US012758807B2

(12) United States Patent
Yee et al.

(10) Patent No.: US 12,758,807 B2
(45) Date of Patent: Oct. 13, 2026

(54) SYSTEMS, APPARATUSES, AND METHODS FOR IMPROVING POWERED AIR PURIFYING RESPIRATOR

(71) Applicant: PIP Manufacturing, Inc., Latham, NY (US)

(72) Inventors: Daniel James Yee, Latham, NY (US); Alex Rochat, Fort Mill, SC (US); Raquel Suarez Net, Mexico City (MX); Mark W. Peurifoy, Latham, NY (US); Raymond Peter Holdcroft, Hertfordshire (GB); Jana Bacinska, Brno (CZ); Shulong Li, Fort Mill, SC (US); Kelli Harper, Stallings, NC (US); Robin B. Regan, Atlanta, GA (US); Petr Lopusnik, Brno (CZ); Vaclav Hruza, Brno (CZ); Jan Crha, Brno (CZ); Marie K. Hammer, Cornelius, NC (US); Jose Antonio Fosado Rodriguez, Miguel Hidalgo (MX); Juan Carlos Adib Audelo Navarro, Mexico City (MX); Taras Andrukh, Fort Mill, SC (US); Marlene M. Ostromecki, Fort Mill, SC (US); Mark L. Oberpriller, Pittsburgh, PA (US); Kenneth G. Karlinchak, Latham, NY (US); Tyler Nikitas, Latham, NY (US); Milan Rabrenovic, Latham, NY (US)

(73) Assignee: PIP Manufacturing, Inc., Latham, NY (US)

( * ) Notice: Subject to any disclaimer, the term of this patent is extended or adjusted under 35 U.S.C. 154(b) by 609 days.

(21) Appl. No.: 18/318,554

(22) Filed: May 16, 2023

(65) Prior Publication Data

US 2023/0372744 A1 Nov. 23, 2023

Related U.S. Application Data

(60) Provisional application No. 63/364,932, filed on May 18, 2022.

(51) Int. Cl.
*A62B 9/00* (2006.01)
*A62B 7/10* (2006.01)

(52) U.S. Cl.
CPC ................ *A62B 9/003* (2013.01); *A62B 7/10* (2013.01)

(58) Field of Classification Search
CPC .. A41D 13/0005; A41D 13/11; A61B 5/4836; A61F 2007/0063; A61F 7/00;
(Continued)

(56) References Cited

U.S. PATENT DOCUMENTS 2,293,041 A * 8/1942 Borden .................... A01J 11/06 210/473
2,990,695 A * 7/1961 Leffingwell, Jr. ...... B64D 13/06 62/48.1
(Continued)

FOREIGN PATENT DOCUMENTS

CA 2432860 A1 12/2004
CN 101909470 A * 12/2010 ............. A61F 7/106
(Continued)

OTHER PUBLICATIONS

Oil Cooler Donut for perkins 1004.42 engine: P2486A218. Heavy Duty Kits. (Mar. 16, 2005). https://www.heavydutykits.com/product/oil-cooler-donut-1004-42-perkins-p2486a218/?srsltid=AfmBOooibyLSLZom7ip-hTAH_xwQLSOMCpdBH_WYHqNaWFyCa-In1i0C (Year: 2005).*
(Continued)

*Primary Examiner* — Brandy S Lee
*Assistant Examiner* — Aislinn M Jones
(74) *Attorney, Agent, or Firm* — Fredrikson & Byron, P.A.

(57) ABSTRACT

Systems, apparatuses, and methods for reducing temperatures of purified air from air-purifying respirators are provided.

20 Claims, 54 Drawing Sheets

(58) Field of Classification Search

CPC ............ A61G 10/023; A61M 2202/03; A61M 2205/36; A62B 17/0005; A62B 7/06; A62B 9/003; A62B 9/00; A62B 7/10; A62B 18/00; B60H 1/00007; B64D 13/06; B64D 2013/0603; F28D 1/00

See application file for complete search history.

(56) References Cited

U.S. PATENT DOCUMENTS

| | | | | | |
|---|---|---|---|---|---|
| 3,000,191 | A | * | 9/1961 | Stark | A41D 13/0053 |
| | | | | | 62/298 |
| 3,385,293 | A | * | 5/1968 | Phillips | A61M 16/06 |
| | | | | | 62/316 |
| 3,610,323 | A | * | 10/1971 | Troyer | A41D 13/0053 |
| | | | | | 607/104 |
| 3,869,871 | A | * | 3/1975 | Rybalko | F25D 3/107 |
| | | | | | 607/104 |
| 4,294,244 | A | * | 10/1981 | Pasternack | A62B 9/003 |
| | | | | | 607/108 |
| 4,379,052 | A | * | 4/1983 | Stearns | B01D 35/02 |
| | | | | | 210/695 |
| 4,611,589 | A | * | 9/1986 | Pasternack | A62B 9/003 |
| | | | | | 128/204.15 |
| 5,386,823 | A | * | 2/1995 | Chen | A41D 13/0053 |
| | | | | | 128/205.12 |
| 5,542,413 | A | * | 8/1996 | Horn | A62B 9/003 |
| | | | | | 128/204.15 |
| 5,572,880 | A | * | 11/1996 | Frustaci | A62B 7/06 |
| | | | | | 62/50.4 |
| 5,896,856 | A | * | 4/1999 | Frasier | A62B 9/003 |
| | | | | | 128/206.29 |
| 6,189,327 | B1 | | 2/2001 | Strauss et al. | |
| 6,192,702 | B1 | | 2/2001 | Shimogori | |
| 6,370,884 | B1 | * | 4/2002 | Kelada | F25B 21/02 |
| | | | | | 62/3.3 |
| 6,857,134 | B1 | | 2/2005 | Cowell | |
| 6,915,641 | B2 | | 7/2005 | Harvie | |
| 7,658,190 | B1 | | 2/2010 | Phifer et al. | |
| 8,087,254 | B2 | | 1/2012 | Arnold | |
| 8,528,677 | B2 | * | 9/2013 | Davis | F01P 11/12 |
| | | | | | 165/104.19 |
| 9,339,066 | B2 | | 5/2016 | Codner et al. | |
| 10,299,525 | B1 | | 5/2019 | Buckman | |
| D884,149 | S | * | 5/2020 | Prevot | D24/129 |
| 10,786,691 | B2 | | 9/2020 | Kao et al. | |
| 2003/0010247 | A1 | * | 1/2003 | Miyaji | B60R 21/261 |
| | | | | | 280/728.1 |
| 2009/0260137 | A1 | * | 10/2009 | Koch | A62B 17/005 |
| | | | | | 165/46 |
| 2010/0108063 | A1 | * | 5/2010 | Koch | A62B 7/00 |
| | | | | | 128/204.15 |
| 2010/0198322 | A1 | | 8/2010 | Joseph et al. | |
| 2010/0242865 | A1 | * | 9/2010 | Davis | F01P 11/12 |
| | | | | | 165/104.19 |
| 2016/0242326 | A1 | * | 8/2016 | Edwards | F04D 25/16 |
| 2018/0352676 | A1 | * | 12/2018 | Degner | H05K 7/20154 |
| 2020/0188626 | A1 | | 6/2020 | Gerder | |
| 2021/0121718 | A1 | * | 4/2021 | Hayran | A62B 9/003 |
| 2021/0298370 | A1 | * | 9/2021 | Watters | A41D 13/0025 |
| 2021/0393890 | A1 | * | 12/2021 | Lynders | A61M 19/00 |
| 2022/0000209 | A1 | | 1/2022 | Hall et al. | |
| 2022/0001218 | A1 | * | 1/2022 | Popov | A62B 18/10 |
| 2022/0023675 | A1 | * | 1/2022 | Herr-Rathke | A62B 18/006 |
| 2023/0372744 | A1 | * | 11/2023 | Yee | A62B 7/10 |

FOREIGN PATENT DOCUMENTS

| | | | | | |
|---|---|---|---|---|---|
| CN | 107343989 | A | * | 11/2017 | A62B 23/02 |
| CN | 108922810 | A | | 11/2018 | |
| CN | 108992810 | A | * | 12/2018 | A62B 18/02 |
| CN | 110074502 | A | | 8/2019 | |
| CN | 110747350 | A | * | 2/2020 | C22B 1/005 |
| CN | 111602904 | A | * | 9/2020 | A41D 31/12 |
| CN | 111918625 | A | * | 11/2020 | A61F 9/00736 |
| CN | 212814479 | U | * | 3/2021 | |
| CN | 113494744 | A | * | 10/2021 | F24F 11/89 |
| CN | 113797415 | A | * | 12/2021 | A61M 16/105 |
| DE | 10153121 | C1 | | 5/2003 | |
| DE | 102008060826 | B3 | * | 2/2010 | A62B 17/005 |
| DE | 102013014800 | A1 | * | 3/2015 | A62B 18/006 |
| DE | 102020111399 | A1 | * | 10/2021 | A62B 18/025 |
| EP | 2818204 | A1 | * | 12/2014 | A62B 17/005 |
| GB | 1170702 | A | * | 11/1969 | |
| JP | 2018533846 | A | * | 11/2018 | H10W 40/475 |
| JP | 2019130277 | A | * | 8/2019 | |
| KR | 20080039221 | A | * | 5/2008 | E21B 43/2605 |
| KR | 101276516 | B1 | * | 6/2013 | A62B 18/006 |
| KR | 20180117442 | A | * | 10/2018 | B60H 3/0641 |
| KR | 102055522 | B1 | * | 1/2020 | F24F 13/28 |
| KR | 20210143407 | A | * | 11/2021 | B01D 53/75 |
| KR | 20220026779 | A | * | 3/2022 | A62B 18/08 |
| WO | WO-0192793 | A1 | * | 12/2001 | F25D 3/107 |
| WO | 2004/111741 | A1 | | 12/2004 | |
| WO | WO-2015032472 | A1 | * | 3/2015 | A62B 18/006 |
| WO | WO-2015151368 | A1 | * | 10/2015 | A61M 16/1075 |
| WO | WO-2021219151 | A1 | * | 11/2021 | A62B 18/025 |
| WO | WO-2021231585 | A1 | * | 11/2021 | A62B 18/025 |
| WO | 2022/039764 | A1 | | 2/2022 | |

OTHER PUBLICATIONS

YouTube. (May 30, 2014). YouTube. https://www.youtube.com/watch?v=f04DZbATiqA (Year: 2014).*

Evaporator 101. HVAC School. (Jul. 29, 2019). https://www.hvacrschool.com/videos/evaporator-101/ (Year: 2019).*

Strong sunlight powers passive cooling device. EurekAlert! (Sep. 19, 2021). https://www.eurekalert.org/news-releases/928908 (Year: 2021).*

Strouse Home Inspections. owning and maintaining evaporative coolers—Strouse Home Inspections Blog. (Sep. 17, 2021). https://web.archive.org/web/20210917131110/https:/strousehomeinspections.com/blog/owning-and-maintaining-evaporative-coolers.html (Year: 2021).*

Extended European Search Report Mailed on Sep. 14, 2023 for EP Application No. 23174158, 10 page(s).

Honeywell, "Powered Air Purifying Respirators & Continuous Flow Supplied Air Respirators Selection Guide," Honeywell North, 4 pages. [Retrieved from the Internet Mar. 26, 2024: URL: <https://prod-edam.honeywell.com/content/dam/honeywell-edam/sps/his/en-us/products/respiratory-protection/documents/HS_pr500_series_front_mount_papr_brochure_papr_cfsar%20selection%20guide_hsprsp.217.pdf>].

* cited by examiner

SYSTEMS, APPARATUSES, AND METHODS FOR IMPROVING POWERED AIR PURIFYING RESPIRATOR

CROSS-REFERENCE TO RELATED APPLICATIONS

This application claims priority to and benefit of U.S. Provisional Patent Application No. 63/364,932, Filed May 18, 2022, the entire content of which is incorporated by reference in its entirety.

BACKGROUND

Applicant has identified many technical challenges and limitations associated with respiratory protective equipment, including air-purifying respirators (APRs) such as, but not limited to, powered air purifying respirators (PAPRs).

BRIEF SUMMARY

In accordance with various example embodiments of the present disclosure, examples of various components associated with air-purifying respirators are provided. Various embodiments of the present disclosure can improve a user's safety and comfort when wearing powered air purifying respirator in environments such as an extreme heat environments. For example, example embodiments of the present disclosure can reduce the temperature of purified air from the air-purifying respirators. Such examples include, but are not limited to:

Example 1: a respiratory headgear for an air-purifying respirator comprises: a head cover comprising a first fastener component secured on an inner surface of the head cover; and a headband comprising a plurality of second fastener components secured on an outer surface of the headband.

Example 2: in the respiratory headgear of Example 1, the first fastener component is positioned at a side portion of the inner surface of the head cover.

Example 3: in the respiratory headgear of Example 1, the head cover comprises a visor shield positioned at a front portion of the head cover.

Example 4: in the respiratory headgear of Example 1, the first fasten component is fastened to one of the plurality of second fastener components of the headband.

Example 5: in the respiratory headgear of Example 1, the headband comprises moisture wicking material.

Example 6: in the respiratory headgear of Example 1, the headband comprises elastic material.

Example 7: a respiratory headgear for an air-purifying respirator comprises: a tube connector comprising at least one tube connector outlet opening positioned within the respiratory headgear for releasing purified air; and an air duct plate positioned within the respiratory headgear, wherein a back surface of the air duct plate is attached to a front wall of the tube connector.

Example 8: in the respiratory headgear of Example 7, an inner surface of the respiratory headgear and the back surface of the air duct plate define at least one flow channel for the purified air.

Example 9: in the respiratory headgear of Example 7, the air duct plate comprises a plurality of perforations, wherein purified air flows through the plurality of perforations.

Example 10: in the respiratory headgear of Example 7, the at least one tube connector outlet opening comprises a top tube connector outlet opening, a bottom left tube connector outlet opening, and a bottom right tube connector outlet opening.

Example 11: in the respiratory headgear of Example 10, the air duct plate comprises a top air duct wing corresponding to the top tube connector outlet opening, a bottom left wing corresponding to the bottom left tube connector outlet opening, and a bottom right wing corresponding to the bottom right tube connector outlet opening.

Example 12: in the respiratory headgear of Example 10, the air duct plate comprises a top air duct wing corresponding to the top tube connector outlet opening and a bottom wing corresponding to the bottom left tube connector outlet opening and the bottom right tube connector outlet opening.

Example 13: in the respiratory headgear of Example 7, the tube connector comprises a tube connector inlet opening positioned outside of the respiratory headgear and connected to a breathing tube, wherein the breathing tube is connected to an air-purifying device outlet opening of an air-purifying device.

Example 14: a respiratory headgear for an air-purifying respirator comprises: a head cover comprising at least one pocket on an inner surface of the head cover; and at least one cooling pouch positioned within the at least one pocket of the head cover.

Example 15: in the respiratory headgear of Example 14, the at least one pocket is positioned at a back portion of the inner surface of the head cover.

Example 16: in the respiratory headgear of Example 14, the at least one cooling pouch comprises coolant material.

Example 17: an air-purifying respirator comprises: a blower assembly housing defining a sunken surface, wherein a centrifugal blower is disposed in the blower assembly housing; and a filter cartridge positioned on the sunken surface of the blower assembly housing, wherein the filter cartridge comprises coolant material.

Example 18: in the air-purifying respirator of Example 17, a centrifugal blower inlet opening of the centrifugal blower is on the sunken surface.

Example 19: in the air-purifying respirator of Example 17, the coolant material comprises ammonium nitrate.

Example 20: in the air-purifying respirator of Example 17, the coolant material comprises water.

Example 21: an air-purifying respirator comprising: a blower assembly housing defining a sunken surface, wherein a centrifugal blower is disposed in the blower assembly housing; a cooling cartridge positioned on the sunken surface of the blower assembly housing, wherein the cooling cartridge comprises coolant material; and a filter cartridge positioned to a top surface of the cooling cartridge.

Example 22: in the air-purifying respirator of Example 21, a centrifugal blower inlet opening of the centrifugal blower is on the sunken surface.

Example 23: in the air-purifying respirator of Example 21, the coolant material comprises ammonium nitrate and water.

Example 24: in the air-purifying respirator of Example 21, the coolant material comprises ice and water.

Example 25: an air-purifying respirator comprises: a blower assembly housing, wherein a centrifugal blower is disposed in the blower assembly housing; a blower assembly cover secured to the blower assembly housing; and a cooling pad disposed on an inner surface of the blower assembly cover, wherein the cooling pad comprises coolant material.

Example 26: in the air-purifying respirator of Example 25, the coolant material comprises ammonium nitrate and water.

Example 27: in the air-purifying respirator of Example 25, the coolant material comprises ice and water.

Example 28: an air-purifying respirator comprises: a blower assembly housing, wherein a centrifugal blower is secured in the blower assembly housing and comprises a centrifugal blower outlet opening; a breathing tube comprising a breathing tube inlet opening that is connected to the centrifugal blower outlet opening; and a cooling pad surrounding a cooling portion of the breathing tube.

Example 29: in the air-purifying respirator of Example 28, the cooling portion of the breathing tube is adjacent to the blower assembly housing.

Example 30: in the air-purifying respirator of Example 28, the breathing tube comprises a breathing tube outlet opening connected to a respiratory headgear inlet opening of a respiratory headgear, wherein the cooling portion of the breathing tube is positioned adjacent to the respiratory headgear.

Example 31: an air-purifying respirator comprises: a breathing tube, wherein a breathing tube inlet opening of the breathing tube is connected to an air-purifying device outlet opening of an air-purifying device; and a coolant container comprising coolant material, wherein the breathing tube comprises a cooling portion positioned within the coolant container and in contact with the coolant material, wherein the coolant container defines a condensation release channel connecting a condensation catch opening on the cooling portion to a condensation release opening on the coolant container.

Example 32: in the air-purifying respirator of Example 31, the coolant material comprises water.

Example 33: in the air-purifying respirator of Example 31, the coolant container comprises a coolant container entrance opening and a coolant container exit opening, wherein the breathing tube enters the coolant container through the coolant container entrance opening and exits the coolant container through the coolant container exit opening.

Example 34: in the air-purifying respirator of Example 31, the cooling portion of the breathing tube comprises a thermal conductive material.

Example 35: in the air-purifying respirator of Example 34, a thermal conductivity range associated with the thermal conductive material is between 0.2 Watts per meter-Kelvin (W/mK) and 10 W/mK.

Example 36: in the air-purifying respirator of Example 34, a thermal conductivity range associated with the thermal conductive material is between 0.3 W/mK and 0.5 W/mK.

Example 37: in the air-purifying respirator of Example 34, the thermal conductive material is selected from the group consisting of high density polyethylene (HDPE), acrylonitrile butadiene styrene (ABS), polyphenylene sulfide (PPS), low density polyethylene (LDPE), polyether ether ketone (PEEK), polybutylene terephthalate, ethylene-vinyl acetate polymer (EVA), Nylon 6, Nylon 66, and polyurethanes.

Example 38: in the air-purifying respirator of Example 31, the coolant container comprises a container shell, wherein a thermal conductivity associated with the container shell is less than a thermal conductivity of the cooling portion of the breathing tube.

Example 39: in the air-purifying respirator of Example 31, the breathing tube receives purified air from the air-purifying device outlet opening of the air-purifying device.

Example 40: in the air-purifying respirator of Example 31, the cooling portion of the breathing tube comprises a downward convex shaped section, wherein the condensation catch opening is positioned at the lowest point of the downward convex shaped section.

Example 41: in the air-purifying respirator of Example 31, the coolant container comprises a condensation release valve positioned in the condensation release channel and blocking the condensation catch opening and the condensation release opening.

Example 42: in the air-purifying respirator of Example 31, the coolant container defines a coolant release opening.

Example 43: in the air-purifying respirator of Example 31, the air-purifying device comprises a centrifugal blower causing purified air to flow through the air-purifying device outlet opening of the air-purifying device.

Example 44: an air-purifying respirator comprises: a breathing tube comprising a breathing tube inlet opening that is connected to an air-purifying device outlet opening of an air-purifying device, wherein the air-purifying device causes purified air to flow upwards to the breathing tube through the air-purifying device outlet opening; and a coolant container positioned above the air-purifying device and housing coolant material, wherein the breathing tube enters the coolant container through a coolant container entrance opening of the coolant container and exits the coolant container through a coolant container exit opening of the coolant container.

Example 45: an air-purifying respirator comprises: a breathing tube comprising a breathing tube inlet opening that is connected to an air-purifying device outlet opening on a left side of an air-purifying device, wherein the air-purifying device causes purified air to flow downwards to the breathing tube through the air-purifying device outlet opening; and a coolant container positioned on the left side of the air-purifying device and housing coolant material, wherein the breathing tube enters the coolant container through a bottom coolant container entrance opening of the coolant container and exits the coolant container through a top coolant container exit opening of the coolant container.

Example 46: an air-purifying respirator comprises: a breathing tube comprising a breathing tube inlet opening that is connected to an air-purifying device outlet opening on a left side of an air-purifying device, wherein the air-purifying device causes purified air to flow downwards to the breathing tube through the air-purifying device outlet opening; and a coolant container positioned on a back side of the air-purifying device and housing coolant material, wherein the breathing tube enters the coolant container through a left coolant container entrance opening of the coolant container and exits the coolant container through a top coolant container exit opening of the coolant container.

Example 47: an air-purifying respirator comprises: a breathing tube comprising a breathing tube inlet opening that is connected to an air-purifying device outlet opening of an air-purifying device, wherein the air-purifying device causes purified air to flow upwards to the breathing tube through the air-purifying device outlet opening; and a coolant container positioned on a back side of the air-purifying device and housing coolant material, wherein the breathing tube enters the coolant container through a top coolant container entrance opening of the coolant container and exits the coolant container through a top coolant container exit opening of the coolant container.

Example 48: an air-purifying respirator comprises: a breathing tube comprising a breathing tube inlet opening that is connected to an air-purifying device outlet opening of an air-purifying device, wherein the air-purifying device causes purified air to flow upwards to the breathing tube through the air-purifying device outlet opening; and a coolant container positioned on a bottom side of the air-purifying device and housing coolant material, wherein the breathing tube enters the coolant container through a right coolant container entrance opening of the coolant container and exits the coolant container through a left coolant container exit opening of the coolant container.

Example 49: an air-purifying respirator comprises: a breathing tube comprising at least one breathing tube attachment connector and a breathing tube inlet opening, wherein the breathing tube inlet opening is connected to an air-purifying device outlet opening of an air-purifying device; and a coolant container defining a coolant container entrance opening, wherein the breathing tube is attached to the coolant container entrance opening through the at least one breathing tube attachment connector.

Example 50: in the air-purifying respirator of Example 49, the at least one breathing tube attachment connector comprises at least one locking pin on an outer surface of the breathing tube attachment connector, wherein the coolant container comprises at least one locking slot on an inner surface of the coolant container entrance opening, wherein the at least one locking pin is secured in the at least one locking slot.

Example 51: in the air-purifying respirator of Example 49, the at least one breathing tube attachment connector comprises an O-ring, wherein the coolant container comprises an O-ring threshold on an inner surface of the coolant container entrance opening.

Example 52: in the air-purifying respirator of Example 49, the at least one breathing tube attachment connector comprises a first plurality of threads, wherein the coolant container comprises a second plurality of threads on an inner surface of the coolant container entrance opening, wherein the breathing tube is attached to the coolant container through an engagement between the first plurality of threads and the second plurality of threads.

Example 53: in the air-purifying respirator of Example 49, adhesive material is disposed on an outer surface of the breathing tube.

Example 54: in the air-purifying respirator of Example 49, the at least one breathing tube attachment connector comprises at least one detent portion on an outer surface of the breathing tube attachment connector, wherein the coolant container comprises at least one ball disposed on an inner surface of the coolant container entrance opening, wherein the breathing tube is attached to the coolant container through an engagement between the at least one detent portion and the at least one ball.

Example 55: in the air-purifying respirator of Example 49, the at least one breathing tube attachment connector comprises at least one protrusion, wherein the coolant container comprises at least one depression portion on an inner surface of the coolant container entrance opening, wherein the breathing tube is attached to the coolant container through a snap fit engagement between the at least one protrusion and the at least one depression portion.

Example 56: an air-purifying respirator comprises: a coolant container comprising coolant material and defining a central hole; a refrigerant evaporator, wherein at least a portion of the refrigerant evaporator is positioned within the central hole of the coolant container; and a breathing tube entering the coolant container through a coolant container entrance opening of the coolant container and exiting the coolant container through a coolant container exit opening of the coolant container.

Example 57: in the air-purifying respirator of Example 56, the breathing tube comprises a cooling portion in contact with the coolant material and at least partially surrounding the central hole.

Example 58: in the air-purifying respirator of Example 56, the refrigerant evaporator defining a refrigerant flow channel and a refrigerant circulation opening, wherein the refrigerant circulation opening is connected to the refrigerant flow channel.

Example 59: in the air-purifying respirator of Example 58, the refrigerant evaporator comprises refrigerant material.

Example 60: in the air-purifying respirator of Example 59, the refrigerant material enters the refrigerant flow channel through the refrigerant circulation opening.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWINGS

Figure 1:
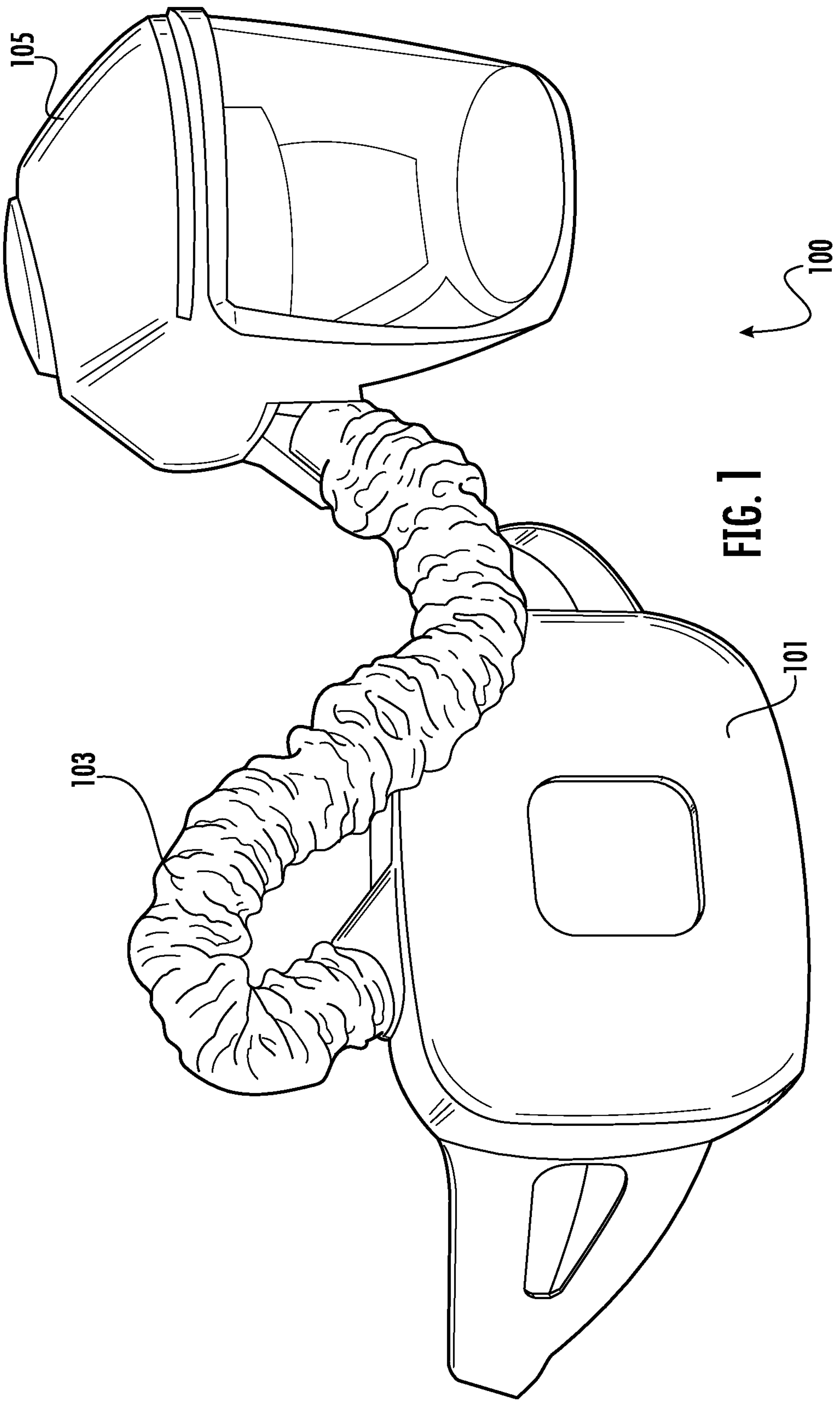
Figure 2:
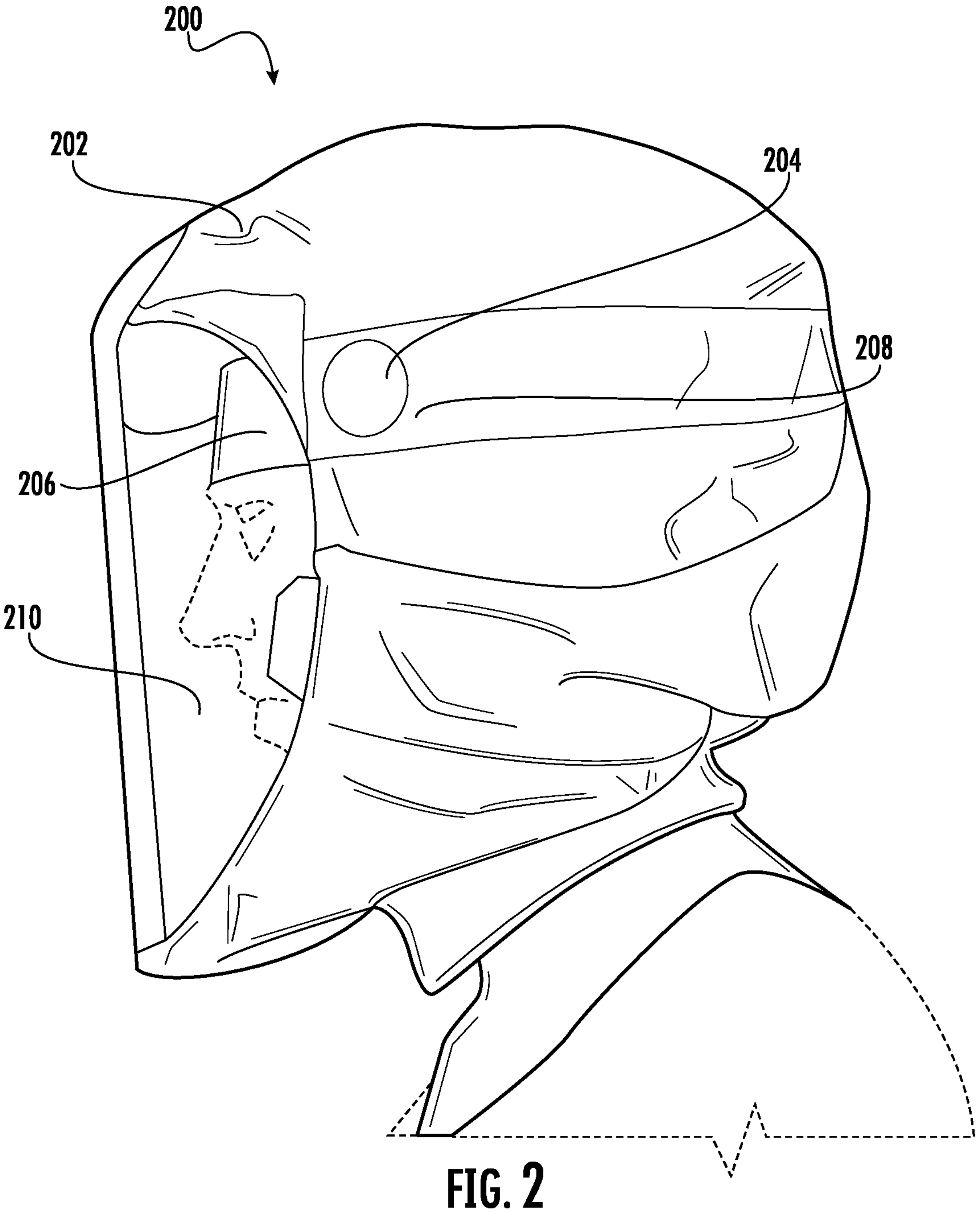
Figure 3:
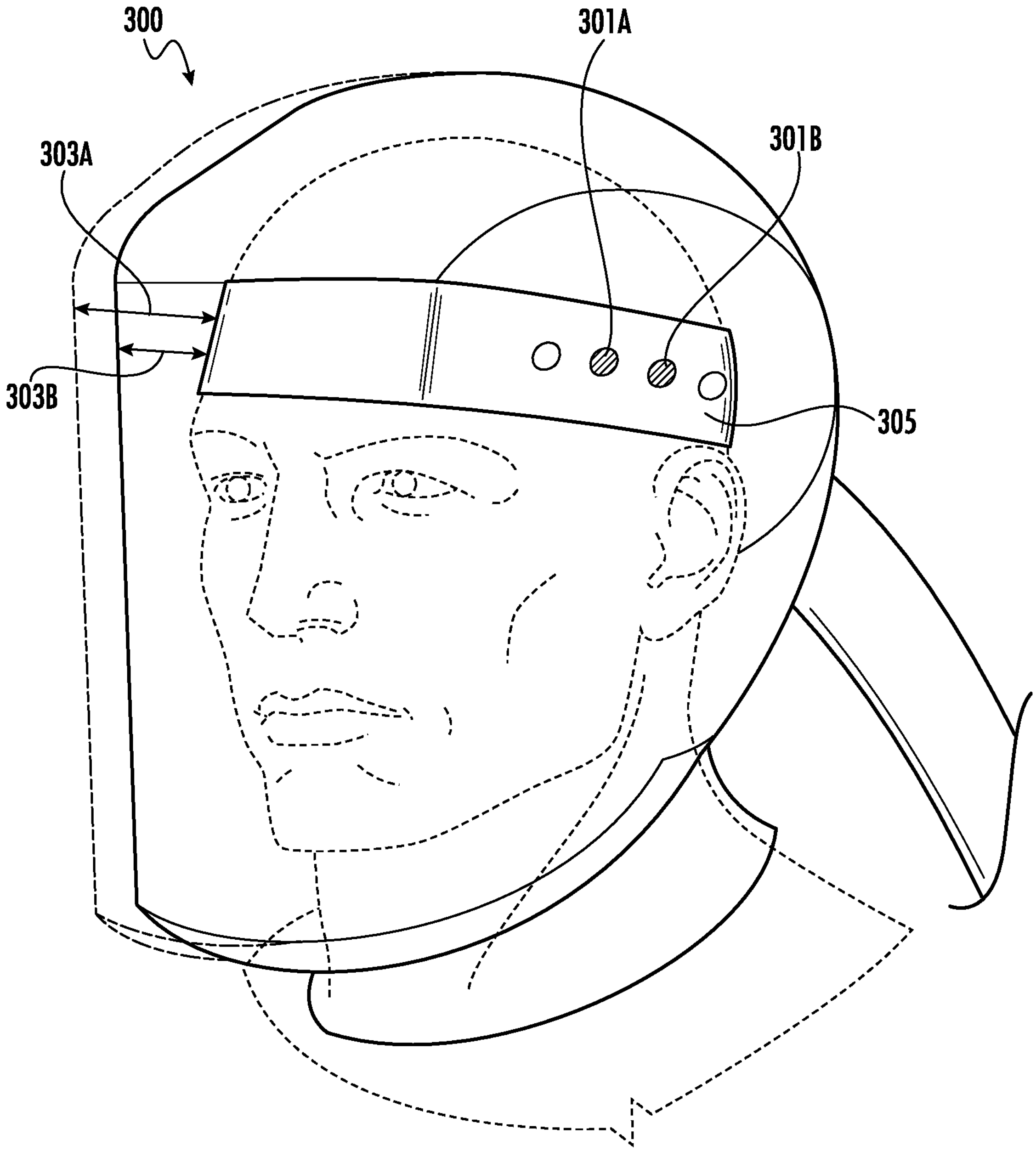
Figure 4:
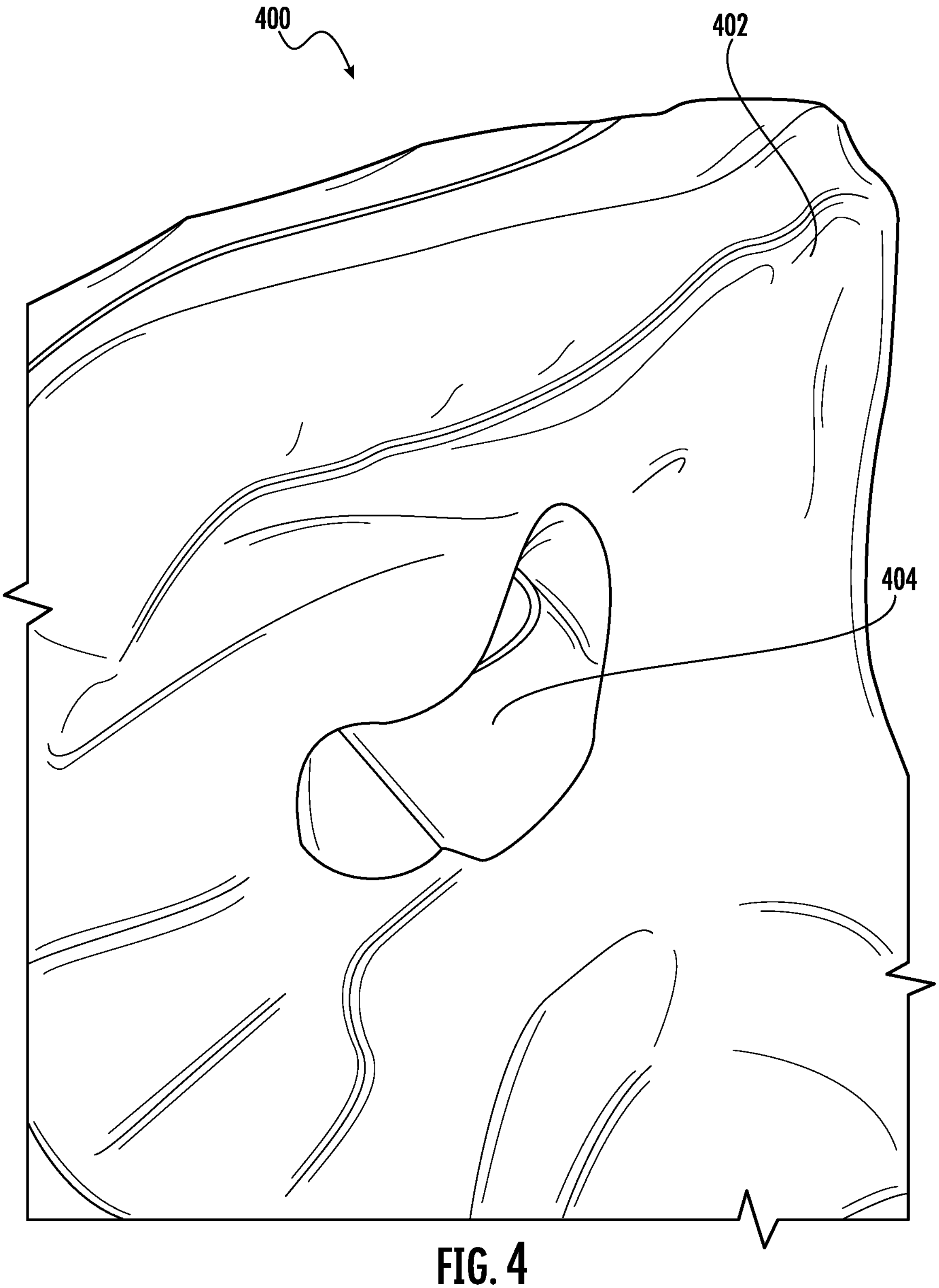
Figure 5:
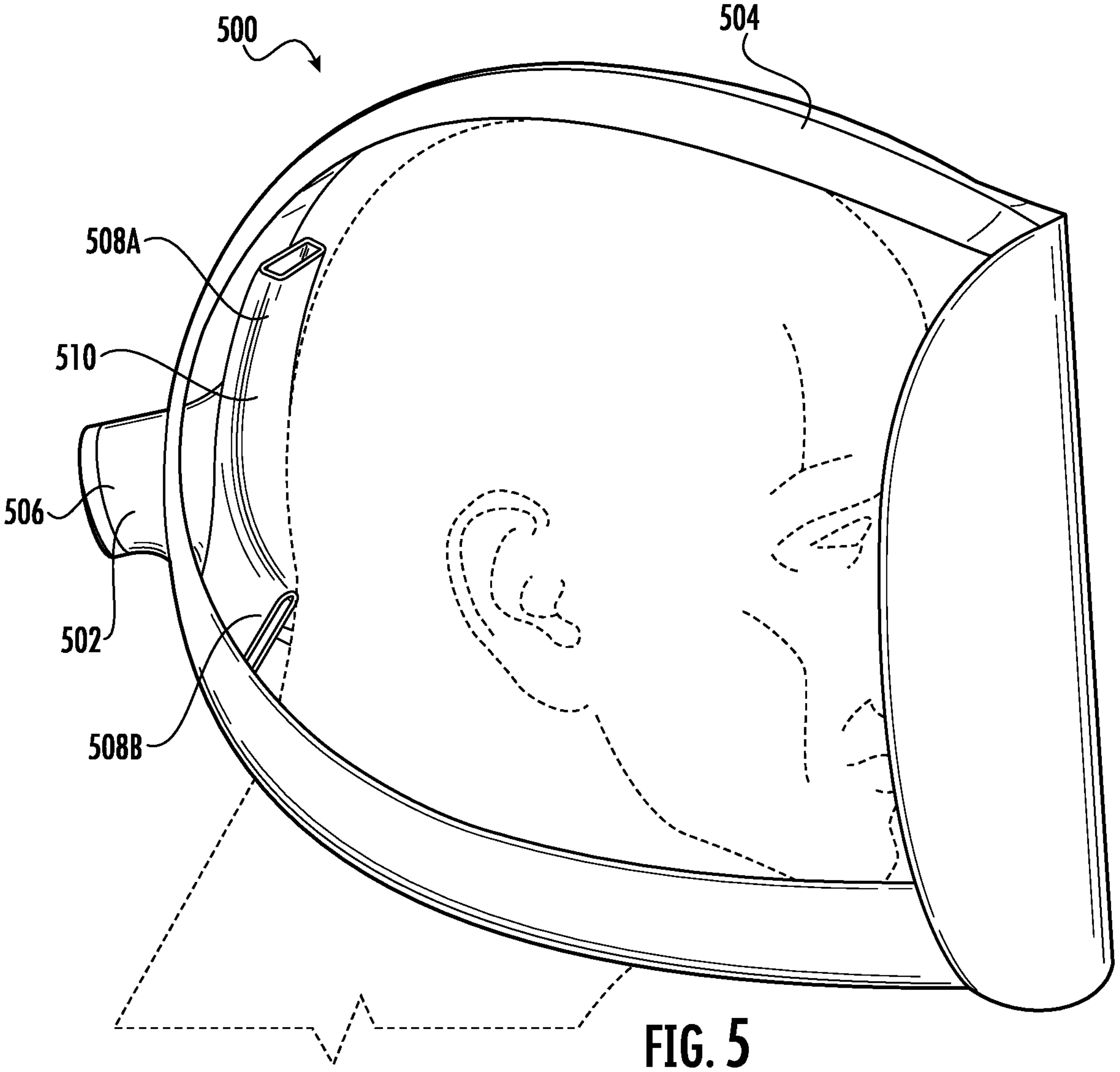
Figure 6:
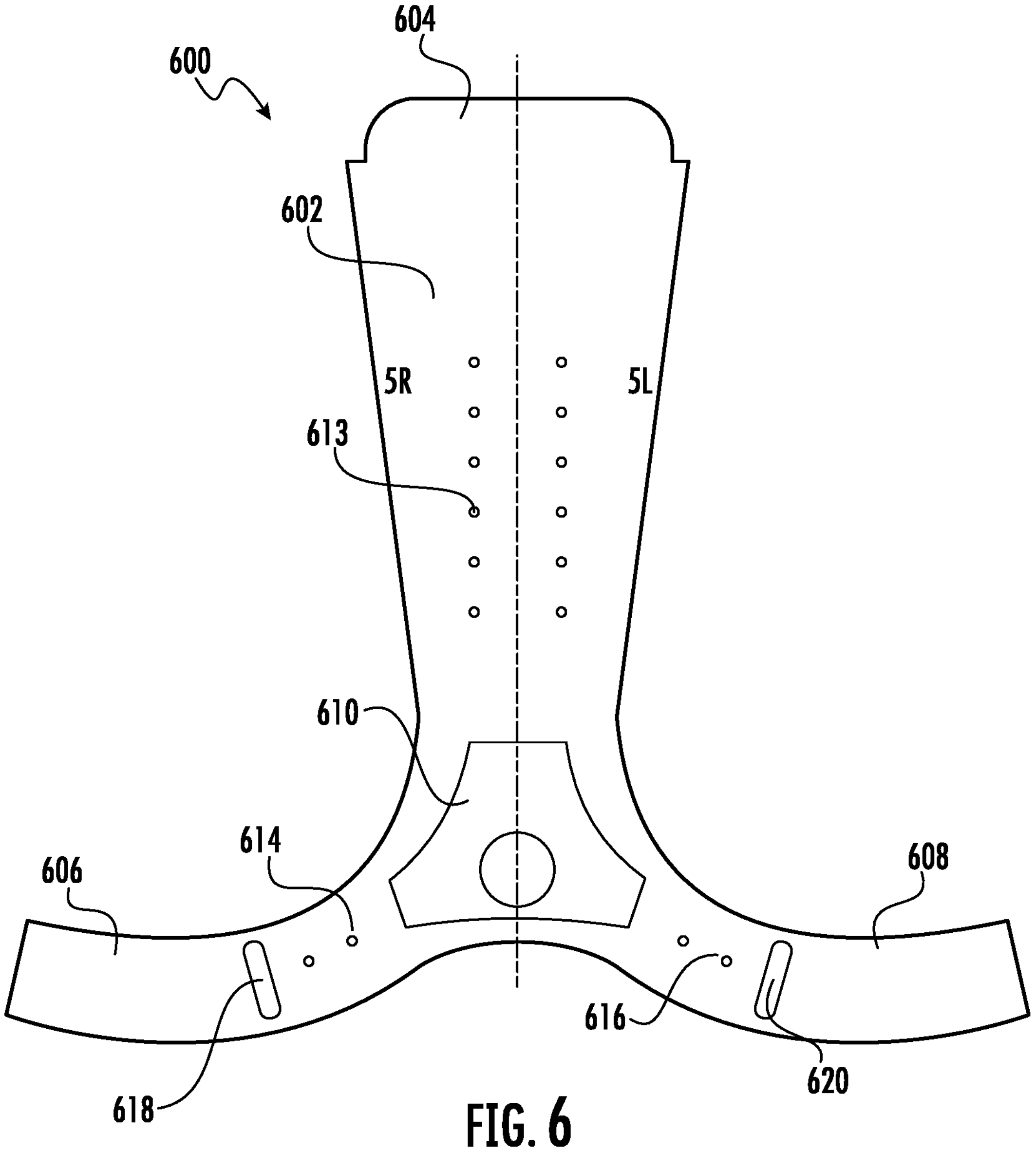
Figure 7A:
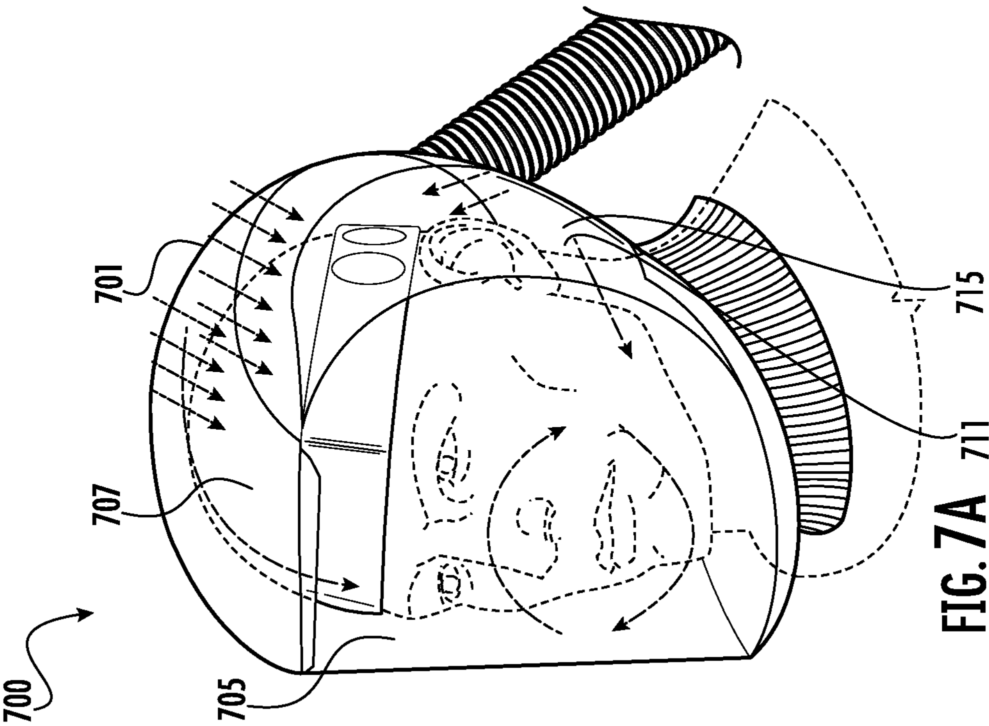
Figure 7B:
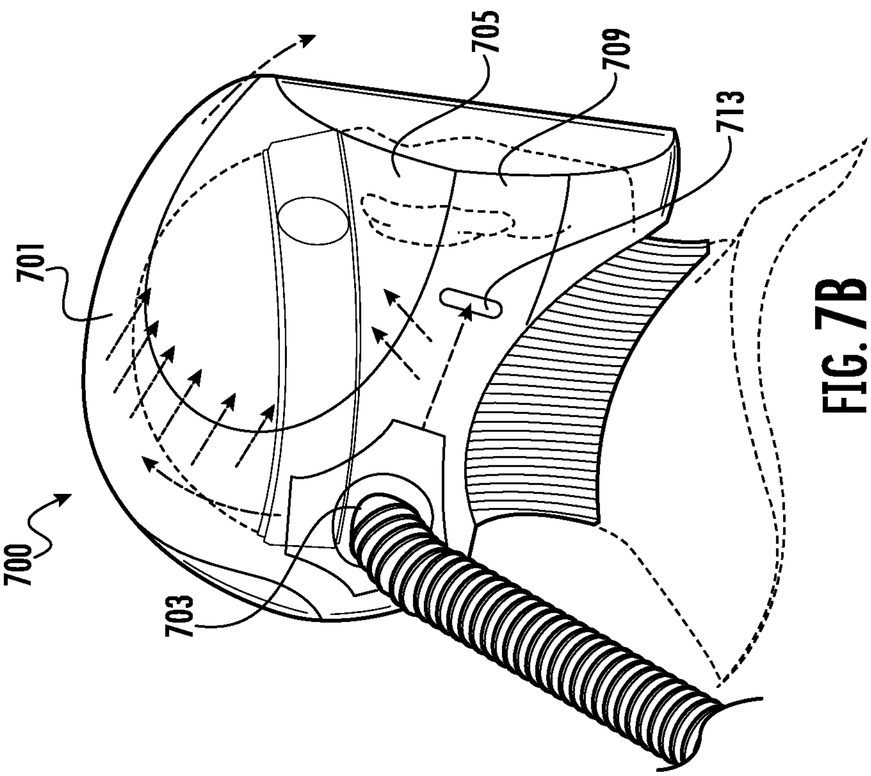
Figure 8:
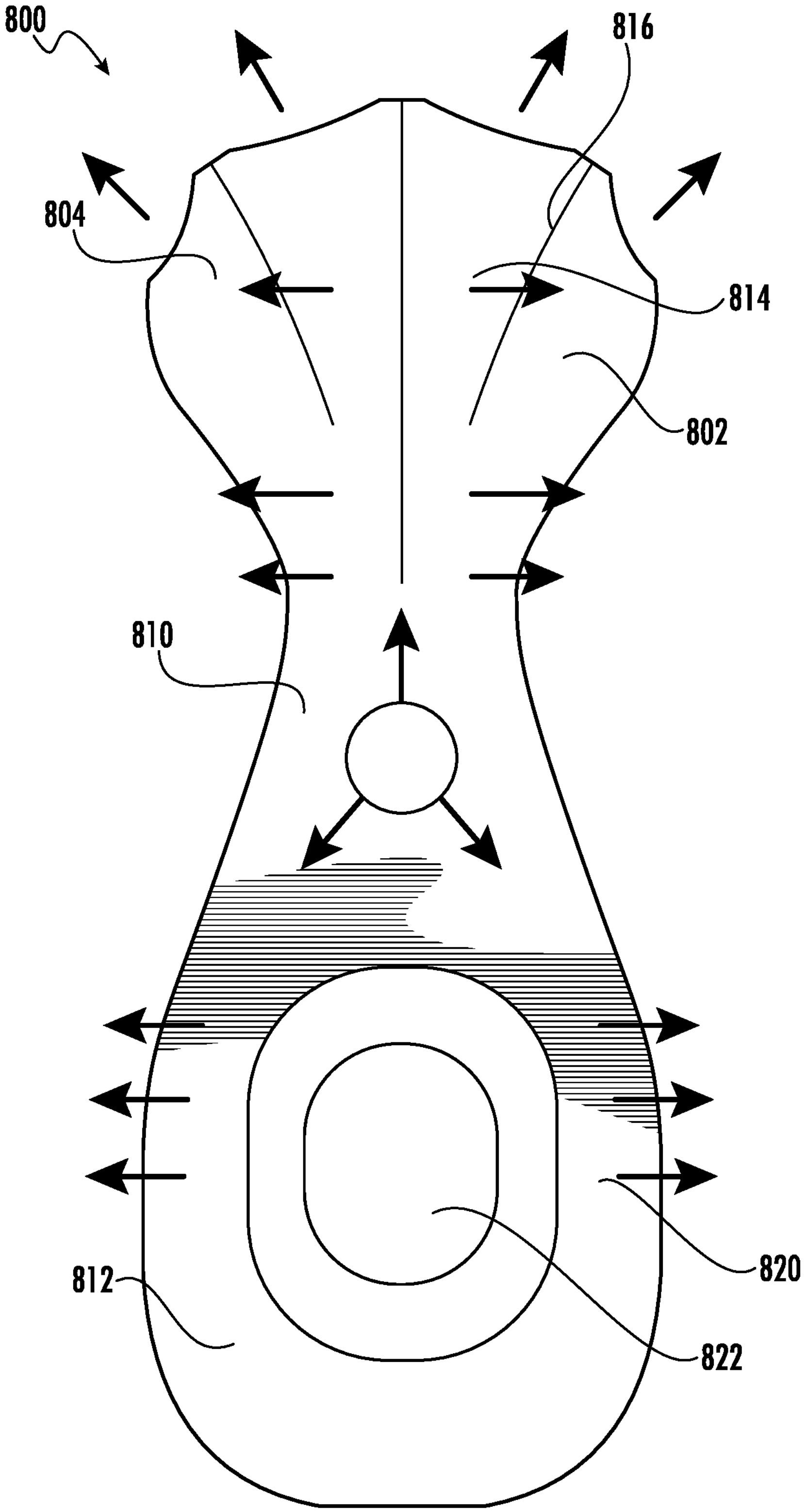
Figure 9:
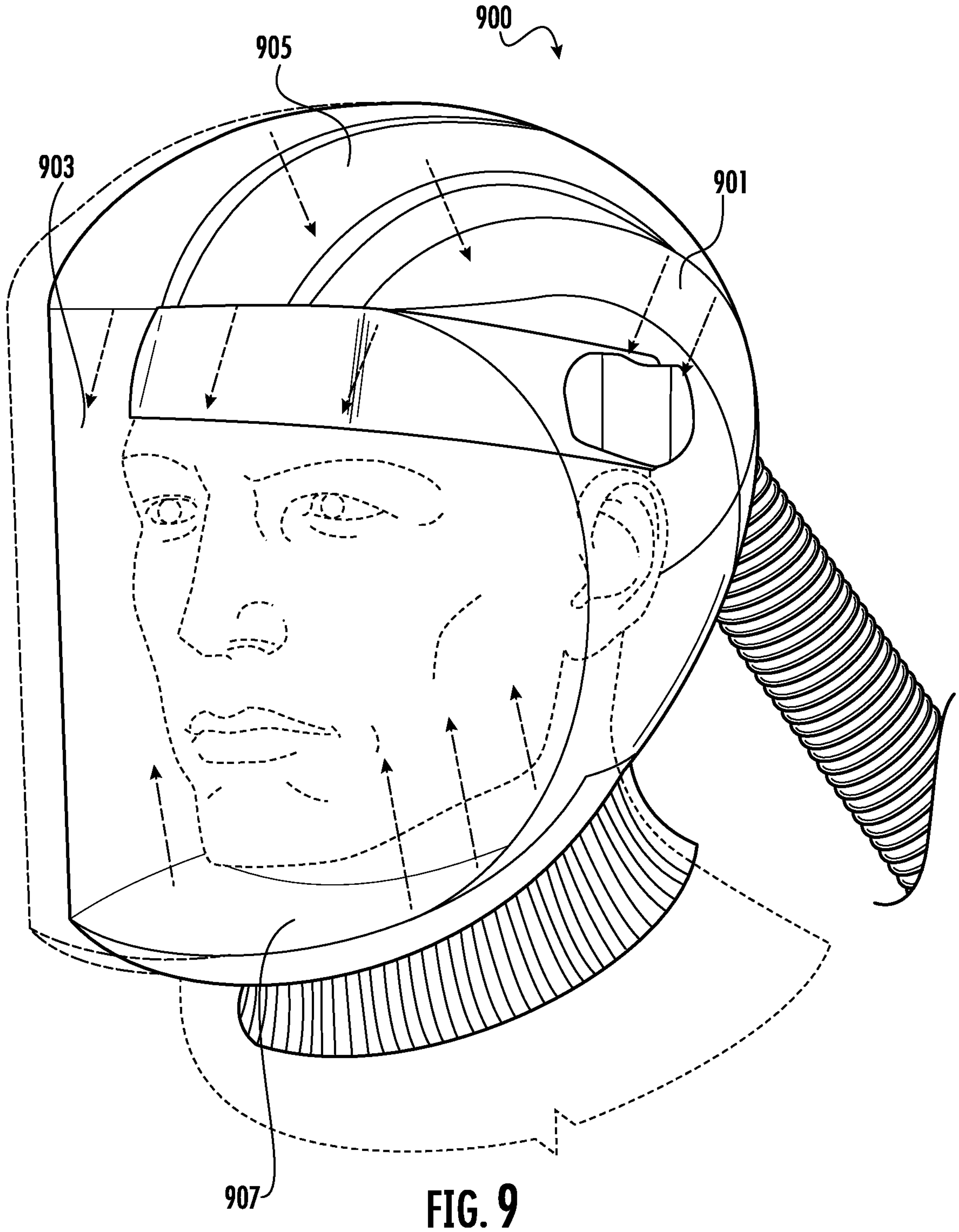
Figure 10:
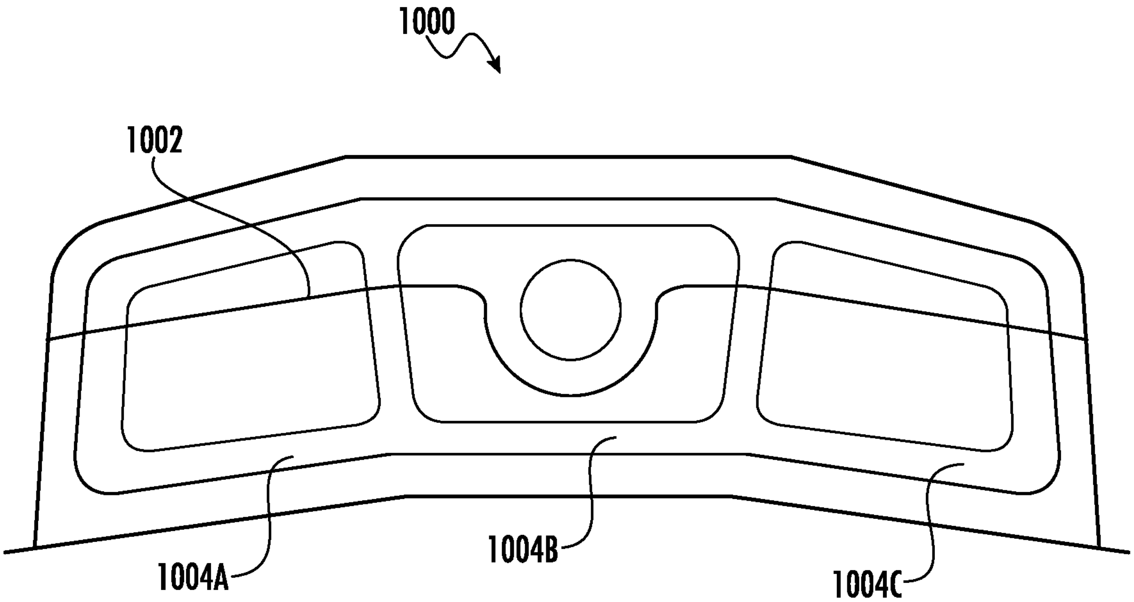
Figure 11:
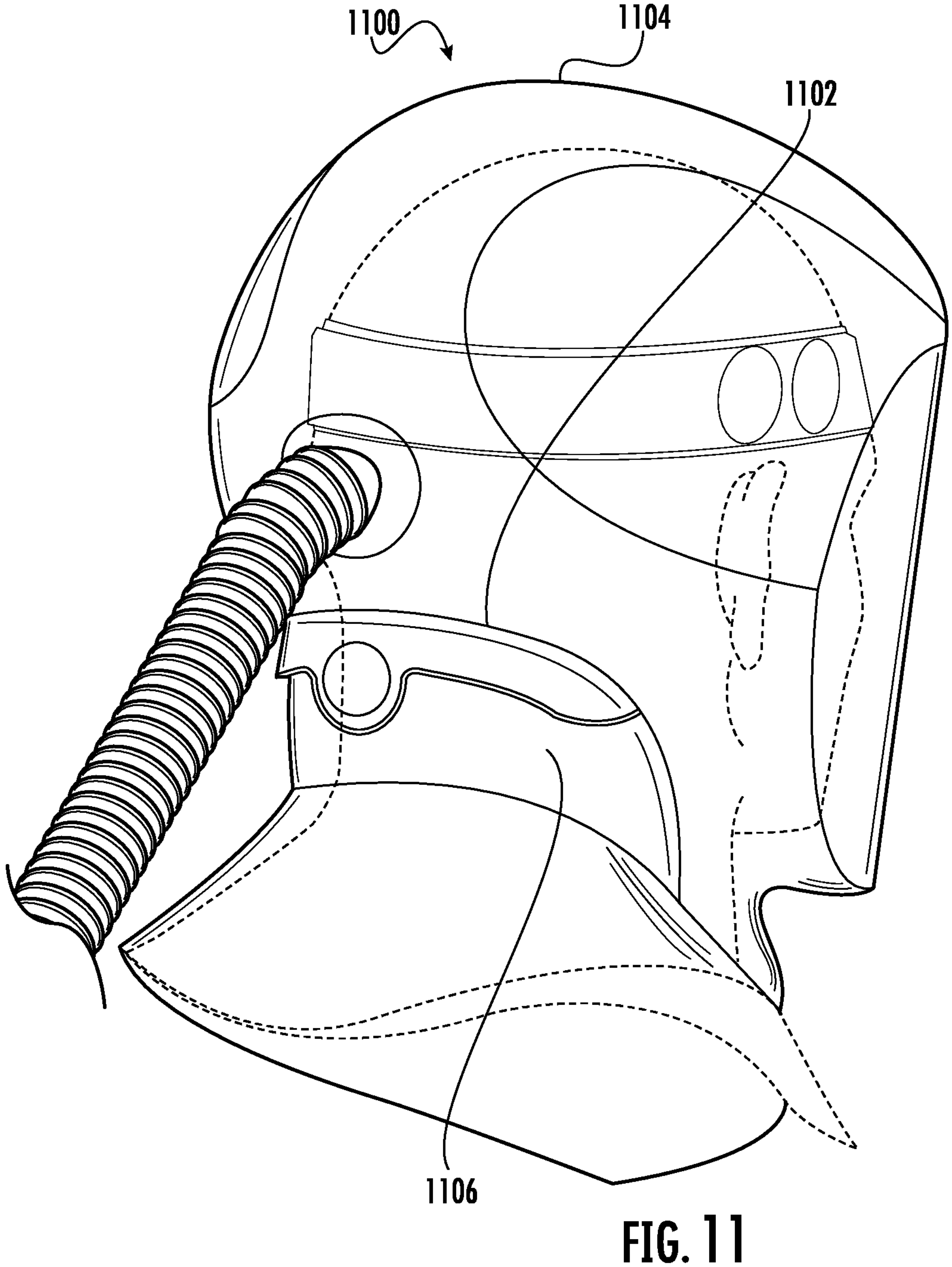
Figure 12:
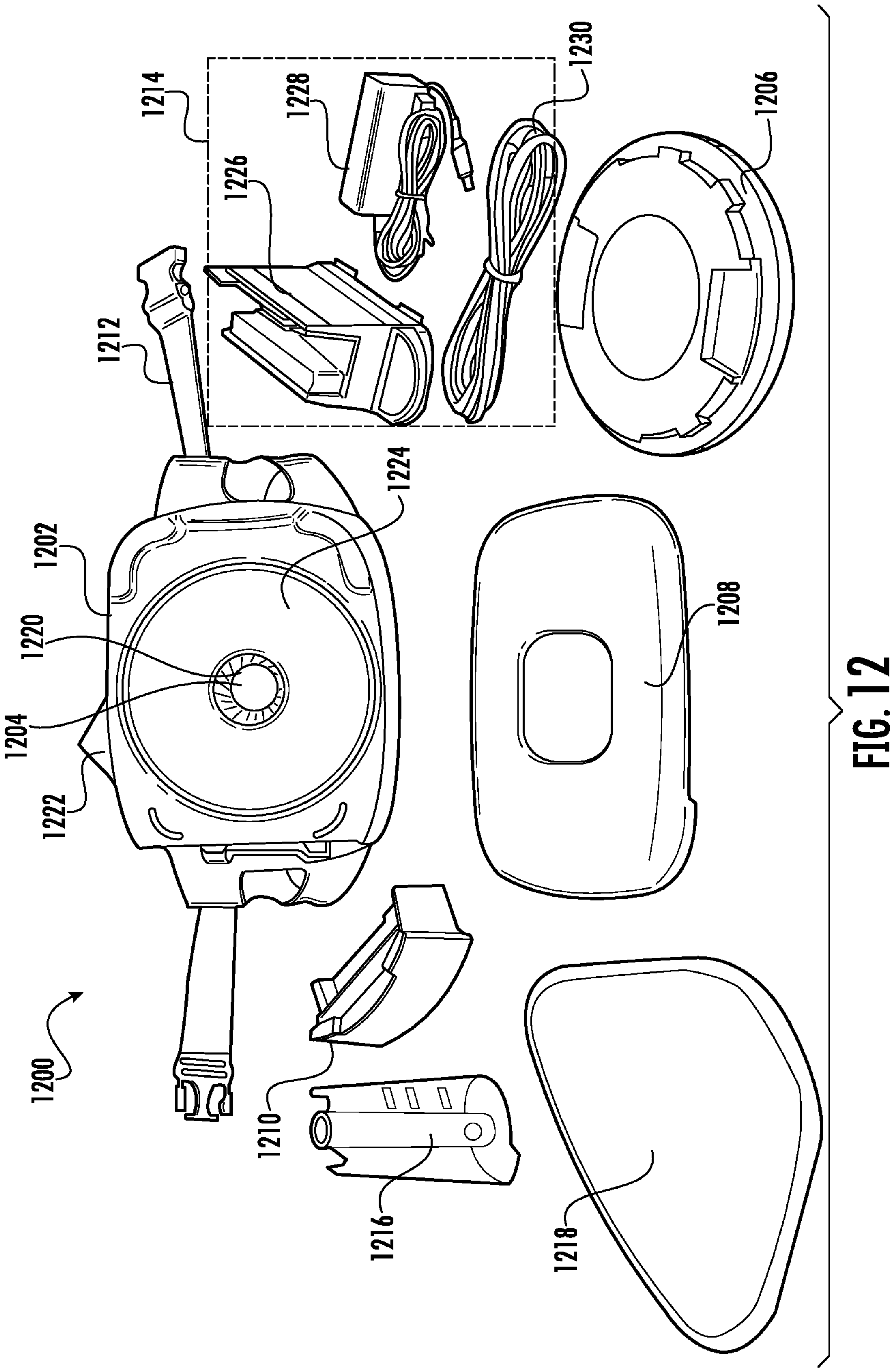
Figure 13:
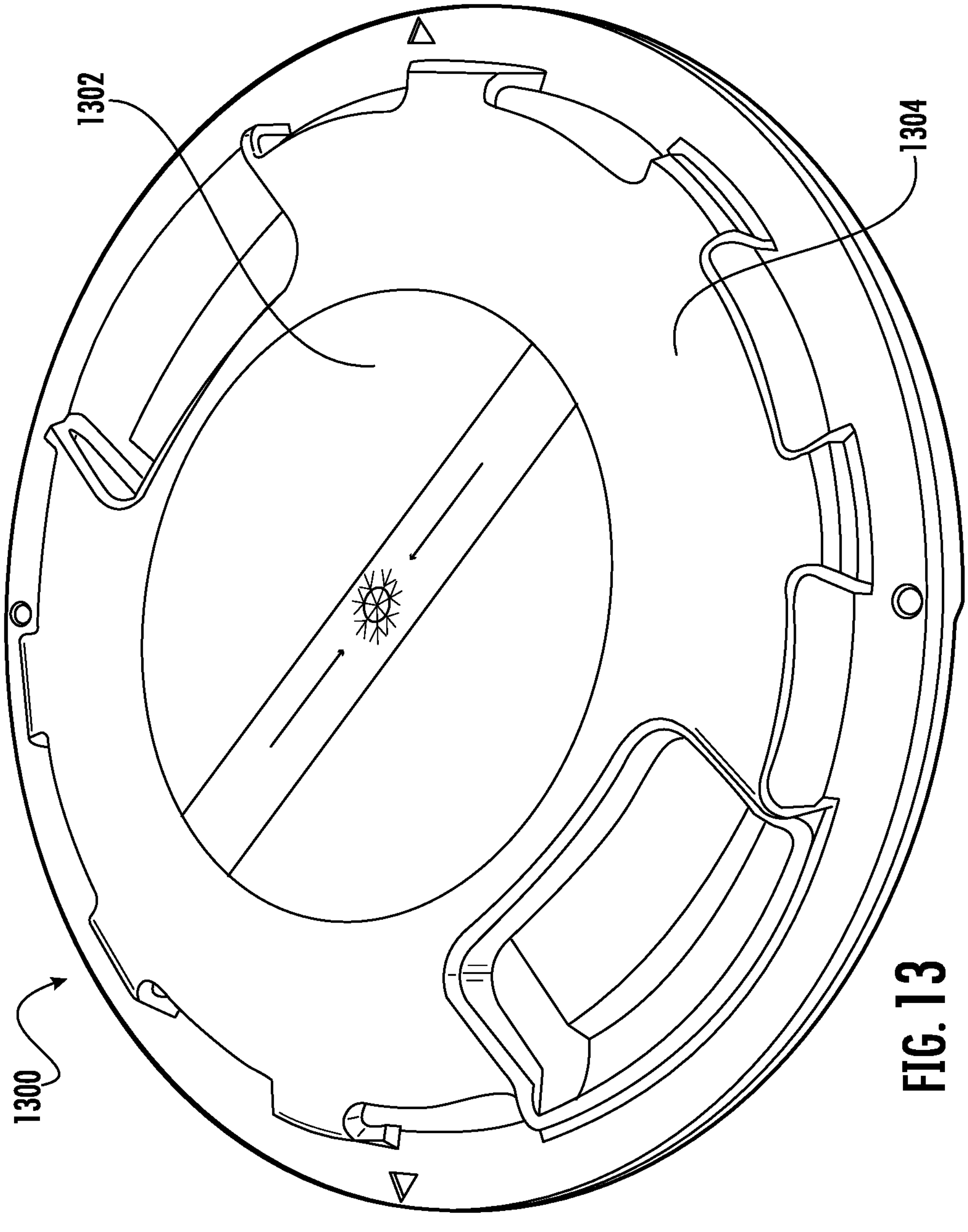
Figure 14A:
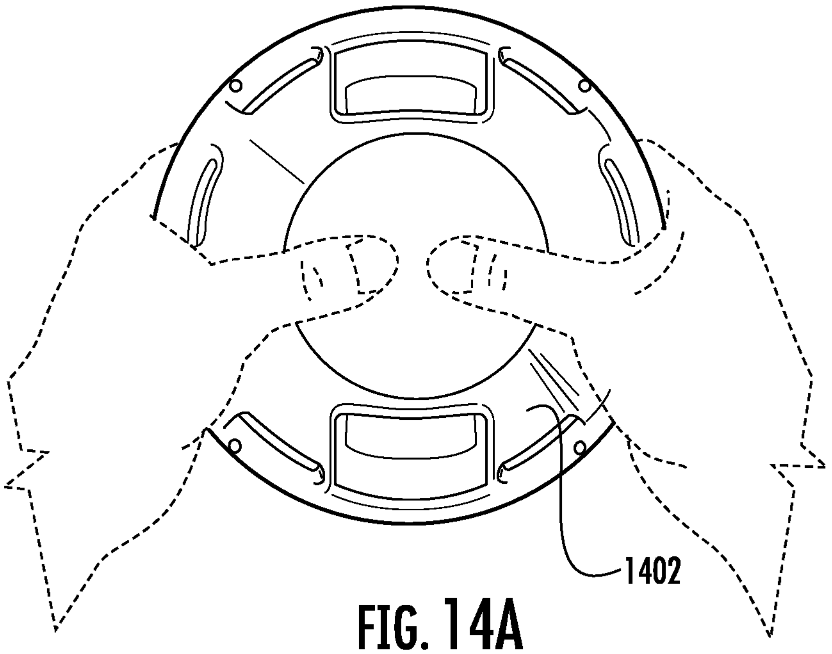
Figure 14B:
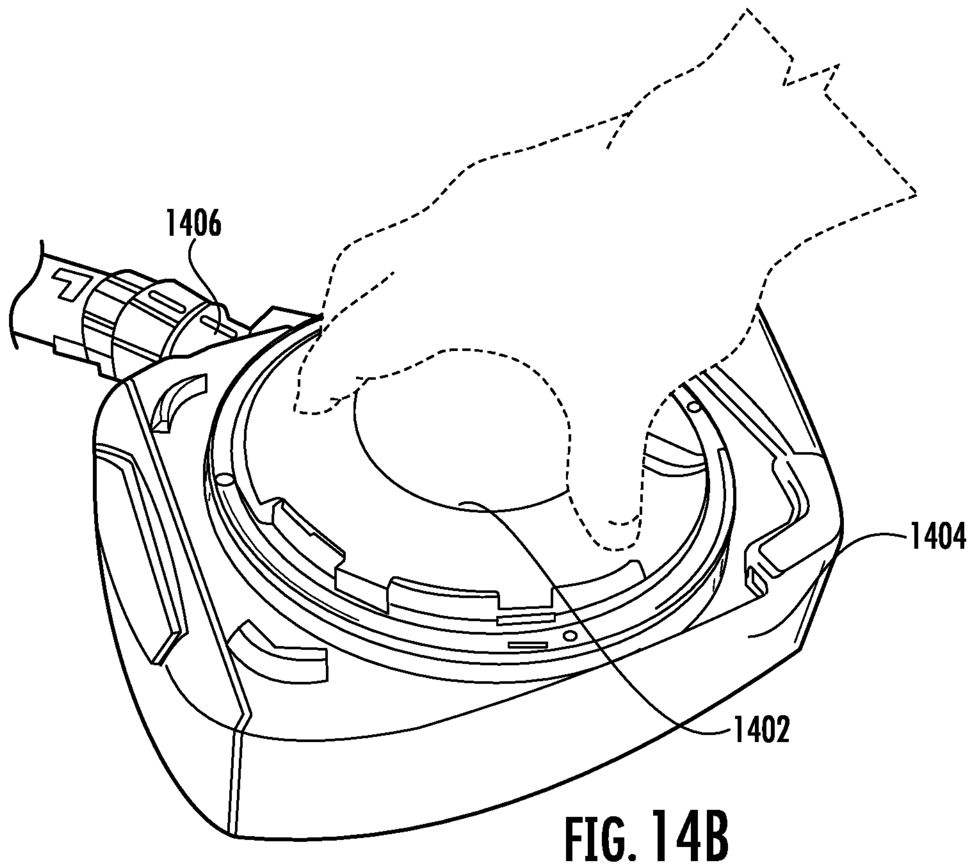
Figure 15A:
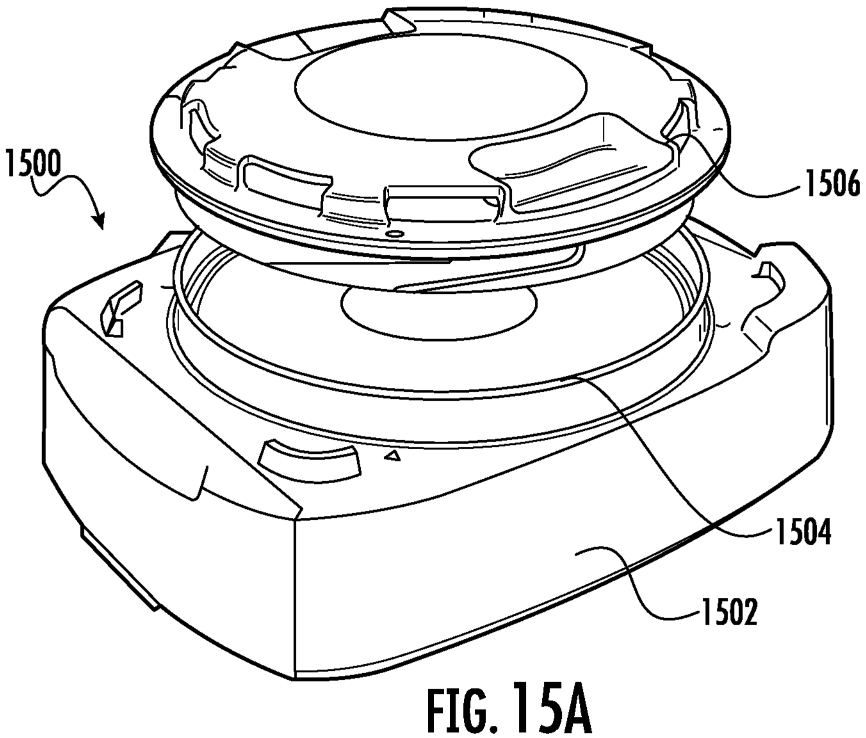
Figure 15B:
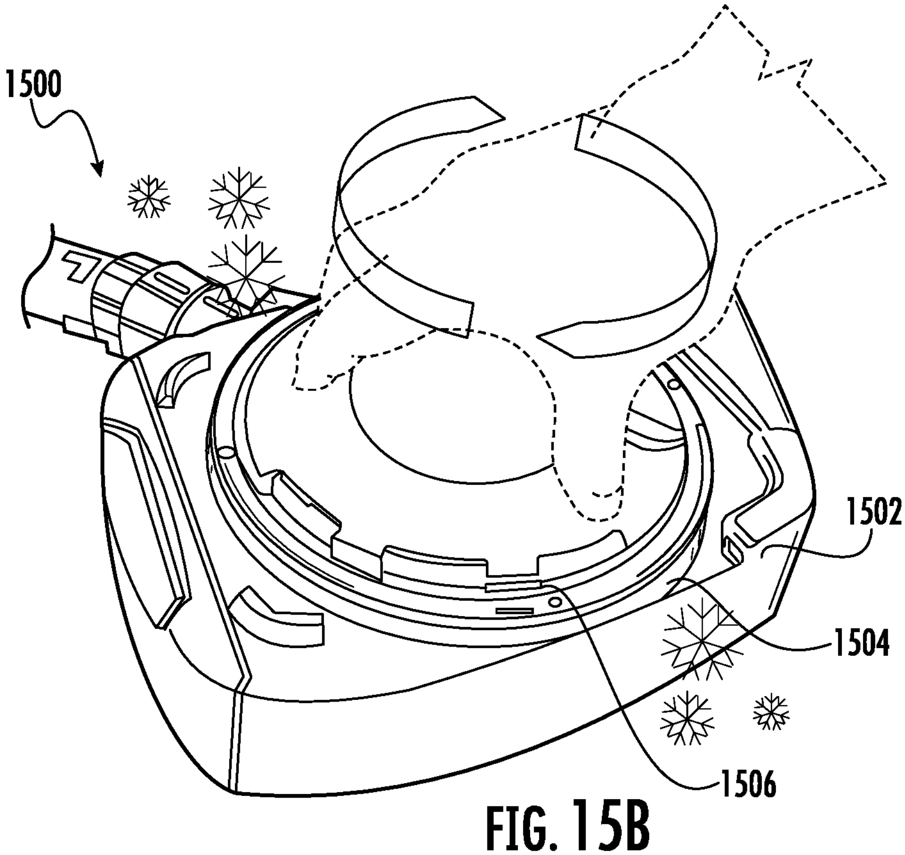
Figure 16:
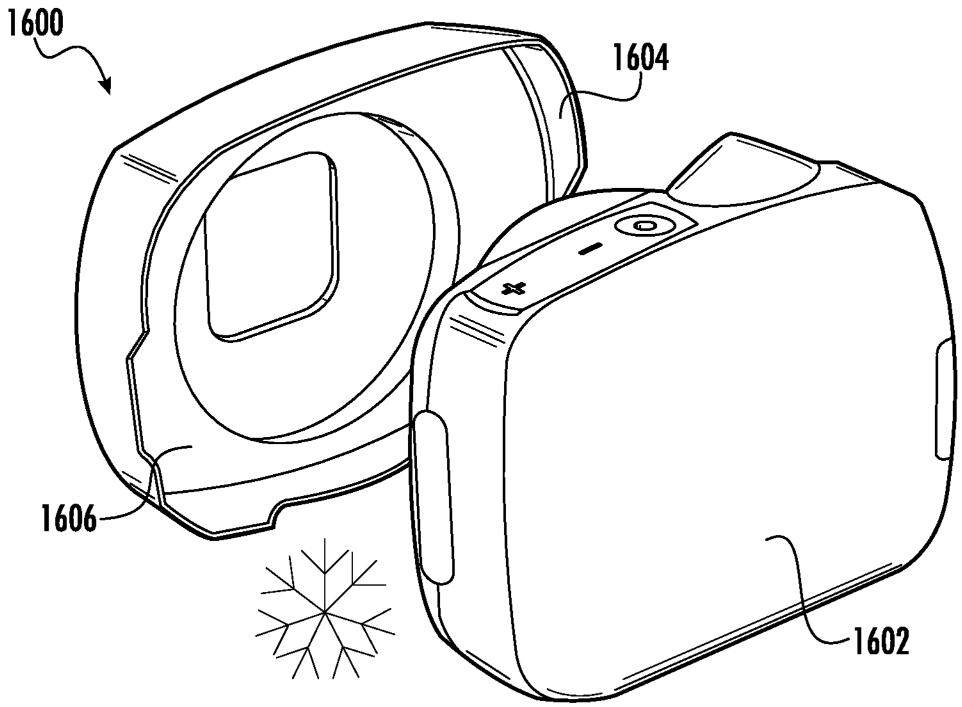
Figure 17:
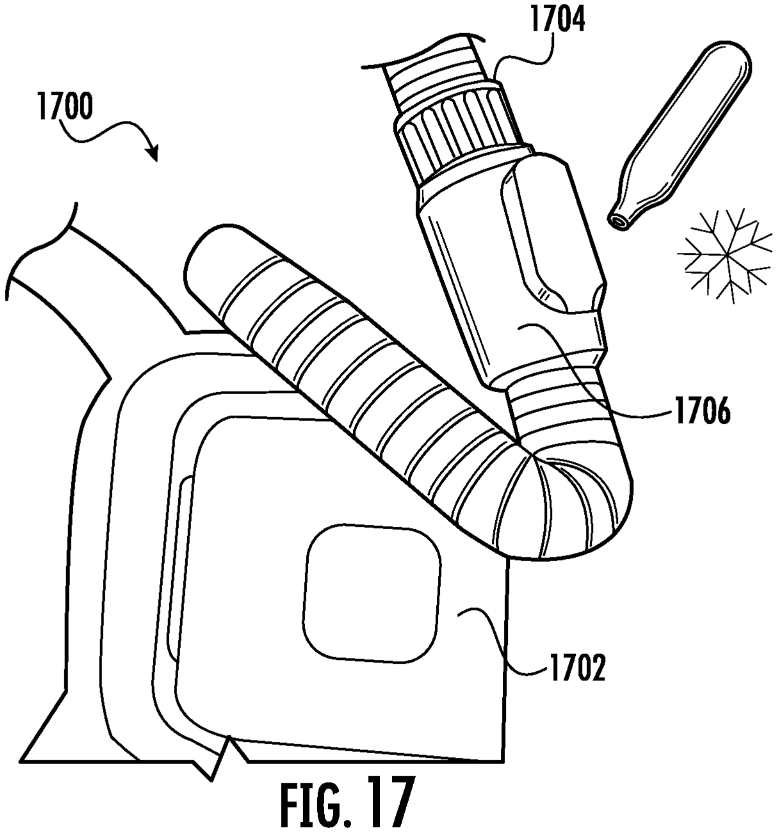
Figure 18:
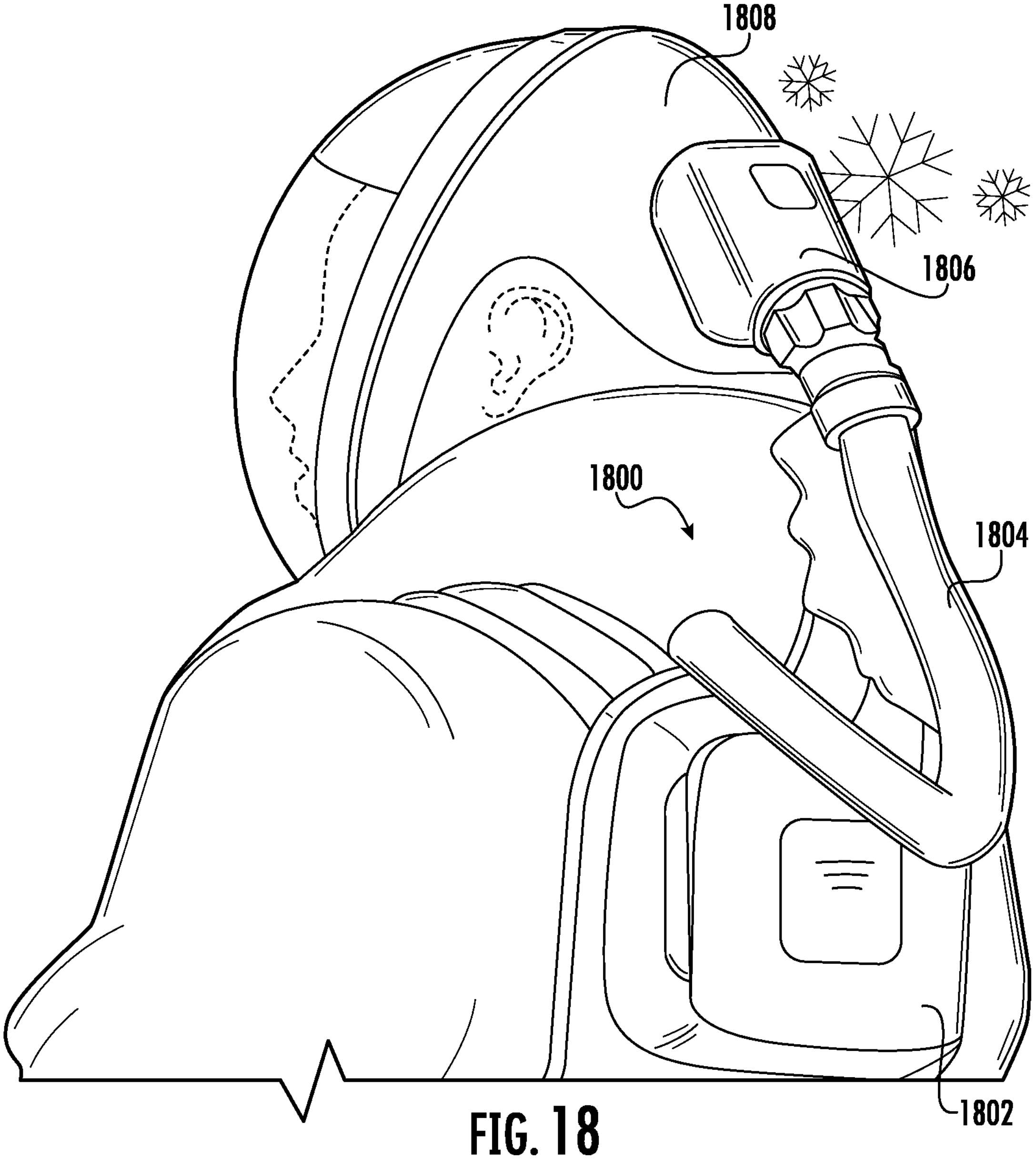
Figure 19:
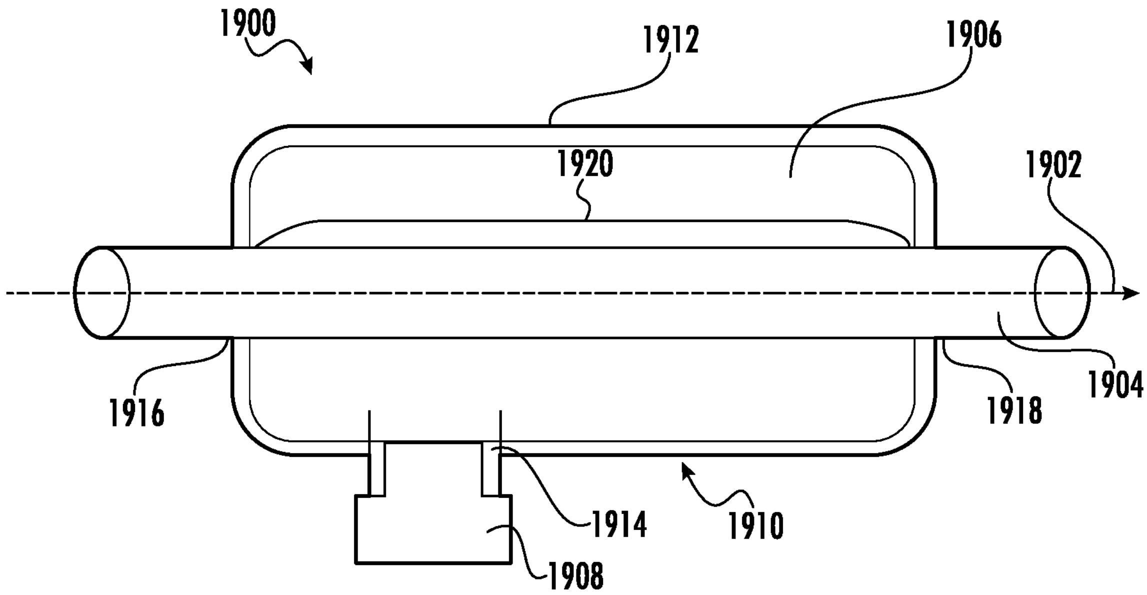
Figure 20:
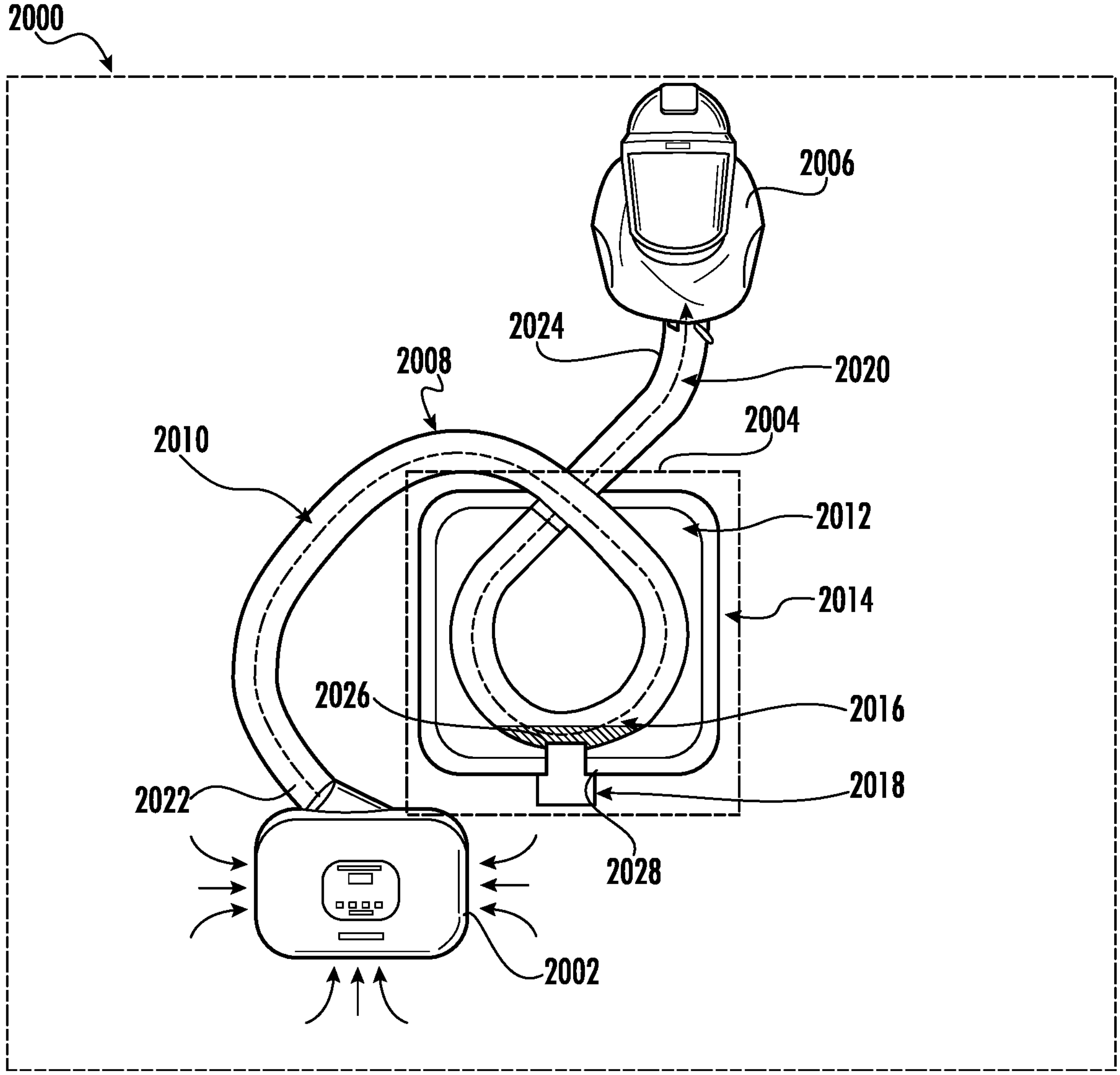
Figure 21:
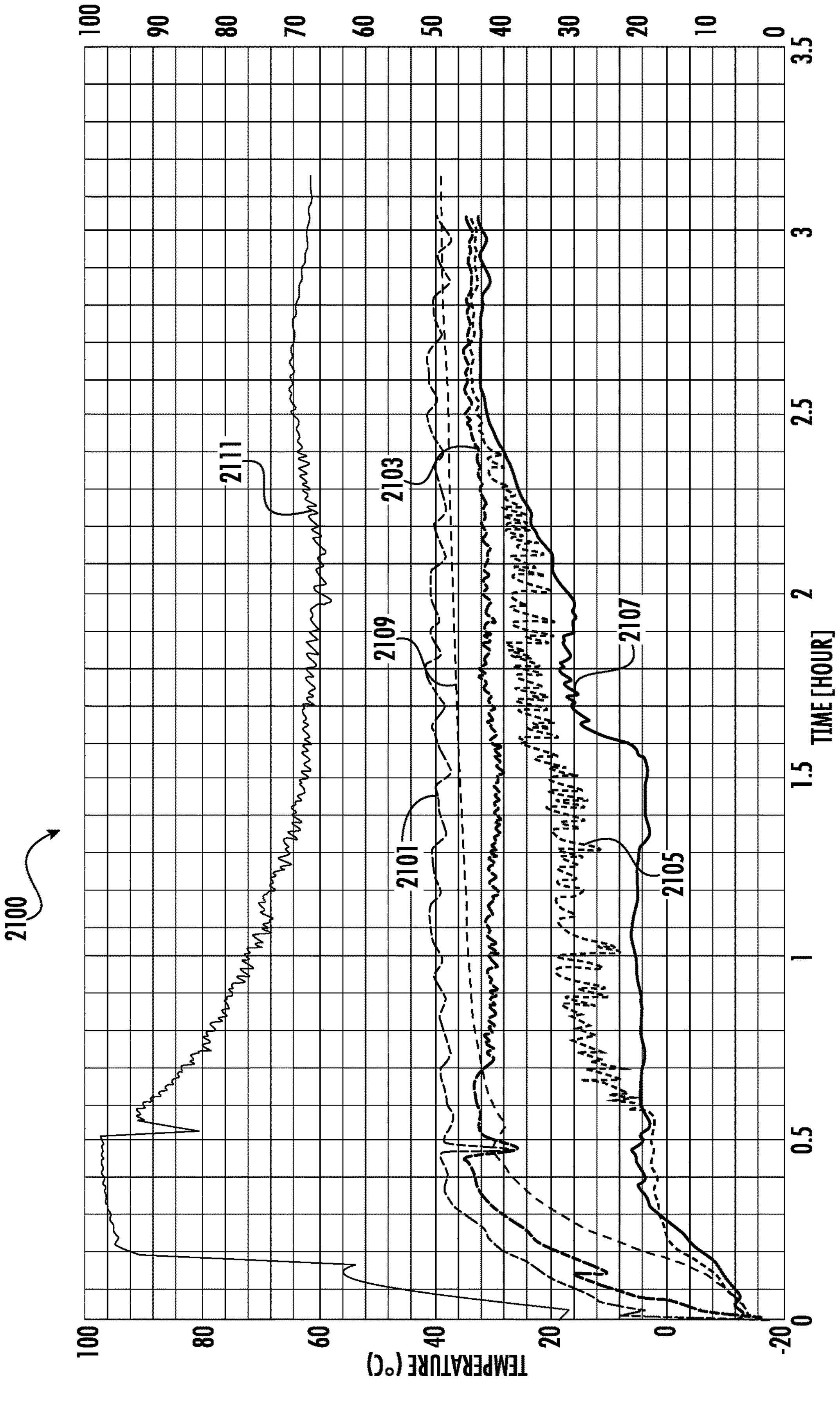
Figure 22:
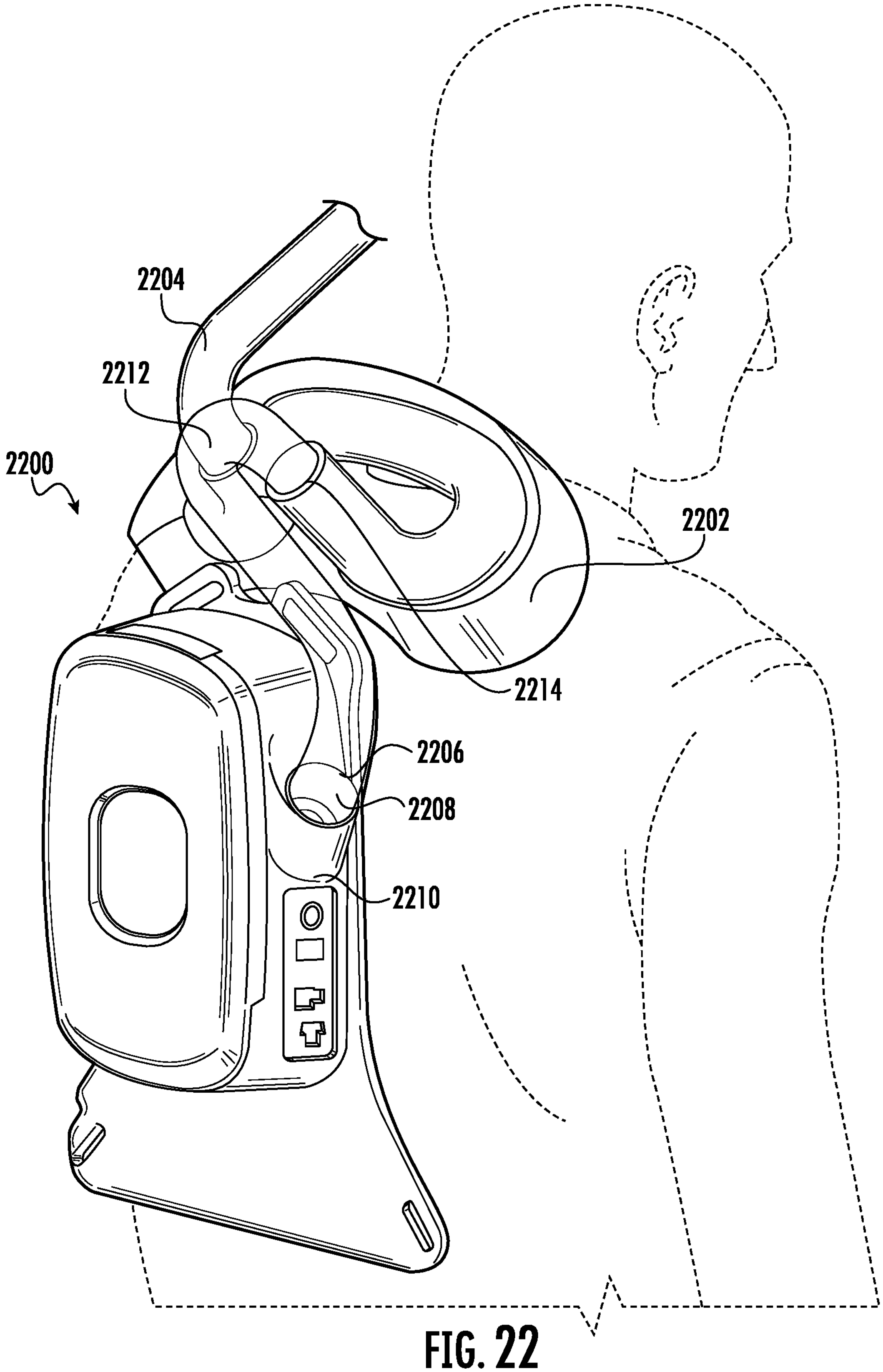
Figure 24:
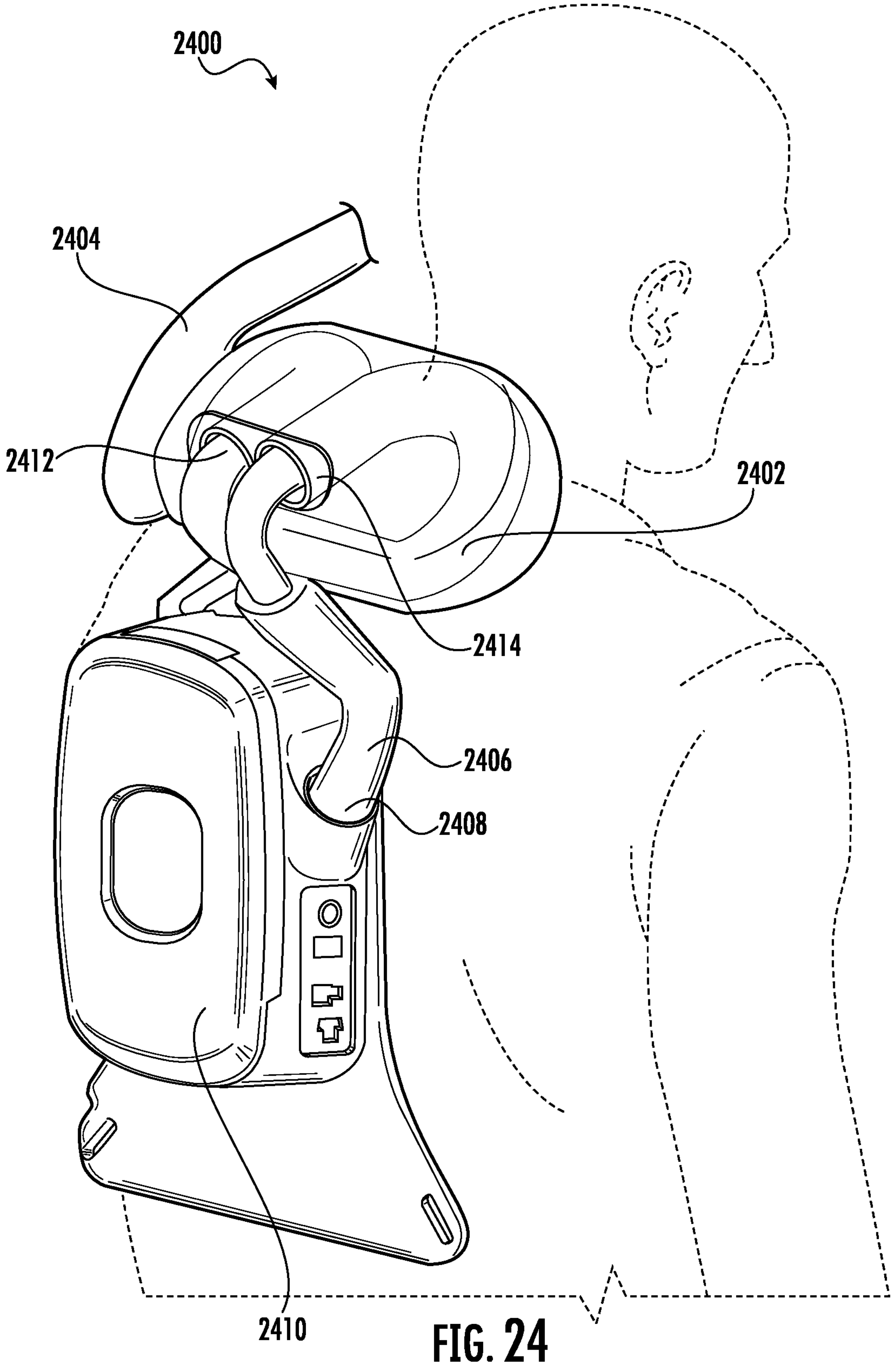
Figure 25:
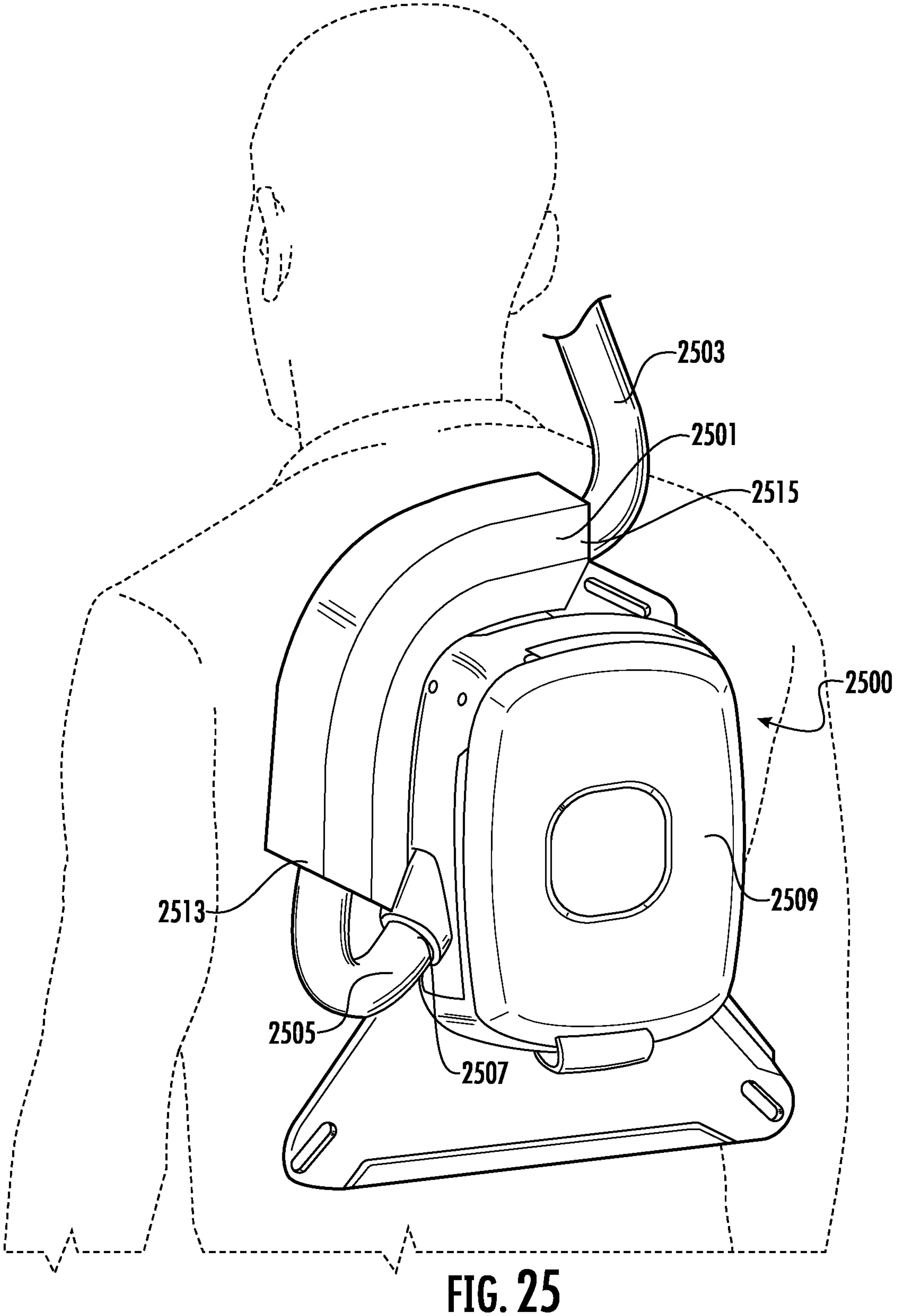
Figure 26A:
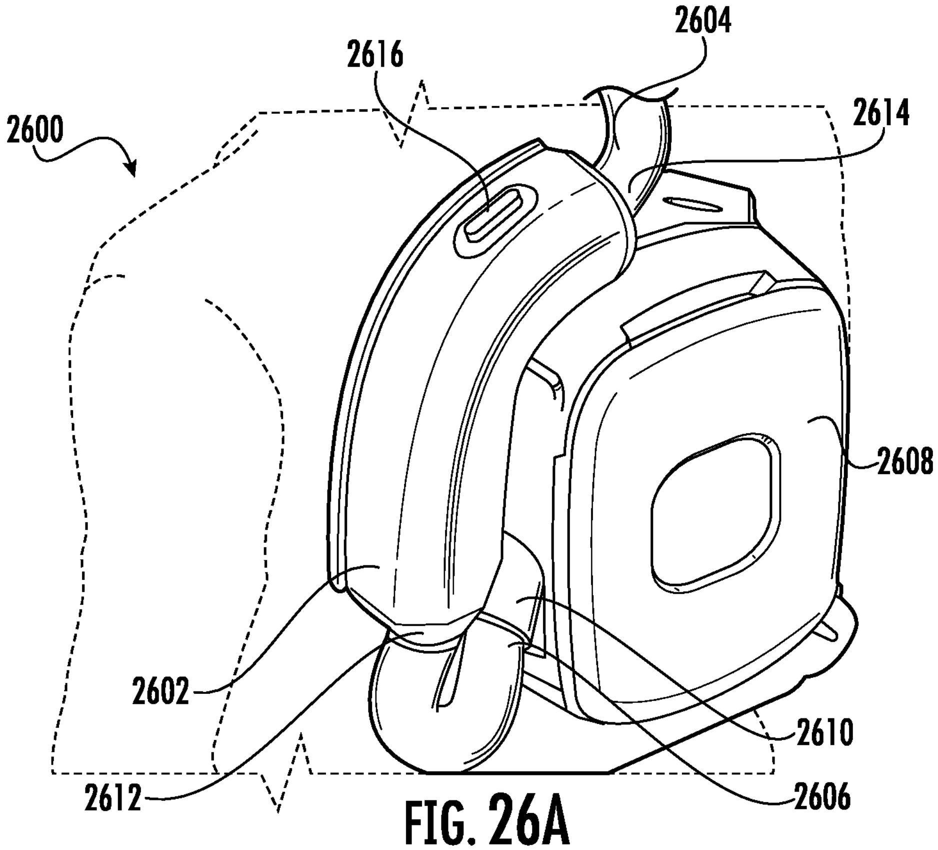
Figure 26B:
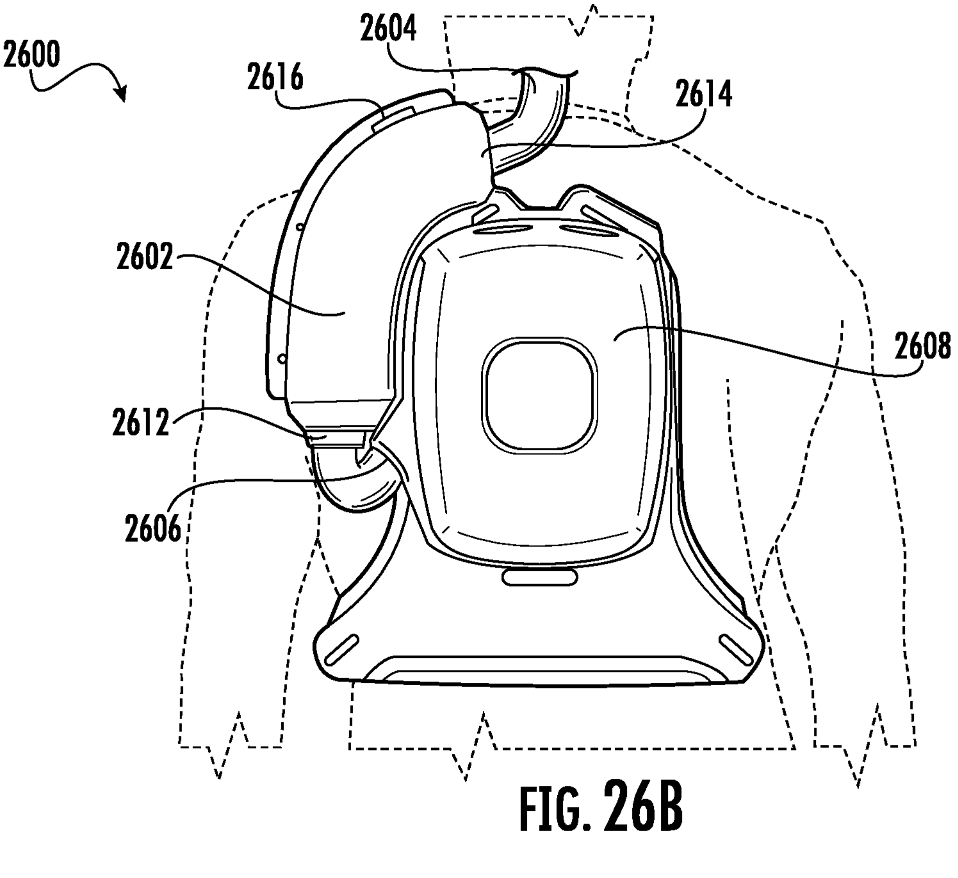
Figure 27:
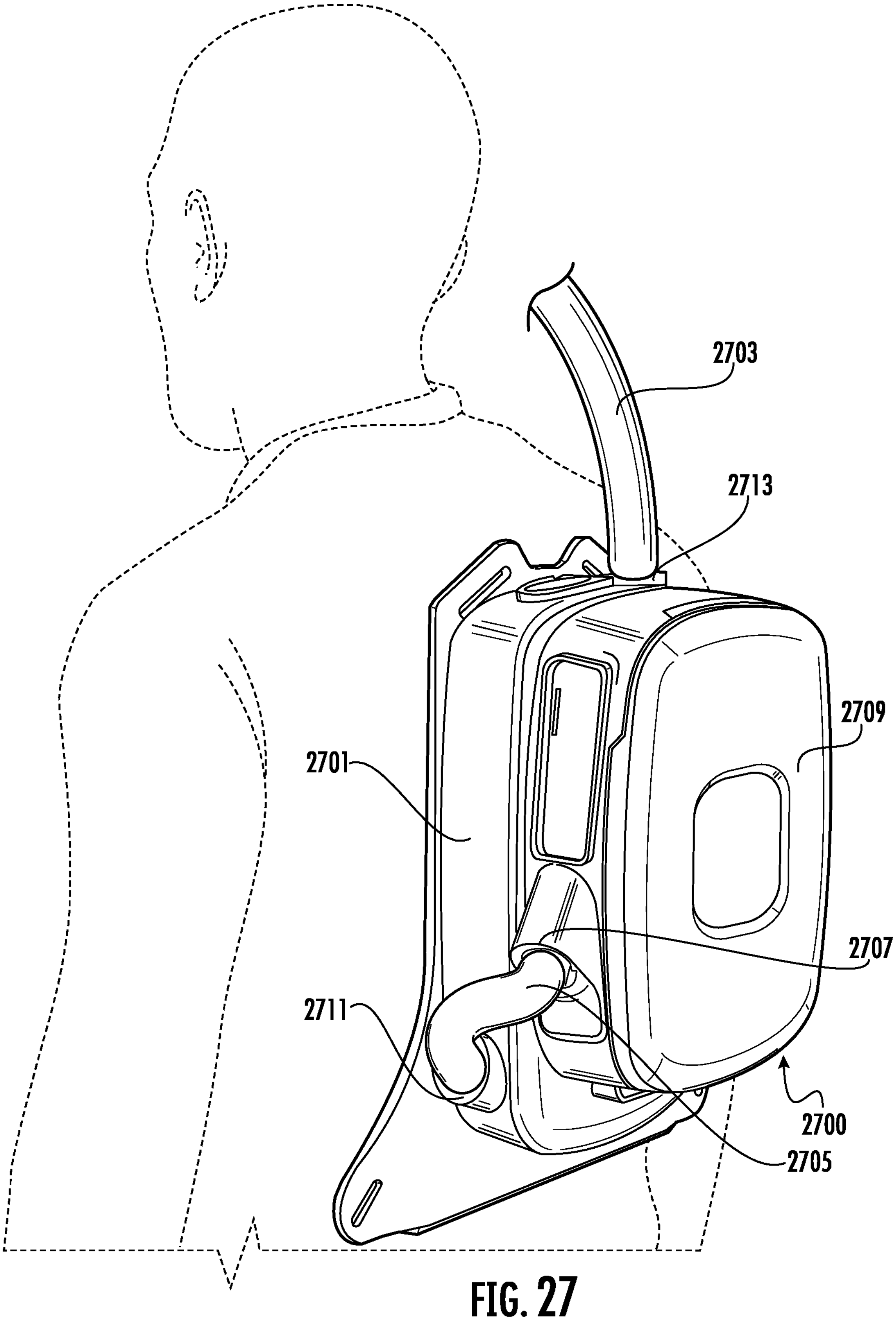
Figure 29:
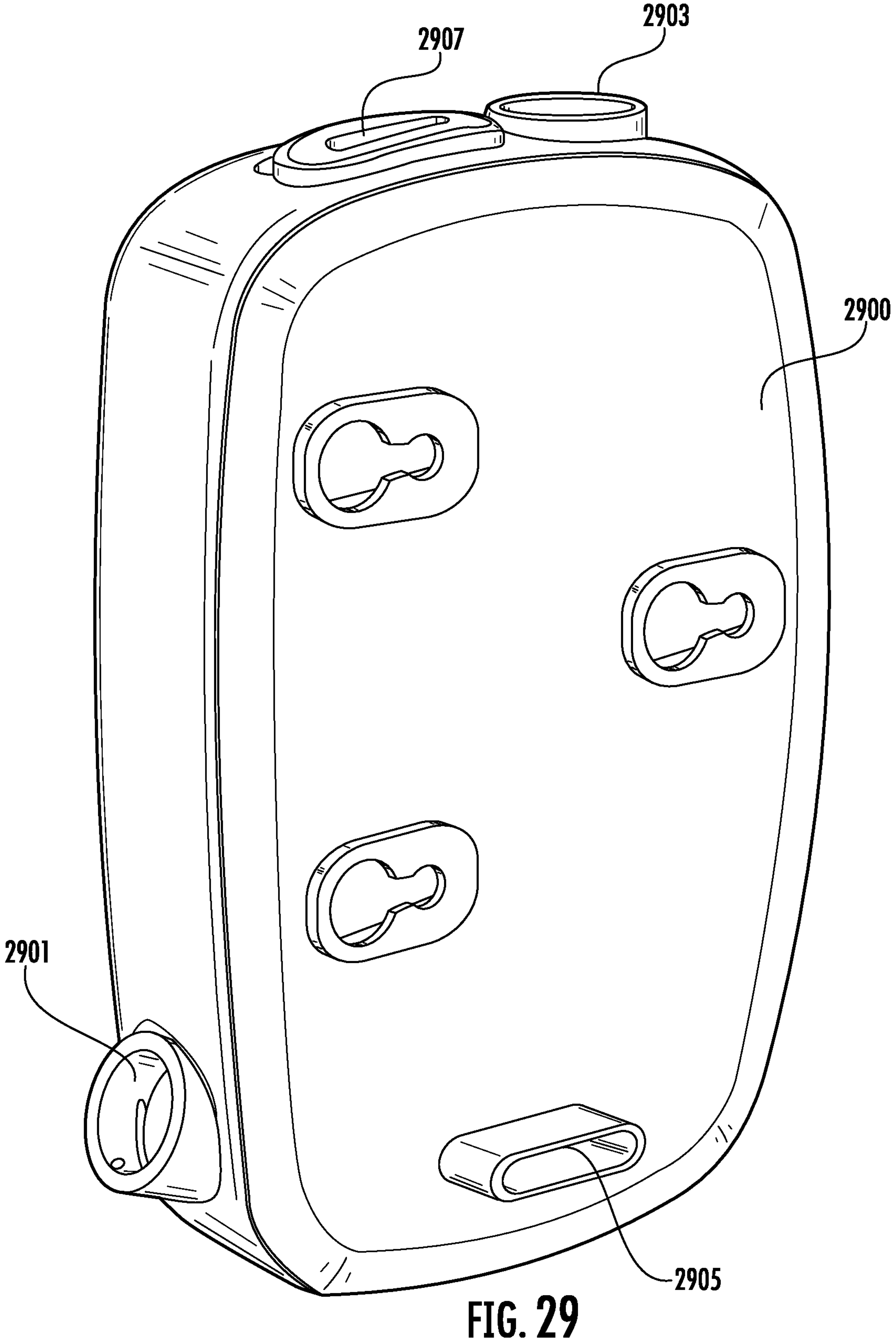
Figure 30A:
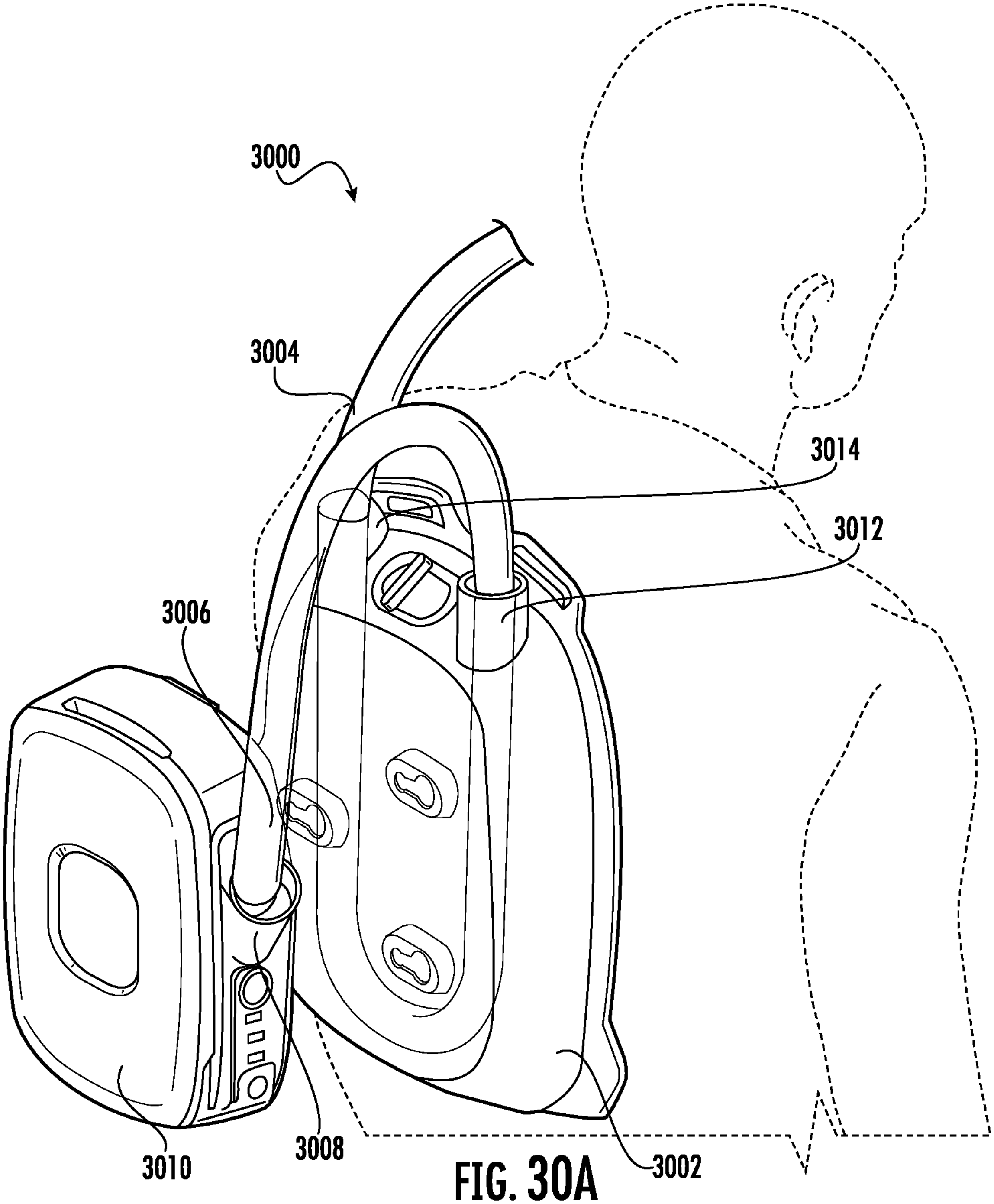
Figure 30B:
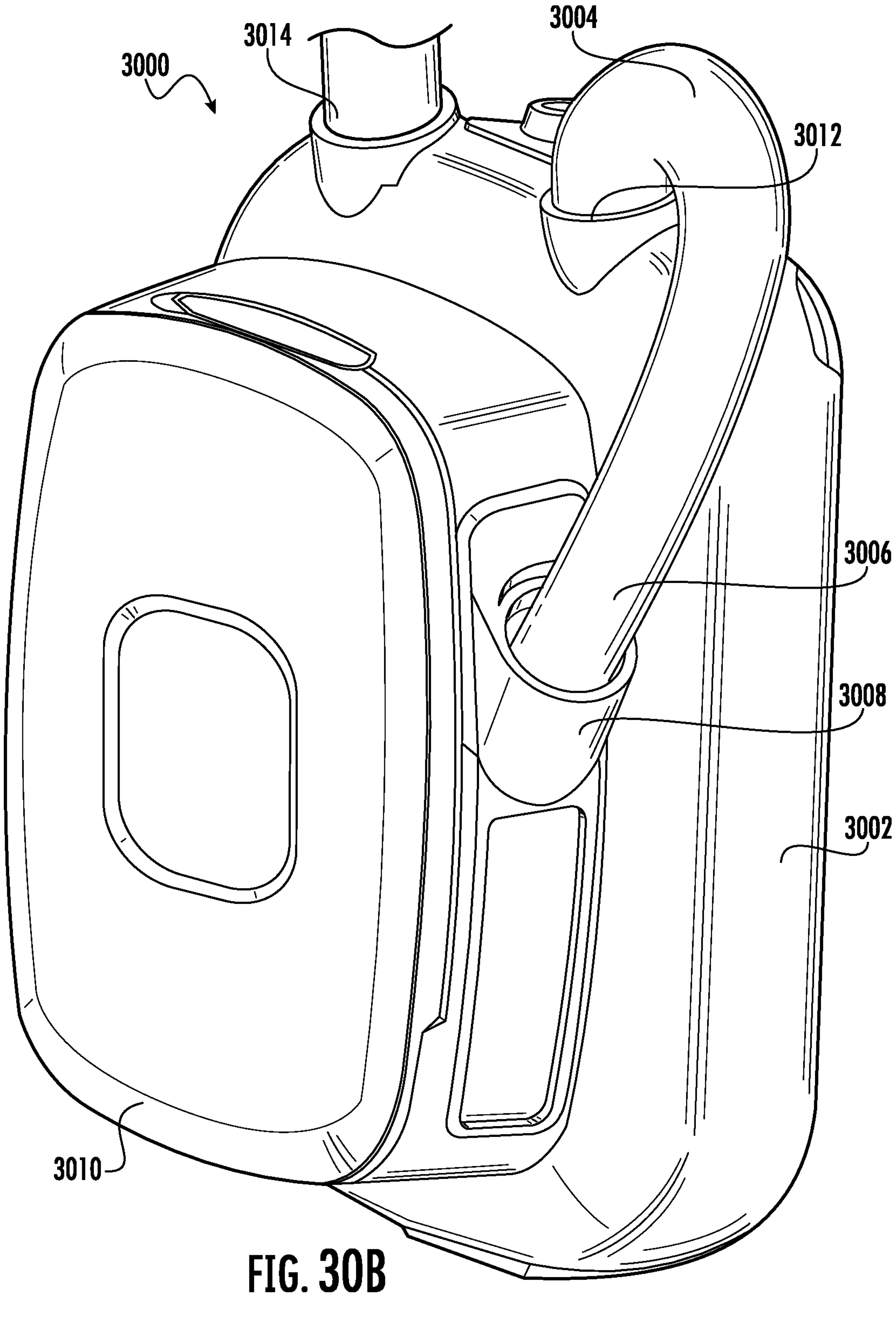
Figure 31B:
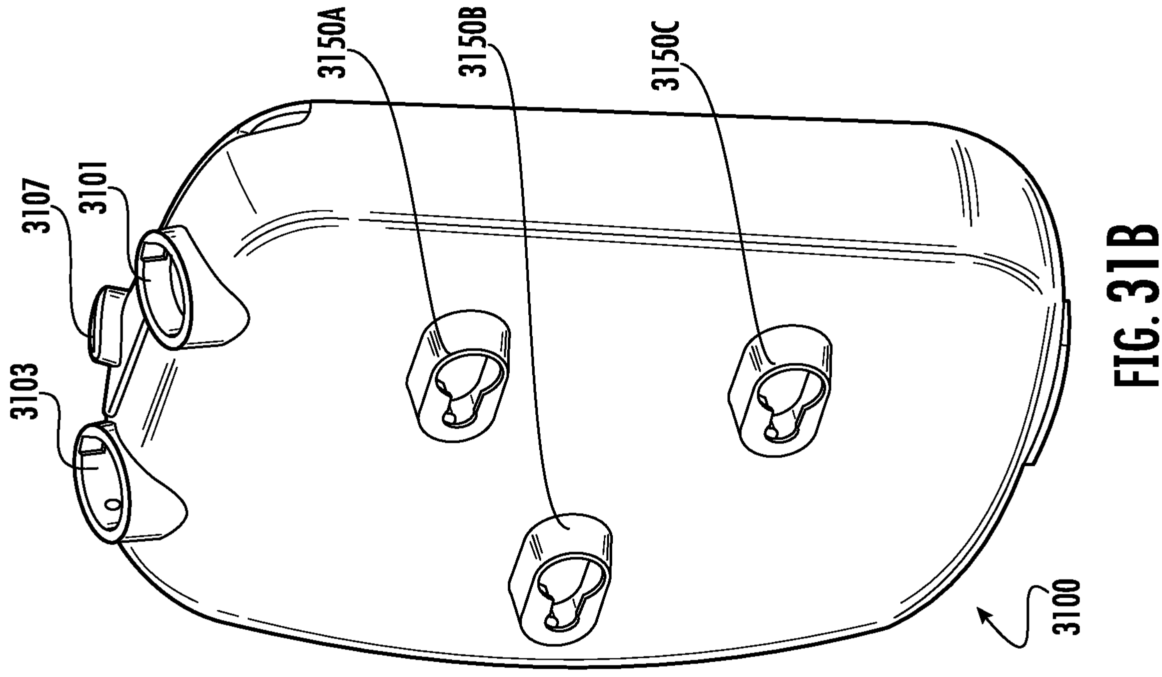
Figure 31A:
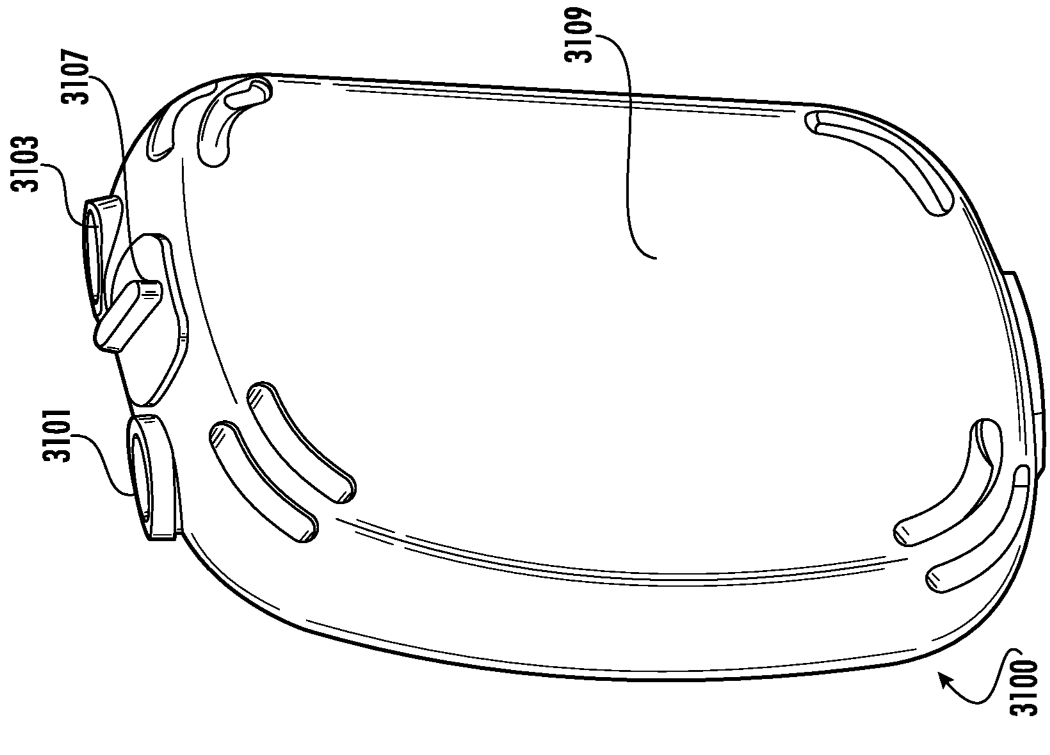
Figure 32:
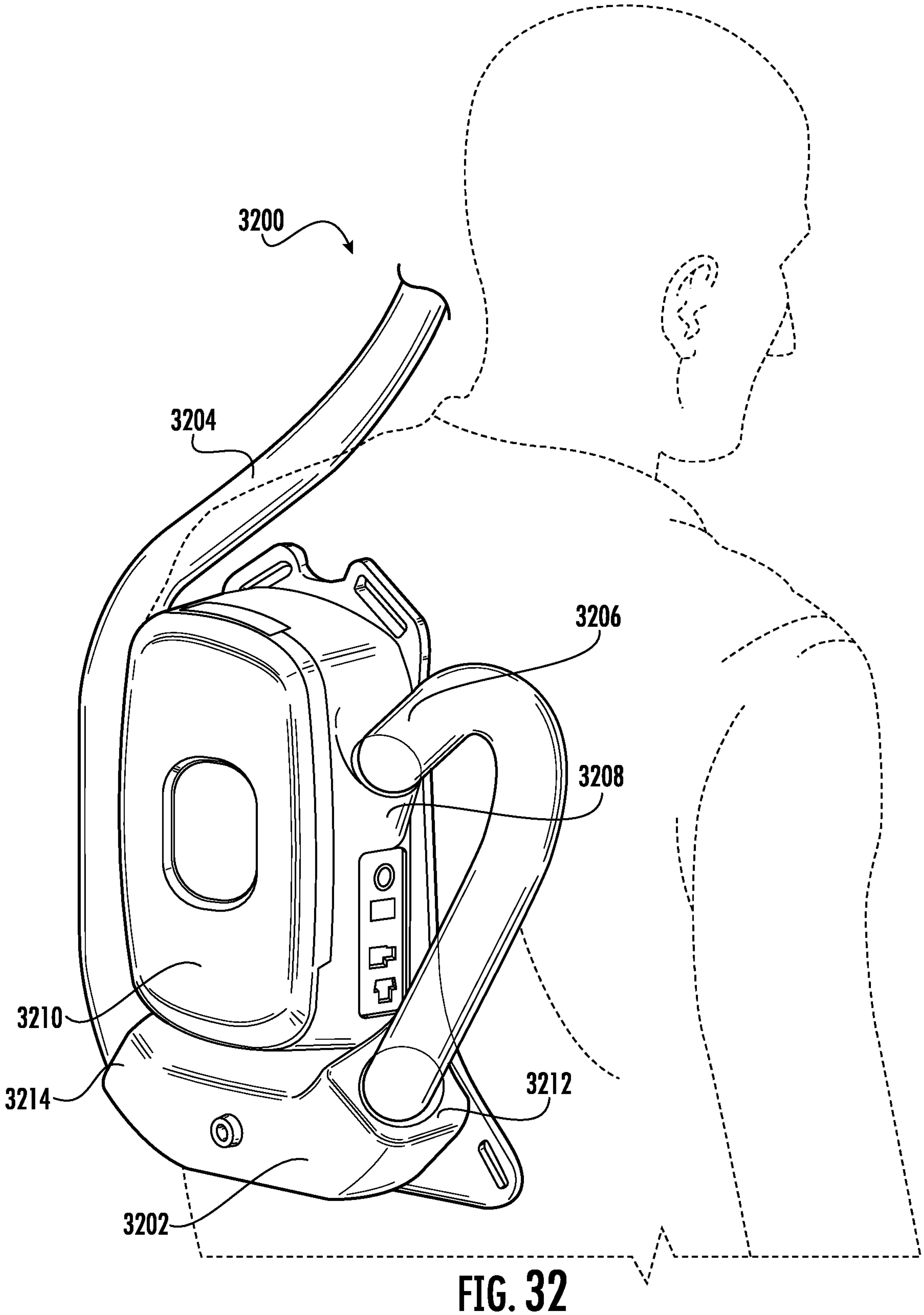
Figure 33:
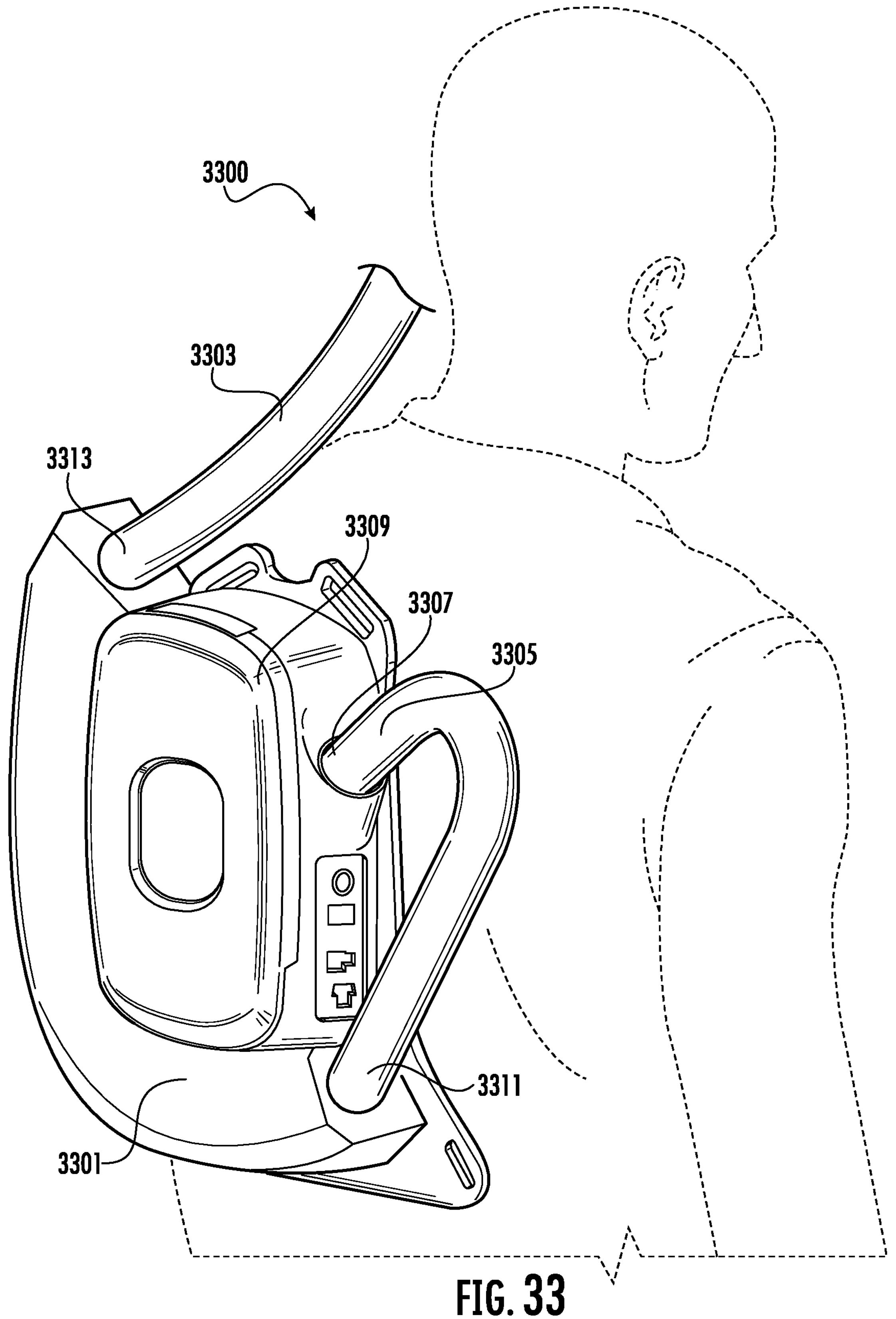
Figure 34A:
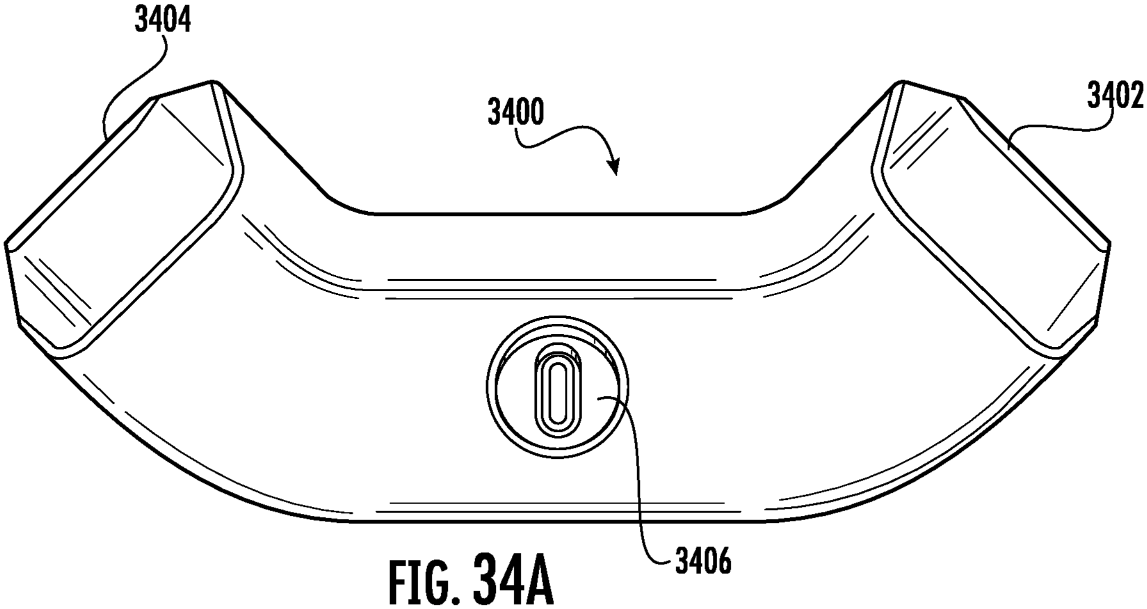
Figure 34B:
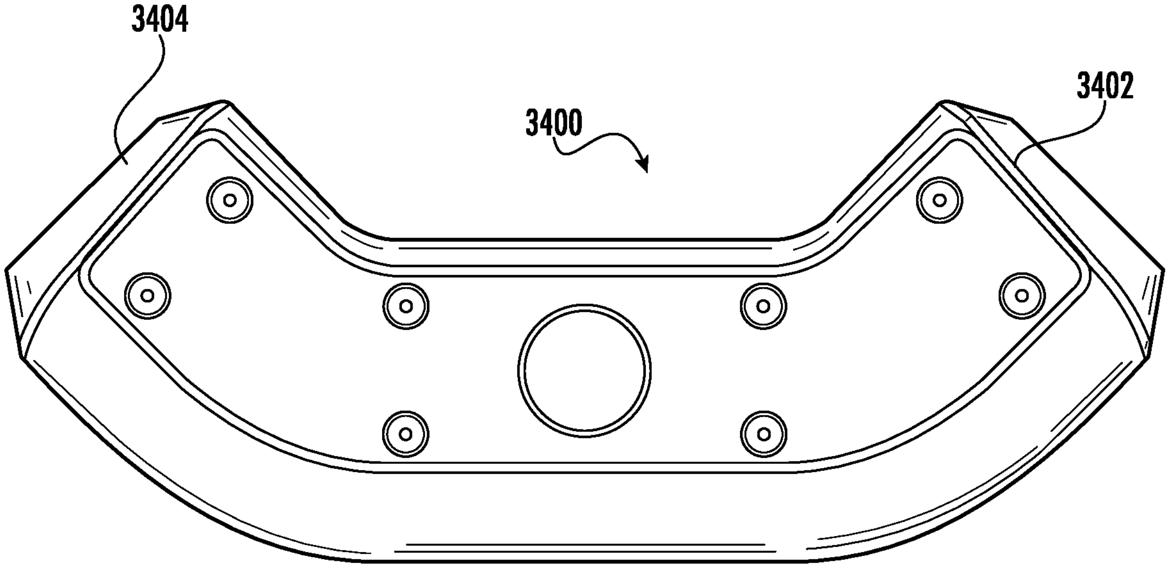
Figure 35:
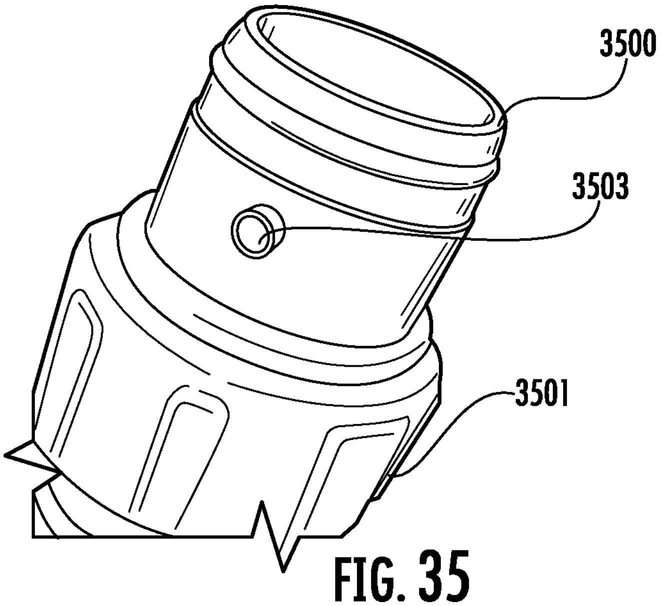
Figure 36:
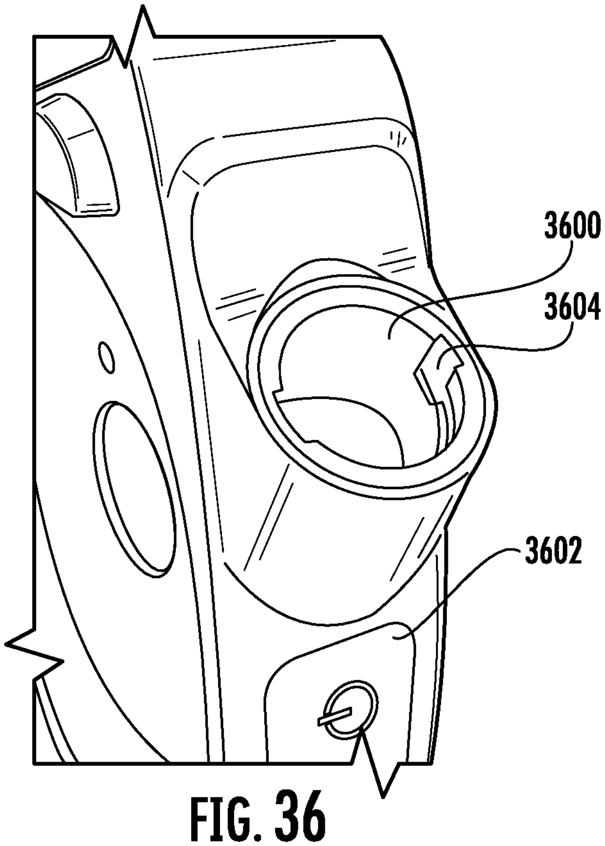
Figure 37:
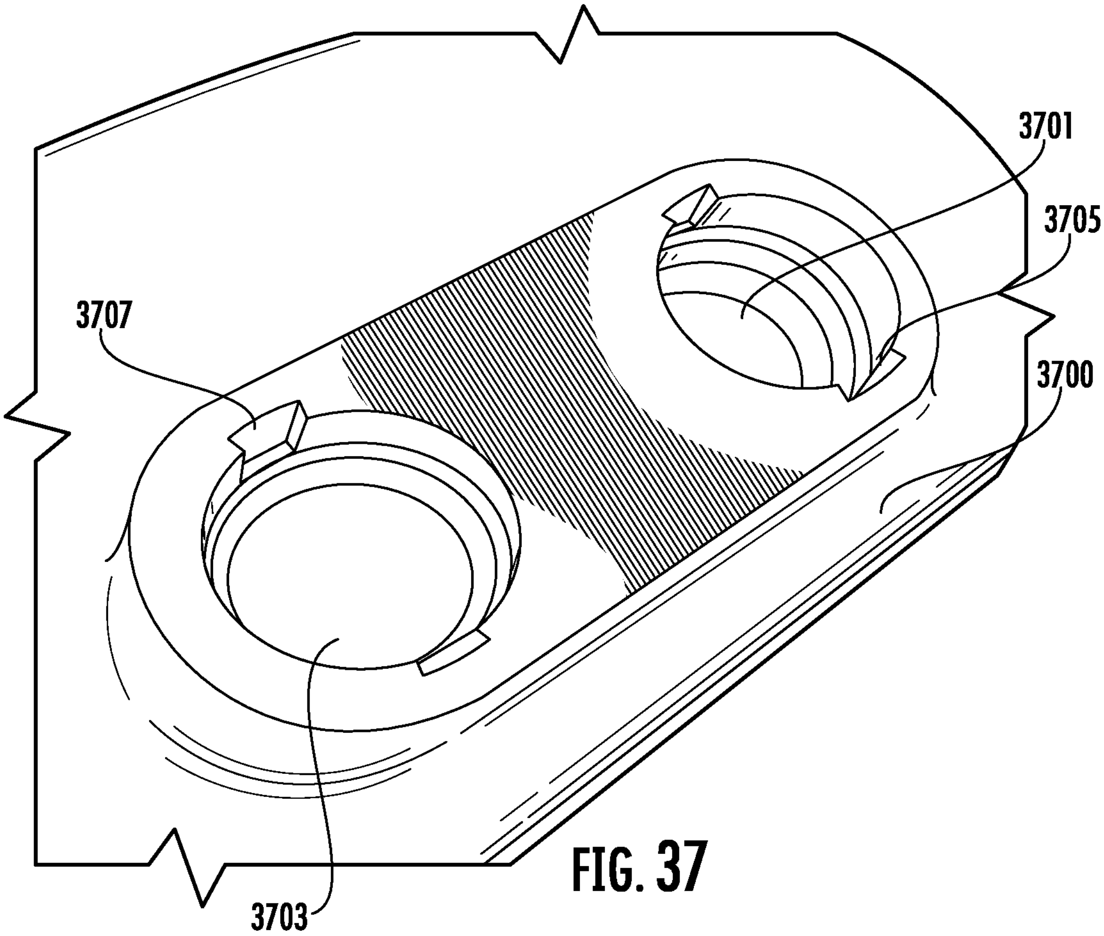
Figure 38:
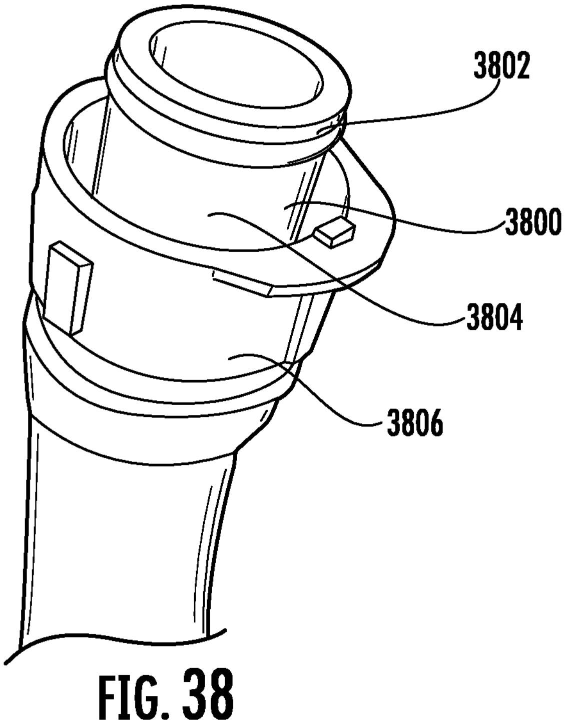
Figure 39:
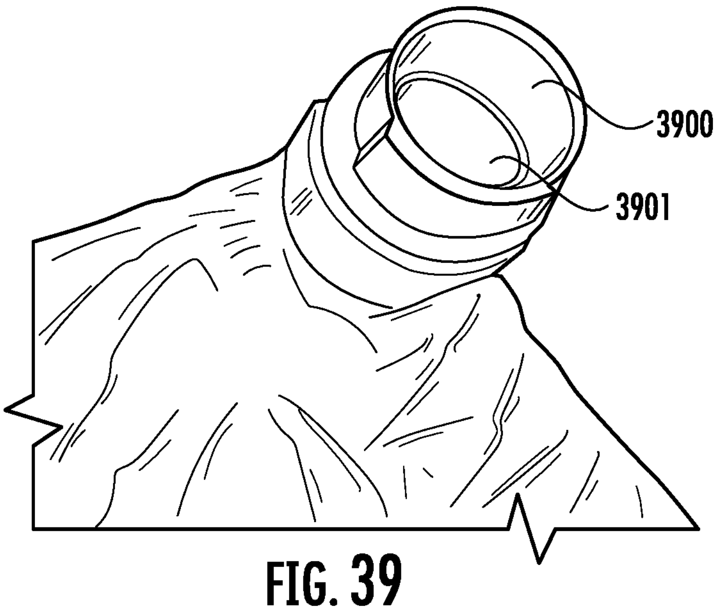
Figure 40:
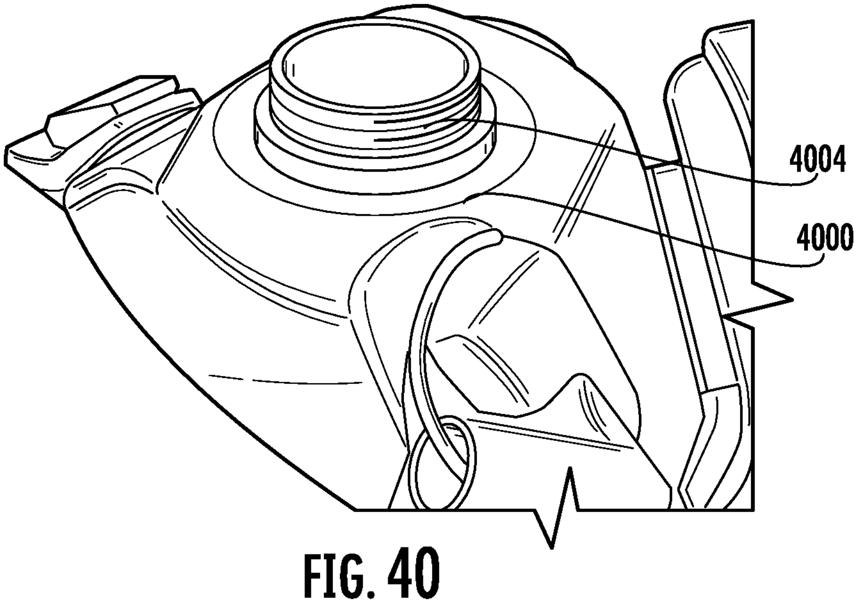
Figure 41:
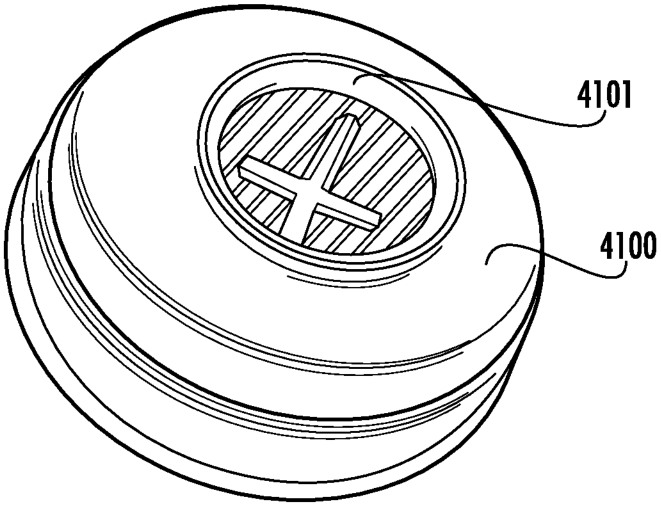
Figure 42:
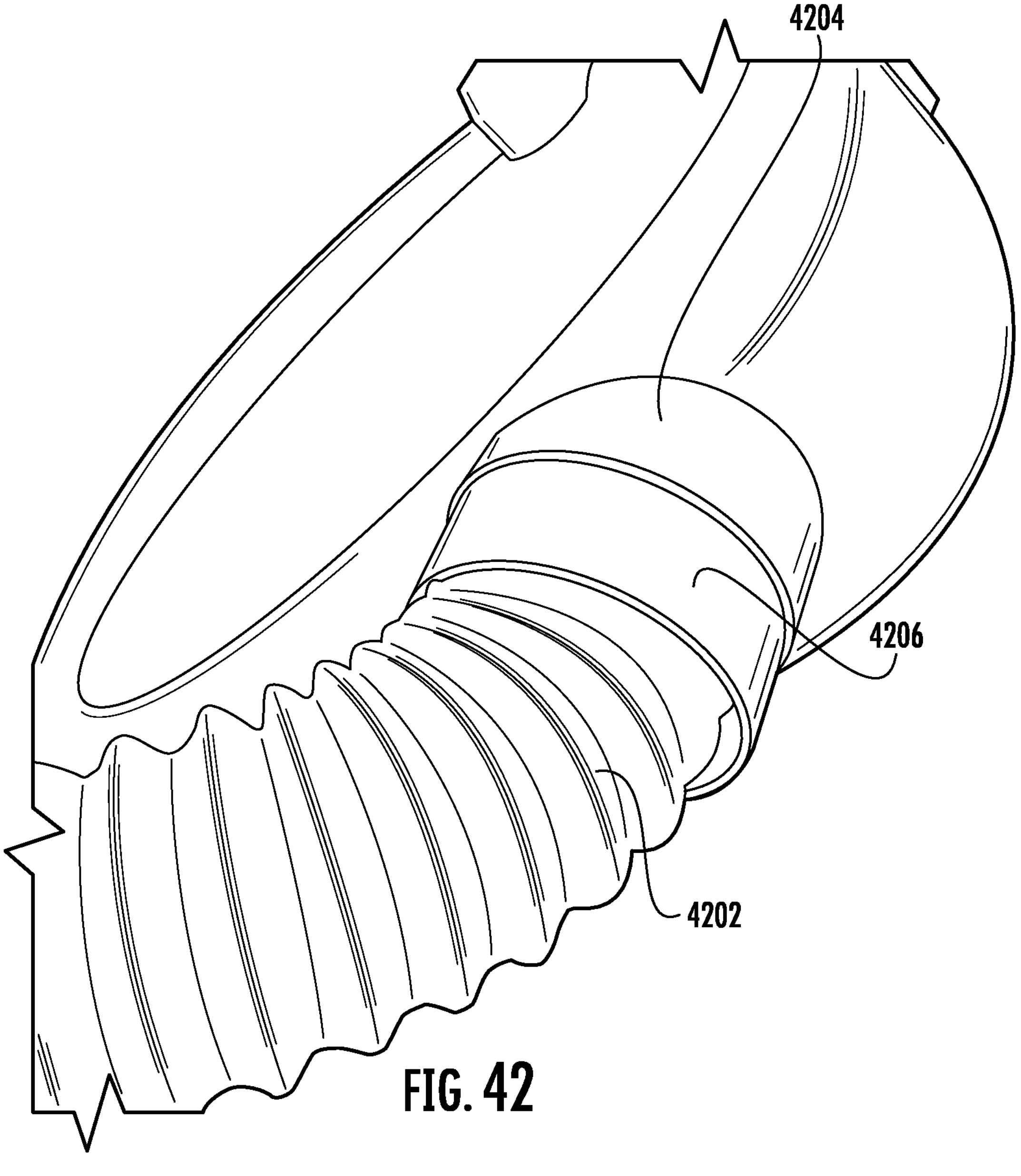
Figure 43:
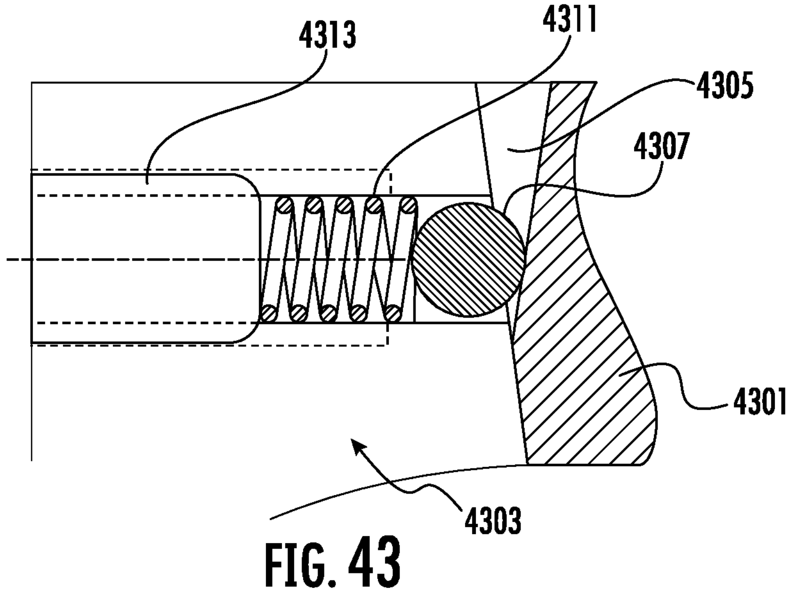
Figure 44:
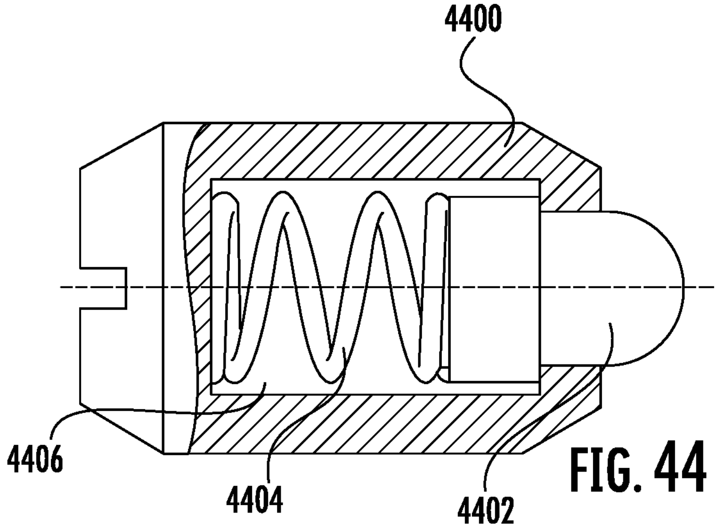
Figure 45:
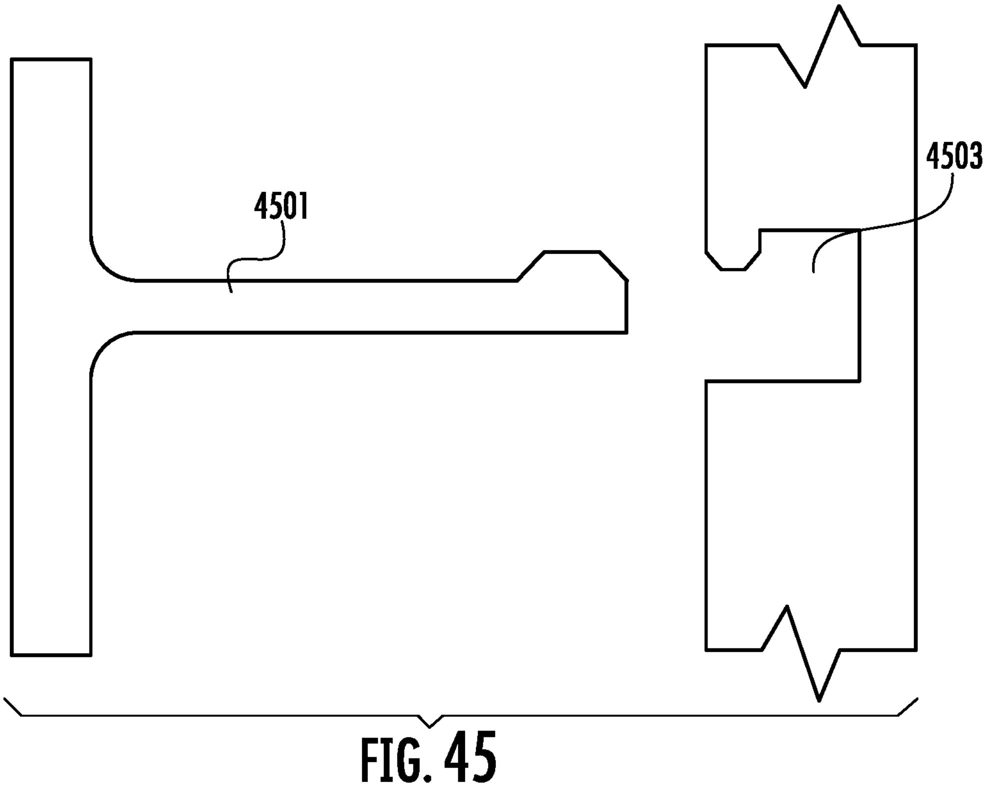
Figure 46:
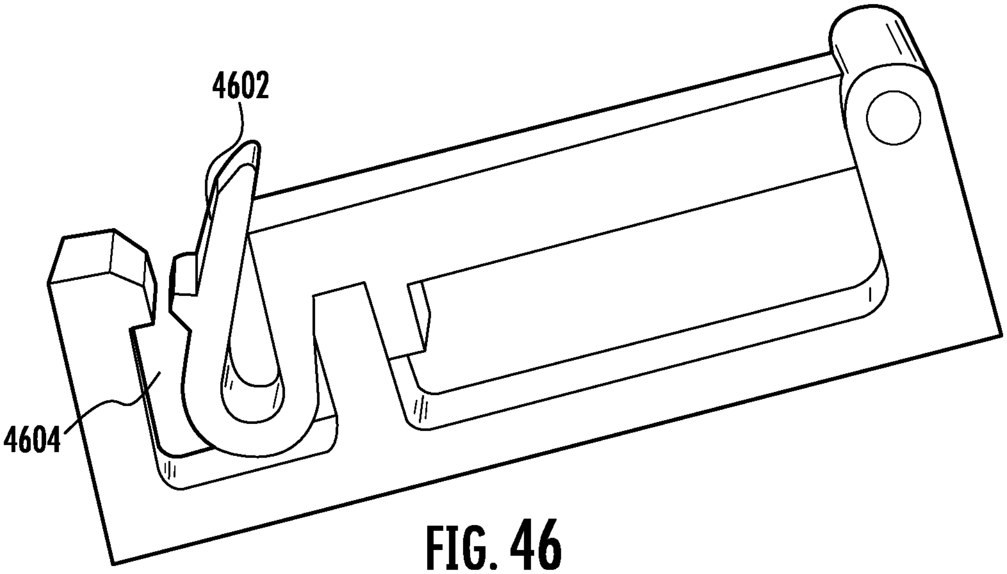
Figure 47:
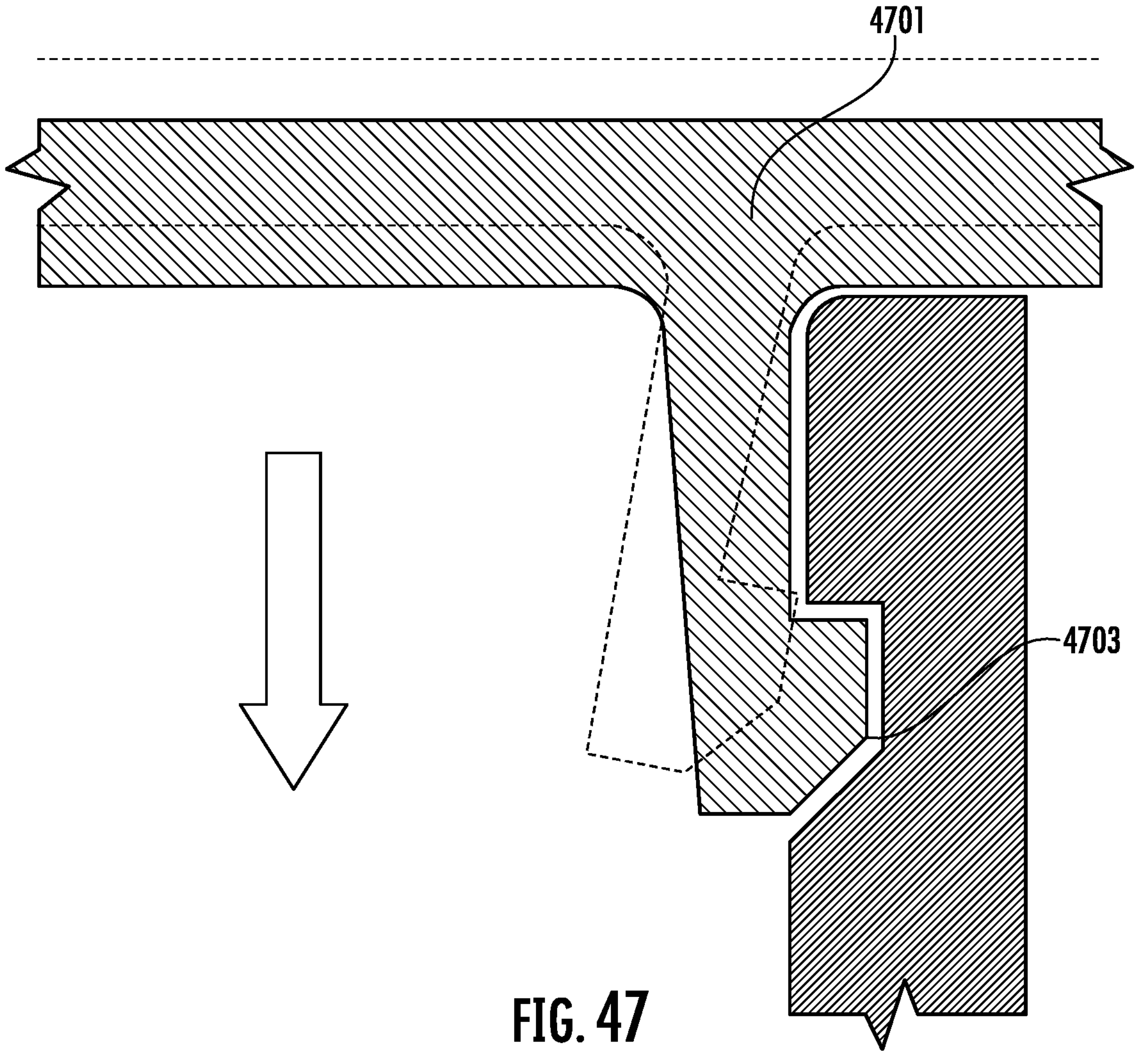
Figure 48:
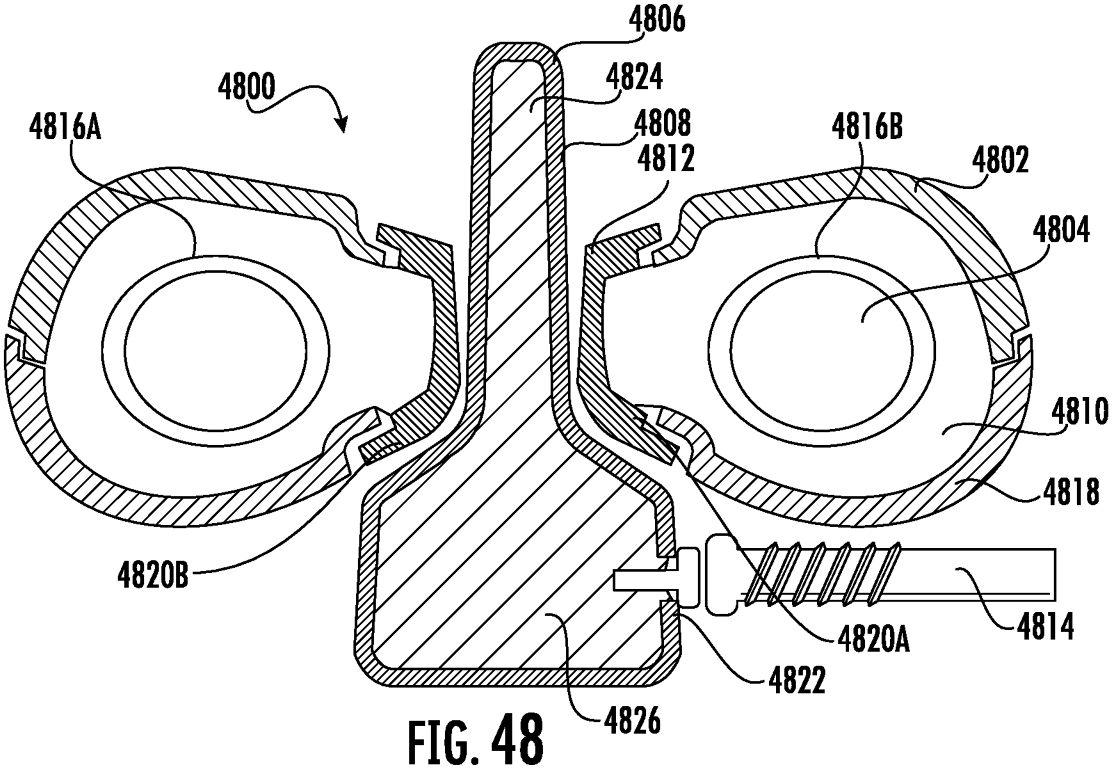
Figure 49:
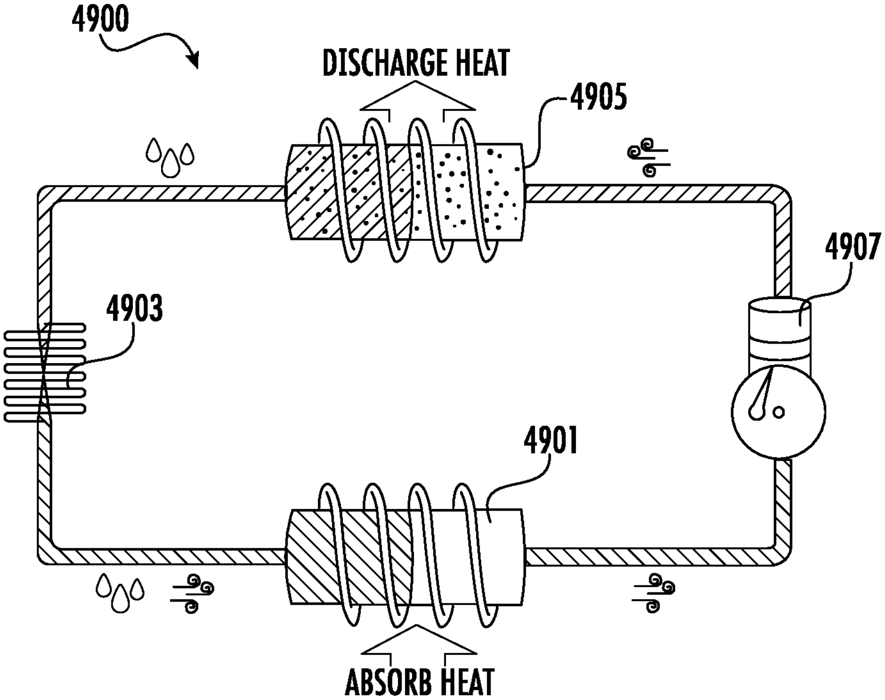
Figure 50:
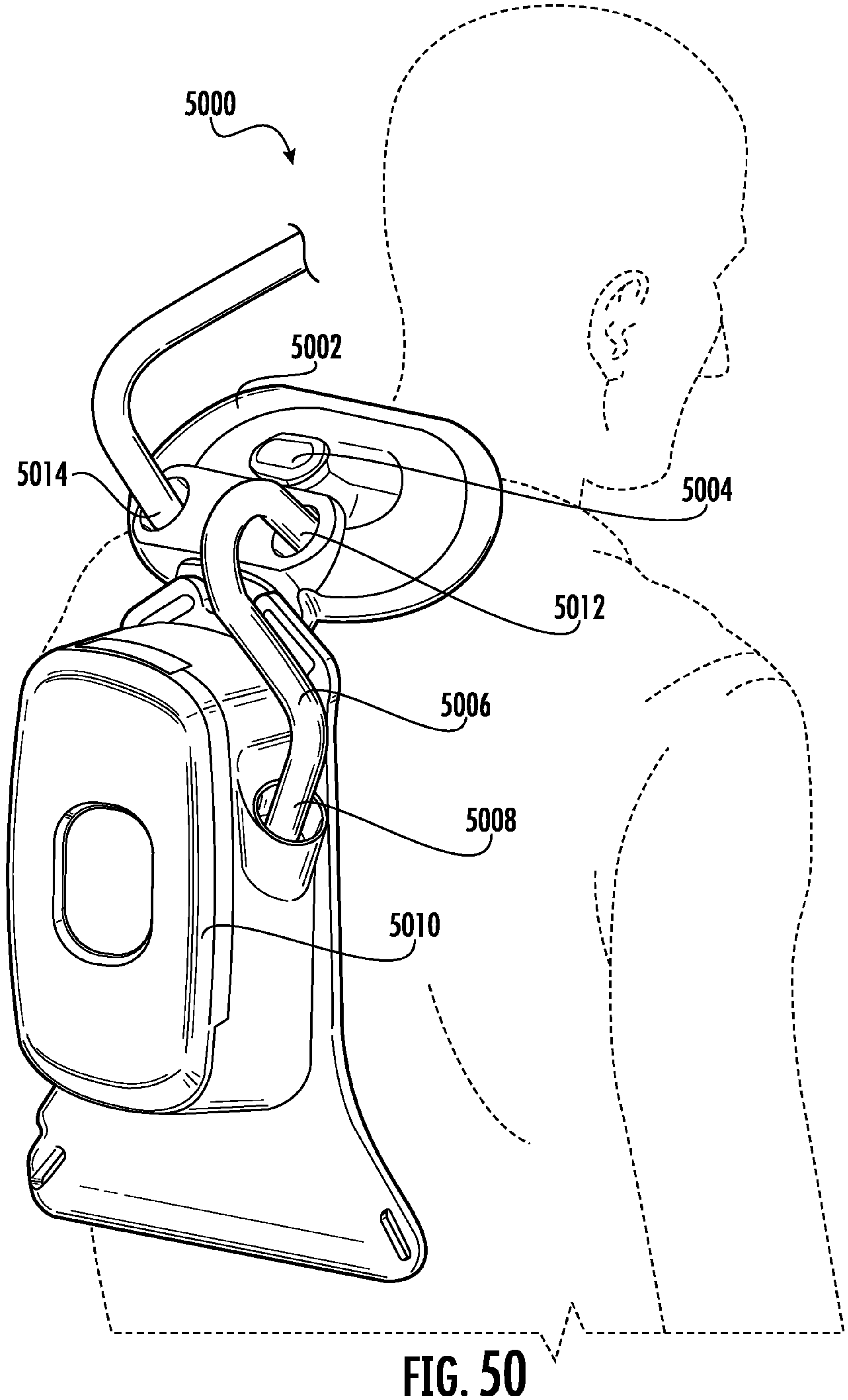
Figure 51B:
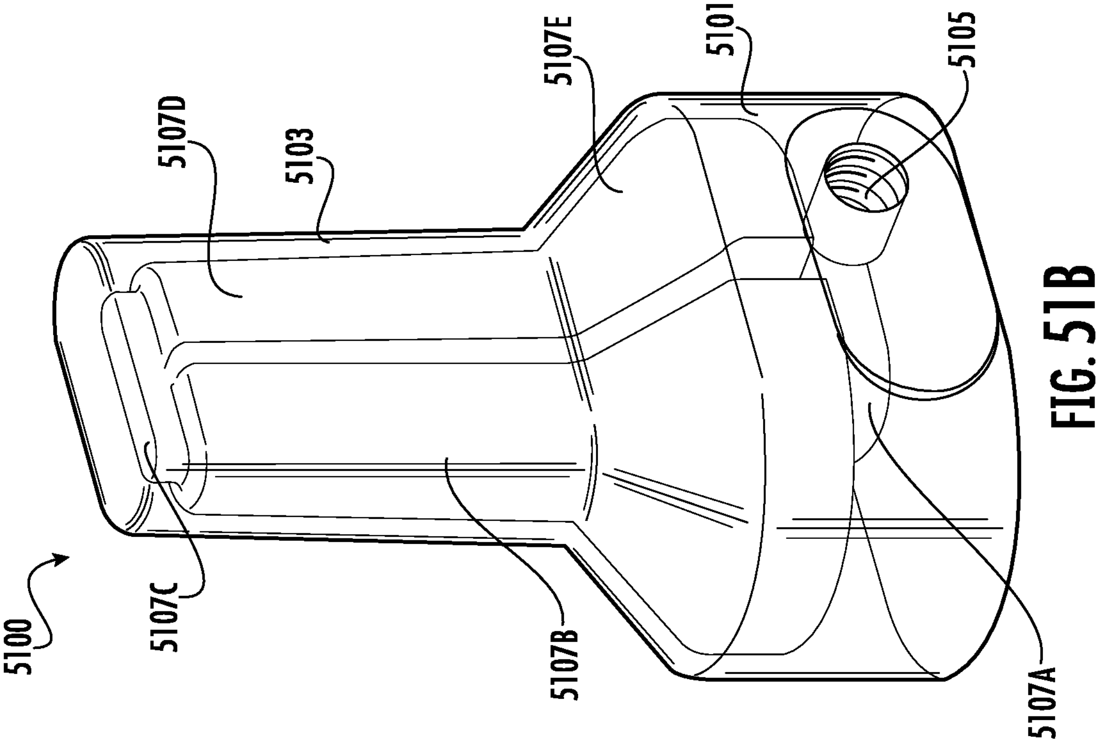
Figure 51A:
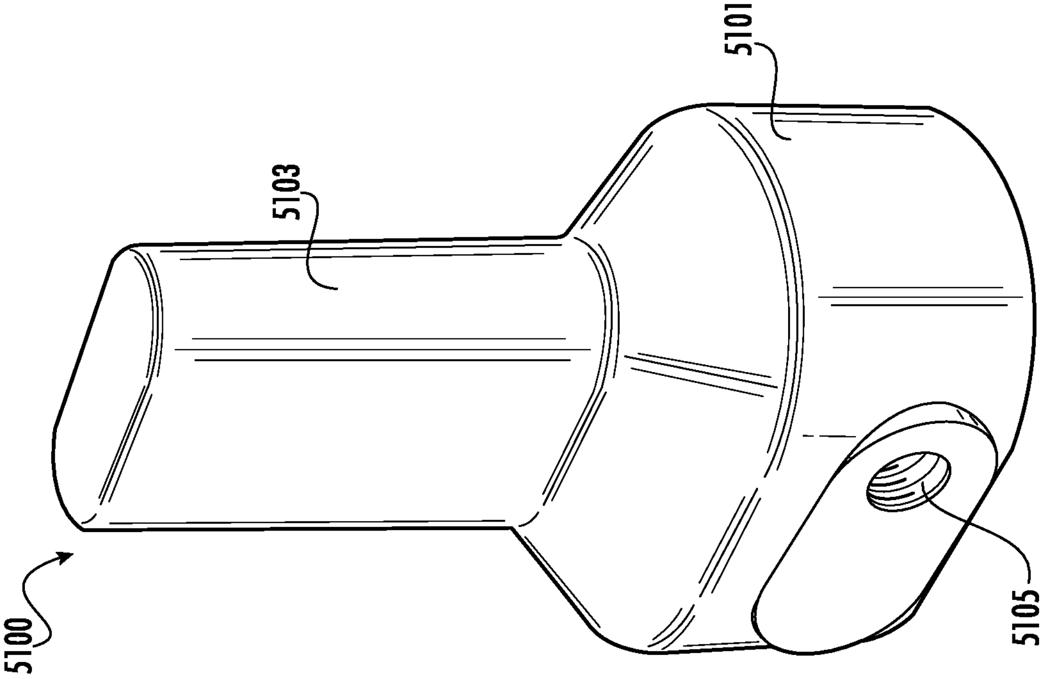
Figure 52A:
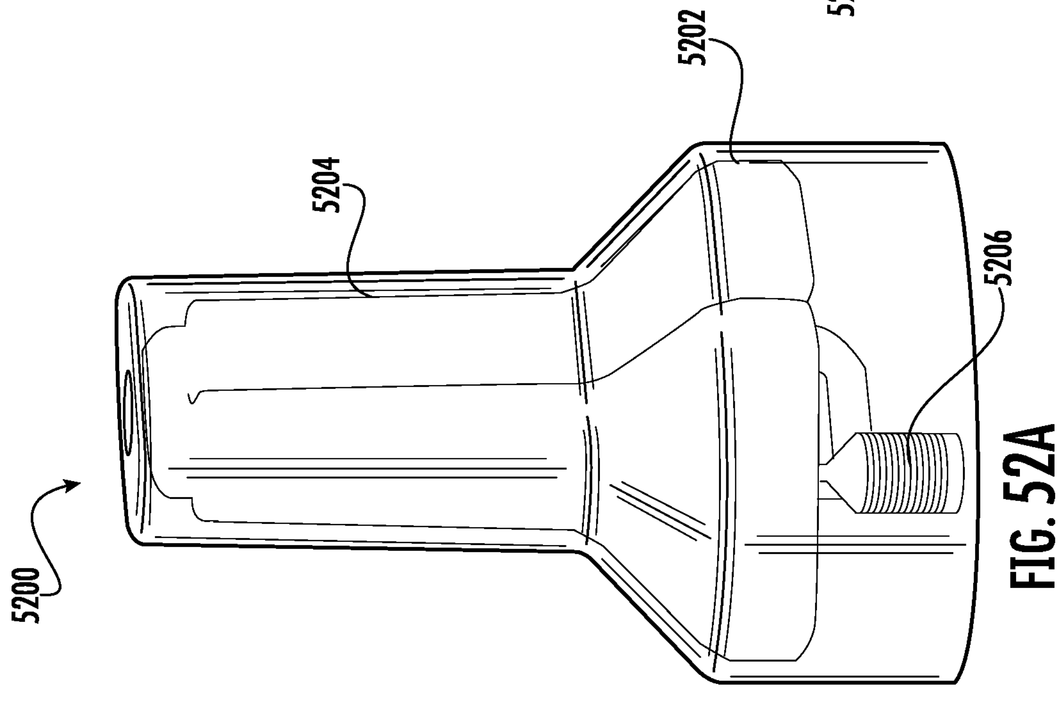
Figure 52B:
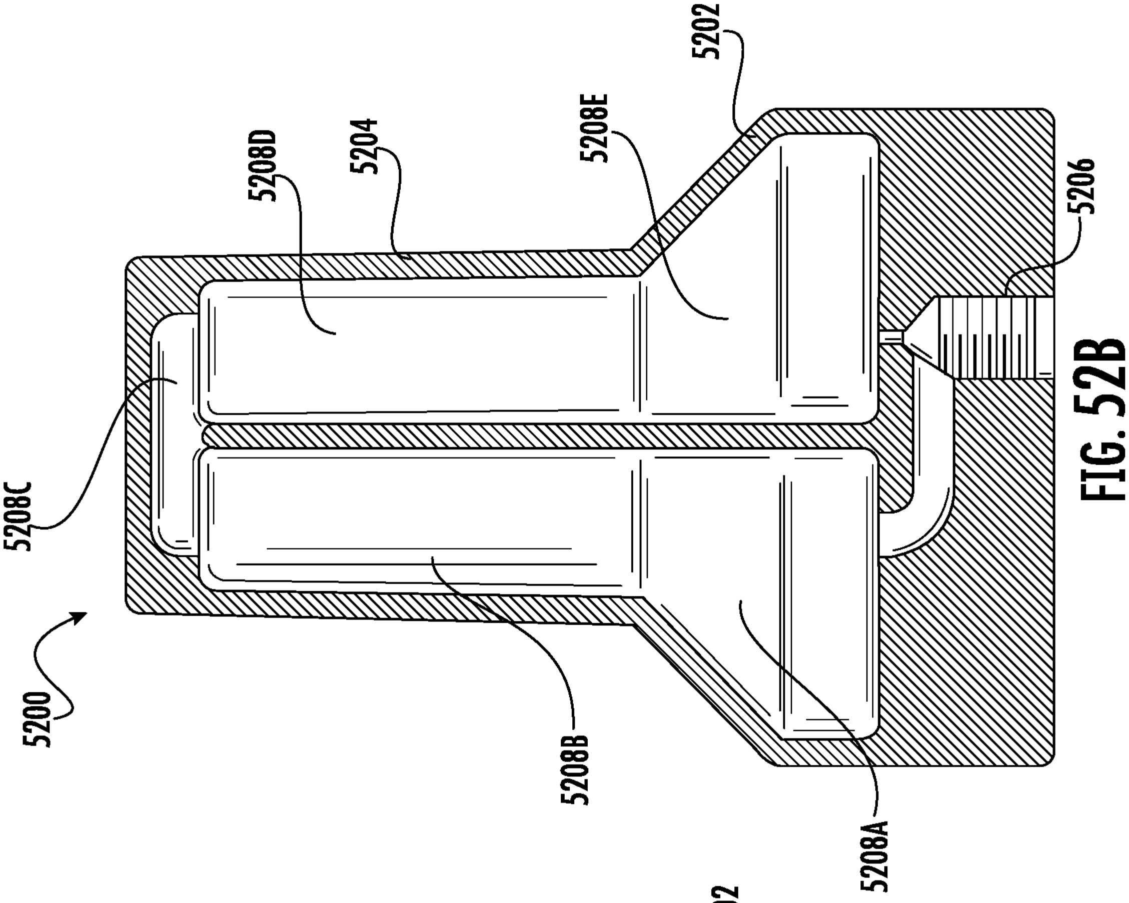
Figure 53A:
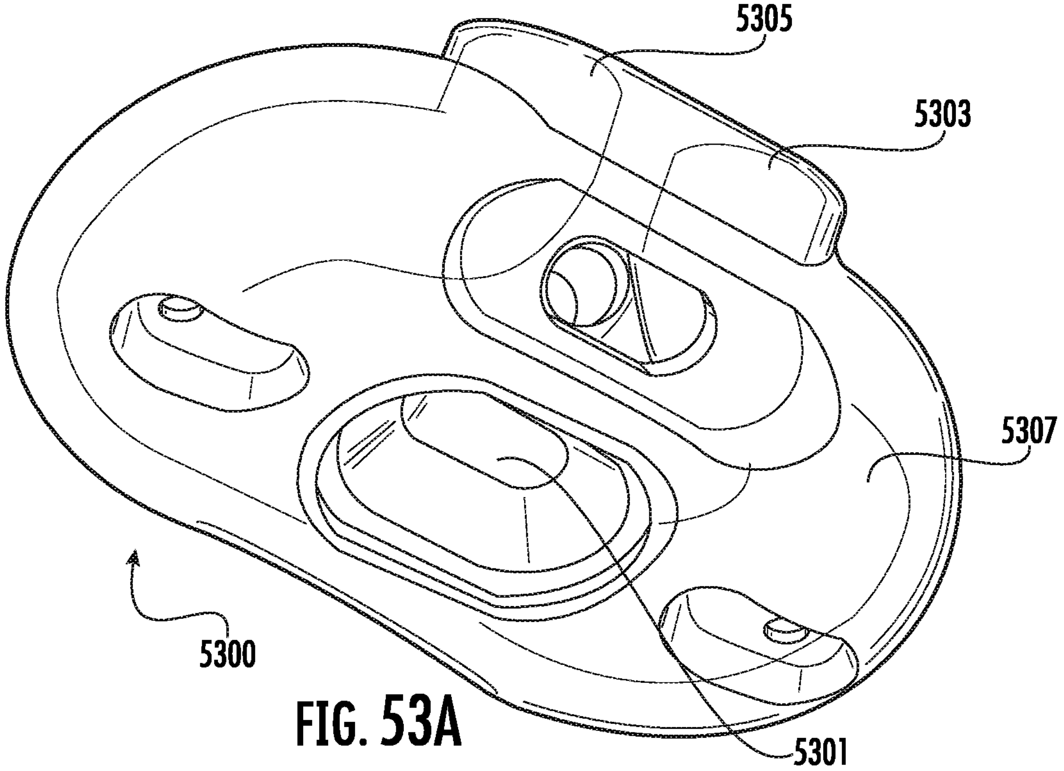
Figure 53B:
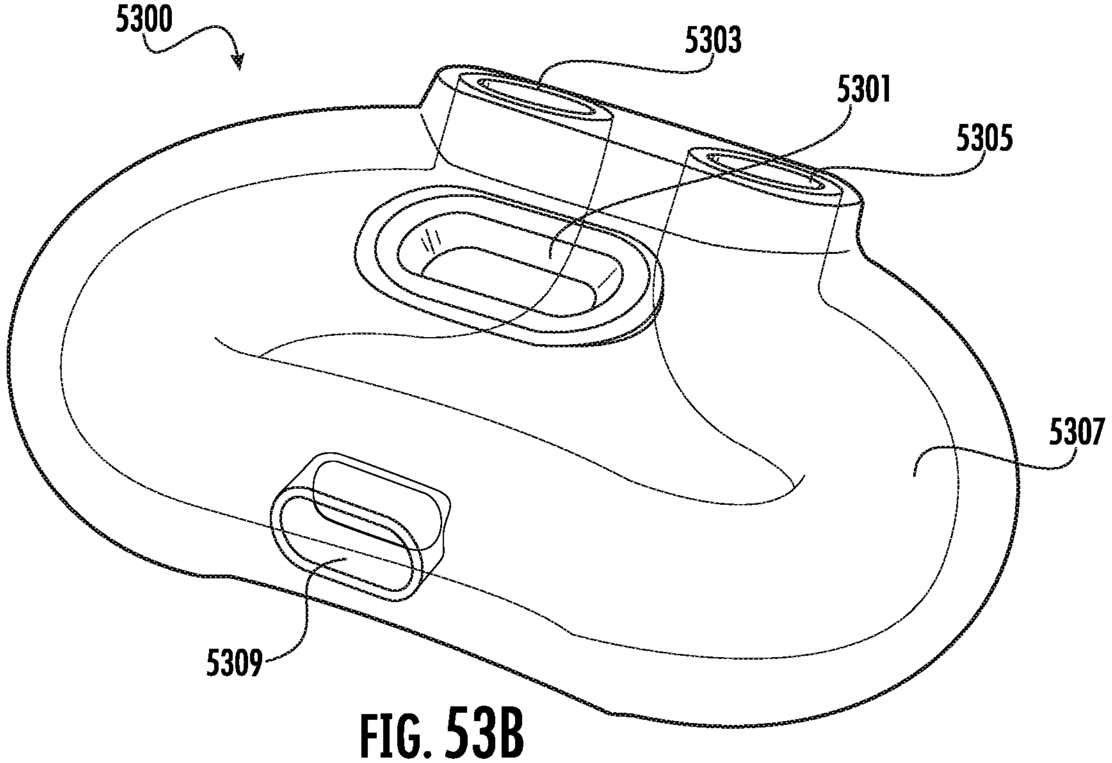
Figure 54A:
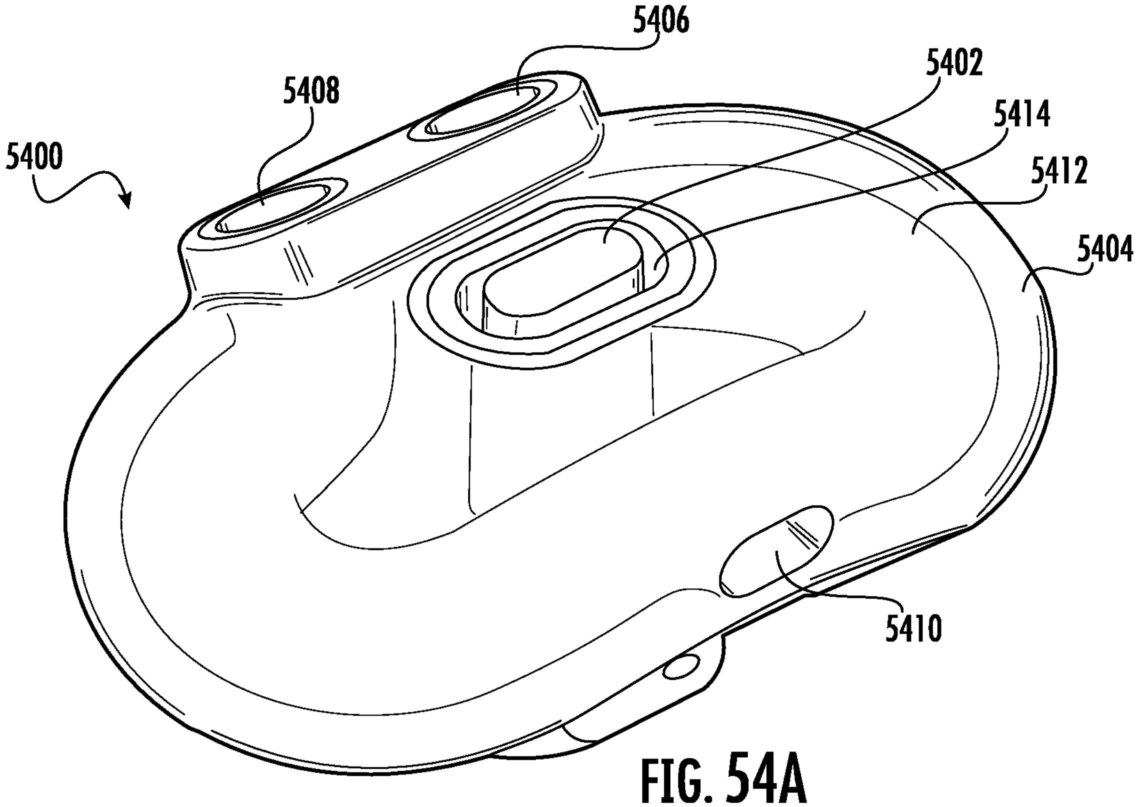
Figure 54B:
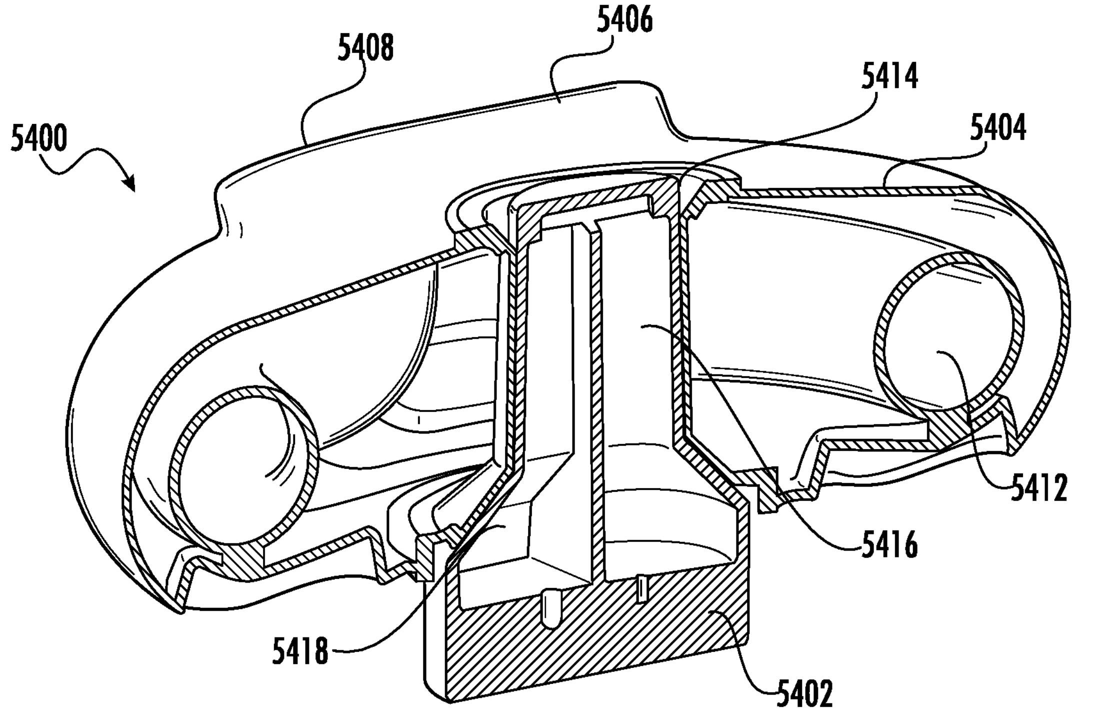
Figure 54C:
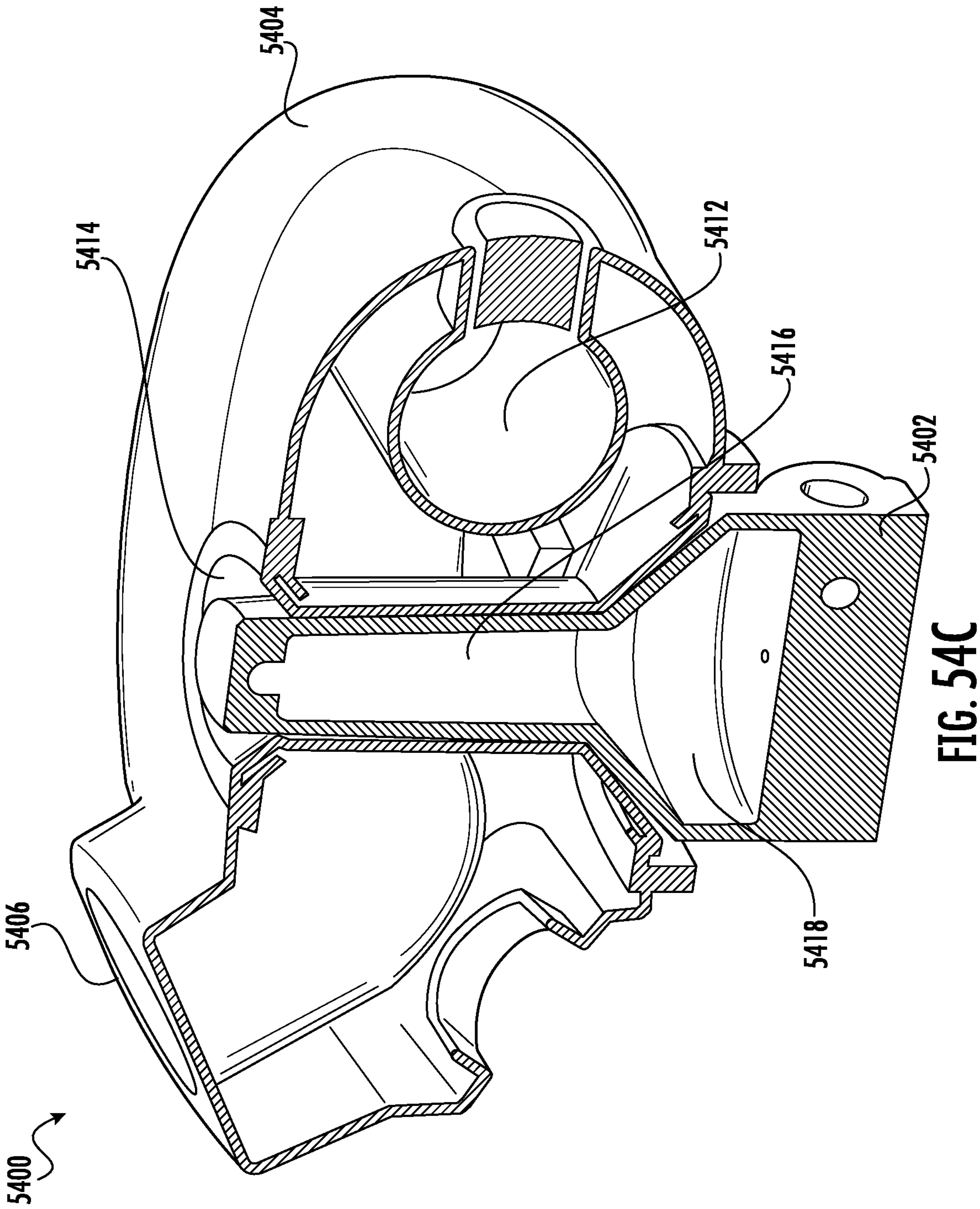

Having thus described the invention in general terms, reference will now be made to the accompanying drawings, which are not necessarily drawn to scale, and wherein:

FIG. 1 illustrates example components of an example air-purifying respirator in accordance with some embodiments of the present disclosure;

FIG. 2 illustrates an example respiratory headgear with an example headband in accordance with some embodiments of the present disclosure;

FIG. 3 illustrates an example view of an example respiratory headgear with an example headband in accordance with some embodiments of the present disclosure;

FIG. 4 illustrates an portion of an example respiratory headgear in accordance with some embodiments of the present disclosure;

FIG. 5 illustrates an example respiratory headgear in accordance with some embodiments of the present disclosure;

FIG. 6 illustrates an example air duct plate in accordance with some embodiments of the present disclosure;

FIG. 7A and FIG. 7B illustrates example views of an example respiratory headgear with an example air duct plate in accordance with some embodiments of the present disclosure;

FIG. 8 illustrates an example air duct plate in accordance with some embodiments of the present disclosure;

FIG. 9 illustrates an example view of an example respiratory headgear with an example air duct plate in accordance with some embodiments of the present disclosure;

FIG. 10 illustrates an example cooling pouch in accordance with some embodiments of the present disclosure;

FIG. 11 illustrates an example view of an example respiratory headgear with an example cooling pouch in accordance with some embodiments of the present disclosure;

FIG. 12 illustrates example components of an example air-purifying device in accordance with some embodiments of the present disclosure;

FIG. 13 illustrates an example filter cartridge of an example air-purifying device in accordance with some embodiments of the present disclosure;

FIG. 14A and FIG. 14B illustrate an example method of operating an example air-purifying device in accordance with some embodiments of the present disclosure;

FIG. 15A and FIG. 15B illustrate an example method of operating an example air-purifying device in accordance with some embodiments of the present disclosure;

FIG. 16 illustrates an example blower assembly cover with an example cooling pad in accordance with some embodiments of the present disclosure;

FIG. 17 illustrates an example air-purifying device in accordance with some embodiments of the present disclosure;

FIG. 18 illustrates an example air-purifying device in accordance with some embodiments of the present disclosure;

FIG. 19 provides an example diagram illustrating an example coolant container and an example breathing tube in accordance with some embodiments of the present disclosure;

FIG. 20 provides an example diagram illustrating an example air-purifying respirator that includes an example coolant container in accordance with some embodiments of the present disclosure;

FIG. 21 illustrates an example diagram illustrating example temperatures of purified air from an example air-purifying respirator in accordance with some embodiments of the present disclosure;

FIG. 22 illustrates example portions of an example air-purifying respirator that includes an example coolant container in accordance with some embodiments of the present disclosure;

FIG. 23A, FIG. 23B, FIG. 23C, FIG. 23D, and FIG. 23E illustrate example views of an example coolant container in accordance with some embodiments of the present disclosure;

FIG. 24 illustrates example portions of an example air-purifying respirator that includes an example coolant container in accordance with some embodiments of the present disclosure;

FIG. 25 illustrates example portions of an example air-purifying respirator that includes an example coolant container in accordance with some embodiments of the present disclosure;

FIG. 26A and FIG. 26B illustrate example views of example portions of an example air-purifying respirator that includes an example coolant container in accordance with some embodiments of the present disclosure;

FIG. 27 illustrates example portions of an example air-purifying respirator that includes an example coolant container in accordance with some embodiments of the present disclosure;

FIG. 28A, FIG. 28B, FIG. 28C, FIG. 28D, and FIG. 28E illustrate example views of an example coolant container and an example air-purifying device in accordance with some embodiments of the present disclosure;

FIG. 29 illustrates example views of an example coolant container in accordance with some embodiments of the present disclosure;

FIG. 30A and FIG. 30B illustrate example portions of an example air-purifying respirator that includes an example coolant container in accordance with some embodiments of the present disclosure;

FIG. 31A and FIG. 31B illustrate example views of an example coolant container in accordance with some embodiments of the present disclosure;

FIG. 32 illustrates example portions of an example air-purifying respirator that includes an example coolant container in accordance with some embodiments of the present disclosure;

FIG. 33 illustrates example portions of an example air-purifying respirator that includes an example coolant container in accordance with some embodiments of the present disclosure;

FIG. 34A and FIG. 34B illustrate example views of an example coolant container in accordance with some embodiments of the present disclosure;

FIG. 35 illustrates an example breathing tube attachment connector in accordance with some embodiments of the present disclosure;

FIG. 36 illustrates an example air-purifying device inlet opening in accordance with some embodiments of the present disclosure;

FIG. 37 illustrates an example coolant container entrance opening in accordance with some embodiments of the present disclosure;

FIG. 38 illustrates an example breathing tube attachment connector in accordance with some embodiments of the present disclosure;

FIG. 39 illustrates an example coolant container entrance opening in accordance with some embodiments of the present disclosure;

FIG. 40 illustrates an example breathing tube attachment connector in accordance with some embodiments of the present disclosure;

FIG. 41 illustrates an example coolant container entrance opening in accordance with some embodiments of the present disclosure;

FIG. 42 illustrates an example breathing tube that is connected to an example coolant container in accordance with some embodiments of the present disclosure;

FIG. 43 is an example cross-sectional view of portions of an example breathing tube connector that is secured to an inner wall that defines an example coolant container entrance opening in accordance with some embodiments of the present disclosure;

FIG. 44 is an example cross-sectional view of portions of an example coolant container entrance opening in accordance with some embodiments of the present disclosure;

FIG. 45 is an example diagram illustrating an example snap fit mechanism in accordance with some embodiments of the present disclosure;

FIG. 46 is an example diagram illustrating an example snap fit mechanism in accordance with some embodiments of the present disclosure;

FIG. 47 illustrates an example diagram illustrating an attachment mechanism between an example breathing tube and an example coolant container in accordance with some embodiments of the present disclosure;

FIG. 48 illustrates an example cross-sectional view of an example coolant container, an example refrigerant evaporator, and an example breathing tube in accordance with some embodiments of the present disclosure;

FIG. 49 is an example diagram illustrating example components connected to an example refrigerant evaporator in accordance with some embodiments of the present disclosure;

FIG. 50 illustrates example portions of an example air-purifying respirator that includes an example coolant container and an example refrigerant evaporator in accordance with some embodiments of the present disclosure;

FIG. 51A and FIG. 51B illustrate example views of an example refrigerant evaporator in accordance with some embodiments of the present disclosure;

FIG. 52A and FIG. 52B illustrate example views of an example refrigerant evaporator in accordance with some embodiments of the present disclosure;

FIG. 53A and FIG. 53B illustrate example views of an example coolant container and an example cooling portion of an example breathing tube in accordance with some embodiments of the present disclosure;

FIG. 54A, FIG. 54B, and FIG. 54C illustrate example views of example portions of an example air-purifying respirator that includes an example refrigerant evaporator, an example coolant container, and an example cooling portion of an example breathing tube in accordance with some embodiments of the present disclosure; and FIG. 55A, FIG. 55B, FIG. 55C, and FIG. 55D illustrate example views of example portions of an example air-purifying respirator that includes an example refrigerant evaporator, an example coolant container, and an example cooling portion of an example breathing tube in accordance with some embodiments of the present disclosure are illustrated.

DETAILED DESCRIPTION OF SOME EXAMPLE EMBODIMENTS

As described above, various embodiments of the present disclosures are related to respiratory protective equipment. In the present disclosure, the term "respiratory protective equipment" refers to a type of personal protective equipment (PPE) that protects at least a portion of a respiratory system of a user wearing said equipment. Examples of respiratory protective equipment may include, but is not limited to, face coverings, face masks (such as, but not limited to, full-face masks, half-masks, etc.), respirators (such as, but not limited to, filtering facepiece respirators, elastomeric half/full facepiece respirators, etc.), and/or the like.

As described above, Applicant has identified many technical challenges and limitations associated with respiratory protective equipment, including air-purifying respirators (APRs) such as, but not limited to, powered air purifying respirators (PAPRs). For example, there are many technical challenges and difficulties in using powered air purifying respirators in an environment with extreme heat while maintaining user comfort and safety.

In many example situations, workers are required to wear respiratory protective equipment (including air-purifying respirators such as, but not limited to, powered air purifying respirators) while performing work. Such example situations include, but are not limited to, high-risk aerosol-generating procedures where the worker may inhale aerosols that can create health risks. However, the environment in which workers must perform and interact with one another is becoming more challenging.

For example, an extreme heat environment refers to working conditions that are above 104° F. for more than 15 minutes of active work, and it is estimated that there will be 76 yearly working days with temperatures over 95° F. by 2030. Wearing respiratory protective equipment (including air-purifying respirators such as, but not limited to, powered air purifying respirators) in such a high temperature environment may not only cause user discomfort, but also can increase heat stress and increase the risks of heat related injuries such as heat strokes. It is estimated that 2.2% of the total working hours will be lost due to heat stress, which translates to 200 billion dollars in productivity losses in the United States by 2030.

In addition, the Occupational Safety and Health Administration published an Advance Notice of Proposed Rulemaking (ANPRM) for Heat Injury and Illness Prevention in Outdoor and Indoor Work Settings in the Federal Register on Oct. 27, 2021. OSHA estimated that one heat-related accident can have a direct cost of more than $23,000, with indirect costs doubling the amount.

As such, there is a need for technical solutions that improve user safety and promote longer/better performance and higher productivity when the user is wearing powered air purifying respirators in extreme heat environments. The impact on cognition, focus and physiological conditions of workers when wearing powered air purifying respirators in high temperature requires an understanding of the principles of physiological thermoregulation and an identification of new ergonomics and technological solutions to solve these issues.

Various embodiments of the present disclosure overcome these technical challenges and difficulties, and provide various technical improvements. In particular, various embodiments of the present disclosure provide clean/cool air solutions that are compatible with many powered air purifying respirators in extreme/high heat scenarios. Various embodiments of the present disclosure mitigate heat stress events and improve worker performance at a desirable value.

Various example embodiments of the present disclosure utilize coolant materials to reduce the temperature of the purified air from the powered air purifying respirators. Examples of coolant materials include, but are not limited to, water/ice, which has been found to be the most energy dense material to reduce the temperature of the purified air from the powered air purifying respirators.

Various embodiments of the present disclosure not only utilize specific coolant materials, but also provide specific configurations that achieve a long lasting cooling time for the purified air from the powered air purifying respirator while maintaining a light weight so that the powered air purifying respirator in accordance with some embodiments of the present disclosure are easy to be carried around by a user.

Various embodiments of the present disclosure not only reduce the temperature of the purified air from the powered air purifying respirator, but also provide humidity control so as to improve the comfort of user wearing such powered air purifying respirators.

For example, some example embodiments of the present disclosure provides a respiratory headgear for an air-purifying respirator that comprises a head cover with a first fastener component secured on an inner surface of the head cover and a headband with a plurality of second fastener components secured on an outer surface of the headband. The first fasten component is fastened to one of the plurality of second fastener components of the headband so that the user can adjust the position of the head cover. In some embodiments, the headband comprises moisture wicking material so that it can absorb sweat from the user's forehead.

In some embodiments, a respiratory headgear for an air-purifying respirator comprises a tube connector having at least one tube connector outlet opening positioned within the respiratory headgear for releasing purified air and an air duct plate positioned within the respiratory headgear. In some embodiments, a back surface of the air duct plate is attached to a front wall of the tube connector so that an inner surface of the respiratory headgear and the back surface of the air duct plate define at least one flow channel for the purified air. In some embodiments, the air duct plate comprises a plurality of perforations that can distribute purified air from different positions towards the user's head, which can improve user comfort.

In some embodiments, a respiratory headgear for an air-purifying respirator comprises: a head cover comprising at least one pocket on an inner surface of the head cover, and at least one cooling pouch positioned within the at least one pocket of the head cover. In some embodiments, the at least one pocket is positioned at a back portion of the inner surface of the head cover, and the at least one cooling pouch comprises coolant material, which can cool down the back of the neck of the user wearing the respiratory headgear and improve user comfort.

In some embodiments, an air-purifying respirator comprises a blower assembly housing defining a sunken surface, wherein a centrifugal blower is disposed in the blower assembly housing and a filter cartridge positioned on the sunken surface of the blower assembly housing, wherein the filter cartridge comprises coolant material. In some embodiments, the coolant material in the filter cartridge can be activated to reduce the temperature of ambient air prior to it being purified by the air-purifying device.

In some embodiments, an air-purifying respirator comprises a blower assembly housing defining a sunken surface and a cooling cartridge positioned on the sunken surface of the blower assembly housing. In some embodiments, a centrifugal blower is disposed in the blower assembly housing and a filter cartridge is positioned to a top surface of the cooling cartridge. In some embodiments, the coolant material in the cooling cartridge can be activated to reduce the temperature of ambient air prior to it being purified by the air-purifying device.

In some embodiments, an air-purifying respirator comprises: a blower assembly housing and a blower assembly cover secured to the blower assembly housing. In some embodiments, a cooling pad is disposed on an inner surface of the blower assembly cover, so that the cooling pad can reduce the temperature of the air within the air-purifying device.

In some embodiments, an air-purifying respirator comprises a blower assembly housing, where a centrifugal blower is secured within and comprises a centrifugal blower outlet opening. In some embodiments, a breathing tube comprises a breathing tube inlet opening that is connected to the centrifugal blower outlet opening, and a cooling pad is disposed surrounding the cooling portion of the breathing tube. In some embodiments, the cooling pad can reduce the temperature of purified air as it travels through the breathing tube.

In some embodiments, an air-purifying respirator comprises a breathing tube and a coolant container. In some embodiments, a breathing tube inlet opening of the breathing tube is connected to an air-purifying device outlet opening of an air-purifying device so as to receive purified air from the air-purifying device. In some embodiments, the coolant container comprises coolant material, and the breathing tube comprises a cooling portion positioned within the coolant container and in contact with the coolant material, so that the coolant material can reduce the temperature of purified air. In some embodiments, the coolant container defines a condensation release channel connecting a condensation catch opening on the cooling portion to a condensation release opening on the coolant container, so that condensation due to cooling the purified air can be released from the breathing tube.

In some embodiments, an air-purifying respirator comprises a breathing tube and a coolant container. In some embodiments, the breathing tube comprises at least one breathing tube attachment connector that securely connects the breathing tube to the coolant container.

In some embodiments, an air-purifying respirator comprises a coolant container, a refrigerant evaporator, and a breathing tube. In some embodiments, the coolant container comprises coolant material and defines a central hole. In some embodiments, at least a portion of the refrigerant evaporator is positioned within the central hole of the coolant container. In some embodiments, a breathing tube enters the coolant container through a coolant container entrance opening of the coolant container and exits the coolant container through a coolant container exit opening of the coolant container. As such, the refrigerant evaporator can reduce the temperature of the coolant material in the coolant container, which in turn can reduce the temperature of the purified air in the breathing tube.

As such, various embodiments can provide value added platformed cooling features to augment purified powered air, providing technical benefits for, such as but not limited to, improving user comfort in high heat/high humidity environments.

Referring now to FIG. 1 illustrates an example air-purifying respirator 100 in accordance with some embodiments of the present disclosure is provided. In the example shown in FIG. 1, the example air-purifying respirator 100 comprises an air-purifying device 101, a breathing tube 103, and a respiratory headgear 105.

In some embodiments, the air-purifying device 101 may be in the form of a powered air purifying respirator. For example, the air-purifying device 101 may comprise a centrifugal blower that can draw ambient air from outside from the air-purifying device 101 through a filter cartridge. In such an example, the filter cartridge purifies the ambient air, and the centrifugal blower blows out purified air through a centrifugal blower outlet opening.

In some embodiments, the breathing tube 103 comprises a breathing tube inlet opening that is connected to the centrifugal blower outlet opening and receives purified air from the air-purifying device 101. In some embodiments, the breathing tube 103 comprises a breathing tube outlet opening that is connected to the respiratory headgear 105.

In some embodiments, the respiratory headgear 105 comprises a respiratory headgear inlet opening that is connected to the breathing tube 103. In some embodiments, when the respiratory headgear 105 is in use, the user's head (and, in some embodiments, at least a portion of the user's neck) is positioned within the respiratory headgear 105, such that the user can breathe in the purified air from the breathing tube.

In some embodiments, the respiratory headgear 105 is in the form of a head piece such as, but not limited to, a helmet, a hood, and/or the like.

As described above, there are many technical challenges and difficulties associated with respiratory protective equipment, including air-purifying respirators such as, but not limited to, powered air purifying respirators. For example, many air-purifying respirators produce purified air with high temperature, which can cause user discomfort, reduce user productivity, and create safety hazards at the workplace. Various embodiments of the present disclosure overcome these technical challenges and difficulties, and provide various technical benefits and advantages. For example, example embodiments illustrated in connection with at least FIG. 2 to FIG. 4 can improve user comfort, increase user productivity, and eliminate safety hazards due to wearing powered air purifying respirator in extreme heat environments.

Referring now to FIG. 2 illustrates an example respiratory headgear 200 with an example headband 206 in accordance with some embodiments of the present disclosure.

As shown in FIG. 2, the example respiratory headgear 200 may comprise a head cover 202 and a headband 206.

In some embodiments, the head cover 202 may be in the form of a head piece that covers a user's head (and, in some embodiments, at least a portion of the user's neck). In some embodiments, the head cover 202 may be in the form of a hood. Additionally, or alternatively, the head cover 202 may be in the form of a helmet. Additionally, or alternatively, the head cover 202 may be in other forms.

In some embodiments, the head cover 202 is connected to the headband 206 by means of a first fastener component 204 of the head cover 202 and one of the second fastener components 208 of the headband 206. In such embodiments, the example respiratory headgear 200 for an air-purifying respirator comprises two components secured together by means of two fasteners. For example, the two fasteners may be hook and loop fasteners (such as, but not limited to, Velcro® fasteners). Additionally, or alternatively, the two fasteners may be in other forms.

In the example shown in FIG. 2, the first fastener component 204 is secured onto an inner surface of head cover 202. As an example, the first fastener component 204 may be in the form of hook fastener (for example, the "hook" strip of a Velcro® fastener). The plurality of second fastener component 208 are secured onto an outer surface of the headband 206. As an example, each of the plurality of second fastener component 208 may be in the form of loop fastener (for example, the "loop" strip of a Velcro® fastener). In some embodiments, by joining the first fastener component 204 to one of the plurality of second fastener component 208, the headband 206 and the head cover 202 can be secured relative to one another. In some embodiments, when the respiratory headgear 200 is in use, the headband 206 is secured to a user's head. Because the head cover 202 is secured to the headband 206 through the first and second fastener components, head cover 202 can be secured relative to the user's head as well.

While the description above provides examples of first fastener components and second fastener components, it is noted that the scope of the present disclosure is not limited to the description above. In some examples, an example first fastener component and/or an example second fastener component may be in other forms such as, but not limited to, snap buttons.

In some embodiments, the example headband 206 may be in the form of a "sweatband." For example, the example headband 206 may comprise soft, elasticated (stretchable) and/or moisture wicking material, which can provide technical improvements over plastic suspension bands. For example, the elasticated material of the example headband 206 allows for users of different head sizes to wear the example respiratory headgear comfortably, in contrast with limited option (if any) of size adjustments when using a plastic suspension band. Additionally, or alternatively, the moisture wicking material of the example headband 206 can absorb sweat from the user's head, which can improve user comfort. Example soft, elasticated (stretchable) and/or moisture wicking material for the example headband 206 may include, but not limited to, polyester, acrylic, and/or the like.

In some embodiments, the example respiratory headgear 200 may include a visor shield 210. In some embodiments, the visor shield 210 comprises transparent material (such as, but not limited to, clear polyethylene terephthalate (PET), polyethylene terephthalate glycol (PETG), and/or the like). In some embodiments, the visor shield 210 is positioned at a front portion of the head cover 202 and protects a user's face.

In some embodiments, the distance from the visor shield 210 to a user's face is adjustable to user viewing needs. For example, the first fastener component 204 is positioned at a top side portion of the inner surface of the head cover 202 (for example, adjacent to the visor shield 210). As described above, the example headband 206 may comprise a plurality of second fastener components 208. In such an example, the distance from the visor shield 210 to a user's face can be adjusted based on the position of the second fastener component that the first fastener component 204 is attached to. For example, if the first fastener component 204 is attached to a second fastener component that is positioned at the front of the example headband 206, the distance between the user's face and the visor shield 210 is increased compared to the distance between the user's face and the visor shield 210 when the first fastener component 204 is attached to a second fastener component that is positioned at the back of the example headband 206.

In the present disclosure, a plurality of different headbands can be implemented in a plurality of different embodiments. In some embodiments, the headband 206 comprises comfortable, soft, washable, replaceable and moisture wicking material. In some embodiments, the headband 206 may comprise one or more integrated sensors. Examples of such sensors include, but are not limited to, core body temperature sensors, heart-rate sensors, breathing sensors, advanced EMG tracking sensors, and/or the like that can help detect user's fatigue and estimate the real-time health conditions of the user.

Referring now to FIG. 3, an example view of an example respiratory headgear 300 in accordance with some embodiments of the present disclosure is provided. In some embodiments, the example respiratory headgear 300 comprises an example headband 305, similar to the example headband described above in connection with FIG. 2.

Similar to those described above, the position of the visor shield of the example respiratory headgear 300 (i.e. a distance between the visor shield and the user's face) can be set up according to the user needs by using different adjustments of the first fastener component on the head cover and second fastener component on the example headband 305.

In the example shown in FIG. 3, the plurality of second fastener components include the second fastener component 301A and the second fastener component 301B. In some embodiments, the second fastener component 301A is positioned to the front of the second fastener component 301B.

When the first fastener component is attached to the second fastener component 301A, the distance between the visor shield and the user's face is shown by arrow 303A. When the first fastener component is attached to the second fastener component 301B, the distance between the visor shield and the user's face is shown by arrow 303B. As illustrated in this example, the distance between the visor shield and the user's face can be increased by joining the first fastener component to a second fastener component that is more to the front of the example headband 305. Such example embodiments can provide technical benefits such as, but not limited to, enabling a user to wear dioptric glasses while wearing the respiratory headgear 300.

Referring now to FIG. 4, a portion of an example respiratory headgear 400 in accordance with some embodiments of the present disclosure is illustrated.

Similar to those described above, the example respiratory headgear 400 comprises a head cover 402. In some embodiments, the head cover 402 comprises a head cover handle 404 that is disposed on an outer surface of the head cover 402.

In some embodiments, the head cover handle 404 is positioned adjacent to the first fastener component that is disposed on the inner surface of the head cover 402. For example, when the user wants to detach the first fastener component of the head cover from a second fastener component on the headband, the user may pull the head cover handle 404. As such, the head cover handle 404 enables easy adjustment of the visor shield position as described above.

As described above, there are many technical challenges and difficulties associated with respiratory protective equipment, including air-purifying respirators such as, but not limited to, powered air purifying respirators. Various embodiments of the present disclosure overcome these technical challenges and difficulties, and provide various technical benefits and advantages. For example, example embodiments illustrated in connection with at least FIG. 5 to FIG. 9 can produce controlled distribution of purified air from the air-purifying respirators, which can improve user comfort, increase user productivity, and eliminate safety hazards due to high air temperature at the workplace.

Referring now to FIG. 5 illustrates an example respiratory headgear 500 in accordance with some embodiments of the present disclosure.

In some embodiments, the example respiratory headgear 500 comprises a tube connector 502 and a head cover 504.

In some embodiments, the head cover 504 may be in the form of a helmet. Additionally, or alternatively, the head cover 504 may be in the form of a hood. Additionally, or alternatively, the head cover 504 may be in other forms. In some embodiments, the head cover 504 may be light weight (for example, less than 1.5 kilograms in accordance with European regulations).

In some embodiments, a tube connector 502 comprises a tube connector inlet opening 506. In some embodiments, the tube connector inlet opening 506 is positioned outside of the respiratory headgear 500 (for example, outside the head cover 504). In some embodiments, the tube connector inlet opening 506 is connected to a breathing tube (for example, through a breathing tube outlet opening of the breathing tube). In some embodiments, the breathing tube is connected to an air-purifying device outlet opening of an air-purifying respirator and receives purified air. As such, the tube connector 502 receives purified air from the breathing tube.

In some embodiments, the tube connector 502 comprises at least one tube connector outlet opening. In the example shown in FIG. 5, the tube connector 502 comprises a top tube connector outlet opening 508A, a bottom left tube connector outlet opening 508B, and a bottom right tube connector outlet opening. In some embodiments, the top tube connector outlet opening 508A is positioned at a top end of the tube connector 502. In some embodiments, the bottom left tube connector outlet opening 508B is positioned at a bottom left end of the tube connector 502. In some embodiments, the bottom right tube connector outlet opening is positioned at a bottom right end of the tube connector 502.

In some embodiments, the tube connector 502 comprises a front wall 510. In some embodiments, the front wall 510 at least partially defines the at least one tube connector outlet opening. For example, as shown in FIG. 5, at least a portion of the front wall 510 provides a wall that defines the top tube connector outlet opening 508A, at least a portion of the front wall 510 provides a wall that defines the bottom left tube connector outlet opening 508B, and at least a portion of the front wall 510 provides a wall that defines the bottom right tube connector outlet opening.

In some embodiments, the tube connector outlet openings of the tube connector 502 are positioned within the respiratory headgear 500 (for example, within the head cover 504) for releasing purified air. For example, the head cover 504 may comprise an opening positioned at the back of the head cover 504 that allows the tube connector 502 to pass through.

In accordance with various embodiments of the present disclosure, a textile air duct plate is positioned within the respiratory headgear 500 (for example, within the head cover 504) and attached to the tube connector 502 (for example, attached to the front wall 510 of the tube connector 502), enabling purified air to flow into the head cover 504 towards the forehead of the user as well as to the sides of the user's head. Examples of air duct plates are described and illustrated herein, including those in connection with FIG. 6 to FIG. 9.

Referring now to FIG. 6 illustrates an example air duct plate 600 in accordance with some embodiments of the present disclosure.

In some embodiments, the example air duct plate 600 is positioned within an example respiratory headgear or an example head cover (for example, the example respiratory headgear 500 and/or the example head cover 504 described above in connection with FIG. 5).

In some embodiments, the example air duct plate 600 comprises a back surface 602 and a front surface that is opposite to the back surface 602. In some embodiments, the back surface 602 of the example air duct plate 600 is attached to a front wall of the tube connector (for example, the front wall 510 of the tube connector 502 shown above in connection with FIG. 5).

In some embodiments, the example air duct plate 600 comprises a plurality of air duct wings. In the example shown in FIG. 6, the example air duct plate 600 comprises a top air duct wing 604 that extends from a center portion 610 of the example air duct plate 600 towards a top portion of the example air duct plate 600, a bottom left wing 606 that extends from the center portion 610 of the example air duct plate 600 towards a bottom left portion of the example air duct plate 600, and a bottom right wing that extends from the center portion 610 of the example air duct plate 600 towards a bottom right portion of the example air duct plate 600.

As described above, the front wall of the tube connector (for example, the front wall 510 of the tube connector 502 shown above in connection with FIG. 5) defines tube connector outlet openings, and the back surface 602 of the example air duct plate 600 is attached to the front wall of the tube connector. In some embodiments, each of the air duct wings corresponds to one or more tube connector outlet openings so that each of the air duct wings defines a flow channel for purified air from the one or more tube connector outlet openings. In the present disclosure, an airflow channel provides a guideway for air to flow. In some embodiments, the air duct plate comprises a plurality of perforations, and purified air may further flow through the plurality of perforations.

For example, the back surface 602 of the center portion 610 of example air duct plate 600 is attached to the front wall of the tube connector. In some embodiments, the top air duct wing 604 corresponds to the top tube connector outlet opening of the tube connector. In other words, the top air duct wing 604 defines a flow channel for purified air from the top tube connector outlet opening of the tube connector. For example, purified air from the top tube connector outlet opening may flow in the flow channel defined by the inner surface of the head cover and the bottom surface of the top air duct wing 604 of the example air duct plate 600, details of which are illustrated in connection with at least FIG. 7A and FIG. 7B. In some embodiments, the top air duct wing 604 of example air duct plate 600 comprises a plurality of perforations 613, and purified air may flow through the plurality of perforations 613 and distributed to the top of the head of the user.

In some embodiments, the bottom left wing 606 corresponds to the bottom left tube connector outlet opening of the tube connector. In other words, the bottom left wing 606 defines a flow channel for purified air from the bottom left tube connector outlet opening of the tube connector. For example, purified air from the bottom left tube connector outlet opening may flow in the flow channel defined by the inner surface of the head cover and the bottom surface of the bottom left wing 606 of the example air duct plate 600, details of which are illustrated in connection with at least FIG. 7A and FIG. 7B. In some embodiments, the bottom left wing 606 of example air duct plate 600 comprises a plurality of perforations 614, and purified air may flow through the plurality of perforations 614 and be distributed to a back side of the user's face. In some embodiments, the bottom left wing 606 further comprises a bottom left wing opening 618, and the purified air may flow through the bottom left wing opening 618 and be distributed to a front side of the user's face, details of which are illustrated and described in connection with at least FIG. 7B.

In some embodiments, the bottom right wing 608 corresponds to the bottom right tube connector outlet opening of the tube connector. In other words, the bottom right wing 608 defines a flow channel for purified air from the bottom right tube connector outlet opening of the tube connector. For example, purified air from the bottom right tube connector outlet opening may flow in the flow channel defined by the inner surface of the head cover and the bottom surface of the bottom right wing 608 of the example air duct plate 600, details of which are illustrated in connection with at least FIG. 7A and FIG. 7B. In some embodiments, the bottom right wing 608 of example air duct plate 600 comprises a plurality of perforations 616, and purified air may flow through the plurality of perforations 616 and be distributed to a side of the user's face. In some embodiments, the bottom right wing 608 further comprises a bottom right wing opening 620, and the purified air may flow through the bottom right wing opening 620 and be distributed to a front side of the user's face, details of which are illustrated and described in connection with at least FIG. 7A.

While the description above provides an example of securing the example air duct plate 600 within the respiratory headgear by attaching it to the tube connector, it is noted that the scope of the present disclosure is not limited to the description above. Additionally, or alternatively, at least a portion or an edge of the example air duct plate 600 may be attached to the inner surface of the respiratory headgear. For example, edges of the example air duct plate 600 are attached to the inner surface of the respiratory headgear. Additionally, or alternatively, the example air duct plate 600 can be secured within the respiratory headgear through other means.

Referring now to FIG. 7A and FIG. 7B, example views of an example respiratory headgear 700 with an example air duct plate 701 in accordance with some embodiments of the present disclosure are illustrated. In particular, FIG. 7A illustrates an example front side view of the example respiratory headgear 700, and FIG. 7B illustrates an example back side view of the example respiratory headgear 700.

Similar to those described above, purified air (such as, but not limited to, purified air that has been cooled in accordance with various embodiments of the present disclosure) enters the head cover 705 through a tube connector 703, similar to those described above. For example, the tube connector 703 comprises a top tube connector outlet opening, a bottom left tube connector outlet opening, and a bottom right tube connector outlet opening.

In some embodiments, the back surface of the example air duct plate 701 is attached to the front wall of the tube connector 703, and edges of the example air duct plate 701 are attached to the inner surface of the head cover 705. In some embodiments, the example air duct plate 701 distributes the purified air towards the user's forehead, as well as to the sides of the user's head.

For example, the example air duct plate 701 comprises a top air duct wing 707 corresponding to the top tube connector outlet opening. In such an example, the top air duct wing 707 defines a flow channel for purified air from the top tube connector outlet opening. The flow channel comprises an inner surface of the respiratory headgear (e.g. the inner surface of the head cover 705) and the back surface of the top air duct wing 707 of the air duct plate 701. The plurality of perforations on the top air duct wing 707 of the example air duct plate 701 diffuse airflow to the top and back of the user's head, as shown in FIG. 7A and FIG. 7B. In some embodiments, the front edge of the top air duct wing 707 of the example air duct plate 701 is not attached to the inner surface of the respiratory headgear, while the side edges of the top air duct wing 707 of the example air duct plate 701 are attached to the inner surface of the respiratory headgear. As such, the opening between the front edge of the top air duct wing 707 of the example air duct plate 701 and the inner surface of the respiratory headgear (e.g. the inner surface of the head cover 705) diffuse airflow from the top front of the user's head, as shown in FIG. 7A and FIG. 7B.

Additionally, the example air duct plate 701 comprises a bottom left wing 709 corresponding to the bottom left tube connector outlet opening. In such an example, the bottom left wing 709 defines a flow channel for purified air from the bottom left tube connector outlet opening. The flow channel comprises an inner surface of the respiratory headgear (e.g. the inner surface of the head cover 705) and the back surface of the bottom left wing 709 of the air duct plate 701. The plurality of perforations on the bottom left wing 709 of the example air duct plate 701 diffuse airflow to the left and back of the user's head, as shown in FIG. 7B. In some embodiments, the edges of the bottom left wing 709 of the example air duct plate 701 are attached to the inner surface of the respiratory headgear, and the bottom left wing 709 comprises a bottom left wing opening 713. In some embodiments, the bottom left wing opening 713 diffuses airflow from the bottom, left, and front side of the user's head, as shown in FIG. 7B.

Additionally, the example air duct plate 701 comprises a bottom right wing 711 corresponding to the bottom right tube connector outlet opening. In such an example, the bottom right wing 711 defines a flow channel for purified air from the bottom right tube connector outlet opening. The flow channel comprises an inner surface of the respiratory headgear (e.g. the inner surface of the head cover 705) and the back surface of the bottom right wing 711 of the air duct plate 701. The plurality of perforations on the bottom right wing 711 of the example air duct plate 701 diffuse airflow to the right and back of the user's head, as shown in FIG. 7B. In some embodiments, the edges of the bottom right wing 711 of the example air duct plate 701 are attached to the inner surface of the respiratory headgear, and the bottom right wing 711 comprises a bottom right wing opening 715. In some embodiments, the bottom right wing opening 715 diffuses airflow from the bottom, right, and front side of the user's head, as shown in FIG. 7A.

As such, various embodiments of the present disclosure utilize the back surface of an air duct plate and the inner surface of the head cover to create air flow channels, providing controlled airflow distribution within the head cover, creating an enhanced sensation of cooling to the user, and preventing spot flow that may feel unpleasant and cause headaches or muscular ache.

Referring now to FIG. 8, an example air duct plate 800 in accordance with some embodiments of the present disclosure is illustrated.

In some embodiments, the example air duct plate 800 is positioned within an example respiratory headgear or an example head cover (for example, the example respiratory headgear 500 and/or the example head cover 504 described above in connection with FIG. 5).

In some embodiments, the example air duct plate 800 comprises a back surface 802 and a front surface that is opposite to the back surface 802. In some embodiments, the back surface 802 of the example air duct plate 800 is attached to a front wall of the tube connector (for example, the front wall 510 of the tube connector 502 shown above in connection with FIG. 5).

In some embodiments, the example air duct plate 800 comprises a plurality of air duct wings. In the example shown in FIG. 6, the example air duct plate 800 comprises a top air duct wing 804 that extends from a center portion 810 of the example air duct plate 800 towards a top portion of the example air duct plate 800 and a bottom wing 812 that extends from the center portion 810 of the example air duct plate 800 towards a bottom portion of the example air duct plate 800.

As described above, the front wall of the tube connector (for example, the front wall 510 of the tube connector 502 shown above in connection with FIG. 5) defines tube connector outlet openings, and the back surface 802 of the example air duct plate 800 is attached to the front wall of the tube connector. In some embodiments, each of the air duct wings corresponds to one or more tube connector outlet openings so that each of the air duct wings defines a flow channel for purified air from the one or more tube connector outlet openings. In some embodiments, the air duct plate comprises a plurality of perforations, and purified air may further flow through the plurality of perforations.

For example, the back surface 802 of the center portion 810 of example air duct plate 800 is attached to the front wall of the tube connector. In some embodiments, the top air duct wing 804 corresponds to the top tube connector outlet opening of the tube connector. In other words, the top air duct wing 804 defines a flow channel for purified air from the top tube connector outlet opening of the tube connector. For example, purified air from the top tube connector outlet opening may flow in the flow channel defines by the inner surface of the head cover and the bottom surface of the top air duct wing 804 of the example air duct plate 800, details of which are illustrated in connection with at least FIG. 9.

In some embodiments, the top air duct wing 804 defines one or more attaching lines 816 that are attached to the inner surface of the head cover. In such an example, the back surface of the example air duct plate 800 between the one or more attaching lines 816 and the inner surface of the head cover define one or more flow channels for purified air from the top tube connector outlet opening.

In some embodiments, the top air duct wing 804 of example air duct plate 800 comprises a plurality of perforations 814, and purified air may flow through the plurality of perforations 814 and distributed to the top of the head of the user.

In some embodiments, the bottom wing 812 corresponds to the bottom left tube connector outlet opening and the bottom right tube connector outlet opening of the tube connector. In other words, the bottom wing 812 defines a flow channel for purified air from the bottom left tube connector outlet opening of the tube connector and purified air from the bottom right tube connector outlet opening of the tube connector. For example, purified air from the bottom left tube connector outlet opening and the bottom right tube connector outlet opening may flow in the flow channel defined by the inner surface of the head cover and the bottom surface of the bottom wing 812 of the example air duct plate 800, details of which are illustrated in connection with at least FIG. 9. In some embodiments, the bottom wing 812 of example air duct plate 800 comprises a plurality of perforations 820, and purified air may flow through the plurality of perforations 820 and be distributed to a bottom side of the user's face. In some embodiments, the bottom wing 812 further comprises a bottom wing opening 822 where a user's neck may pass through, details of which are illustrated and described in connection with at least FIG. 7B.

While the description above provides an example of securing the example air duct plate 800 within the respiratory headgear by attaching it to the tube connector, it is noted that the scope of the present disclosure is not limited to the description above. Additionally, or alternatively, at least a portion or an edge of the example air duct plate 800 may be attached to the inner surface of the respiratory headgear.

Referring now to FIG. 9 illustrates an example view of an example respiratory headgear 900 with an example air duct plate 800 in accordance with some embodiments of the present disclosure.

Referring now to 9, an example view of an example respiratory headgear 900 with an example air duct plate 901 in accordance with some embodiments of the present disclosure is illustrated. In particular, FIG. 9 illustrates an example front side view of the example respiratory headgear 900.

Similar to those described above, purified air (such as, but not limited to, purified air that has been cooled in accordance with various embodiments of the present disclosure) enters the head cover 903 through a tube connector, similar to those described above. For example, the tube connector comprises a top tube connector outlet opening, a bottom left tube connector outlet opening, and a bottom right tube connector outlet opening.

In some embodiments, the back surface of the example air duct plate 901 is attached to the front wall of the tube connector, and edges of the example air duct plate 901 are attached to the inner surface of the head cover 903. In some embodiments, the example air duct plate 901 distributes the purified air towards the top of the user's head, as well as towards the bottom of the user's head.

For example, the top air duct wing 905 comprises one or more attaching lines that are on the back surface of the top air duct wing 905 and are attached to the inner surface of the head cover. In such an example, the back surface of the top air duct wing 905 of the example air duct plate 901 between the one or more attaching lines and the inner surface of the head cover define one or more flow channels for purified air from the top tube connector outlet opening to the top and front of the user's face.

In some embodiments, the top air duct wing 905 of example air duct plate 901 comprises a plurality of perforations, and purified air may flow through the plurality of perforations 613 and distributed to the top of the head of the user.

Additionally, the example air duct plate 901 comprises a bottom wing 907 corresponding to the bottom left tube connector outlet opening and the bottom right tube connector outlet opening. In such an example, the bottom wing 907 defines a flow channel for purified air from the bottom left tube connector outlet opening and the bottom right tube connector outlet opening. The flow channel comprises an inner surface of the respiratory headgear (e.g. the inner surface of the head cover 705) and the back surface of the bottom wing 907 of the air duct plate 901. In some embodiments, the edges of the bottom wing 907 of the example air duct plate 901 are attached to the inner surface of the respiratory headgear. In some embodiments, the plurality of perforations on the bottom wing 907 of the example air duct plate 901 diffuse airflow to the bottom of the user's head, as shown in FIG. 9.

As such, various embodiments of the present disclosure utilize the back surface of an air duct plate and the inner surface of the head cover to create air flow channels, providing controlled airflow distribution within the head cover, creating an enhanced sensation of cooling to the user, and preventing spot flow that may feel unpleasant and cause headaches or muscular ache.

As described above, there are many technical challenges and difficulties associated with respiratory protective equipment, including air-purifying respirators such as, but not limited to, powered air purifying respirators. For example, many air-purifying respirators produce purified air with high temperature, which can cause user discomfort, reduce user productivity, and create safety hazards at the workplace. Various embodiments of the present disclosure overcome these technical challenges and difficulties, and provide various technical benefits and advantages. For example, example embodiments illustrated in connection with at least FIG. 10 to FIG. 11 can reduce temperatures of purified air from the air-purifying respirators, which can improve user comfort, increase user productivity, and eliminate safety hazards due to high air temperature at the workplace.

Referring now to FIG. 10, an example cooling pouch 1000 in accordance with some embodiments of the present disclosure is illustrated.

In some embodiments, the example cooling pouch 1000 comprises coolant material 1002. For example, the example cooling pouch 1000 may be a pre-frozen water bag that comprises ice. Additionally, or alternatively, the example cooling pouch 1000 may comprise other coolant material(s).

In some embodiments, the coolant material 1002 may be sealed in the example cooling pouch 1000. For example, the coolant material 1002 may be sealed between a front surface of the example cooling pouch 1000 and a back surface of the example cooling pouch 1000.

In some embodiments, the example cooling pouch 1000 may seal the coolant material 1002 into multiple, separate cooling units (such as the cooling unit 1004A, the cooling unit 1004B, and the cooling unit 1004C illustrated in FIG. 10). In some embodiments, each of the cooling unit is thermally insulated from one another.

In some embodiments, the bottom layer of the cooling pouch 1000 may comprise thermally insulation material or material with a thermal conductivity that is less than a predetermined threshold so as to protect the user from a rapid direct cold contact when the cooling pouch 1000 is placed on a user's skin (for example, near the user's neck and/or shoulder areas) so as to make the cooling pleasant and prevent muscular ache.

Referring now to FIG. 11 illustrates an example view of an example respiratory headgear 1100 with an example cooling pouch 1000 in accordance with some embodiments of the present disclosure.

In some embodiments, the example respiratory headgear 1100 comprises a head cover 1104 with at least one pocket 1102. In some embodiments, the at least one pocket 1102 is disposed on an inner surface of the head cover 1104. For example, the at least one pocket 1102 is positioned at a back portion of the inner surface of the head cover 1104, which corresponds to the back neck area of the user when wearing the example respiratory headgear 1100.

In some embodiments, at least one cooling pouch 1106 is positioned within the at least one pocket 1102 of the head cover 1104. In some embodiments, the at least one cooling pouch 1106 comprises coolant material, similar to those described above in connection with FIG. 10. Because the position of the at least one pocket 1102 corresponds to the back neck area of the user when wearing the example respiratory headgear 1100, the at least one cooling pouch 1106 allows for cooling of the neck and/or shoulder areas of the user.

Referring now to FIG. 12, example components of an example air-purifying device 1200 in accordance with some embodiments of the present disclosure are illustrated.

As shown in FIG. 12, the example air-purifying device 1200 may be in the form of an example power air purifying respirator (PAPR). In some embodiments, the example air-purifying device 1200 may comprise the blower assembly housing 1202, a filter cartridge 1206 and a blower assembly cover 1208.

In some embodiments, the blower assembly housing 1202 houses a centrifugal blower 1204. In some embodiments, the centrifugal blower 1204 comprises a centrifugal blower inlet opening 1220 that draws air into the centrifugal blower 1204, as well as a centrifugal blower outlet opening 1222 where air may exit from the centrifugal blower 1204.

In some embodiments, the blower assembly housing 1202 defines a sunken surface 1224. In some embodiments, the centrifugal blower 1204 is disposed within the blower assembly housing 1202. For example, the centrifugal blower inlet opening 1220 is on the sunken surface 1224 of the blower assembly housing 1202, and the centrifugal blower outlet opening 1222 is positioned on the side of the blower assembly housing 1202.

In some embodiments, the filter cartridge 1206 may comprise filtering material. For example, the filter cartridge 1206 may comprise a high efficiency particulate air (HEPA) filter. Additionally, or alternatively, the filter cartridge 1206 may comprise other filter material(s).

In some embodiments, the filter cartridge 1206 positioned on the sunken surface 1224 of the blower assembly housing 1202. In some embodiments, the filter cartridge 1206 may cover the centrifugal blower inlet opening 1220. In such embodiments, when the centrifugal blower 1204 is in operation, the centrifugal blower 1204 draws ambient air through the filter cartridge 1206 to the centrifugal blower inlet opening 1220. Because the filter cartridge 1206 comprises filtering material, the ambient air is filtered into purified air through the filter cartridge 1206. As such, the purified air enters the centrifugal blower 1204, and the centrifugal blower 1204 pushes purified air out through the centrifugal blower outlet opening 1222.

In some embodiments, the blower assembly cover 1208 may be secured to the blower assembly housing 1202. In particular, the filter cartridge 1206 is positioned between the blower assembly cover 1208 and the blower assembly housing 1202.

In various embodiments of the present disclosure, the air-purifying device 1200 may comprise one or more additional components.

For example, a rechargeable power source 1210 may be secured to the blower assembly housing 1202 and provide power to the centrifugal blower 1204. In some embodiments, the rechargeable power source 1210 may comprise a rechargeable battery, which may be charged through the power charging unit 1214 that includes a charger 1226, a power adapter 1228, and a power cord 1230.

Additionally, or alternatively, the air-purifying device 1200 may comprise a blower assembly pad 1218 that is secured to a back side of the blower assembly housing 1202. In some embodiments, the blower assembly pad 1218 may comprise shock absorbing material (such as, but not limited to, rubber, sponge, and/or the like).

Additionally, or alternatively, the air-purifying device 1200 may comprise a carrying belt 1212 that is secured to the back side of the blower assembly housing 1202, so that the user can carry around the example air-purifying device 1200.

Additionally, or alternatively, the air-purifying device 1200 may comprise a flow meter device 1216 that measures the flow rate of the purified air.

In some embodiments, the weight of the air-purifying device 1200 may be less than 5 kilograms in accordance with the European regulations.

As described above, there are many technical challenges and difficulties associated with respiratory protective equipment, including air-purifying respirators such as, but not limited to, powered air purifying respirators. For example, many air-purifying respirators produce purified air with high temperature, which can cause user discomfort, reduce user productivity, and create safety hazards at the workplace. Various embodiments of the present disclosure overcome these technical challenges and difficulties, and provide various technical benefits and advantages. For example, example embodiments illustrated in connection with at least FIG. 13 to FIG. 14B can reduce temperatures of air prior to it being purified by an air-purifying respirator, which can improve user comfort, increase user productivity, and eliminate safety hazards due to high air temperature at the workplace.

Referring now to FIG. 13, an example filter cartridge 1300 of an example air-purifying device in accordance with some embodiments of the present disclosure is illustrated.

In some embodiments, the example filter cartridge 1300 comprises a filter housing 1304 and a cooling packet 1302.

In some embodiments, the cooling packet 1302 is housed within the filter housing 1304. In some embodiments, the cooling packet 1302 may comprise coolant material that can reduce temperature (for example, through one or more chemical reactions and/or other cooling alternatives).

In some embodiments, the coolant material comprises ammonium nitrate and water, which allows for cooling before air filtration. Implementing ammonium nitrate and water as coolant material provides the technical advantages of easy cleanup and portability.

Additionally, or alternatively, the coolant material comprises water and/or ice (e.g. purely frozen water and/or cold water, which allows for a freeze pack to be added. Implementing water and/or ice as coolant material also provides the technical advantages of easy cleanup and portability.

Additionally, or alternatively, the coolant material comprises cooling air salve (such as, but not limited to, menthol), which allows for cooling by sensation (i.e., aroma scents). Implementing cooling air salve as coolant material provides the technical advantages of easy cleanup and enhanced sense of cleanliness.

As illustrated in various examples described above, the example filter cartridge 1300 with the coolant material provides solutions for cooling air that are portable, on demand, and easy to clean.

In some embodiments, the example filter cartridge 1300 further comprises filter material(s) disposed within the filter housing 1304. In some embodiments, the timeline for replacing the filter material(s) ad/or the example filter cartridge 1300 depends on the type of filter material. For HEPA filters, replacement ranges from every few hours to every few months. For gas cartridge filters, replacement ranges from every hour to every two weeks.

Referring now to FIG. 14A and FIG. 14B, an example method of operating an example air-purifying device in accordance with some embodiments of the present disclosure.

As shown in FIG. 14A, the example air-purifying device is operated by first activating a filter cartridge 1402. In some embodiments, the manner of activating the filter cartridge 1402 depends on the coolant material that is in the filter cartridge 1402. For example, if the coolant material comprises ammonium nitrate and water, the step of activating the filter cartridge 1402 may include pressing firmly on a cooling packet of the filter cartridge 1402 (which may be centrally placed in the filter cartridge housing as shown FIG. 14A).

Subsequent to activating the filter cartridge 1402. The example proceeds to FIG. 14B. As shown in FIG. 14B, the example air-purifying device is operated by placing the activated filter cartridge 1402 into the blower assembly housing 1404.

Similar to those described above, the blower assembly housing 1404 defines a sunken surface, and a centrifugal blower 1406 is disposed in the blower assembly housing 1404. In some embodiments, the activated filter cartridge 1402 is positioned on the sunken surface of the blower assembly housing 1404. In some embodiments, the centrifugal blower inlet opening of the centrifugal blower 1406 is on the sunken surface of the blower assembly housing 1404. In some embodiments, the activated filter cartridge 1402 is positioned on top of the centrifugal blower inlet opening of the centrifugal blower 1406. Because the coolant material has been activated, the centrifugal blower 1406 draws air that has a reduced temperature to the centrifugal blower inlet opening of the centrifugal blower 1406, and causes purified air with the reduced temperature to flow out through a centrifugal blower outlet opening.

As described above, there are many technical challenges and difficulties associated with respiratory protective equipment, including air-purifying respirators such as, but not limited to, powered air purifying respirators. For example, many air-purifying respirators produce purified air with high temperature, which can cause user discomfort, reduce user productivity, and create safety hazards at the workplace. Various embodiments of the present disclosure overcome these technical challenges and difficulties, and provide various technical benefits and advantages. For example, example embodiments illustrated in connection with at least FIG. 15A to FIG. 18 can reduce temperatures of air in air-purifying respirators, which can improve user comfort, increase user productivity, and eliminate safety hazards due to high air temperature at the workplace.

Referring now to FIG. 15A and FIG. 15B, an example method of operating an example air-purifying device 1500 in accordance with some embodiments of the present disclosure is illustrated.

In some embodiments, the example air-purifying device 1500 may comprise a blower assembly housing 1502, a cooling cartridge 1504, and a filter cartridge 1506. These components may operate together as an air-purifying device that cools ambient air.

In the example method shown in FIGS. 15A and 15B, each of the blower assembly housing 1502, the cooling cartridge 1504, and the filter cartridge 1506 are stacked and/or secured to one another.

For example, the blower assembly housing 1502 defines a sunken surface, similar to those described above. In some embodiments, a centrifugal blower is disposed in the blower assembly housing 1502. For example, a centrifugal blower inlet opening is disposed on the sunken surface of the blower assembly housing 1502, similar to those described above.

In some embodiments, the cooling cartridge 1504 is secured to the sunken surface of the blower assembly housing 1502. In some embodiments, the cooling cartridge 1504 comprises coolant material.

In some embodiments, the coolant material comprises ammonium nitrate and water, which allows for cooling before air filtration. Implementing ammonium nitrate and water as coolant material provides the technical advantages of easy cleanup and portability.

Additionally, or alternatively, the coolant material comprises water and/or ice (e.g. purely frozen water and/or cold water, which allows for a freeze pack to be added. Implementing water and/or ice as coolant material also provides the technical advantages of easy cleanup and portability.

Additionally, or alternatively, the coolant material comprises cooling air salve (such as, but not limited to, menthol), which allows for cooling by sensation (i.e., aroma scents). Implementing cooling air salve as coolant material provides the technical advantages of easy cleanup and enhanced sense of cleanliness.

In some embodiments, the filter cartridge 1506 is positioned to a top surface of the cooling cartridge 1504. For example, the filter cartridge 1506 may be secured relative to the cooling cartridge 1504 through a twisting motion as shown in FIG. 15B.

As described above, the centrifugal blower inlet opening is disposed on the sunken surface of the blower assembly housing 1502. As shown in FIG. 15A and FIG. 15B, the cooling cartridge 1504 is disposed on the centrifugal blower inlet opening, and the filter cartridge 1506 is positioned on top of the cooling cartridge 1504. When the centrifugal blower is in operation, the centrifugal blower drawings ambient air through the filter cartridge 1506, which produces purified air. The purified air is then drawn through the cooling cartridge 1504, and the cooling cartridge 1504 reduces the temperature of the purified air prior to it entering the centrifugal blower.

Referring now to FIG. 16, an example air-purifying device 1600 in accordance with some embodiments of the present disclosure is illustrated.

In some embodiments, an example air-purifying device 1600 comprises a blower assembly housing 1602, a blower assembly cover 1604, and a cooling pad 1606. These components may operate together as an air-purifying device that cools ambient air through the blower assembly cover 1604.

In some embodiments, a centrifugal blower is disposed in the blower assembly housing 1602, similar to those described above. In some embodiments, a filter cartridge is disposed on the blower assembly housing (for example, on a sunken surface of the blower assembly housing), similar to those described above).

In some embodiments, the blower assembly cover 1604 is secured to the blower assembly housing 1602. In some embodiments, a cooling pad is disposed on an inner surface of the blower assembly cover. In some embodiments, the cooling pad comprises coolant material.

In some embodiments, the coolant material comprises ammonium nitrate and water, which allows for cooling before air filtration. Implementing ammonium nitrate and water as coolant material provides the technical advantages of easy cleanup and portability.

Additionally, or alternatively, the coolant material comprises water and/or ice (e.g. purely frozen water and/or cold water, which allows for a freeze pack to be added. Implementing water and/or ice as coolant material also provides the technical advantages of easy cleanup and portability.

Additionally, or alternatively, the coolant material comprises cooling air salve (such as, but not limited to, menthol), which allows for cooling by sensation (i.e., aroma scents). Implementing cooling air salve as coolant material provides the technical advantages of easy cleanup and enhanced sense of cleanliness.

In some embodiments, when the centrifugal blower is in operation, ambient air is drawn into the air-purifying respirator. As described above, the filter cartridge is positioned between the blower assembly cover 1604 and the blower assembly housing 1602, and a cooling pad 1606 is disposed on an inner surface of the blower assembly cover 1604. Because the cooling pad 1606 comprise coolant material, the cooling pad 1606 can reduce the temperature of air that entered into the example air-purifying device 1600 prior to it being filtered by the filter cartridge.

Referring now to FIG. 17, an example air-purifying device 1700 in accordance with some embodiments of the present disclosure is illustrated.

In some embodiments, the example air-purifying device 1700 comprises a blower assembly housing 1702, the breathing tube 1704, and the cooling pad 1706. These components may operate together as the air-purifying device 1700 that cools ambient air closer to the centrifugal blower.

In some embodiments, a centrifugal blower is secured in the blower assembly housing 1702. In some embodiments, the centrifugal blower comprises a centrifugal blower outlet opening that pushes purified air out for the centrifugal blower, similar to those described above.

In some embodiments, the breathing tube 1704 comprises a breathing tube inlet opening that is connected to the centrifugal blower outlet opening. In some embodiments, the breathing tube 1704 receives purified air from the centrifugal blower.

In some embodiments, the cooling pad 1706 is attached to an outer surface of the breathing tube 1704. For example, the cooling pad 1706 may surround and wrap around a portion of the breathing tube 1704. In some embodiments, the portion of the breathing tube 1704 where the cooling pad 1706 surrounds is also referred to as the cooling portion of the breathing tube 1704, where cooling of purified air happens. In some embodiments, the cooling pad 1706 comprises coolant material.

In some embodiments, the coolant material comprises ammonium nitrate and water, which allows for cooling before air filtration. Implementing ammonium nitrate and water as coolant material provides the technical advantages of easy cleanup and portability.

Additionally, or alternatively, the coolant material comprises water and/or ice (e.g. purely frozen water and/or cold water, which allows for a freeze pack to be added. Implementing water and/or ice as coolant material also provides the technical advantages of easy cleanup and portability.

Additionally, or alternatively, the coolant material comprises cooling air salve (such as, but not limited to, menthol), which allows for cooling by sensation (i.e., aroma scents). Implementing cooling air salve as coolant material provides the technical advantages of easy cleanup and enhanced sense of cleanliness.

In the example shown in FIG. 17, the cooling portion of the breathing tube (e.g. where the cooling pad 1706 surrounds the breathing tube 1704) is adjacent to the blower assembly housing. In some embodiments, the cooling pad 1706 may be positioned in other locations.

Referring now to FIG. 18, an example breathing tube with an example cooling pad in accordance with some embodiments of the present disclosure is illustrated.

In some embodiments, the example air-purifying device 1800 comprises a blower assembly housing 1802, a breathing tube 1804, a cooling pad 1806, and a respiratory headgear 1808. These components may operate together as the example air-purifying device 1800 that cools ambient air closer to the centrifugal blower.

In some embodiments, a centrifugal blower is secured in the blower assembly housing 1802. In some embodiments, the centrifugal blower comprises a centrifugal blower outlet opening that pushes purified air out for the centrifugal blower, similar to those described above.

In some embodiments, the breathing tube 1804 comprises a breathing tube inlet opening that is connected to the centrifugal blower outlet opening. In some embodiments, the breathing tube 1804 receives purified air from the centrifugal blower.

In some embodiments, the breathing tube 1804 comprises a breathing tube outlet opening that is connected to a respiratory headgear inlet opening of the respiratory headgear 1808. In some embodiments, the respiratory headgear 1808 may be in the form of a helmet or a hood, where a user's head may be positioned within. In some embodiments, the breathing tube 1804 delivers purified air to the user through the respiratory headgear inlet opening.

In some embodiments, the cooling pad 1806 is attached to an outer surface of the breathing tube 1804. For example, the cooling pad 1806 may surround and wrap around a portion of the breathing tube 1804. In some embodiments, the portion of the breathing tube 1804 where the cooling pad 1806 surrounds is also referred to as the cooling portion of the breathing tube 1804, where cooling of purified air happens. In some embodiments, the cooling pad 1806 comprises coolant material.

In some embodiments, the coolant material comprises ammonium nitrate and water, which allows for cooling before air filtration. Implementing ammonium nitrate and water as coolant material provides the technical advantages of easy cleanup and portability.

Additionally, or alternatively, the coolant material comprises water and/or ice (e.g. purely frozen water and/or cold water, which allows for a freeze pack to be added. Implementing water and/or ice as coolant material also provides the technical advantages of easy cleanup and portability.

Additionally, or alternatively, the coolant material comprises cooling air salve (such as, but not limited to, menthol), which allows for cooling by sensation (i.e., aroma scents). Implementing cooling air salve as coolant material provides the technical advantages of easy cleanup and enhanced sense of cleanliness.

In the example shown in FIG. 18, the cooling portion of the breathing tube (e.g. where the cooling pad 1806 surrounds the breathing tube 1804) is adjacent to the respiratory headgear 1808. For example, the cooling pad 1806 may attach the breathing tube outlet opening of the breathing tube 1804 to the respiratory headgear inlet opening of the respiratory headgear 1808. As such, purified air may be cooled before entering into the respiratory headgear 1808.

As described above, there are many technical challenges and difficulties associated with respiratory protective equipment, such as, but not limited to, air-purifying respirator (including powered air purifying respirators). For example, purified air having a high temperature from such air-purifying respirators may not only cause discomfort in workers, but also create safety hazards.

Various embodiments of the present disclosure overcome these technical challenges and difficulties, and provide various technical benefits and improvements. For example, various embodiments of the present disclosure reduce the temperature of the purified air by placing the breathing tube in a coolant container, such that the breathing tube is in contact with coolant and transfers heat from the purified air to the coolant.

As an example, various embodiments of the present disclosure cool down the ambient airflow to the end user's head through our air-purifying respirator (including, but not limited to, powered air purifying respirators).

In some embodiments, a coolant container (or a housing, an apparatus, a tube, and/or the like) is provided. In some embodiments, a breathing tube (which may comprise material such as, but not limited to, plastic, metal, composites, and/or the like) runs through the coolant container.

In some embodiments, the coolant container may store coolant such as, but not limited to, ice. Ice is defined as a solid substance produced by the freezing of water vapor or liquid water. For example, at temperatures below 0° C. (32° F.), water vapor develops into frost at ground level and snowflakes (each of which consists of a single ice crystal) in clouds. Similarly, at temperatures below 0° C. (32° F.), liquid water forms a solid, as, for example, river ice, sea ice, hail, and ice produced commercially or in household refrigerators.

In embodiments where ice is used as a coolant, the coolant container is filled with water and then frozen into ice. For example, the breathing tube can be put through a coolant container in the form of a plastic container that can be filled with approximately 1.5 kilograms of water (and/or ice). In such an example, the water is then frozen by reducing the temperature down to at least below 0° C. When the purified air flows through the breathing tube, thermal transfer occurs from the purified air, through the breathing tube, and to the ice.

In experimentations using an example air-purifying respirator constructed in accordance with some embodiments of the present disclosure, the ambient air (for example, in a climatic chambers where the example air-purifying respirator is positioned), the ambient air temperature is 40° C. After the air flows through the breathing tube of the example air-purifying respirator, the temperature of the air is reduced by 5° C. In an experimentation, 50 milliliter of water was built up in the breathing tube due to condensation. Various embodiments of the present disclosure provide a condensation release valve that allows the condensation to be released from the breathing tube, details of which are described herein.

As such, various example embodiments of the present disclosure provide technical benefits and advantages. For example, example embodiments of the present disclosure provide thermal comfort while maintaining safety compliance by pushing purified air through the breathing tube of the powered air purifying respirator to this "ice shrouded tube" such that purified air can be then cooled down from its surrounding ambient temperature. As illustrated in the example experimentations above, various embodiments of the present disclosure can reduce the temperature of purified air by 5° C. to 10° C. in an environment where the ambient temperature is 40° C. In some embodiments, various embodiments of the present disclosure can reduce the temperature of purified air by more than 5° C. to 10° C. and can be implemented in environments with higher ambient temperatures. Additional details are described herein.

Referring now to FIG. 19 to FIG. 20, examples of respiratory protective equipment in accordance with some embodiments of the present disclosure are provided. More specifically, FIG. 19 to FIG. 20 depict example portions of example air-purifying respirators in accordance with some embodiments of the present disclosure.

Referring now to FIG. 19, an example diagram 1900 illustrating an example coolant container 1910 and an example breathing tube 1904 in accordance with some embodiments of the present disclosure.

In some embodiments, the coolant container 1910 may comprise coolant material 1906. For example, the coolant container 1910 may comprise a container shell 1912 that provides a housing where the coolant material 1906 can be stored within.

In some embodiments, the coolant material 1906 has a melting point that is less than 40° C. and a heat of fusion/melting of at least 150 J/g or >250 J/g. For example, the coolant material 1906 may comprise, such as but not limited to, water, paraffin-based phase change materials, and/or the like. Such embodiments and examples provide technical benefits and improvements such as, but not limited to, increasing the thermal transfer rate (e.g. allowing the purified air to be cooled more quickly).

In some embodiments, additives such as salts and antifreeze agents (such as, but not limited to, polyethylene glycol, polypropylene glycol, ethylene glycol, propylene glycol, etc.) can also be further included in the coolant. Such embodiments provide technical benefits and improvements such as, but not limited to, preventing the breathing tube from being frozen.

In some embodiments, the volume of coolant material 1906 can be within the range of 0 to 10 kilograms of water/ice formulation with a preferred range of 0.725 kgs to 3.5 kgs. Such embodiments provide technical benefits and improvements such as, but not limited to, increasing the thermal transfer rate (e.g. allowing the purified air to be cooled more quickly).

As described above, the coolant container 1910 may comprise the container shell 1912. In some embodiments, the container shell 1912 may comprise material that has a density of less than 1.2 g/cm$^3$ and a thermal conductivity less than 0.2 W/mK. For example, the container shell 1912 can be made of a solid sheet material of polypropylene, polyvinyl chloride, polystyrene, polyimide, silicone, epoxy, and/or any blends thereof. In some embodiments, polypropylene is a preferred solid sheet material for the container shell 1912. In some embodiments, a modified polypropylene may be used for enhanced impact resistance. In some embodiments, polypropylene has a thermal conductivity of 0.12 W/mK and a density of 0.9 g/cm$^3$. In some embodiments, the container shell 1912 may comprise material that is made of a foamed plastic with an overall density less than 1 g/cm$^3$ and thermal conductivity of 0.2 or less. Various example embodiments described above provide technical benefits and improvements such as, but not limited to, providing more space for housing the coolant material without significantly increasing the size of the coolant container, as well as enabling at least a partial thermal isolation between the coolant material 1906 and the ambient environment (so that the coolant material can reduce the temperature of the purified air from the breathing tube instead of reducing the temperature of the ambient environment).

In some embodiments, the container shell 1912 may further include a porous liquid absorbing/holding layer that is on the outermost layer of the container shell 1912. In some embodiments, the porous liquid absorbing/holding layer of the container shell 1912 prevents moisture condensation on the outside of container shell 1912 to gather and drip off. As described herein, the coolant container 1910 may be carried by a user. As such, the porous liquid absorbing/holding layer of the container shell 1912 may prevent the coolant container 1910 from wetting the user. In some embodiments, the porous layer may be a textile (such as, but not limited to, nonwoven, woven or knit material) that is bonded to the outside of the container shell 1912 and/or loosely attached to the outside of the coolant container 1910.

In the example shown in FIG. 19, the breathing tube 1904 passes through the coolant container 1910. In some embodiments, the container shell 1912 is detachable from the breathing tube 1904. For example, the container shell 1912 may comprise rigid material(s) and/or flexible material(s). In embodiments where more flexible material(s) are used for the container shell 1912, the container shell 1912 can be constructed using a resin coated textile or textile substrate with a plastic/rubber layer laminated with the coating or film side facing the coolant material 1906. Various example embodiments described above provide technical benefits and improvements such as, but not limited to, enabling the coolant container 1910 to be easily swapped while preventing the coolant material 1906 from leaking.

In some embodiments, the coolant container 1910 comprises a coolant release valve 1908. In some embodiments, the coolant release valve 1908 enables the coolant container 1910 to be opened and closed, so that the coolant material 1906 can be drained and replaced as needed. For example, the coolant container 1910 (e.g. the container shell 1912) may define a coolant release opening 1914, and the coolant release valve 1908 may be positioned to block the coolant release opening 1914.

In some embodiments, example dimensions of the coolant release valve 1908 may range from at least 0.75" by 0.75" by 2" (e.g. approximately the size of an ice cube). Such example embodiments described above provide technical benefits and improvements such as, but not limited to, help funnel out the coolant material 1906 or to help facilitate swap out of the coolant material 1906.

Similar to those described above, the breathing tube 1904 may comprise a breathing tube inlet opening that is connected to an air-purifying device outlet opening of an air-purifying device and receives purified air from the air-purifying device. The breathing tube 1904 may comprise a breathing tube outlet opening that is connected to a respiratory headgear inlet opening of a respiratory headgear and provides the purified air to the respiratory headgear. In FIG. 19, the flow direction of the purified air is shown by the airflow arrow 1902.

In the example shown in FIG. 19, the breathing tube 1904 passes through the coolant container 1910. In particular, the coolant container 1910 comprises a first opening 1916 and a second opening 1918 that are on the outer surface of the coolant container 1910 (for example, on the container shell 1912). In some embodiments, the breathing tube 1904 enters the coolant container 1910 through the first opening 1916 and exits the coolant container 1910 through the second opening 1918. As such, the breathing tube 1904 comprises a cooling portion 1920 that is between the first opening 1916 and the second opening 1918 and is in contact with the coolant material 1906.

In some embodiments, the breathing tube 1904 is in a shape similar to a substantially cylindrical shape. In some embodiments, the breathing tube 1904 may be in the form of other shape(s).

In some embodiments, the coolant container 1910 and the breathing tube 1904 (including, but not limited to, the cooling portion 1920) may comprise different materials.

For example, the breathing tube 1904 (including, but not limited to, the cooling portion 1920) may comprise solid material. For example, the breathing tube 1904 (including, but not limited to, the cooling portion 1920) may comprise thermal conductive material. In some embodiments, the thermal conductive material has a thermal conductivity at room temperature of between 0.2 Watts per meter-Kelvin (W/mK) and 10 W/mK. In some embodiments, the thermal conductive material has a thermal conductivity more preferably between 0.3 W/mK to 0.8 W/mK or between 0.3 W/mK to 0.5 W/mK.

Various example embodiments described above provide technical benefits and improvements. On one hand, if the thermal conductivity of the material for the breathing tube 1904 (including, but not limited to, the cooling portion 1920) is higher than 2 W/mK, then the purified air is cooled too quickly, consuming the thermal capacity of the fixed amount of coolant material and shortening the cooling effects time. Condensation inside the breathing tube 1904 may also occur too quickly if the thermal conductivity is greater than 2 W/mK. On the other hand, if the thermal conductivity of the material for the breathing tube 1904 (including, but not limited to, the cooling portion 1920) is less than 0.2 W/mk, the cooling rate may be too slow to produce any meaningful cooling effect. In some embodiments, preferred materials for the breathing tube 1904 (including, but not limited to, the cooling portion 1920 that is in contact with the coolant material 1906) may include, but are not limited to, HDPE, ABS, PPS, LDPE, PEEK, polybutylene terephthalate, EVA, Nylon 6, Nylon 66, and polyurethanes.

In some embodiments, the thickness of the breathing tube 1904 (including, but not limited to, the cooling portion 1920) is less than 10 mm, preferably less than 3 mm. In some embodiments, the breathing tube 1904 (including, but not limited to, the cooling portion 1920) has a gas and liquid barrier properties that is above a threshold (for example, as required by a safety standard) and/or a chemical resistance level that is above a threshold (for example, as required by a safety standard), thereby reducing/preventing the purified air from leaking into the coolant container 1910 and/or reducing/preventing the coolant material 1906 from leaking into the breathing tube 1904.

In some embodiments, the material for the breathing tube 1904 (including, but not limited to, the cooling portion 1920) may include filler materials, which may provide the technical benefits and advantages such as, but not limited to, enhancing the thermal conductivities of the breathing tube 1904 (including, but not limited to, the cooling portion 1920). In some embodiments, the material for the breathing tube 1904 (including, but not limited to, the cooling portion 1920) may have a low density (for example, less than 1.4 $g/cm^3$, and preferably less than 1 $g/cm^3$). In some embodiments, any blends of the various example materials described above can be used. As described above, high-density polyethylene (HDPE) and/or Low-density polyethylene (LDPE) are the preferred material in some embodiments, as both materials have a density less than 1 $g/cm^3$ and a thermal conductivity greater than 0.3 W/mK.

In some embodiments, a length of the cooling portion 1920 of the breathing tube 1904 (e.g. the portion of the breathing tube 1904 that is in contact with the coolant material 1906) may be determined to provide technical benefits and advantages such as, but not limited to, maximizing the reduction of temperature of the purified air while minimizing the condensation of water. In some embodiments, the length of the cooling portion 1920 is between 1 cm to 100 cm. In some embodiments, the length is between 15 cm to 60 cm. In some embodiments, the length is between 20 cm to 30 cm.

As illustrated in the examples above, various embodiments of the present disclosure provide purifying and cooling air solutions that are compatible with powered air purifying respirators for worker productivity and safety in extreme or high heat scenarios. Various embodiments of the present disclosure can increase customers overall safety and comfort by lowering the temperature of the purified air (which may in turn lowering the temperature of the respiratory headgear worn by a user) while improving the body thermal regulations defined by OSHA and/or onsite industrial hygienist.

Examples of body thermal regulations may also include heat index, which is a measure of subjective heat that combines the effects of heat and humidity to determine how hot it feels to the user.

Examples of body thermal regulations may include, but are not limited to, Wet Bulb Global Temperature (WBGT), which is a net heat load (including the environmental temperature and the clothing value) to which a worker may be exposed from the combined contributions of metabolic heat. For example, the OSHA threshold is 30° C. WBGT (43° C.) in a very heavy workload situation, where the worker can do 0 to 25% work. Other variables include, but not limited to, personal protective equipment (PPE) burden, clothing value, metabolic rate, operating environment, user fitness, user lifestyle, and/or the like. It is noted that some use scenarios for powered air purifying respirators can exceed operational standards. For example, in a smelting environment, the temperatures can go up to 43.3° C.

In some embodiments, a mixture of water and ice is provided as the coolant material and provides the most energy dense cooling method. In some embodiments, a freezer is provided on a work site to store the mixture of water and ice so that they can be provided into the coolant container. In some embodiments, cooling purified air for a user not only reduces temperature but also controls humidity. As such, various embodiments of the present disclosure can help users to make better cognitive decisions and increase their productivity, safety, or performance.

For example, in experimentations with example air-purifying respirators in accordance with some embodiments of the present disclosure, the inside temperature of a respiratory headgear can be reduced by between 5° C. to 10° C. (based on technical feasibility and potential usability limits) for 2 to 4 hours (based upon length of continuous work between break times, where 4 hours is upper limit for operation battery time of powered air purifying respirator), leading to significant improvement on worker comfort and performance.

Referring now to FIG. 20, an example diagram illustrates an example air-purifying respirator 2000 in accordance with some embodiments of the present disclosure. In some embodiments, the example air-purifying respirator 2000 may be in the form of and/or comprise an example power air purifying respirator. For example, the example air-purifying respirator 2000 in the example shown in FIG. 20 comprises an air-purifying device 2002, a breathing tube 2008, and a respiratory headgear 2006. In some embodiments, the example air-purifying respirator 2000 further comprises a coolant container 2004.

In some embodiments, the example air-purifying device 2002 is similar to various example air-purifying devices described herein (including, but not limited to, the example air-purifying device 1200 described above in connection with FIG. 12). For example, the example air-purifying device 2002 may comprise at least a centrifugal blower that draws ambient air from the ambient environment into the example air-purifying device 2002 through a filter cartridge to produce purified air.

In some embodiments, the example air-purifying device 2002 pushes purified air from an air-purifying device outlet opening of the example air-purifying device 2002. In some embodiments, the example air-purifying device 2002 may provide different pressure/flow speed of the purified air. For example, the example air-purifying device 2002 may provide a default airflow of 7.2 CFM (205 lpm), a medium airflow of 7.8 CFM (220 lpm), a high airflow (e.g. in tight-fit configurations) of 8.3 CFM (235 lpm), and a nominal airflow of 5.5 CFM (155 lpm). Additionally, or alternatively, the example air-purifying device 2002 may provide airflow with different pressures and/or flow speeds.

In some embodiments, the example air-purifying device 2002 may be in the form of a Honeywell North® Primair® 700 (PA700) powered air purifying respirators. In some embodiments, the example air-purifying device 2002 may be other types of powered air purifying respirators.

Rereferring back to FIG. 20, the example air-purifying respirator 2000 comprises a respiratory headgear 2006. In some embodiments, the respiratory headgear 2006 may be in the form of a hood. In such an example, the respiratory headgear 2006 covers the head and the neck portions of a user wearing the respiratory headgear 2006. In some embodiments, the respiratory headgear 2006 may be in the form of a helmet. In such an example, the respiratory headgear 2006 covers the head portion of a user wearing the respiratory headgear 2006 and does not cover the neck portion of the user.

In some embodiments, the respiratory headgear 2006 may comprise a respiratory headgear inlet opening. The respiratory headgear inlet opening of the respiratory headgear 2006 provides an opening for purified air to flow into respiratory headgear 2006. In some embodiments, the example air-purifying respirator 2000 may comprise a breathing tube 2008. Similar to those described above, the breathing tube 2008 may comprise a breathing tube inlet opening 2022 that is connected to an air-purifying device outlet opening of the air-purifying device 2002 and receives purified air from the air-purifying device 2002. In some embodiments, the breathing tube 1904 may comprise a breathing tube outlet opening 2024 that is connected to a respiratory headgear inlet opening of a respiratory headgear 2006 and provides the purified air to the respiratory headgear 2006.

Similar to those described above in connection with at least FIG. 19, the example air-purifying respirator 2000 reduces the temperature of the purified air that exits from the air-purifying device 2002 before it enters the respiratory headgear 2006. For example, the example air-purifying respirator 2000 comprises a coolant container 2004, and at least a portion of the breathing tube 2008 runs through the coolant container 2004.

Similar to those described above, the coolant container 2004 may comprise a container shell 2014 that provides a housing for storing the coolant material 2012. In some embodiments, the coolant material 2012 has a melting point that is less than 40° C. and a heat of fusion/melting of at least 150 J/g or >250 J/g. For example, the coolant material 2012 may comprise, such as but not limited to, water and/or ice, which can provide technical benefits and improvements such as, but not limited to, increasing the thermal transfer rate (e.g. allowing the purified air to be cooled more quickly).

Additionally, or alternatively, the coolant material 2012 may comprise other materials, such as, but not limited to, paraffin-based phase change materials, additives such as salts and antifreeze agents, and/or the like, similar to those described above.

Similar to those described above, the volume of coolant material 2012 can be within the range of 0 to 10 kilograms of water/ice formulation with a preferred range of 0.725 kgs to 3.5 kgs. Such embodiments provide technical benefits and improvements such as, but not limited to, increasing the thermal transfer rate (e.g. allowing the purified air to be cooled more quickly).

Similar to those described above, the coolant container 2004 may comprise the container shell 2014. In some embodiments, the container shell 2014 may comprise material that has a density of less than 1.2 g/cm$^3$ and a thermal conductivity less than 0.2 W/mK. For example, the container shell 2014 can be made of a solid sheet material of polypropylene, polyvinyl chloride, polystyrene, polyimide, silicone, epoxy, and/or any blends thereof. In some embodiments, polypropylene is a preferred solid sheet material for the container shell 2014. Various example embodiments described above provide technical benefits and improvements such as, but not limited to, providing more space for housing the coolant material without significantly increasing the size of the coolant container 2004, as well as enabling at least a partial thermal isolation between the coolant material 2012 and the ambient environment (so that the coolant material 2012 can reduce the temperature of the purified air from the breathing tube instead of reducing the temperature of the ambient environment).

Similar to those described above, the coolant container 2004 comprises one or more openings that are on the outer surface of the coolant container 2004 (for example, on the container shell 2014). In some embodiments, the breathing tube 2008 enters and exits the coolant container 2004 through the one or more openings. In some embodiments, the breathing tube 2008 comprises a cooling portion, which refers to the portion of the breathing tube 2008 that is within the coolant container 2004 and in contact with the coolant material 2012.

Similar to those described above, the breathing tube 2008 is in a shape similar to a substantially cylindrical shape. Additionally, or alternatively, the breathing tube 2008 may be in the form of other shape(s).

In some embodiments, the coolant container 2004 and the breathing tube 2008 (including, but not limited to, the cooling portion) may comprise different materials. For example, the breathing tube 2008 (including, but not limited to, the cooling portion) may comprise thermal conductive material that has a thermal conductivity at room temperature of between 0.2 W/mK and 10 W/mK. In some embodiments, the thermal conductive material has a thermal conductivity more preferably between 0.3 W/mK to 0.8 W/mK or between 0.3 W/mK to 0.5 W/mK, providing various technical benefits and improvements such as, but not limited to, allowing purified air to be cooled at a sufficient rate without causing too much condensation.

In some embodiments, preferred materials for the breathing tube 2008 (including, but not limited to, the cooling portion that is in contact with the coolant material 2012) may include, but are not limited to, HDPE, ABS, PPS, LDPE, PEEK, polybutylene terephthalate, EVA, Nylon 6, Nylon 66, and polyurethanes.

In some embodiments, the breathing tube 2008 can isolate purified air from the coolant material 2012 in the coolant container 2004. For example, the breathing tube 2008 (including, but not limited to, the cooling portion) has a gas and liquid barrier properties that is above a threshold (for example, as required by a safety standard) and/or a chemical resistance level that is above a threshold (for example, as required by a safety standard), thereby reducing/preventing the purified air from leaking into the coolant container 2004 and/or reducing/preventing the coolant material 2012 from leaking into the breathing tube 2008. In some embodiments, the thickness of the breathing tube 2008 (including, but not limited to, the cooling portion) is less than 10 mm, preferably less than 3 mm.

In some embodiments, the material for the breathing tube 2008 (including, but not limited to, the cooling portion 1920) may include filler materials, which may provide the technical benefits and advantages such as, but not limited to, enhancing the thermal conductivities of the breathing tube 2008 (including, but not limited to, the cooling portion 1920). In some embodiments, the material for the breathing tube 2008 (including, but not limited to, the cooling portion 1920) may have a low density (for example, less than 1.4 g/cm$^3$, and preferably less than 1 g/cm$^3$).

In some embodiments, a length of the cooling portion of the breathing tube 2008 (e.g. the portion of the breathing tube 2008 that is in contact with the coolant material 2012) is between 1 cm to 100 cm. In some embodiments, the length is between 15 cm to 60 cm. In some embodiments, the length is between 20 cm to 30 cm. Example lengths of the cooling portion of the breathing tube 2008 described herein may provide technical benefits and advantages such as, but not limited to, maximizing the reduction of temperature of the purified air while minimizing the condensation of water.

In the example shown in FIG. 20, the breathing tube 2008 passes through the coolant container 2004. In some embodiments, the coolant container 2004 is filled with water and then frozen into an ice, and at least a portion of the breathing tube 2008 is in contact with the ice. As described above, the air-purifying device 2002 may filter and/or purify ambient air to produce purified air 2010. The purified air 2010 may pass through the portion of the breathing tube 2008 that is in contact with the ice (e.g. the coolant material), which reduces the air temperature of the filtered/purified air so that cooled purified air 2020 enters the respiratory headgear. In such an example, the portion of the breathing tube 2008 that is in contact with the ice becomes an “ice shrouded tube,” which cools down the filtered/purified air from its surrounding ambient temperature. For example, the ambient temperature may be 40° C. After the filtered/purified air passes through the breathing tube 2008, the temperature of the filtered/purified air can be reduced by at least 5° C. to 10° C. for 2 to 8 hours.

As illustrated in the examples described above, the temperature of the purified air may be reduced as the purified air passes through the portion of the breathing tube that is in contact with the coolant material in the coolant container (e.g. the cooling portion of the cooling portion). In some embodiments, the reduction of temperature of the purified air causes condensation of water vapor in the purified air. In the present disclosure, the term “condensation” refers to the change of the state of matter from water vapor to liquid water.

As shown in FIG. 20, the condensation of water vapor in the purified air may accumulate in the breathing tube. The condensation of water vapor in the purified air may cause many technical challenges and problems. For example, when a user inhales while wearing the respiratory headgear, condensation of water vapor that is accumulated in the breathing tube can be sucked into the respiratory headgear, which increases the humidity level within the respiratory headgear and causes user discomfort.

Various embodiments of the present disclosure may solve the above-referenced technical problems. For example, various embodiments of the present disclosure may provide a condensation release valve 2018 that allows condensation of water vapor to be discharged from the breathing tube.

In the example shown in FIG. 20, the cooling portion of the breathing tube 2008 may comprise a loop (or a downward arc or section) that functions as a condensation catch 2016. As described above, condensation of water vapor in the purified air may occur when the coolant material from the coolant container is frozen and used to cool the purified air in the breathing tube. In some embodiments, the condensation catch 2016 refers to a downward convex shaped section of the cooling portion of the breathing tube 2008 where condensation of water vapor may accumulate. In some embodiments, the condensation catch 2016 may catch a volume of the water from 0 milliliter to 100 milliliter.

In some embodiments, the breathing tube 2008 defines a condensation catch opening 2026 on the cooling portion of the breathing tube 2008. In some embodiments, the condensation catch opening 2026 is positioned at the lowest point of the downward convex shaped section of the cooling portion of the breathing tube 2008 (e.g. at the lowest point of the condensation catch 2016).

In some embodiments, the coolant container 2004 defines a condensation release opening 2028 on the surface of the coolant container 2004. For example, the condensation release opening 2028 is positioned on the container shell 2014 of the coolant container 2004.

In some embodiments, the condensation catch opening 2026 and the condensation release opening 2028 are connected to each other. In some embodiments, the coolant container 2004 defines a condensation release channel that connects the condensation catch opening 2026 on the cooling portion of the breathing tube 2008 to a condensation release opening 2028 on the coolant container 2004. In particular, the condensation of water vapor in the purified air that is accumulated in the condensation catch 2016 (e.g. the downward convex shaped section of the cooling portion of the breathing tube 2008) may be released through the condensation catch opening 2026 of the breathing tube 2008, and then through the condensation release channel, and then be released through the condensation release opening 2028 of the coolant container 2004.

In some embodiments, the coolant container 2004 comprises a condensation release valve 2018.

In some embodiments, when the example air-purifying respirator 2000 is in use, the condensation release valve 2018 is positioned in the condensation release channel. In particular, the condensation release valve 2018 blocks the condensation release opening 2028 and the condensation release opening 2028. As such, the condensation release valve 2018 prevents the leaking of purified air (as well as the condensation of water vapor) from the breathing tube 2008.

In some embodiments, when a user decides to release the condensation of water vapor in the breathing tube, the user may remove the condensation release valve 2018 from the condensation release channel. Once the condensation release valve 2018 is moved, the condensation of water vapor in the condensation catch 2016 may be released through the condensation catch opening 2026 of the breathing tube 2008, and then through the condensation release channel, and then be released through the condensation release opening 2028 of the coolant container 2004. As such, removing the condensation release valve 2018 evacuates the condensation of water vapor that has been built up in the condensation catch 2016, and also prevents the condensation of water vapor from getting back into the air-purifying device 2002 and/or into the respiratory headgear 2006.

Referring now to FIG. 21, an example chart 2100 illustrating example monitored parameters associated with an example air-purifying respirator in accordance with some embodiments of the present disclosure is provided. In particular, the example air-purifying respirator may comprise a coolant container storing 0.725 kgs to 3.5 kgs of water/ice as coolant material. In some embodiments, the cooling portion of the breathing tube (e.g. the portion of the breathing tube that is in contact with the coolant material) is at least 30 centimeters.

In the example chart 2100, the x axis of the example chart 2100 indicates time, and the y axis of the example chart 2100 indicates the values of the corresponding monitored parameters. For example, the curve 2101 indicates values of the ambient air temperature of the environment where the example air-purifying respirator is in. In contrast, the curve 2103 indicates values of the temperature of the purified air from the breathing tube after it is cooled through an example coolant container in accordance with some embodiments of the present disclosure. For example, the example coolant container may comprise coolant material such as, but not limited to, ice. The curve 2105 indicates values of the temperature of the coolant material (such as, but not limited to, ice) that is in contact with the breathing tube, and the curve 2107 indicates values of the temperature of the surface of the coolant container. As described above, an example air-purifying respirator in accordance with some embodiments of the present disclosure may utilize the coolant material in the coolant container to reduce the temperature of the purified air in the breathing tube. The curve 2109 indicates values of the temperature of purified air that becomes in contact with the user, and the curve 2111 indicates values of the humidity of purified air that becomes in contact with the user.

As illustrated in the example chart 2100 of FIG. 21, an example air-purifying respirator in accordance with some embodiments of the present disclosure can reduce the temperature of the purified air. For example, comparing the curve 2101 (which indicates values of the ambient air temperature) and the curve 2103 (which indicates values of temperature of the purified air that it is cooled down), the range of temperatures of the temperature of the purified air can drop from the ambient air temperature of 40° C. by at least 5° C. to 10° C. after a cooling time of 1 to 8 hours. Further, curve 2109 illustrates that the temperature of the purified air that becomes in contact with a user's face is lower than the ambient air temperature, and curve 2111 illustrates that the humidity of the purified air that becomes in contact with a user's face is reduced as well. As such, various example embodiments of the present disclosure provide technical benefits and improvements such as, but not limited to, reducing the temperature of purified air from an example air-purifying device and improving the experience of a user wearing the air-purifying device.

While the description above provides an example air-purifying respirator that includes a coolant container, it is noted that the scope of the present disclosure is not limited to the description above. In some examples, an example air-purifying respirator with a coolant container may comprise one or more additional and/or alternative elements, and/or may be in one or more additional or alternative forms.

For example, various embodiments may leverage backpacks, hoses, cartridge covers, and/or the like as the coolant container or as a component that provides cooling of the purified air. Additionally, or alternatively, various embodiments may be compatible with any respiratory headgear (such as, but not limited to, helmets, hoods, and/or the like). Various embodiments of the present disclosure can provide water condensation control, similar to those described above.

As described above, there are many technical challenges and difficulties associated with respiratory protective equipment, including air-purifying respirators such as, but not limited to, powered air purifying respirators. For example, many air-purifying respirators produce purified air with high temperature, which can cause user discomfort, reduce user productivity, and create safety hazards at the workplace. Various embodiments of the present disclosure overcome these technical challenges and difficulties, and provide various technical benefits and advantages. For example, example embodiments illustrated in connection with at least FIG. 22 to FIG. 24 can reduce temperatures of purified air from the air-purifying respirators, which can improve user comfort, increase user productivity, and eliminate safety hazards due to high air temperature at the workplace.

In particular, example embodiments illustrated in connection with at least FIG. 22 to FIG. 24 comprises a breathing tube that runs through the coolant container containing coolant material in a way that can capture the condensation build up inside, similar to those described above. The coolant container shown in connection with FIG. 22 to FIG. 24 is designed to be worn as a shoulder pack in connection with many different powered air purifying respirators (such as, but not limited to, the PAPR PA761 backpack harness). In some embodiments, the coolant container provides added topical cooling effect on the back of the neck of the user. In some embodiments, the coolant container comprises 0.625 kg to 1.5 kgs of water/ice as coolant materials. In some embodiments, the breathing tube within the coolant container is between 20 cm to 40 cm in length.

Referring now to FIG. 22, example portions of an example air-purifying respirator 2200 that includes an example coolant container 2202 in accordance with some embodiments of the present disclosure are illustrated.

Similar to those described above, the coolant container 2202 may comprise a container shell that provides a housing for storing the coolant material. In some embodiments, the coolant material has a melting point that is less than 40° C. and a heat of fusion/melting of at least 150 J/g or >250 J/g. For example, the coolant material may comprise, such as but not limited to, water and/or ice, which can provide technical benefits and improvements such as, but not limited to, increasing the thermal transfer rate (e.g. allowing the purified air to be cooled more quickly). In some embodiments, the coolant container 2202 comprises 0.625 kg to 1.5 kgs of water/ice. Such embodiments provide technical benefits and improvements such as, but not limited to, increasing the thermal transfer rate (e.g. allowing the purified air to be cooled more quickly).

Additionally, or alternatively, the coolant material may comprise other materials, such as, but not limited to, paraffin-based phase change materials, additives such as salts and antifreeze agents, and/or the like, similar to those described above.

Similar to those described above, the coolant container 2202 may comprise the container shell. In some embodiments, the container shell may comprise material that has a density of less than 1.2 g/cm$^3$ and a thermal conductivity less than 0.2 W/mK. For example, the container shell can be made of a solid sheet material of polypropylene, polyvinyl chloride, polystyrene, polyimide, silicone, epoxy, and/or any blends thereof. In some embodiments, polypropylene is a preferred solid sheet material for the container shell. Various example embodiments described above provide technical benefits and improvements such as, but not limited to, providing more space for housing the coolant material without significantly increasing the size of the coolant container 2202, as well as enabling at least a partial thermal isolation between the coolant material and the ambient environment (so that the coolant material can reduce the temperature of the purified air from the breathing tube instead of reducing the temperature of the ambient environment).

In the example shown in FIG. 22, the example air-purifying respirator 2200 comprises a breathing tube 2204. In some embodiments, the breathing tube 2204 comprises a breathing tube inlet opening 2206 that is connected to an air-purifying device outlet opening 2208 of an air-purifying device 2210. Similar to those described above, the breathing tube 2204 may receive purified air from the air-purifying device 2210.

In the example shown in FIG. 22, the air-purifying device 2210 causes purified air to flow upwards to the breathing tube 2204 through the air-purifying device outlet opening 2208.

Similar to those described above, the breathing tube 2204 is in a shape similar to a substantially cylindrical shape. Additionally, or alternatively, the breathing tube 2204 may be in the form of other shape(s).

In some embodiments, the coolant container 2202 and the breathing tube 2204 (including, but not limited to, the cooling portion) may comprise different materials. For example, the breathing tube 2204 (including, but not limited to, the cooling portion) may comprise thermal conductive material that has a thermal conductivity at room temperature of between 0.2 W/mK and 10 W/mK. In some embodiments, the thermal conductive material has a thermal conductivity more preferably between 0.3 W/mK to 0.8 W/mK or between 0.3 W/mK to 0.5 W/mK, providing various technical benefits and improvements such as, but not limited to, allowing purified air to be cooled at a sufficient rate without causing too much condensation.

In some embodiments, preferred materials for the breathing tube 2204 (including, but not limited to, the cooling portion that is in contact with the coolant material) may include, but are not limited to, HDPE, ABS, PPS, LDPE, PEEK, polybutylene terephthalate, EVA, Nylon 6, Nylon 66, and polyurethanes.

In some embodiments, at least a portion of the breathing tube 2204 runs through the coolant container 2202.

Similar to those described above, the coolant container 2202 comprises one or more openings that are on the outer surface of the coolant container 2202 (for example, on the container shell). In some embodiments, the breathing tube 2204 enters and exits the coolant container 2202 through the one or more openings. In some embodiments, the breathing tube 2204 comprises a cooling portion, which refers to the portion of the breathing tube 2204 that is within the coolant container 2202 and in contact with the coolant material.

In the example shown in FIG. 22, the coolant container 2202 is positioned above the air-purifying device 2210 and houses coolant material as described above. The coolant container 2202 comprises a front coolant container entrance opening 2214 and a front coolant container exit opening 2212. In the example shown in FIG. 22, both the front coolant container entrance opening 2214 and the front coolant container exit opening 2212 are defined at a front portion of the coolant container 2202, and the front coolant container entrance opening 2214 is positioned to the right of the front coolant container exit opening 2212. Such example arrangements provide technical benefits and advantages such as, but not limited to, extending the cooling portion of the breathing tube while maintaining a lightweight of the coolant container.

In some embodiments, the breathing tube 2204 enters the coolant container 2202 through the front coolant container entrance opening 2214 of the coolant container and exits the coolant container 2202 through the front coolant container exit opening 2212 of the coolant container 2202. In some embodiments, at least a portion of the cooling portion (e.g. the portion of the breathing tube 2204 that is in contact with the coolant material in the coolant container) is above the front coolant container entrance opening 2214 and the front coolant container exit opening 2212.

In some embodiments, the breathing tube 2204 can isolate purified air from the coolant material in the coolant container 2202. For example, the breathing tube 2204 (including, but not limited to, the cooling portion) has a gas and liquid barrier properties that is above a threshold (for example, as required by a safety standard) and/or a chemical resistance level that is above a threshold (for example, as required by a safety standard), thereby reducing/preventing the purified air from leaking into the coolant container 2202 and/or reducing/preventing the coolant material from leaking into the breathing tube 2204. In some embodiments, the thickness of the breathing tube 2204 (including, but not limited to, the cooling portion) is less than 10 mm, preferably less than 3 mm.

In some embodiments, the material for the breathing tube 2204 (including, but not limited to, the cooling portion) may include filler materials, which may provide the technical benefits and advantages such as, but not limited to, enhancing the thermal conductivities of the breathing tube 2204 (including, but not limited to, the cooling portion). In some embodiments, the material for the breathing tube 2204 (including, but not limited to, the cooling portion) may have a low density (for example, less than 1.4 $g/cm^3$, and preferably less than 1 $g/cm^3$).

In some embodiments, a length of the cooling portion of the breathing tube 2204 (e.g. the portion of the breathing tube 2204 that is in contact with the coolant material) is between 20 cm to 40 cm. Example lengths of the cooling portion of the breathing tube 2204 described herein may provide technical benefits and advantages such as, but not limited to, maximizing the reduction of temperature of the purified air while minimizing the condensation of water.

Referring now to FIG. 23A, FIG. 23B, FIG. 23C, FIG. 23D, and FIG. 23E, example views of an example coolant container 2300 in accordance with some embodiments of the present disclosure are illustrated.

Figure 23A:
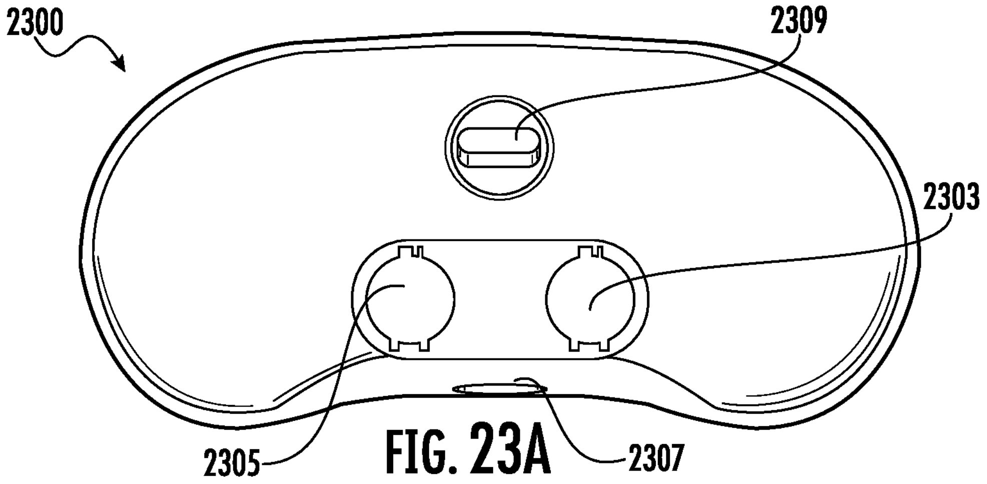
Figure 23B:
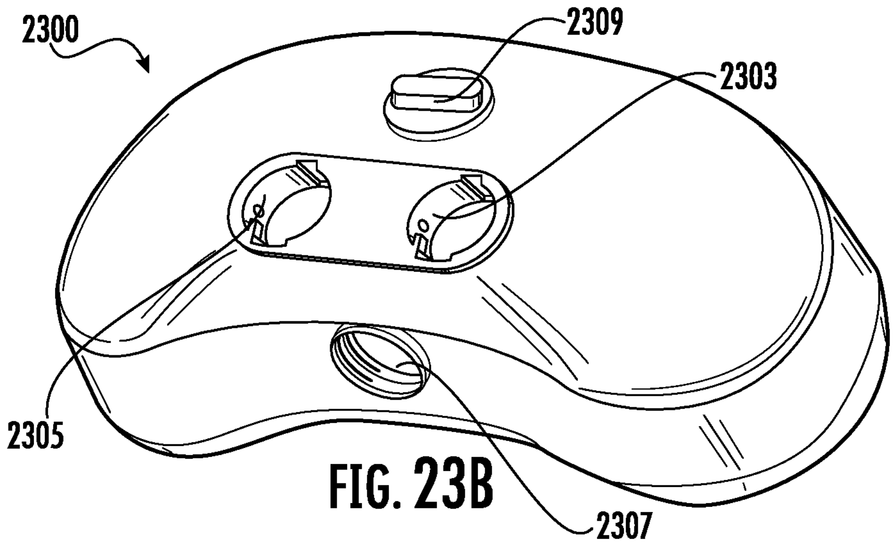
Figure 23C:
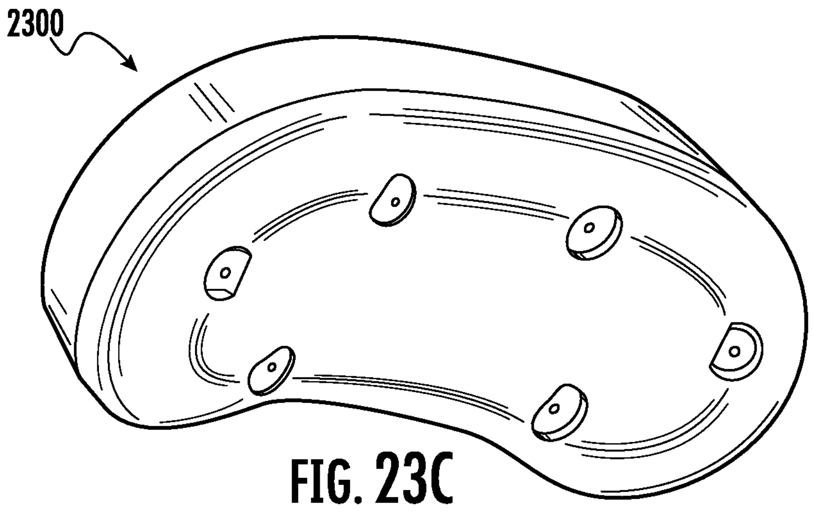
Figure 23D:
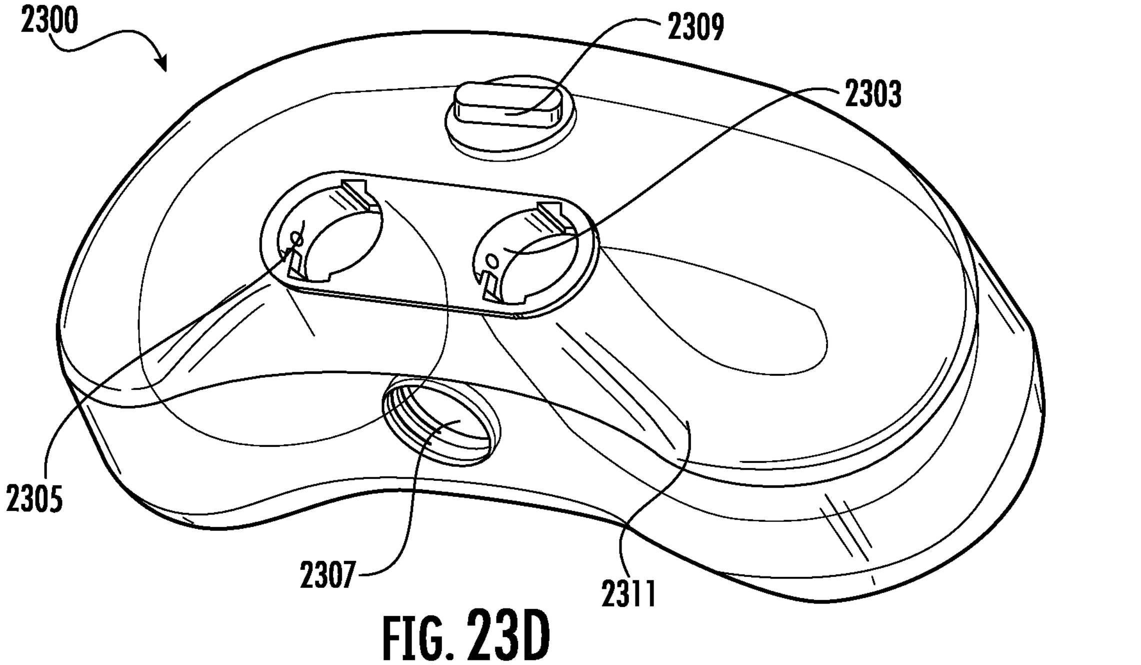

In particular, FIG. 23A illustrates an example top view of the example coolant container 2300. FIG. 23B illustrates an example front angled view of the example coolant container 2300. FIG. 23C illustrates an example back angled view of the example coolant container 2300. FIG. 23D illustrates an example front angled view that illustrates the cooling portion of the breathing tube within the example coolant container 2300. FIG. 23D illustrates another example front angled view that illustrates the cooling portion of the breathing tube within the example coolant container 2300.

Similar to those described above, the coolant container 2300 may comprise a container shell that provides a housing for storing the coolant material. In some embodiments, the coolant material has a melting point that is less than 40° C. and a heat of fusion/melting of at least 150 J/g or >250 J/g. For example, the coolant material may comprise, such as but not limited to, water and/or ice, which can provide technical benefits and improvements such as, but not limited to, increasing the thermal transfer rate (e.g. allowing the purified air to be cooled more quickly).

Additionally, or alternatively, the coolant material may comprise other materials, such as, but not limited to, paraffin-based phase change materials, additives such as salts and antifreeze agents, and/or the like, similar to those described above.

Similar to those described above, the coolant container comprises 0.625 kg to 1.5 kgs of water/ice. Such embodiments provide technical benefits and improvements such as, but not limited to, increasing the thermal transfer rate (e.g. allowing the purified air to be cooled more quickly).

Similar to those described above, the coolant container 2300 may comprise the container shell. In some embodiments, the container shell may comprise material that has a density of less than 1.2 $g/cm^3$ and a thermal conductivity less than 0.2 W/mK. For example, the container shell can be made of a solid sheet material of polypropylene, polyvinyl chloride, polystyrene, polyimide, silicone, epoxy, and/or any blends thereof. In some embodiments, polypropylene is a preferred solid sheet material for the container shell. Various example embodiments described above provide technical benefits and improvements such as, but not limited to, providing more space for housing the coolant material without significantly increasing the size of the coolant container 2300, as well as enabling at least a partial thermal isolation between the coolant material and the ambient environment (so that the coolant material can reduce the temperature of the purified air from the breathing tube instead of reducing the temperature of the ambient environment).

Similar to those described above, the coolant container 2300 comprises one or more openings that are on the outer surface of the coolant container 2300 (for example, on the container shell). In some embodiments, the breathing tube enters and exits the coolant container 2300 through the one or more openings.

For example, as shown in FIG. 23A, FIG. 23B, FIG. 23D, and FIG. 23E, the coolant container 2300 comprises a front coolant container entrance opening 2303 and a front coolant container exit opening 2305. In some embodiments, the front coolant container entrance opening 2303 and the front coolant container exit opening 2305 are positioned at a front portion of the coolant container 2300. For example, the front coolant container entrance opening 2303 is positioned to the left of the front coolant container exit opening 2305.

Figure 23E:
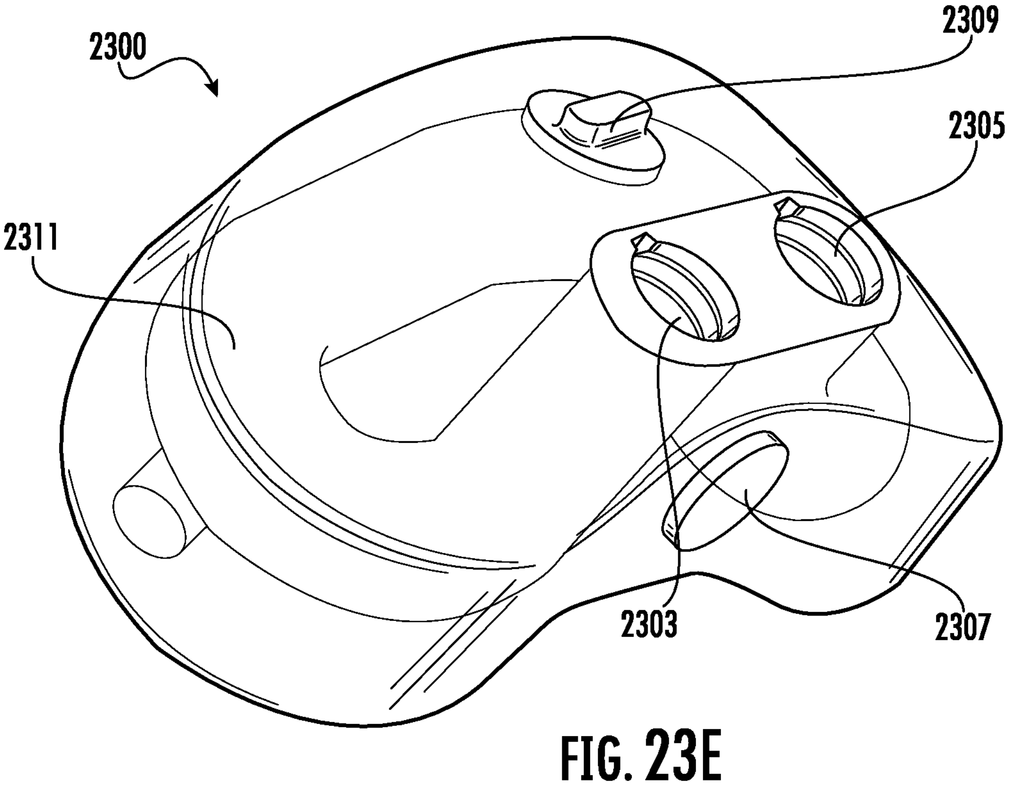

As shown in FIG. 23A and FIG. 23E, a breathing tube enters the coolant container 2300 through the front coolant container entrance opening 2303 and exits the coolant container 2300 through the front coolant container exit opening 2305. In some embodiments, the breathing tube comprises a cooling portion 2311, which refers to the portion of the breathing tube that is within the coolant container 2300 and in contact with the coolant material. As shown in FIG. 23D and FIG. 23E, the cooling portion 2311 extends from the front coolant container entrance opening 2303 to the bottom right of the coolant container 2300, and then towards the top right of the coolant container 2300, and then towards the top left of the coolant container 2300, then towards the bottom left of the coolant container 2300, and then connected to the front coolant container exit opening 2305.

In some embodiments, the example coolant container 2300 comprises a condensation release valve 2309. Similar to those described above in connection with at least FIG. 20, the condensation release valve 2309 blocks an opening on the cooling portion 2311 and an opening on the container shell of the coolant container 2300. In some embodiments, a user may open to the condensation release valve 2309 to release the condensation of purified air from the breathing tube, similar to those described above in connection with FIG. 20.

In some embodiments, the example coolant container 2300 comprises a coolant release valve 2307. Similar to those described above in connection with at least FIG. 20, the coolant release valve 2307 blocks an opening on the container shell of the coolant container 2300. In some embodiments, a user may open to the coolant release valve 2307 to release coolant material from the coolant container 2300 and/or to inject coolant material into the coolant container 2300, similar to those described above in connection with FIG. 20.

Referring now to FIG. 24, example portions of an example air-purifying respirator 2400 that includes an example coolant container 2402 in accordance with some embodiments of the present disclosure are illustrated.

In the example shown in FIG. 24, the example air-purifying respirator 2400 comprises a breathing tube 2404. In some embodiments, the breathing tube 2404 comprises a breathing tube inlet opening 2406 that is connected to an air-purifying device outlet opening 2408 of an air-purifying device 2410. In some embodiments, the air-purifying device 2410 causes purified air to flow upwards to the breathing tube 2404 through the air-purifying device outlet opening, similar to those described above.

Similar to those described above, the coolant container 2402 may comprise a container shell that provides a housing for storing the coolant material. In some embodiments, the coolant material has a melting point that is less than 40° C. and a heat of fusion/melting of at least 150 J/g or >250 J/g. For example, the coolant material may comprise, such as but not limited to, water and/or ice, which can provide technical benefits and improvements such as, but not limited to, increasing the thermal transfer rate (e.g. allowing the purified air to be cooled more quickly).

Additionally, or alternatively, the coolant material may comprise other materials, such as, but not limited to, paraffin-based phase change materials, additives such as salts and antifreeze agents, and/or the like, similar to those described above.

Similar to those described above, the volume of coolant material can be between 0.625 kilograms and 1.5 kilograms. Such embodiments provide technical benefits and improvements such as, but not limited to, increasing the thermal transfer rate (e.g. allowing the purified air to be cooled more quickly).

Similar to those described above, the coolant container 2402 may comprise the container shell. In some embodiments, the container shell may comprise material that has a density of less than 1.2 g/cm$^3$ and a thermal conductivity less than 0.2 W/mK. For example, the container shell can be made of a solid sheet material of polypropylene, polyvinyl chloride, polystyrene, polyimide, silicone, epoxy, and/or any blends thereof. In some embodiments, polypropylene is a preferred solid sheet material for the container shell. Various example embodiments described above provide technical benefits and improvements such as, but not limited to, providing more space for housing the coolant material without significantly increasing the size of the coolant container 2402, as well as enabling at least a partial thermal isolation between the coolant material and the ambient environment (so that the coolant material can reduce the temperature of the purified air from the breathing tube instead of reducing the temperature of the ambient environment).

Similar to those described above, the breathing tube 2404 is in a shape similar to a substantially cylindrical shape. Additionally, or alternatively, the breathing tube 2404 may be in the form of other shape(s).

In some embodiments, the coolant container 2402 and the breathing tube 2404 (including, but not limited to, the cooling portion) may comprise different materials. For example, the breathing tube 2404 (including, but not limited to, the cooling portion) may comprise thermal conductive material that has a thermal conductivity at room temperature of between 0.2 W/mK and 10 W/mK. In some embodiments, the thermal conductive material has a thermal conductivity more preferably between 0.3 W/mK to 0.8 W/mK or between 0.3 W/mK to 0.5 W/mK, providing various technical benefits and improvements such as, but not limited to, allowing purified air to be cooled at a sufficient rate without causing too much condensation.

In some embodiments, preferred materials for the breathing tube 2404 (including, but not limited to, the cooling portion that is in contact with the coolant material) may include, but are not limited to, HDPE, ABS, PPS, LDPE, PEEK, polybutylene terephthalate, EVA, Nylon 6, Nylon 66, and polyurethanes.

Similar to those described above, the coolant container 2402 comprises one or more openings that are on the outer surface of the coolant container 2402 (for example, on the container shell). In some embodiments, the breathing tube enters and exits the coolant container 2402 through the one or more openings. In some embodiments, the breathing tube comprises a cooling portion, which refers to the portion of the breathing tube 2204 that is within the coolant container 2402 and in contact with the coolant material.

In the example shown in FIG. 24, the coolant container 2402 is positioned above the air-purifying device 2410 and houses coolant material as described above. The coolant container 2402 comprises a front coolant container entrance opening 2414 and a front coolant container exit opening 2412. In the example shown in FIG. 24, both the front coolant container entrance opening 2414 and the front coolant container exit opening 2412 are defined at a front portion of the coolant container 2402, and the front coolant container entrance opening 2414 is positioned to the right of the front coolant container exit opening 2412. Such example arrangements provide technical benefits and advantages such as, but not limited to, extending the cooling portion of the breathing tube while maintaining a lightweight of the coolant container.

In some embodiments, the breathing tube 2404 enters the coolant container 2402 through the front coolant container entrance opening 2414 of the coolant container and exits the coolant container 2402 through the front coolant container exit opening 2412 of the coolant container 2402. In some embodiments, at least a portion of the cooling portion (e.g. the portion of the breathing tube 2404 that is in contact with the coolant material in the coolant container) is below the front coolant container entrance opening 2414 and the front coolant container exit opening 2412. For example, the cooling portion extends from the front coolant container entrance opening 2414 to the top right of the coolant container 2402, and then towards the bottom right of the coolant container 2402, and then towards the bottom left of the coolant container 2402, then towards the top left of the coolant container 2402, and then connected to the front coolant container exit opening 2412.

In some embodiments, the breathing tube 2404 can isolate purified air from the coolant material in the coolant container 2402. For example, the breathing tube 2404 (including, but not limited to, the cooling portion) has a gas and liquid barrier properties that is above a threshold (for example, as required by a safety standard) and/or a chemical resistance level that is above a threshold (for example, as required by a safety standard), thereby reducing/preventing the purified air from leaking into the coolant container 2402 and/or reducing/preventing the coolant material from leaking into the breathing tube 2404. In some embodiments, the thickness of the breathing tube 2404 (including, but not limited to, the cooling portion) is less than 10 mm, preferably less than 3 mm.

In some embodiments, the material for the breathing tube 2404 (including, but not limited to, the cooling portion) may include filler materials, which may provide the technical benefits and advantages such as, but not limited to, enhancing the thermal conductivities of the breathing tube 2404 (including, but not limited to, the cooling portion). In some embodiments, the material for the breathing tube 2404 (including, but not limited to, the cooling portion) may have a low density (for example, less than 1.4 g/cm$^3$, and preferably less than 1 g/cm$^3$).

In some embodiments, a length of the cooling portion of the breathing tube 2404 (e.g. the portion of the breathing tube 2404 that is in contact with the coolant material) is between 20 cm to 40 cm. Example lengths of the cooling portion of the breathing tube 2404 described herein may provide technical benefits and advantages such as, but not limited to, maximizing the reduction of temperature of the purified air while minimizing the condensation of water.

In some embodiments, the breathing tube 2404 can isolate purified air from the coolant material in the coolant container 2402. For example, the breathing tube 2404 (including, but not limited to, the cooling portion) has a gas and liquid barrier properties that is above a threshold (for example, as required by a safety standard) and/or a chemical resistance level that is above a threshold (for example, as required by a safety standard), thereby reducing/preventing the purified air from leaking into the coolant container 2402 and/or reducing/preventing the coolant material from leaking into the breathing tube 2008. In some embodiments, the thickness of the breathing tube 2404 (including, but not limited to, the cooling portion) is less than 10 mm, preferably less than 3 mm.

As described above, there are many technical challenges and difficulties associated with respiratory protective equipment, including air-purifying respirators such as, but not limited air with high temperature, which can cause user discomfort, reduce user productivity, and create safety hazards at the workplace. Various embodiments of the present disclosure overcome these technical challenges and difficulties, and provide various technical benefits and advantages. For example, example embodiments illustrated in connection with at least FIG. 25 to FIG. 26B can reduce temperatures of purified air from the air-purifying respirators, which can improve user comfort, increase user productivity, and eliminate safety hazards due to high air temperature at the workplace.

Fr example, example embodiments illustrated in connection with at least FIG. 25 to FIG. 26B comprises a breathing tube that runs through a coolant container in a way that can capture the condensation build up inside in the breathing tube. In some embodiments, the coolant container is designed mounted on fixture on an air-purifying device in a way that reorientates the air-purifying device so that the purified air is channeled to flow downward from the air-purifying device, therefore preventing condensation build up in the air-purifying device itself. In some embodiments, the coolant container shown in connection with FIG. 25 to FIG. 26B can be mounted to many different air-purifying devices (such as, but not limited to, the PAPR PA761 backpack harness). In some embodiments, there is no condensation release valve in the coolant container because the air-purifying device is in an upside down orientation so that the breathing tube is facing down to prevent condensation build up in the air-purifying device by utilizing gravity. In some embodiments, the coolant container comprises 0.625 kg to 1.5 kgs of water/ice as coolant materials. In some embodiments, the breathing tube within the coolant container is between 20 cm to 40 cm in length.

Referring now to FIG. 25, example portions of an example air-purifying respirator 2500 that includes an example coolant container 2501 in accordance with some embodiments of the present disclosure are illustrated.

Similar to those described above, the coolant container 2501 may comprise a container shell that provides a housing for storing the coolant material. In some embodiments, the coolant material has a melting point that is less than 40° C. and a heat of fusion/melting of at least 150 J/g or >250 J/g. For example, the coolant material may comprise, such as but not limited to, water and/or ice, which can provide technical benefits and improvements such as, but not limited to, increasing the thermal transfer rate (e.g. allowing the purified air to be cooled more quickly).

Additionally, or alternatively, the coolant material may comprise other materials, such as, but not limited to, paraffin-based phase change materials, additives such as salts and antifreeze agents, and/or the like, similar to those described above.

Similar to those described above, the coolant material may comprise water/ice that is between 0.625 kg to 1.5 kgs. Such embodiments provide technical benefits and improvements such as, but not limited to, increasing the thermal transfer rate (e.g. allowing the purified air to be cooled more quickly).

Similar to those described above, the coolant container 2501 may comprise the container shell. In some embodiments, the container shell may comprise material that has a density of less than 1.2 g/cm$^3$ and a thermal conductivity less than 0.2 W/mK. For example, the container shell can be made of a solid sheet material of polypropylene, polyvinyl chloride, polystyrene, polyimide, silicone, epoxy, and/or any blends thereof. In some embodiments, polypropylene is a preferred solid sheet material for the container shell. Various example embodiments described above provide technical benefits and improvements such as, but not limited to, providing more space for housing the coolant material without significantly increasing the size of the coolant container 2501, as well as enabling at least a partial thermal isolation between the coolant material and the ambient environment (so that the coolant material can reduce the temperature of the purified air from the breathing tube instead of reducing the temperature of the ambient environment).

Similar to those described above, the coolant container 2501 comprises one or more openings that are on the outer surface of the coolant container 2501 (for example, on the container shell). In some embodiments, the breathing tube enters and exits the coolant container 2501 through the one or more openings. In some embodiments, the breathing tube comprises a cooling portion, which refers to the portion of the breathing tube 2204 that is within the coolant container 2501 and in contact with the coolant material.

In the example shown in FIG. 25, the example air-purifying respirator 2500 comprises a breathing tube 2503. In some embodiments, the breathing tube 2503 comprises a breathing tube inlet opening 2505 that is connected to an air-purifying device outlet opening 2507 of an air-purifying device 2509. Similar to those described above, the breathing tube 2503 may receive purified air from the air-purifying device 2509.

In the example shown in FIG. 25, the air-purifying device outlet opening 2507 is positioned on a left side of an air-purifying respirator 2500, and the air-purifying device 2509 causes purified air to flow downwards to the breathing tube 2503 through the air-purifying device outlet opening 2507, therefore preventing condensation from building up in the air-purifying device 2509.

Similar to those described above, the breathing tube 2503 is in a shape similar to a substantially cylindrical shape. Additionally, or alternatively, the breathing tube 2503 may be in the form of other shape(s).

In some embodiments, the coolant container 2501 and the breathing tube 2503 (including, but not limited to, the cooling portion) may comprise different materials. For example, the breathing tube 2503 (including, but not limited to, the cooling portion) may comprise thermal conductive material that has a thermal conductivity at room temperature of between 0.2 W/mK and 10 W/mK. In some embodiments, the thermal conductive material has a thermal conductivity more preferably between 0.3 W/mK to 0.8 W/mK or between 0.3 W/mK to 0.5 W/mK, providing various technical benefits and improvements such as, but not limited to, allowing purified air to be cooled at a sufficient rate without causing too much condensation.

In some embodiments, preferred materials for the breathing tube 2503 (including, but not limited to, the cooling portion that is in contact with the coolant material) may include, but are not limited to, HDPE, ABS, PPS, LDPE, PEEK, polybutylene terephthalate, EVA, Nylon 6, Nylon 66, and polyurethanes.

In some embodiments, at least a portion of the breathing tube 2503 runs through the coolant container 2501.

Similar to those described above, the coolant container 2501 comprises one or more openings that are on the outer surface of the coolant container 2501 (for example, on the container shell). In some embodiments, the breathing tube 2503 enters and exits the coolant container 2501 through the one or more openings. In some embodiments, the breathing tube 2503 comprises a cooling portion, which refers to the portion of the breathing tube 2503 that is within the coolant container 2501 and in contact with the coolant material.

In the example shown in FIG. 25, the coolant container 2501 is positioned at the left side of the air-purifying device 2509 (for example, mounted on the left side of the air-purifying device 2509) and houses coolant material as described above. The coolant container 2501 comprises a bottom coolant container entrance opening 2513 and a top coolant container exit opening 2515. In the example shown in FIG. 25, the bottom coolant container entrance opening 2513 is positioned at a bottom portion of the coolant container 2501, and the top coolant container exit opening 2515 is positioned at a top portion of the coolant container 2501. Such example arrangements provide technical benefits and advantages such as, but not limited to, extending the cooling portion of the breathing tube while maintaining a lightweight of the coolant container.

In some embodiments, the breathing tube 2503 enters the coolant container 2501 through the bottom coolant container entrance opening 2513 of the coolant container and exits the coolant container 2501 through the top coolant container exit opening 2515 of the coolant container 2501.

In some embodiments, the breathing tube 2503 can isolate purified air from the coolant material in the coolant container 2501. For example, the breathing tube 2503 (including, but not limited to, the cooling portion) has a gas and liquid barrier properties that is above a threshold (for example, as required by a safety standard) and/or a chemical resistance level that is above a threshold (for example, as required by a safety standard), thereby reducing/preventing the purified air from leaking into the coolant container 2501 and/or reducing/preventing the coolant material from leaking into the breathing tube 2503. In some embodiments, the thickness of the breathing tube 2503 (including, but not limited to, the cooling portion) is less than 10 mm, preferably less than 3 mm.

In some embodiments, the material for the breathing tube 2503 (including, but not limited to, the cooling portion) may include filler materials, which may provide the technical benefits and advantages such as, but not limited to, enhancing the thermal conductivities of the breathing tube 2503 (including, but not limited to, the cooling portion). In some embodiments, the material for the breathing tube 2503 (including, but not limited to, the cooling portion) may have a low density (for example, less than 1.4 g/cm$^3$, and preferably less than 1 g/cm$^3$).

In some embodiments, a length of the cooling portion of the breathing tube 2503 (e.g. the portion of the breathing tube 2503 that is in contact with the coolant material) is between 20 cm to 40 cm. Example lengths of the cooling portion of the breathing tube 2503 described herein may provide technical benefits and advantages such as, but not limited to, maximizing the reduction of temperature of the purified air while minimizing the condensation of water.

Referring now to FIG. 26A and FIG. 26B, example views of example portions of an example air-purifying respirator 2600 that includes an example coolant container 2602 in accordance with some embodiments of the present disclosure are illustrated.

In the example shown in FIG. 26A and FIG. 26B, an example air-purifying respirator 2600 comprises a breathing tube 2604 and a coolant container 2602, similar to the breathing tube 2503 and the coolant container 2501 described above in connection with FIG. 25.

In some embodiments, the breathing tube 2604 comprises a breathing tube inlet opening 2606 that is connected to an air-purifying device outlet opening 2610 on a left side of the air-purifying device 2608. In some embodiments, the air-purifying device 2608 causes purified air to flow downwards to the breathing tube 2604 through the air-purifying device outlet opening 2610, similar to those described above in connection with FIG. 25.

In some embodiments, the coolant container 2602 is positioned on the left side of the air-purifying device 2608 (for example, mounted on the left side of the air-purifying device 2608) and houses coolant material, similar to those described above.

In some embodiments, the breathing tube 2604 enters the coolant container 2602 through a bottom coolant container entrance opening 2612 of the coolant container 2602 and exits the coolant container through a top coolant container exit opening 2614 of the coolant container 2602, similar to those described above.

In some embodiments, the coolant container 2602 comprises a coolant release valve 2616. Similar to those described above in connection with FIG. 20, the coolant release valve 2616 allows a user to remove coolant material from the coolant container 2602 and/or inject coolant material into the coolant container 2602.

As described above, there are many technical challenges and difficulties associated with respiratory protective equipment, including air-purifying respirators such as, but not limited to, powered air purifying respirators. For example, many air-purifying respirators produce purified air with high temperature, which can cause user discomfort, reduce user productivity, and create safety hazards at the workplace. Various embodiments of the present disclosure overcome these technical challenges and difficulties, and provide various technical benefits and advantages. For example, example embodiments illustrated in connection with at least FIG. 27 to FIG. 29 can reduce temperatures of purified air from the air-purifying respirators, which can improve user comfort, increase user productivity, and eliminate safety hazards due to high air temperature at the workplace.

Figure 28B:
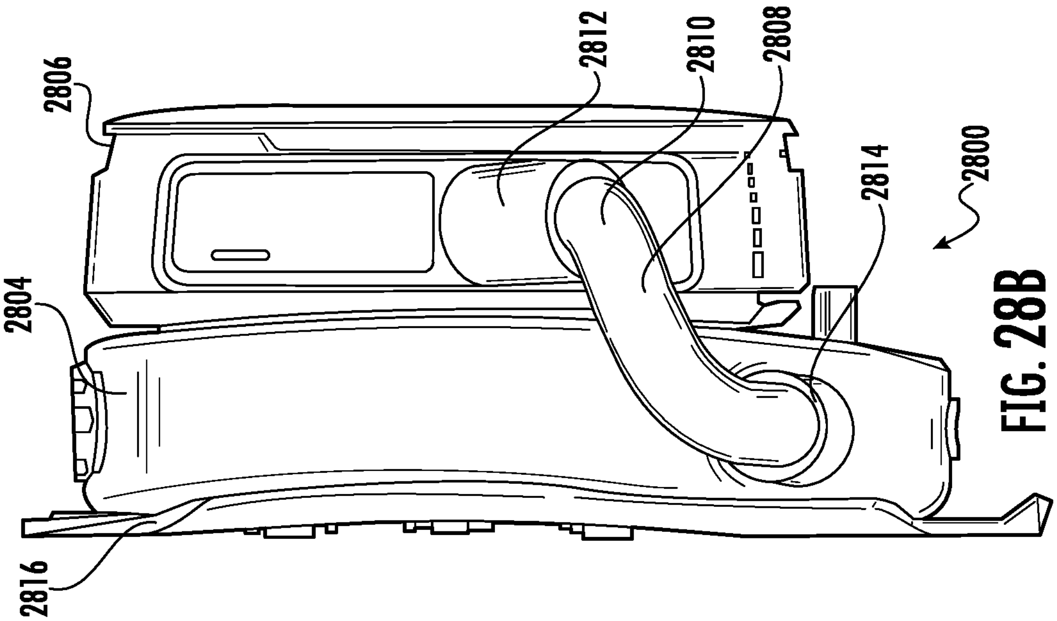
Figure 28A:
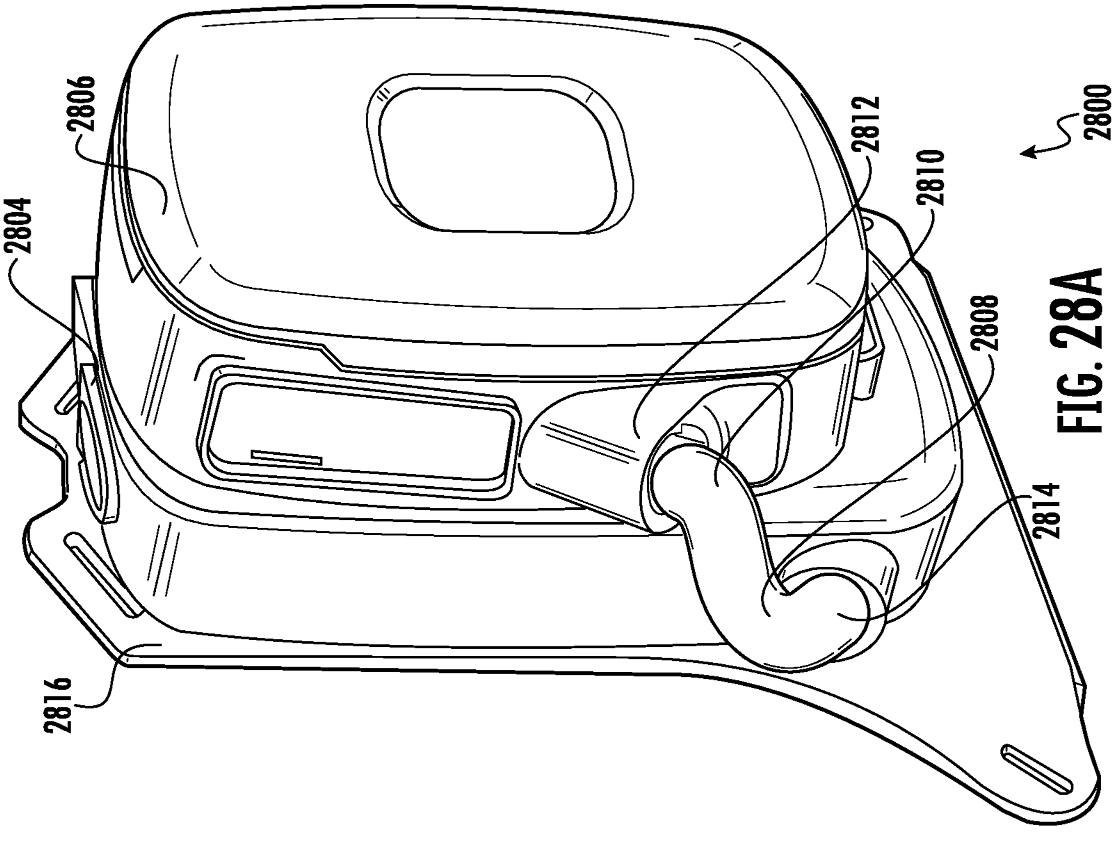

For example, example embodiments illustrated in connection with at least FIG. 27 to FIG. 29 comprise a breathing tube that runs through a coolant container in a way that can capture the condensation build up inside the breathing tube. In some embodiments, the coolant container is designed to be mounted as a fixture on many different air-purifying devices. For example, the air-purifying devices can be reorientated so that the air flow is channeled downwards, therefore preventing condensation from building up in the air-purifying devices. In some embodiments, the coolant container shown in connection with FIG. 27 to FIG. 29 can be mounted to many different air-purifying devices (such as, but not limited to, the PAPR PA761 backpack harness). In some embodiments, there is no condensation release valve in the coolant container because the air-purifying device is in an upside down orientation so that the breathing tube is facing down to prevent condensation build up in the air-purifying device by utilizing gravity. In some embodiments, the coolant container shown in FIG. 27 to FIG. 29 provides a higher volume/capacity for housing coolant container material, which can comprise 0.625 kg to 4.0 kgs of water/ice. Due to added coolant container weight, backpack configurations shown in FIG. 28A to FIG. 29 are more comfortable than belt mounted configurations. In some embodiments, the breathing tube within the coolant container is between 30 cm to 50 cm in length.

Referring now to FIG. 27, example portions of an example air-purifying respirator 2700 that includes an example coolant container 2701 in accordance with some embodiments of the present disclosure are illustrated.

Similar to those described above, the coolant container 2701 may comprise a container shell that provides a housing for storing the coolant material. In some embodiments, the coolant material has a melting point that is less than 40° C. and a heat of fusion/melting of at least 150 J/g or >250 J/g. For example, the coolant material may comprise, such as but not limited to, water and/or ice, which can provide technical benefits and improvements such as, but not limited to, increasing the thermal transfer rate (e.g. allowing the purified air to be cooled more quickly).

Additionally, or alternatively, the coolant material may comprise other materials, such as, but not limited to, paraffin-based phase change materials, additives such as salts and antifreeze agents, and/or the like, similar to those described above.

In the example shown in FIG. 27, the example air-purifying respirator 2700 comprises a breathing tube 2703. In some embodiments, the breathing tube 2703 comprises a breathing tube inlet opening 2705 that is connected to an air-purifying device outlet opening 2707 of an air-purifying device 2709. Similar to those described above, the breathing tube 2703 may receive purified air from the air-purifying device 2709.

In the example shown in FIG. 27, the air-purifying device outlet opening 2707 is positioned on a left side of the air-purifying device 2709, and the air-purifying device 2709 causes purified air to flow downwards to the breathing tube 2703 through the air-purifying device outlet opening 2707, therefore preventing condensation from building up in the air-purifying device 2709.

Similar to those described above, the breathing tube 2703 is in a shape similar to a substantially cylindrical shape. Additionally, or alternatively, the breathing tube 2703 may be in the form of other shape(s).

In some embodiments, the coolant container 2701 and the breathing tube 2703 (including, but not limited to, the cooling portion) may comprise different materials. For example, the breathing tube 2703 (including, but not limited to, the cooling portion) may comprise thermal conductive material that has a thermal conductivity at room temperature of between 0.2 W/mK and 10 W/mK. In some embodiments, the thermal conductive material has a thermal conductivity more preferably between 0.3 W/mK to 0.8 W/mK or between 0.3 W/mK to 0.5 W/mK, providing various technical benefits and improvements such as, but not limited to, allowing purified air to be cooled at a sufficient rate without causing too much condensation.

In some embodiments, preferred materials for the breathing tube 2703 (including, but not limited to, the cooling portion that is in contact with the coolant material) may include, but are not limited to, HDPE, ABS, PPS, LDPE, PEEK, polybutylene terephthalate, EVA, Nylon 6, Nylon 66, and polyurethanes.

In some embodiments, at least a portion of the breathing tube 2703 runs through the coolant container 2701.

Similar to those described above, the coolant container 2701 comprises one or more openings that are on the outer surface of the coolant container 2701 (for example, on the container shell). In some embodiments, the breathing tube 2703 enters and exits the coolant container 2701 through the one or more openings. In some embodiments, the breathing tube 2703 comprises a cooling portion, which refers to the portion of the breathing tube 2703 that is within the coolant container 2701 and in contact with the coolant material.

In the example shown in FIG. 27, the coolant container 2701 is positioned on a back side of the air-purifying device 2709 (for example, mounted to the back of the air-purifying device 2709) and houses coolant material as described above. The coolant container 2701 comprises a left coolant container entrance opening 2711 and a top coolant container exit opening 2713. In the example shown in FIG. 27, the left coolant container entrance opening 2711 is positioned at a bottom left portion of the coolant container 2701, and the top coolant container exit opening 2713 is positioned at a top portion of the coolant container 2701. Such example arrangements provide technical benefits and advantages such as, but not limited to, extending the cooling portion of the breathing tube while maintaining a lightweight of the coolant container.

In some embodiments, the breathing tube 2703 enters the coolant container 2701 through the left coolant container entrance opening 2711 of the coolant container and exits the coolant container 2701 through the top coolant container exit opening 2713 of the coolant container 2701.

In some embodiments, the breathing tube 2703 can isolate purified air from the coolant material in the coolant container 2701. For example, the breathing tube 2703 (including, but not limited to, the cooling portion) has a gas and liquid barrier properties that is above a threshold (for example, as required by a safety standard) and/or a chemical resistance level that is above a threshold (for example, as required by a safety standard), thereby reducing/preventing the purified air from leaking into the coolant container 2701 and/or reducing/preventing the coolant material from leaking into the breathing tube 2703. In some embodiments, the thickness of the breathing tube 2703 (including, but not limited to, the cooling portion) is less than 10 mm, preferably less than 3 mm.

In some embodiments, the material for the breathing tube 2703 (including, but not limited to, the cooling portion) may include filler materials, which may provide the technical benefits and advantages such as, but not limited to, enhancing the thermal conductivities of the breathing tube 2703 (including, but not limited to, the cooling portion). In some embodiments, the material for the breathing tube 2703 (including, but not limited to, the cooling portion) may have a low density (for example, less than 1.4 g/cm$^3$, and preferably less than 1 g/cm$^3$).

In some embodiments, a length of the cooling portion of the breathing tube 2703 (e.g. the portion of the breathing tube 2703 that is in contact with the coolant material) is between 20 cm to 40 cm. Example lengths of the cooling portion of the breathing tube 2703 described herein may provide technical benefits and advantages such as, but not limited to, maximizing the reduction of temperature of the purified air while minimizing the condensation of water.

Referring now to FIG. 28A, FIG. 28B, FIG. 28C, FIG. 28D, and FIG. 28E, example views of an example air-purifying respirator 2800 in accordance with some embodiments of the present disclosure are illustrated. In some embodiments, the example air-purifying respirator 2800 comprises an example coolant container 2804 and an example air-purifying device 2806.

Figure 28C:
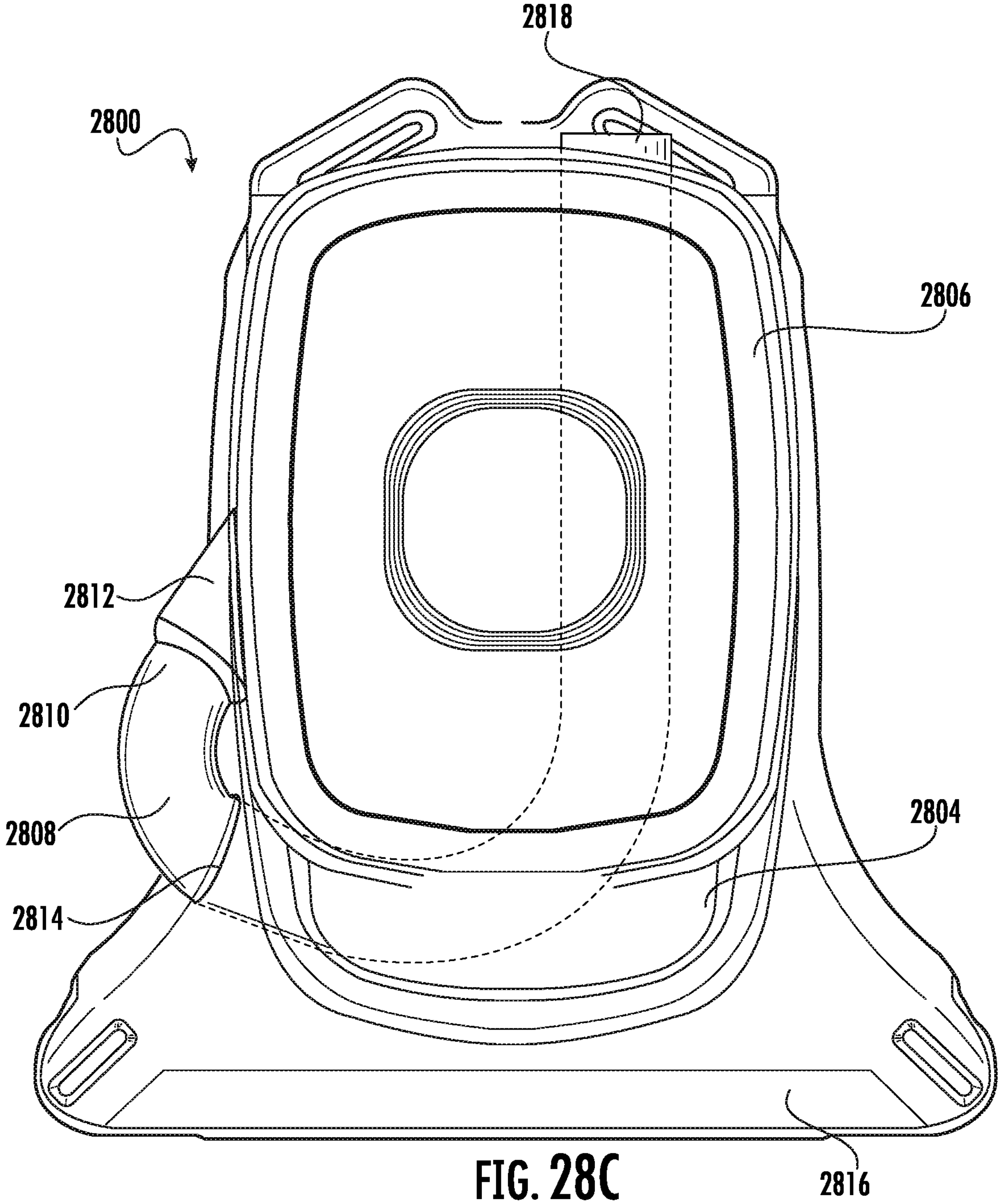
Figure 28E:
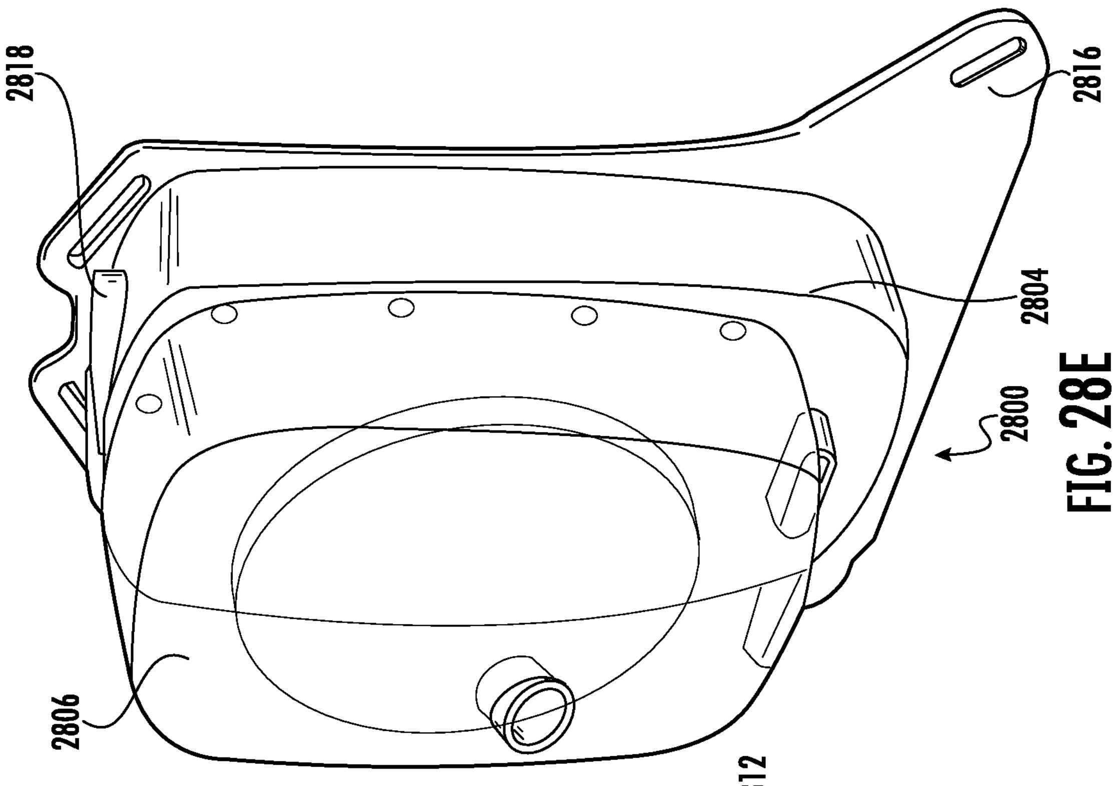
Figure 28D:
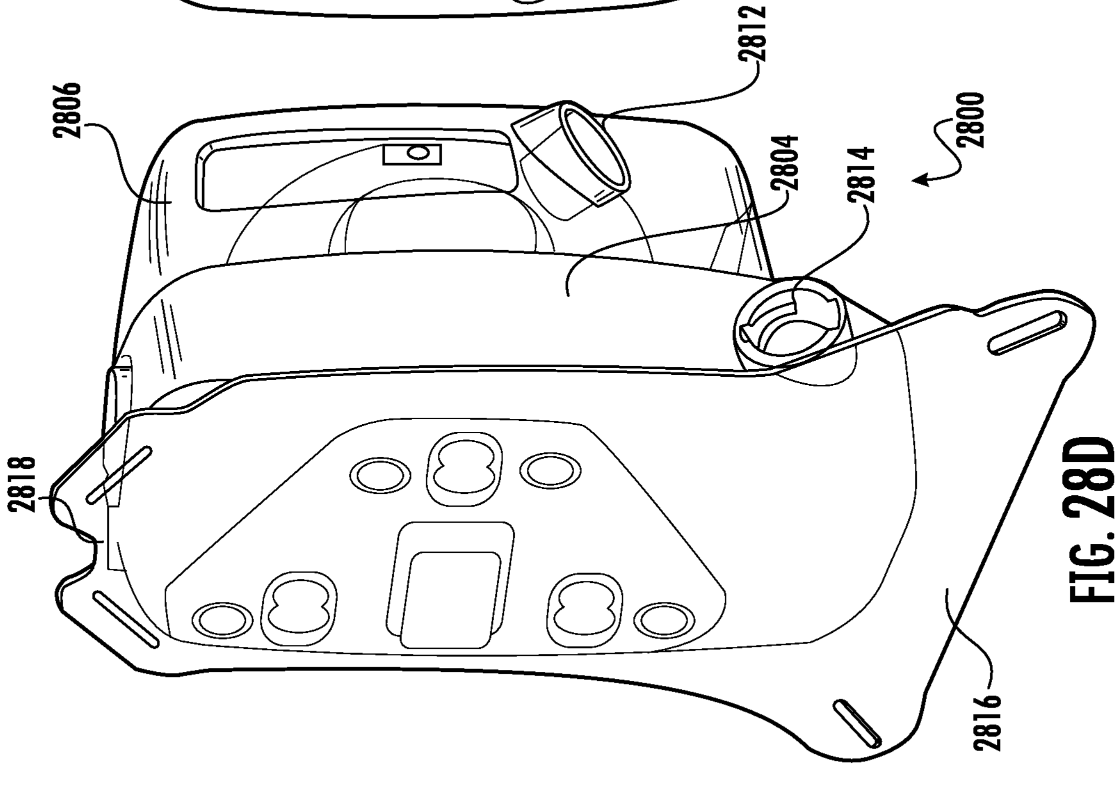

In particular, FIG. 28A illustrates an example angled view of the example air-purifying respirator 2800. FIG. 28B illustrates an example side view of the example air-purifying respirator 2800. FIG. 28C illustrates an example front view of the example air-purifying respirator 2800. FIG. 28D illustrates an example back angled view of the example air-purifying respirator 2800 with the breathing tube 2808 removed. FIG. 28E illustrates an example front angled view of example air-purifying respirator 2800 with the breathing tube 2808 removed.

In the example shown in FIG. 28A, FIG. 28B, and FIG. 28C, the example air-purifying respirator 2800 comprises a breathing tube 2808. In some embodiments, the breathing tube 2808 comprises a breathing tube inlet opening 2810 that is connected to an air-purifying device outlet opening 2812 of an air-purifying device 2806. Similar to those described above, the breathing tube 2808 may receive purified air from the air-purifying device 2806.

In the example shown in FIG. 28A, FIG. 28B, FIG. 28C, FIG. 28D, and FIG. 28E, the air-purifying device outlet opening 2812 is positioned on a left side of an air-purifying device 2806, and the air-purifying device 2806 causes purified air to flow downwards to the breathing tube 2808 through the air-purifying device outlet opening 2812, therefore preventing condensation from building up in the air-purifying device 2806.

Similar to those described above, the breathing tube 2808 is in a shape similar to a substantially cylindrical shape. Additionally, or alternatively, the breathing tube 2808 may be in the form of other shape(s).

In some embodiments, the coolant container 2804 and the breathing tube 2808 (including, but not limited to, the cooling portion) may comprise different materials. For example, the breathing tube 2808 (including, but not limited to, the cooling portion) may comprise thermal conductive material that has a thermal conductivity at room temperature of between 0.2 W/mK and 10 W/mK. In some embodiments, the thermal conductive material has a thermal conductivity more preferably between 0.3 W/mK to 0.8 W/mK or between 0.3 W/mK to 0.5 W/mK, providing various technical benefits and improvements such as, but not limited to, allowing purified air to be cooled at a sufficient rate without causing too much condensation.

In some embodiments, preferred materials for the breathing tube 2808 (including, but not limited to, the cooling portion that is in contact with the coolant material) may include, but are not limited to, HDPE, ABS, PPS, LDPE, PEEK, polybutylene terephthalate, EVA, Nylon 6, Nylon 66, and polyurethanes.

In some embodiments, at least a portion of the breathing tube 2808 runs through the coolant container 2804.

Similar to those described above, the coolant container 2804 comprises one or more openings that are on the outer surface of the coolant container 2804 (for example, on the container shell). In some embodiments, the breathing tube 2808 enters and exits the coolant container 2804 through the one or more openings. In some embodiments, the breathing tube 2808 comprises a cooling portion, which refers to the portion of the breathing tube 2808 that is within the coolant container 2804 and in contact with the coolant material.

In the example shown in FIG. 28A, FIG. 28B, FIG. 28C, FIG. 28D, and FIG. 28E, the coolant container 2804 is positioned on a back side of the air-purifying device 2806 and houses coolant material as described above. For example, the coolant container 2804 is mounted/secured between a back plate 2816 and the air-purifying device 2806, as shown in FIG. 28D and FIG. 28E. In some embodiments, a user may carry the coolant container 2804 as a backpack on his or her back, which can increase user comfort as compared to carrying the coolant container 2804 along the user's waist.

In some embodiments, the coolant container 2804 comprises a left coolant container entrance opening 2814 and a top coolant container exit opening 2818. In the example shown in FIG. 28A, FIG. 28B, FIG. 28C, FIG. 28D, and FIG. 28E, the left coolant container entrance opening 2814 is positioned at a bottom left portion of the coolant container 2804, and the top coolant container exit opening 2818 is positioned at a top portion of the coolant container 2804. Such example arrangements provide technical benefits and advantages such as, but not limited to, extending the cooling portion of the breathing tube while maintaining a lightweight of the coolant container.

In some embodiments, the breathing tube 2808 enters the coolant container 2804 through the left coolant container entrance opening 2814 of the coolant container and exits the coolant container 2804 through the top coolant container exit opening 2818 of the coolant container 2804.

In some embodiments, the breathing tube 2808 can isolate purified air from the coolant material in the coolant container 2804. For example, the breathing tube 2808 (including, but not limited to, the cooling portion) has a gas and liquid barrier properties that is above a threshold (for example, as required by a safety standard) and/or a chemical resistance level that is above a threshold (for example, as required by a safety standard), thereby reducing/preventing the purified air from leaking into the coolant container 2804 and/or reducing/preventing the coolant material from leaking into the breathing tube 2808. In some embodiments, the thickness of the breathing tube 2808 (including, but not limited to, the cooling portion) is less than 10 mm, preferably less than 3 mm.

In some embodiments, the material for the breathing tube 2808 (including, but not limited to, the cooling portion) may include filler materials, which may provide the technical benefits and advantages such as, but not limited to, enhancing the thermal conductivities of the breathing tube 2808 (including, but not limited to, the cooling portion). In some embodiments, the material for the breathing tube 2808 (including, but not limited to, the cooling portion) may have a low density (for example, less than 1.4 g/cm$^3$, and preferably less than 1 g/cm$^3$).

In some embodiments, a length of the cooling portion of the breathing tube 2808 (e.g. the portion of the breathing tube 2808 that is in contact with the coolant material) is between 20 cm to 40 cm. Example lengths of the cooling portion of the breathing tube 2808 described herein may provide technical benefits and advantages such as, but not limited to, maximizing the reduction of temperature of the purified air while minimizing the condensation of water.

Referring now to FIG. 29, example views of an example coolant container 2900 in accordance with some embodiments of the present disclosure are illustrated.

Similar to those described above, the coolant container 2900 may comprise a container shell that provides a housing for storing the coolant material. In some embodiments, the coolant material has a melting point that is less than 40° C. and a heat of fusion/melting of at least 150 J/g or >250 J/g. For example, the coolant material may comprise, such as but not limited to, water and/or ice, which can provide technical benefits and improvements such as, but not limited to, increasing the thermal transfer rate (e.g. allowing the purified air to be cooled more quickly).

Additionally, or alternatively, the coolant material may comprise other materials, such as, but not limited to, paraffin-based phase change materials, additives such as salts and antifreeze agents, and/or the like, similar to those described above.

Similar to those described above, the volume of coolant material can be within the range of 0.625 kg to 1.5 kgs of water/ice of water/ice formulation. Such embodiments provide technical benefits and improvements such as, but not limited to, increasing the thermal transfer rate (e.g. allowing the purified air to be cooled more quickly).

Similar to those described above, the coolant container 2900 may comprise the container shell. In some embodiments, the container shell may comprise material that has a density of less than 1.2 g/cm$^3$ and a thermal conductivity less than 0.2 W/mK. For example, the container shell can be made of a solid sheet material of polypropylene, polyvinyl chloride, polystyrene, polyimide, silicone, epoxy, and/or any blends thereof. In some embodiments, polypropylene is a preferred solid sheet material for the container shell. Various example embodiments described above provide technical benefits and improvements such as, but not limited to, providing more space for housing the coolant material without significantly increasing the size of the coolant container 2900, as well as enabling at least a partial thermal isolation between the coolant material and the ambient environment (so that the coolant material can reduce the temperature of the purified air from the breathing tube instead of reducing the temperature of the ambient environment).

Similar to those described above, the coolant container 2900 comprises one or more openings that are on the outer surface of the coolant container 2900 (for example, on the container shell). In some embodiments, the breathing tube enters and exits the coolant container 2900 through the one or more openings. In some embodiments, the breathing tube comprises a cooling portion, which refers to the portion of the breathing tube that is within the coolant container 2900 and in contact with the coolant material.

For example, the coolant container 2900 comprises a left coolant container entrance opening 2901 and a top coolant container exit opening 2903, similar to those described above in connection with FIG. 27 to FIG. 28E. In some embodiments, the coolant container 2900 comprises a valve 2907 that can function as a coolant release valve or a condensation release valve, similar to the example coolant release valves described above.

In some embodiments, the coolant container 2900 may comprise protrusions 2905 that extends from the surface of the coolant container 2900. In some embodiments, the protrusions 2905 may provide mechanical support for an air-purifying device. For example, the air-purifying device may be positioned on top of the protrusions 2905, so that the relative position between the coolant container 2900 and the air-purifying device can be secured.

As described above, there are many technical challenges and difficulties associated with respiratory protective equipment, including air-purifying respirators such as, but not limited to, powered air purifying respirators. For example, many air-purifying respirators produce purified air with high temperature, which can cause user discomfort, reduce user productivity, and create safety hazards at the workplace. Various embodiments of the present disclosure overcome these technical challenges and difficulties, and provide various technical benefits and advantages. For example, example embodiments illustrated in connection with at least FIG. 30A to FIG. 31B can reduce temperatures of purified air from the air-purifying respirators, which can improve user comfort, increase user productivity, and eliminate safety hazards due to high air temperature at the workplace.

In particular, example embodiments illustrated in connection with at least FIG. 30A to FIG. 31B comprise a breathing tube that runs through the coolant container comprising coolant material in a way that can capture the condensation build up inside, similar to those described above. The example coolant container shown in connection with FIG. 30A to FIG. 31B is designed to be worn as a backpack. As such, the example coolant container can be mounted directly to air-purifying devices (such as, but not limited to, PAPR (PA700)) and without the requirement of a separate air-purifying device harness (such as, but not limited to, the PAPR (PA761) harness). In some embodiments, the coolant container shown in FIG. 30A to FIG. 31B provides a higher volume/capacity for housing coolant container material, which can comprise 0.625 kg to 4.0 kgs of water/ice. In some embodiments, the breathing tube within the coolant container is between 30 cm to 50 cm in length. In some embodiments, the example coolant container shown in connection with FIG. 30A to FIG. 31B comprises a condensation release valve.

Referring now to FIG. 30A and FIG. 30B, example portions of an example air-purifying respirator 3000 that includes an example coolant container 3002 in accordance with some embodiments of the present disclosure are illustrated.

Similar to those described above, the coolant container 3002 may comprise a container shell that provides a housing for storing the coolant material. In some embodiments, the coolant material has a melting point that is less than 40° C. and a heat of fusion/melting of at least 150 J/g or >250 J/g. For example, the coolant material may comprise, such as but not limited to, water and/or ice, which can provide technical benefits and improvements such as, but not limited to, increasing the thermal transfer rate (e.g. allowing the purified air to be cooled more quickly).

Additionally, or alternatively, the coolant material may comprise other materials, such as, but not limited to, paraffin-based phase change materials, additives such as salts and antifreeze agents, and/or the like, similar to those described above.

Similar to those described above, the volume of coolant material can be within the range of 0 to 10 kilograms of water/ice formulation with a preferred range of 0.725 kilograms to 3.5 kilograms. Such embodiments provide technical benefits and improvements such as, but not limited to, increasing the thermal transfer rate (e.g. allowing the purified air to be cooled more quickly).

Similar to those described above, the coolant container 3002 may comprise the container shell. In some embodiments, the container shell may comprise material that has a density of less than 1.2 g/cm$^3$ and a thermal conductivity less than 0.2 W/mK. For example, the container shell can be made of a solid sheet material of polypropylene, polyvinyl chloride, polystyrene, polyimide, silicone, epoxy, and/or any blends thereof. In some embodiments, polypropylene is a preferred solid sheet material for the container shell. Various example embodiments described above provide technical benefits and improvements such as, but not limited to, providing more space for housing the coolant material without significantly increasing the size of the coolant container 3002, as well as enabling at least a partial thermal isolation between the coolant material and the ambient environment (so that the coolant material can reduce the temperature of the purified air from the breathing tube instead of reducing the temperature of the ambient environment).

In the example shown in FIG. 30A and FIG. 30B, the example air-purifying respirator 3000 comprises a breathing tube 3004. In some embodiments, the breathing tube 3004 comprises a breathing tube inlet opening 3006 that is connected to an air-purifying device outlet opening 3008 of an air-purifying device 3010. Similar to those described above, the breathing tube 3004 may receive purified air from the air-purifying device 3010.

In the example shown in FIG. 30A and FIG. 30B, the air-purifying device outlet opening 3008 is positioned on a right side of the air-purifying device 3010, and the air-purifying device 3010 causes purified air to flow upwards to the breathing tube 3004 through the air-purifying device outlet opening 3008.

Similar to those described above, the breathing tube 3004 is in a shape similar to a substantially cylindrical shape. Additionally, or alternatively, the breathing tube 3004 may be in the form of other shape(s).

In some embodiments, the coolant container 3002 and the breathing tube 3004 (including, but not limited to, the cooling portion) may comprise different materials. For example, the breathing tube 3004 (including, but not limited to, the cooling portion) may comprise thermal conductive material that has a thermal conductivity at room temperature of between 0.2 W/mK and 10 W/mK. In some embodiments, the thermal conductive material has a thermal conductivity more preferably between 0.3 W/mK to 0.8 W/mK or between 0.3 W/mK to 0.5 W/mK, providing various technical benefits and improvements such as, but not limited to, allowing purified air to be cooled at a sufficient rate without causing too much condensation.

In some embodiments, preferred materials for the breathing tube 3004 (including, but not limited to, the cooling portion that is in contact with the coolant material) may include, but are not limited to, HDPE, ABS, PPS, LDPE, PEEK, polybutylene terephthalate, EVA, Nylon 6, Nylon 66, and polyurethanes.

In some embodiments, at least a portion of the breathing tube 3004 runs through the coolant container 3002.

Similar to those described above, the coolant container 3002 comprises one or more openings that are on the outer surface of the coolant container 3002 (for example, on the container shell). In some embodiments, the breathing tube 3004 enters and exits the coolant container 3002 through the one or more openings. In some embodiments, the breathing tube 3004 comprises a cooling portion, which refers to the portion of the breathing tube 3004 that is within the coolant container 3002 and in contact with the coolant material.

In the example shown in FIG. 30A and FIG. 30B, the coolant container 3002 is positioned on a back side of the air-purifying device 3010 and houses coolant material as described above. The coolant container 3002 comprises a top coolant container entrance opening 3012 and a top coolant container exit opening 3014. In the example shown in FIG. 30A and FIG. 30B, the top coolant container entrance opening 3012 and the top coolant container exit opening 3014 are positioned at a top portion of the coolant container 3002, and the top coolant container exit opening 3014 is positioned to the left of the top coolant container entrance opening 3012. Such example arrangements provide technical benefits and advantages such as, but not limited to, extending the cooling portion of the breathing tube while maintaining a lightweight of the coolant container.

In some embodiments, the breathing tube 3004 enters the coolant container 3002 through the top coolant container entrance opening 3012 of the coolant container and exits the coolant container 3002 through the top coolant container exit opening 3014 of the coolant container 3002.

In some embodiments, the breathing tube 3004 can isolate purified air from the coolant material in the coolant container 3002. For example, the breathing tube 3004 (including, but not limited to, the cooling portion) has a gas and liquid barrier properties that is above a threshold (for example, as required by a safety standard) and/or a chemical resistance level that is above a threshold (for example, as required by a safety standard), thereby reducing/preventing the purified air from leaking into the coolant container 3002 and/or reducing/preventing the coolant material from leaking into the breathing tube 3004. In some embodiments, the thickness of the breathing tube 3004 (including, but not limited to, the cooling portion) is less than 10 mm, preferably less than 3 mm.

In some embodiments, the material for the breathing tube 3004 (including, but not limited to, the cooling portion) may include filler materials, which may provide the technical benefits and advantages such as, but not limited to, enhancing the thermal conductivities of the breathing tube 3004 (including, but not limited to, the cooling portion). In some embodiments, the material for the breathing tube 3004 (including, but not limited to, the cooling portion) may have a low density (for example, less than 1.4 g/cm$^3$, and preferably less than 1 g/cm$^3$).

In some embodiments, a length of the cooling portion of the breathing tube 3004 (e.g. the portion of the breathing tube 3004 that is in contact with the coolant material) is between 30 cm to 50 cm. Example lengths of the cooling portion of the breathing tube 3004 described herein may provide technical benefits and advantages such as, but not limited to, maximizing the reduction of temperature of the purified air while minimizing the condensation of water.

Referring now to FIG. 31A and FIG. 31B, example views of an example coolant container 3100 in accordance with some embodiments of the present disclosure are provided.

Similar to those described above, the coolant container 3100 may comprise a container shell that provides a housing for storing the coolant material. In some embodiments, the coolant material has a melting point that is less than 40° C. and a heat of fusion/melting of at least 150 J/g or >250 J/g. For example, the coolant material may comprise, such as but not limited to, water and/or ice, which can provide technical benefits and improvements such as, but not limited to, increasing the thermal transfer rate (e.g. allowing the purified air to be cooled more quickly).

Additionally, or alternatively, the coolant material may comprise other materials, such as, but not limited to, paraffin-based phase change materials, additives such as salts and antifreeze agents, and/or the like, similar to those described above.

Similar to those described above, the volume of coolant material can be within the range of 0.625 kg to 4.0 kgs of water/ice. Such embodiments provide technical benefits and improvements such as, but not limited to, increasing the thermal transfer rate (e.g. allowing the purified air to be cooled more quickly).

Similar to those described above, the coolant container 3100 may comprise the container shell. In some embodiments, the container shell may comprise material that has a density of less than 1.2 g/cm$^3$ and a thermal conductivity less than 0.2 W/mK. For example, the container shell can be made of a solid sheet material of polypropylene, polyvinyl chloride, polystyrene, polyimide, silicone, epoxy, and/or any blends thereof. In some embodiments, polypropylene is a preferred solid sheet material for the container shell. Various example embodiments described above provide technical benefits and improvements such as, but not limited to, providing more space for housing the coolant material without significantly increasing the size of the coolant container 3100, as well as enabling at least a partial thermal isolation between the coolant material and the ambient environment (so that the coolant material can reduce the temperature of the purified air from the breathing tube instead of reducing the temperature of the ambient environment).

Similar to those described above, the coolant container 3100 comprises one or more openings that are on the outer surface of the coolant container 3100 (for example, on the container shell). In some embodiments, the breathing tube enters and exits the coolant container 3100 through the one or more openings. In some embodiments, the breathing tube comprises a cooling portion, which refers to the portion of the breathing tube that is within the coolant container 3100 and in contact with the coolant material.

For example, the coolant container 3100 comprises a top coolant container entrance opening 3101 and a top coolant container exit opening 3103, similar to those described above in connection with FIG. 30A to FIG. 30B. In some embodiments, the coolant container 3100 comprises a coolant release valve 3107, similar to the example coolant release valves described above.

In some embodiments, the coolant container 3100 may comprise protrusions 3150A, 3150B, and 3150C that extend from a front surface of the coolant container 3100. In some embodiments, the protrusions 3150A, 3150B, and 3150C may provide mechanical connection to an air-purifying device. For example, the air-purifying device may comprise notches that are disposed on the surface of a blower assembly housing, and the positions of the notches may correspond to the positions of the protrusions 3150A, 3150B, and 3150C. As such, the air-purifying device can be secured to the coolant container 3100.

In some embodiments, the back surface 3109 may define curvature corresponding to the curvature of the human back. In such an example, a user may directly wear the coolant container 3100 as a backpack without the need for a separate back plate.

As described above, there are many technical challenges and difficulties associated with respiratory protective equipment, including air-purifying respirators such as, but not limited to, powered air purifying respirators. For example, many air-purifying respirators produce purified air with high temperature, which can cause user discomfort, reduce user productivity, and create safety hazards at the workplace. Various embodiments of the present disclosure overcome these technical challenges and difficulties, and provide various technical benefits and advantages. For example, example embodiments illustrated in connection with at least FIG. 32 to FIG. 34B can reduce temperatures of purified air from the air-purifying respirators, which can improve user comfort, increase user productivity, and eliminate safety hazards due to high air temperature at the workplace.

Fr example, example embodiments illustrated in connection with at least FIG. 32 to FIG. 34B comprises a breathing tube that runs through a coolant container in a way that can capture the condensation build up inside in the breathing tube. In some embodiments, the coolant container shown in connection with FIG. 32 to FIG. 34B can be in a backpack configuration that includes an air-purifying device (for example, the coolant container can be mounted directly to the PAPR (PA700)). In some embodiments, the coolant container shown in connection with FIG. 32 to FIG. 34B can be integrated into many different air-purifying device harnesses (such as, but not limited to, the PAPR PA761 backpack harness). In some embodiments, the coolant container comprises 0.625 kg to 2.0 kgs of water/ice as coolant materials. In some embodiments, the breathing tube within the coolant container is between 30 cm to 50 cm in length.

Referring now to FIG. 32, example portions of an example air-purifying respirator 3200 that includes an example coolant container 3202 in accordance with some embodiments of the present disclosure are illustrated.

Similar to those described above, the coolant container 3202 may comprise a container shell that provides a housing for storing the coolant material. In some embodiments, the coolant material has a melting point that is less than 40° C. and a heat of fusion/melting of at least 150 J/g or >250 J/g. For example, the coolant material may comprise, such as but not limited to, water and/or ice, which can provide technical benefits and improvements such as, but not limited to, increasing the thermal transfer rate (e.g. allowing the purified air to be cooled more quickly).

Additionally, or alternatively, the coolant material may comprise other materials, such as, but not limited to, paraffin-based phase change materials, additives such as salts and antifreeze agents, and/or the like, similar to those described above.

Similar to those described above, the volume of coolant material can be within the range of 0 to 10 kilograms of water/ice formulation with a preferred range of 0.625 kilograms to 2.0 kilograms. Such embodiments provide technical benefits and improvements such as, but not limited to, increasing the thermal transfer rate (e.g. allowing the purified air to be cooled more quickly).

Similar to those described above, the coolant container 3202 may comprise the container shell. In some embodiments, the container shell may comprise material that has a density of less than 1.2 g/cm$^3$ and a thermal conductivity less than 0.2 W/mK. For example, the container shell can be made of a solid sheet material of polypropylene, polyvinyl chloride, polystyrene, polyimide, silicone, epoxy, and/or any blends thereof. In some embodiments, polypropylene is a preferred solid sheet material for the container shell. Various example embodiments described above provide technical benefits and improvements such as, but not limited to, providing more space for housing the coolant material without significantly increasing the size of the coolant container 3202, as well as enabling at least a partial thermal isolation between the coolant material and the ambient environment (so that the coolant material can reduce the temperature of the purified air from the breathing tube instead of reducing the temperature of the ambient environment).

In the example shown in FIG. 32, the example air-purifying respirator 3200 comprises a breathing tube 3204. In some embodiments, the breathing tube 3204 comprises a breathing tube inlet opening 3206 that is connected to an air-purifying device outlet opening 3208 of an air-purifying device 3210. Similar to those described above, the breathing tube 3204 may receive purified air from the air-purifying device 3210.

In the example shown in FIG. 32, the air-purifying device outlet opening 3208 is positioned on a right side of the air-purifying device 3210, and the air-purifying device 3210 causes purified air to flow upwards to the breathing tube 3204 through the air-purifying device outlet opening 3208.

Similar to those described above, the breathing tube 3204 is in a shape similar to a substantially cylindrical shape. Additionally, or alternatively, the breathing tube 3204 may be in the form of other shape(s).

In some embodiments, the coolant container 3202 and the breathing tube 3204 (including, but not limited to, the cooling portion) may comprise different materials. For example, the breathing tube 3204 (including, but not limited to, the cooling portion) may comprise thermal conductive material that has a thermal conductivity at room temperature of between 0.2 W/mK and 10 W/mK. In some embodiments, the thermal conductive material has a thermal conductivity more preferably between 0.3 W/mK to 0.8 W/mK or between 0.3 W/mK to 0.5 W/mK, providing various technical benefits and improvements such as, but not limited to, allowing purified air to be cooled at a sufficient rate without causing too much condensation.

In some embodiments, preferred materials for the breathing tube 3204 (including, but not limited to, the cooling portion that is in contact with the coolant material) may include, but are not limited to, HDPE, ABS, PPS, LDPE, PEEK, polybutylene terephthalate, EVA, Nylon 6, Nylon 66, and polyurethanes.

In some embodiments, at least a portion of the breathing tube 3204 runs through the coolant container 3202.

Similar to those described above, the coolant container 3202 comprises one or more openings that are on the outer surface of the coolant container 3202 (for example, on the container shell). In some embodiments, the breathing tube 3204 enters and exits the coolant container 3202 through the one or more openings. In some embodiments, the breathing tube 3204 comprises a cooling portion, which refers to the portion of the breathing tube 3204 that is within the coolant container 3202 and in contact with the coolant material.

In the example shown in FIG. 32, the coolant container 3202 is positioned on a bottom side of the air-purifying device 3210 and houses coolant material as described above. The coolant container 3202 comprises a right coolant container entrance opening 3212 and a left coolant container exit opening 3214. In the example shown in FIG. 32, the right coolant container entrance opening 3212 is positioned at a right portion of the coolant container 3202, and the left coolant container exit opening 3214 is positioned at a left portion of the coolant container 3202. Such example arrangements provide technical benefits and advantages such as, but not limited to, extending the cooling portion of the breathing tube while maintaining a lightweight of the coolant container.

In some embodiments, the breathing tube 3204 enters the coolant container 3202 through the right coolant container entrance opening 3212 of the coolant container and exits the coolant container 3202 through the left coolant container exit opening 3214 of the coolant container 3202.

In some embodiments, the breathing tube 3204 can isolate purified air from the coolant material in the coolant container 3202. For example, the breathing tube 3204 (including, but not limited to, the cooling portion) has a gas and liquid barrier properties that is above a threshold (for example, as required by a safety standard) and/or a chemical resistance level that is above a threshold (for example, as required by a safety standard), thereby reducing/preventing the purified air from leaking into the coolant container 3202 and/or reducing/preventing the coolant material from leaking into the breathing tube 3204. In some embodiments, the thickness of the breathing tube 3204 (including, but not limited to, the cooling portion) is less than 10 mm, preferably less than 3 mm.

In some embodiments, the material for the breathing tube 3204 (including, but not limited to, the cooling portion) may include filler materials, which may provide the technical benefits and advantages such as, but not limited to, enhancing the thermal conductivities of the breathing tube 3204 (including, but not limited to, the cooling portion). In some embodiments, the material for the breathing tube 3204 (including, but not limited to, the cooling portion) may have a low density (for example, less than 1.4 g/cm$^3$, and preferably less than 1 g/cm$^3$).

In some embodiments, a length of the cooling portion of the breathing tube 3204 (e.g. the portion of the breathing tube 3204 that is in contact with the coolant material) is between 30 cm to 50 cm. Example lengths of the cooling portion of the breathing tube 3204 described herein may provide technical benefits and advantages such as, but not limited to, maximizing the reduction of temperature of the purified air while minimizing the condensation of water.

Referring now to FIG. 33, example portions of an example air-purifying respirator 3300 that includes an example coolant container 3301 in accordance with some embodiments of the present disclosure are illustrated.

Similar to those described above, the coolant container 3301 may comprise a container shell that provides a housing for storing the coolant material. In some embodiments, the coolant material has a melting point that is less than 40° C. and a heat of fusion/melting of at least 150 J/g or >250 J/g. For example, the coolant material may comprise, such as but not limited to, water and/or ice, which can provide technical benefits and improvements such as, but not limited to, increasing the thermal transfer rate (e.g. allowing the purified air to be cooled more quickly).

Additionally, or alternatively, the coolant material may comprise other materials, such as, but not limited to, paraffin-based phase change materials, additives such as salts and antifreeze agents, and/or the like, similar to those described above.

Similar to those described above, the volume of coolant material can be within the range of 0 to 10 kilograms of water/ice formulation with a preferred range of 0.725 kilograms to 3.5 kilograms. Such embodiments provide technical benefits and improvements such as, but not limited to, increasing the thermal transfer rate (e.g. allowing the purified air to be cooled more quickly).

Similar to those described above, the coolant container 3301 may comprise the container shell. In some embodiments, the container shell may comprise material that has a density of less than 1.2 g/cm$^3$ and a thermal conductivity less than 0.2 W/mK. For example, the container shell can be made of a solid sheet material of polypropylene, polyvinyl chloride, polystyrene, polyimide, silicone, epoxy, and/or any blends thereof. In some embodiments, polypropylene is a preferred solid sheet material for the container shell. Various example embodiments described above provide technical benefits and improvements such as, but not limited to, providing more space for housing the coolant material without significantly increasing the size of the coolant container 3301, as well as enabling at least a partial thermal isolation between the coolant material and the ambient environment (so that the coolant material can reduce the temperature of the purified air from the breathing tube instead of reducing the temperature of the ambient environment).

In the example shown in FIG. 33, the example air-purifying respirator 3300 comprises a breathing tube 3303. In some embodiments, the breathing tube 3303 comprises a breathing tube inlet opening 3305 that is connected to an air-purifying device outlet opening 3307 of an air-purifying device 3309. Similar to those described above, the breathing tube 3303 may receive purified air from the air-purifying device 3309.

In the example shown in FIG. 33, the air-purifying device outlet opening 3307 is positioned on a right side of the air-purifying device 3309, and the air-purifying device 3309 causes purified air to flow upwards to the breathing tube 3303 through the air-purifying device outlet opening 3307.

Similar to those described above, the breathing tube 3303 is in a shape similar to a substantially cylindrical shape. Additionally, or alternatively, the breathing tube 3303 may be in the form of other shape(s).

In some embodiments, the coolant container 3301 and the breathing tube 3303 (including, but not limited to, the cooling portion) may comprise different materials. For example, the breathing tube 3303 (including, but not limited to, the cooling portion) may comprise thermal conductive material that has a thermal conductivity at room temperature of between 0.2 W/mK and 10 W/mK. In some embodiments, the thermal conductive material has a thermal conductivity more preferably between 0.3 W/mK to 0.8 W/mK or between 0.3 W/mK to 0.5 W/mK, providing various technical benefits and improvements such as, but not limited to, allowing purified air to be cooled at a sufficient rate without causing too much condensation.

In some embodiments, preferred materials for the breathing tube 3303 (including, but not limited to, the cooling portion that is in contact with the coolant material) may include, but are not limited to, HDPE, ABS, PPS, LDPE, PEEK, polybutylene terephthalate, EVA, Nylon 6, Nylon 66, and polyurethanes.

In some embodiments, at least a portion of the breathing tube 3303 runs through the coolant container 3301.

Similar to those described above, the coolant container 3301 comprises one or more openings that are on the outer surface of the coolant container 3301 (for example, on the container shell). In some embodiments, the breathing tube 3303 enters and exits the coolant container 3301 through the one or more openings. In some embodiments, the breathing tube 3303 comprises a cooling portion, which refers to the portion of the breathing tube 3303 that is within the coolant container 3301 and in contact with the coolant material.

In the example shown in FIG. 33, the coolant container 3301 is positioned on a bottom side of the air-purifying device 3309 and houses coolant material as described above. The coolant container 3301 comprises a right coolant container entrance opening 3311 and a top coolant container exit opening 3313. In the example shown in FIG. 33, the right coolant container entrance opening 3311 is positioned at a right portion of the coolant container 3301, and the top coolant container exit opening 3313 is positioned at a top portion of the coolant container 3301. Such example arrangements provide technical benefits and advantages such as, but not limited to, extending the cooling portion of the breathing tube while maintaining a lightweight of the coolant container.

In some embodiments, the breathing tube 3303 enters the coolant container 3301 through the right coolant container entrance opening 3311 of the coolant container and exits the coolant container 3301 through the top coolant container exit opening 3313 of the coolant container 3301.

In some embodiments, the breathing tube 3303 can isolate purified air from the coolant material in the coolant container 3301. For example, the breathing tube 3303 (including, but not limited to, the cooling portion) has a gas and liquid barrier properties that is above a threshold (for example, as required by a safety standard) and/or a chemical resistance level that is above a threshold (for example, as required by a safety standard), thereby reducing/preventing the purified air from leaking into the coolant container 3301 and/or reducing/preventing the coolant material from leaking into the breathing tube 3303. In some embodiments, the thickness of the breathing tube 3303 (including, but not limited to, the cooling portion) is less than 10 mm, preferably less than 3 mm.

In some embodiments, the material for the breathing tube 3303 (including, but not limited to, the cooling portion) may include filler materials, which may provide the technical benefits and advantages such as, but not limited to, enhancing the thermal conductivities of the breathing tube 3303 (including, but not limited to, the cooling portion). In some embodiments, the material for the breathing tube 3303 (including, but not limited to, the cooling portion) may have a low density (for example, less than 1.4 g/cm$^3$, and preferably less than 1 g/cm$^3$).

In some embodiments, a length of the cooling portion of the breathing tube 3303 (e.g. the portion of the breathing tube 3303 that is in contact with the coolant material) is between 30 cm to 50 cm. Example lengths of the cooling portion of the breathing tube 3303 described herein may provide technical benefits and advantages such as, but not limited to, maximizing the reduction of temperature of the purified air while minimizing the condensation of water.

Referring now to FIG. 34A and FIG. 34B, example views of an example coolant container 3400 in accordance with some embodiments of the present disclosure are illustrated.

Similar to those described above, the coolant container 3400 may comprise a container shell that provides a housing for storing the coolant material. In some embodiments, the coolant material has a melting point that is less than 40° C. and a heat of fusion/melting of at least 150 J/g or >250 J/g. For example, the coolant material may comprise, such as but not limited to, water and/or ice, which can provide technical benefits and improvements such as, but not limited to, increasing the thermal transfer rate (e.g. allowing the purified air to be cooled more quickly).

Additionally, or alternatively, the coolant material may comprise other materials, such as, but not limited to, paraffin-based phase change materials, additives such as salts and antifreeze agents, and/or the like, similar to those described above.

Similar to those described above, the volume of coolant material can be within the range of 0 to 10 kilograms of water/ice formulation with a preferred range of 0.625 kilograms to 2.0 kilograms. Such embodiments provide technical benefits and improvements such as, but not limited to, increasing the thermal transfer rate (e.g. allowing the purified air to be cooled more quickly).

Similar to those described above, the coolant container 3400 may comprise the container shell. In some embodiments, the container shell may comprise material that has a density of less than 1.2 g/cm$^3$ and a thermal conductivity less than 0.2 W/mK. For example, the container shell can be made of a solid sheet material of polypropylene, polyvinyl chloride, polystyrene, polyimide, silicone, epoxy, and/or any blends thereof. In some embodiments, polypropylene is a preferred solid sheet material for the container shell. Various example embodiments described above provide technical benefits and improvements such as, but not limited to, providing more space for housing the coolant material without significantly increasing the size of the coolant container 3400, as well as enabling at least a partial thermal isolation between the coolant material and the ambient environment (so that the coolant material can reduce the temperature of the purified air from the breathing tube instead of reducing the temperature of the ambient environment).

Similar to those described above, the coolant container 3400 comprises one or more openings that are on the outer surface of the coolant container 3400 (for example, on the container shell). In some embodiments, the breathing tube enters and exits the coolant container 3400 through the one or more openings. In some embodiments, the breathing tube comprises a cooling portion, which refers to the portion of the breathing tube that is within the coolant container 3400 and in contact with the coolant material.

For example, the coolant container 3400 comprises a right coolant container entrance opening 3402 and a left coolant container exit opening 3404, similar to those described above in connection with FIG. 32. In some embodiments, the coolant container 3400 comprises a condensation release valve 3406, similar to the example coolant release valves described above.

As described above, there are many technical challenges and difficulties associated with respiratory protective equipment, including air-purifying respirators such as, but not limited to, powered air purifying respirators. For example, many air-purifying respirators produce purified air with high temperature, which can cause user discomfort, reduce user productivity, and create safety hazards at the workplace. Various embodiments of the present disclosure overcome these technical challenges and difficulties, and provide various technical benefits and advantages. For example, example embodiments illustrated in connection with at least FIG. 35 to FIG. 47 provide attachment mechanisms that allow a breathing tube to be securely connected to a coolant container, which can improve user comfort, increase user productivity, and eliminate safety hazards due to high air temperature at the workplace.

In some embodiments, a breathing tube in accordance with some embodiments of the present disclosure may comprise at least one breathing tube attachment connector. In some embodiments, the at least one breathing tube attachment connector provides attachment mechanisms that enable the breathing tube to be securely connected to an air-purifying device, a coolant container, and/or a respiratory headgear.

In some embodiments, the breathing tube attachment connector may be positioned at an end of the breathing tube.

For example, the breathing tube attachment connector may be positioned at a breathing tube inlet opening of the breathing tube, and the breathing tube attachment connector may connect the breathing tube to an air-purifying device outlet opening of an air-purifying device. In such an example, purified air may flow from the air-purifying device outlet opening of an air-purifying device to the breathing tube inlet opening of the breathing tube through the breathing tube attachment connector.

Additionally, or alternatively, the breathing tube attachment connector may also be positioned at a breathing tube outlet opening of the breathing tube, and the breathing tube attachment connector may connect the breathing tube to a coolant container entrance opening of a coolant container. In such an example, purified air may flow from the breathing tube outlet opening of the breathing tube to the coolant container entrance opening of the coolant container through the breathing tube attachment connector. In some embodiments, the coolant container may comprise an inner flow channel, where the purified air may flow from the coolant container entrance opening to the coolant container exit opening.

Additionally, or alternatively, the breathing tube attachment connector may be positioned at a breathing tube inlet opening of the breathing tube, and the breathing tube attachment connector may connect the breathing tube to an coolant container exit opening of an coolant container. In such an example, purified air may flow from the coolant container exit opening of the coolant container to the breathing tube inlet opening of the breathing tube, through the breathing tube attachment connector.

Additionally, or alternatively, the breathing tube attachment connector may be positioned at a breathing tube outlet opening of the breathing tube, and the breathing tube attachment connector may connect the breathing tube to a respiratory headgear inlet opening of an example respiratory headgear. In such an example, purified air may flow from the breathing tube outlet opening of the breathing tube to the respiratory headgear inlet opening of the example respiratory headgear.

While the description above provides examples of where the breathing tube attachment connector may be positioned at an end of a breathing tube, it is noted that the scope of the present disclosure is not limited to the description above. In some examples, one or more example breathing tube attachment connectors may be positioned along the breathing tube.

For example, an example breathing tube may comprise two breathing tube attachment connectors that are positioned along a circumference of the example breathing tube. In such embodiments, the first breathing tube attachment connector may secure a first portion of the breathing tube to an coolant container entrance opening, and the second breathing tube attachment connector may secure a second portion of the breathing tube to an coolant container exit opening. In some embodiments, the portion of the breathing tube that is between the first portion and the second portion may correspond to the cooling portion of the breathing tube that is disposed within the coolant container and in contact with the coolant material.

Referring now to FIG. 35 to FIG. 37, various example views of example components associated with an example air-purifying respirator in accordance with some embodiments of the present disclosure are illustrated.

In particular, FIG. 35 illustrates an example breathing tube attachment connector 3500. FIG. 36 illustrates an example air-purifying device inlet opening 3600 of an example air-purifying device. FIG. 37 illustrates an example coolant container entrance opening 3701 and an example coolant container exit opening 3703 of an example coolant container 3700.

In the example shown in FIG. 35, the breathing tube 3501 comprises at least one breathing tube attachment connector (such as the example breathing tube attachment connector 3500). Similar to those described above, the breathing tube 3501 also comprises a breathing tube inlet opening that is connected to an air-purifying device outlet opening of an air-purifying device so as to receive purified air.

As shown in FIG. 35, the breathing tube attachment connector 3500 comprises at least one locking pin 3503. In some embodiments, the at least one locking pin 3503 protrudes from an outer surface of the breathing tube attachment connector 3500. In some embodiments, the breathing tube attachment connector 3500 secure the breathing tube 3501 to an air-purifying device, a coolant container, or a respiratory headgear through the at least one locking pin 3503.

For example, as shown in FIG. 36, the example air-purifying device inlet opening 3600 of an example air-purifying device 3602 comprises at least one locking slot 3604 that is disposed on an inner surface of example air-purifying device inlet opening 3600. In some embodiments, to attach the breathing tube 3501 shown in FIG. 35 to the example air-purifying device 3602 shown in FIG. 36, the at least one locking pin 3503 of the breathing tube attachment connector 3500 is secured in the at least one locking slot 3604 of the air-purifying device 3602 through a twist and lock mechanism (e.g. a bayonet mount).

Additionally, or alternatively, as shown in FIG. 37, the example coolant container 3700 comprises a coolant container entrance opening 3701 and a coolant container exit opening 3703.

In some embodiments, the coolant container entrance opening 3701 comprises at least one locking slot 3705 that is disposed on an inner surface of the coolant container entrance opening 3701. In some embodiments, to attach the breathing tube 3501 shown in FIG. 35 to the coolant container entrance opening 3701 of the coolant container 3700 shown in FIG. 37, the at least one locking pin 3503 of the breathing tube attachment connector 3500 is secured in the at least one locking slot 3705 of the coolant container entrance opening 3701 of the coolant container 3700 through a twist and lock mechanism (e.g. a bayonet mount).

In some embodiments, the coolant container exit opening 3703 comprises at least one locking slot 3707 that is disposed on an inner surface of the coolant container exit opening 3703. In some embodiments, to attach the breathing tube 3501 shown in FIG. 35 to the coolant container exit opening 3703 of the coolant container 3700 shown in FIG. 37, the at least one locking pin 3503 of the breathing tube attachment connector 3500 is secured in the at least one locking slot 3707 of the coolant container exit opening 3703 of the coolant container 3700 through a twist and lock mechanism (e.g. a bayonet mount).

Referring now to FIG. 38 and FIG. 39, various example views of example components associated with an example air-purifying respirator in accordance with some embodiments of the present disclosure are illustrated. In particular, FIG. 38 illustrates an example breathing tube attachment connector 3800. FIG. 39 illustrates an example coolant container entrance opening 3900.

In the example shown in FIG. 38, the breathing tube 3804 comprises at least one breathing tube attachment connector 3800. Similar to those described above, the breathing tube 3804 also comprises a breathing tube inlet opening that is connected to an air-purifying device outlet opening of an air-purifying device so as to receive purified air.

As shown in FIG. 38, the at least one breathing tube attachment connector 3800 comprises an O-ring 3802. In some embodiments, the O-ring 3802 is disposed along an outer circumference of the breathing tube 3804. In some embodiments, the O-ring 3802 may comprise elasticated materials. In some embodiments, the at least one breathing tube attachment connector 3800 secures the breathing tube 3804 to an air-purifying device, a coolant container, or a respiratory headgear through the O-ring 3802.

For example, as shown in FIG. 39, the coolant container entrance opening 3900 comprises an O-ring threshold 3901 on an inner surface of the coolant container entrance opening 3900. In some embodiments, the O-ring threshold 3901 refers to a ring-shaped protrusion that extends from the inner surface of the coolant container entrance opening 3900. In some embodiments, to attach the breathing tube 3804 shown in FIG. 38 to the coolant container entrance opening 3900 of the coolant container shown in FIG. 39, the O-ring 3802 of the at least one breathing tube attachment connector 3800 is twisted to enter the coolant container entrance opening 3900, and pressed past the O-ring threshold 3901.

Additionally, or alternatively, the at least one breathing tube attachment connector 3800 comprises at least one breathing tube attachment cover 3806. In such an example, the breathing tube 3804 is disposed within the at least one breathing tube attachment cover 3806. In some embodiments, the coolant container entrance opening 3900 may be in the form of a coolant container entrance tube, and an opening of the coolant container entrance tube is secured in the space between the at least one breathing tube attachment cover 3806 and the breathing tube 3804. For example, the inner surface of the at least one breathing tube attachment cover 3806 may comprise one or more locking protrusions that can be matched and locked with one or more locking notches on the outer surface of the coolant container entrance tube.

Referring now to FIG. 40 and FIG. 41, various example views of example components associated with an example air-purifying respirator in accordance with some embodiments of the present disclosure are illustrated. In particular, FIG. 40 illustrates an example breathing tube attachment connector 4000. FIG. 41 illustrates an example portion of an example coolant container 4100.

In the example shown in FIG. 40, the breathing tube attachment connector 4000 may be secured to an end of a breathing tube in accordance with some embodiments of the present disclosure.

In some embodiments, the at least one breathing tube attachment connector 4000 comprises a first plurality of threads 4004. In some embodiments, the first plurality of threads 4004 protrudes from an outer surface of the at least one breathing tube attachment connector 4000. In some embodiments, the at least one breathing tube attachment connector 4000 secures a breathing tube to an air-purifying device, a coolant container, or a respiratory headgear through the first plurality of threads 4004.

For example, as shown in FIG. 41, the coolant container 4100 comprises a second plurality of threads 4101 on an inner surface of the coolant container entrance opening of the coolant container 4100. In some embodiments, to attach the breathing tube attachment connector 4000 shown in FIG. 40 to the coolant container 4100 shown in FIG. 41, the first plurality of threads 4004 of the at least one breathing tube attachment connector 4000 engages with the second plurality of threads 4101 of the coolant container 4100 through a threaded mechanism. As such, a breathing tube can be attached to the coolant container 4100 through an engagement between the first plurality of threads 4004 and the second plurality of threads 4101.

Referring now to FIG. 42, an example view of example components associated with an example air-purifying respirator in accordance with some embodiments of the present disclosure is illustrated. In particular, FIG. 42 illustrates an example breathing tube 4202 that is connected to an example coolant container 4204 (for example, connected to an example coolant container entrance opening 4206).

In some embodiments, adhesive material is disposed on an outer surface of the breathing tube 4202. Additionally, or alternatively, adhesive material is disposed on an inner surface of the example coolant container entrance opening 4206 of the coolant container 4204. Examples of adhesive material include, but are not limited to, chemical glues.

Referring now to FIG. 43 and FIG. 44, various example views of example components associated with an example air-purifying respirator in accordance with some embodiments of the present disclosure are illustrated. FIG. 43 and FIG. 44 illustrate attaching the breathing tube to the coolant container through example ball-detent mechanisms.

In particular, FIG. 43 illustrates an example cross-sectional view of portions of an example breathing tube attachment connector 4301 that is secured to an inner surface of the coolant container entrance opening of a coolant container 4303.

In some embodiments, the example breathing tube attachment connector 4301 comprises at least one detent portion 4305 on an outer surface of the at least one breathing tube attachment connector 4301.

In some embodiments, the coolant container 4303 comprises at least one ball 4307 disposed on an inner surface of the coolant container entrance opening of the coolant container 4303. In some embodiments, the example breathing tube attachment connector 4301 attaches a breathing tube to the coolant container 4303 through an engagement between the at least one detent portion 4305 and the at least one ball 4307.

For example, as shown in FIG. 43, the at least one ball 4307 is connected to a spring 4311, which in turn is connected to a set screw 4313 that is disposed within the coolant container 4303. In some embodiments, when example breathing tube attachment connector 4301 slides into the coolant container entrance opening of the coolant container 4303, the spring 4311 causes the at least one ball 4307 to retract into the coolant container 4303 when the at least one detent portion 4305 of the example breathing tube attachment connector 4301 is not in contact with the at least one ball 4307. When the at least one detent portion 4305 of the example breathing tube attachment connector 4301 becomes in contact with the at least one ball 4307, the spring 4311 causes the at least one ball 4307 to protrude from the inner surface of the coolant container entrance opening of the coolant container 4303 and to be locked at the at least one detent portion 4305 of the example breathing tube attachment connector 4301. As such, a breathing tube can be attached to the coolant container 4303 through the example breathing tube attachment connector 4301 shown in FIG. 43.

While the description above in connection with FIG. 43 provides an example of ball-detent mechanism, it is noted that the scope of the present disclosure is not limited to the description above. For example, the at least one detent portion may be on an inner surface of a coolant container entrance opening, and the at least one ball may be disposed on an outer surface of breathing tube attachment connector (along with the spring and the set screw being disposed within the coolant container).

FIG. 44 illustrates an example cross-sectional view of a portion of an example coolant container 4400.

Similar to those described above, the coolant container 4400 comprises at least moveable pin 4402 that is disposed on an inner surface of the coolant container entrance opening of the coolant container 4400. In some embodiments, the at least moveable pin 4402 is connected to a spring 4404. In some embodiments, the spring 4404 is positioned within an inner cavity 4406 of the coolant container 4400 and secured to an inner surface of the inner cavity 4406 of the coolant container 4400.

In some embodiments, an example breathing tube attachment connector comprises at least one detent portion, similar to those described above. In some embodiments, when the example breathing tube attachment connector slides into the coolant container entrance opening of the coolant container 4400, the spring 4404 causes the at least moveable pin 4402 to retract into the coolant container 4400 when the at least one detent portion of the example breathing tube attachment connector is not in contact with the at least moveable pin 4402. When a detent portion of the example breathing tube attachment connector becomes in contact with the at least moveable pin 4402, the spring 4404 causes the at least moveable pin 4402 to protrude from the inner surface of the coolant container entrance opening of the coolant container 4400 and locked in the at least one detent portion of the example breathing tube attachment connector. As such, a breathing tube can be attached to the coolant container 4400.

While the description above in connection with FIG. 44 provides an example of ball-detent mechanism, it is noted that the scope of the present disclosure is not limited to the description above. For example, the at least one detent portion may be on an inner surface of a coolant container entrance opening, and the at least one moveable pin may be disposed on an outer surface of breathing tube attachment connector (along with the spring being disposed within the coolant container).

Referring now to FIG. 45 to FIG. 47, various example views of example components associated with an example air-purifying respirator in accordance with some embodiments of the present disclosure are illustrated. In particular, FIG. 45 to FIG. 47 illustrate example snap fit mechanisms in accordance with some embodiments of the present disclosure.

In the example shown in FIG. 45, an example breathing tube attachment connector comprises a protrusion 4501. In some embodiments, the protrusion 4501 may be in the form of a hook, a stud, or a bead that can be deflected when stress is applied on the protrusion 4501.

In some embodiments, an example coolant container comprises at least one depression portion 4503 on an inner surface of the coolant container entrance opening. In some embodiments, the example breathing tube attachment connector is attached to the example coolant container by pushing the protrusion 4501 to the at least one depression portion 4503. The push force exerted on the protrusion 4501 causes the protrusion 4501 to deflect and enter the at least one depression portion 4503. After the push force exerted on the protrusion 4501 is removed, the protrusion 4501 is locked in the at least one depression portion 4503.

In the example shown in FIG. 46, an example breathing tube attachment connector comprises a U-shaped cantilever 4602. In some embodiments, the U-shaped cantilever 4602 can be deflected when stress is applied on the U-shaped cantilever 4602.

In some embodiments, an example coolant container comprises at least one depression portion 4604 on an inner surface of the coolant container entrance opening. In some embodiments, the example breathing tube attachment connector is attached to the example coolant container by pressing the U-shaped cantilever 4602 to the at least one depression portion 4604. The press force exerted on the U-shaped cantilever 4602 causes the U-shaped cantilever 4602 to deflect and enter the at least one depression portion 4604. After the press force exerted on the U-shaped cantilever 4602 is removed, the U-shaped cantilever 4602 is locked in the at least one depression portion 4604.

In the example shown in FIG. 47, a breathing tube may be connected to a coolant container through a cantilever snap fit mechanism. For example, an example breathing tube attachment connector comprises a protrusion 4701. In some embodiments, the protrusion 4701 can be deflected when stress is applied on the protrusion 4701.

In some embodiments, an example coolant container comprises at least one depression portion 4703 on an inner surface of the coolant container entrance opening. In some embodiments, the example breathing tube attachment connector is attached to the example coolant container by pressing the protrusion 4701 downwards to the at least one depression portion 4703. The press force exerted on the protrusion 4701 causes the protrusion 4701 to deflect and enter the at least one depression portion 4703. After the press force exerted on the protrusion 4701 is removed, the protrusion 4701 is locked in the at least one depression portion 4703.

As described above, there are many technical challenges and difficulties associated with respiratory protective equipment, including air-purifying respirators such as, but not limited air with high temperature, which can cause user discomfort, reduce user productivity, and create safety hazards at the workplace. Various embodiments of the present disclosure overcome these technical challenges and difficulties, and provide various technical benefits and advantages. For example, example embodiments illustrated in connection with at least FIG. 48 to FIG. 55D can reduce temperatures of purified air from the air-purifying respirators, which can improve user comfort, increase user productivity, and eliminate safety hazards due to high air temperature at the workplace.

For example, example embodiments illustrated in connection with at least FIG. 48 to FIG. 55D can be implemented in conjunction with the example embodiments described herein where water/ice is provided as a coolant material in a coolant container to reduce the temperature of purified air. For example, one or more example embodiments in connection with at least FIG. 48 to FIG. 55D provides an example refrigerant evaporator that can actively act as a portable freezer that directly engages with the coolant container. Such an example refrigerant evaporator can have a much lower profile than that of a refrigerator. The example refrigerant evaporator may engage with the coolant container via direct contact (such as, but not limited to, a surface of the example refrigerant evaporator contacting a surface of the example refrigerant evaporator, or interlocking features where the example refrigerant evaporator is in a male form and the example coolant container is in a female forms). The example refrigerant evaporator may operate and function similar to a regular refrigerator, utilizing pressure and refrigeration to actively cool and freeze liquid materials that have a freezing point between 0° C. to −20° C. As such, the example refrigerant evaporator can reduce the temperature of the coolant stored in the coolant container, which in turn can reduce the temperature of the purified air in the breathing tube, additional details of which are described herein.

Referring now to FIG. 48, an example cross-sectional view of example portions of an example air-purifying respirator 4800 in accordance with some embodiments of the present disclosure are illustrated. In particular, the example air-purifying respirator 4800 shown in FIG. 48 comprises an example coolant container 4802, an example refrigerant evaporator 4806, and an example breathing tube 4804.

In some embodiments, the coolant container 4802 comprises coolant material 4810. Similar to those described above, the coolant container 4802 may comprise a container shell 4818 that provides a housing for storing the coolant material 4810. In some embodiments, the coolant material 4810 has a melting point that is less than 40° C. and a heat of fusion/melting of at least 150 J/g or >250 J/g. For example, the coolant material 4810 may comprise, such as but not limited to, water and/or ice, which can provide technical benefits and improvements such as, but not limited to, increasing the thermal transfer rate (e.g. allowing the purified air to be cooled more quickly).

Additionally, or alternatively, the coolant material 4810 may comprise other materials, such as, but not limited to, paraffin-based phase change materials, additives such as salts and antifreeze agents, and/or the like, similar to those described above.

Similar to those described above, the volume of coolant material 4810 can be within the range of 0 to 10 kilograms of water/ice formulation with a preferred range of 0.725 kilograms to 3.5 kilograms. Such embodiments provide technical benefits and improvements such as, but not limited to, increasing the thermal transfer rate (e.g. allowing the purified air to be cooled more quickly).

Similar to those described above, the coolant container 4802 may comprise the container shell 4818. In some embodiments, the container shell 4818 may comprise material that has a density of less than 1.2 g/cm$^3$ and a thermal conductivity less than 0.2 W/mK. For example, the container shell 4818 can be made of a solid sheet material of polypropylene, polyvinyl chloride, polystyrene, polyimide, silicone, epoxy, and/or any blends thereof. In some embodiments, polypropylene is a preferred solid sheet material for the container shell 4818. Various example embodiments described above provide technical benefits and improvements such as, but not limited to, providing more space for housing the coolant material without significantly increasing the size of the coolant container 4802, as well as enabling at least a partial thermal isolation between the coolant material 4810 and the ambient environment (so that the coolant material 4810 can reduce the temperature of the purified air from the breathing tube instead of reducing the temperature of the ambient environment).

Similar to those described above, the coolant container 4802 comprises one or more openings that are on the outer surface of the coolant container 4802 (for example, on the container shell 4818). In some embodiments, the breathing tube 4804 enters and exits the coolant container 4802 through the one or more openings. In some embodiments, the breathing tube 4804 comprises a cooling portion (including portion 4816A and portion 4816B), which refers to the portion of the breathing tube 4804 that is within the coolant container 4802 and in contact with the coolant material 4810.

In some embodiments, the coolant container 4802 may be in a shape similar to a ring torus shape. For example, the coolant container 4802 defines a center hole 4812. In such an example, the container shell 4818 of the coolant container 4802 may comprise central inner surface 4820A and central inner surface 4820B that define the center hole 4812.

While the description above provides an example shape of the coolant container, it is noted that the scope of the present disclosure is not limited to the description above. In some examples, an example coolant container may be in other additional and/or alternative shapes.

Referring back to FIG. 48, in some embodiments, the example refrigerant evaporator 4806 comprises an outer shell 4808.

In some embodiments, the outer shell 4808 of the example refrigerant evaporator 4806 can comprise thermal conductive material. For example, the outer shell 4808 may comprise metal material such as, but not limited to, aluminum, copper, copper/aluminum alloy, steel, and/or the like.

Additionally, or alternatively, the outer shell 4808 of the example refrigerant evaporator 4806 can comprise rigid material that can operate under working pressures without deformation. For example, the outer shell 4808 of the example refrigerant evaporator 4806 may comprise material that does not deform while under a pressure of 300 to 500 Psig.

In some embodiments, example refrigerant material may flow through and/or stored in the example refrigerant evaporator 4806. In some embodiments, the boiling temperature of the example refrigerant material may be at or lower than −52.78° F. (−47.1° C.). Examples of refrigerant materials may include, but are not limited to, monochlorodifluoromethane, bromotrifluoromethane, tetrafluoromethane (carbon tetrafluoride), and/or the like.

In some embodiments, the example refrigerant evaporator 4806 defines a refrigerant flow channel within the outer shell 4808 of the example refrigerant evaporator 4806. In some embodiments, example refrigerant material may enter the example refrigerant evaporator 4806 through a refrigerant circulation opening of the refrigerant flow channel, circulate through the refrigerant flow channel, and may exit example refrigerant evaporator 4806 through the refrigerant circulation opening of the refrigerant flow channel, details of which are described herein.

In some embodiments, the example refrigerant evaporator 4806 may comprise at least one refrigerant circulation opening 4822 that is disposed on the outer shell 4808 of the example refrigerant evaporator 4806. In some embodiments, at least one refrigerant flow tube 4814 is connected to the at least one refrigerant circulation opening 4822 of the refrigerant evaporator 4806 and causes refrigerant material to circulate through the refrigerant flow channel of the example refrigerant evaporator 4806, details of which are described herein.

In the example shown in FIG. 48, the refrigerant evaporator 4806 is positioned and secured relative to the coolant container 4802 through a male-female interlock mechanism.

For example, the refrigerant evaporator 4806 comprises a evaporator head 4824 and a evaporator base 4826 in the example shown in FIG. 48. For example, the evaporator head 4824 of the refrigerant evaporator 4806 may be in an elongated shape that extends from the top surface of the evaporator base 4826 of the refrigerant evaporator 4806.

In some embodiments, the evaporator head 4824 of the refrigerant evaporator 4806 is positioned through the center hole 4812, and the evaporator base 4826 of the refrigerant evaporator 4806 is positioned under the coolant container 4802. As such, at least a portion of the refrigerant evaporator 4806 is positioned within the center hole 4812 of the coolant container 4802 and in direct contact with the coolant container 4802.

While the description above provides an example of direct contact between the coolant container 4802 and the refrigerant evaporator 4806 through a male-female locking mechanism, it is noted that the scope of the present disclosure is not limited to the description above. In some examples, the direct contact between the coolant container 4802 and the refrigerant evaporator 4806 and/or the mechanism to secure the coolant container 4802 and the refrigerant evaporator 4806 to one another may be through other mechanisms.

In some embodiments, the surface of the example refrigerant evaporator 4806 and the surface of the example coolant container 4802 that are in contact with one another may comprise ferrous/metallic materials. For example, illustrated in FIG. 48, the evaporator head 4824 of the refrigerant evaporator 4806 is in contact with the center hole 4812 of the coolant container 4802 as defined by the central inner surface 4820A and central inner surface 4820B that define the center hole 4812. In such an example, the evaporator head 4824 of the refrigerant evaporator 4806, the central inner surface 4820A of the example coolant container 4802, and the central inner surface 4820B of the example coolant container 4802 comprise ferrous/metallic materials, so that the example refrigerant evaporator 4806 can absorb the heat from the coolant container material in the coolant container 4802, which in turn absorb the heat from the purified air in the breathing tube 4804.

In some embodiments, the example refrigerant evaporator 4806 acts as an evaporator and engages with the coolant material (such as, but not limited to, water/ice) via direct contact. For example, when the example refrigerant evaporator 4806 operates, the surface temperature of the example refrigerant evaporator 4806 (for example, the surface temperature of the evaporator head 4824 of the example refrigerant evaporator 4806) is reduced. Because of the direct contact between the example refrigerant evaporator 4806 and the coolant container 4802, the surface temperatures of surfaces that define the center hole 4812 of the example coolant container 4802 (for example, the portion 4816A and the portion 4816B) are reduced, which in turn reduces the temperature of the coolant container material stored in the example coolant container 4802.

In some embodiments, the cooling portion of the example breathing tube 4804 (including the portion 4816A and the portion 4816B) at least partially surrounds the center hole 4812 of the coolant container 4802. As described above, the temperature of coolant materials stored in the example coolant container 4802 can be reduced by the refrigerant evaporator 4806. Because the cooling portion of the example breathing tube 4804 (including the portion 4816A and the portion 4816B) is in contact with the coolant materials stored in the example coolant container 4802 and surrounds the center hole 4812 of the coolant container 4802, the refrigerant evaporator 4806 can also reduce the temperature of the purified air that flows inside the breathing tube 4804.

In some embodiments, portions of the example refrigerant evaporator 4806 and portions of the example coolant container 4802 that are in contact with one another may comprise thermal conductive material such as, but not limited to, ferrous materials and/or metallic materials. For example, the evaporator head 4824 of the example refrigerant evaporator 4806 may comprise ferrous materials and/or metallic materials such as, but not limited to, aluminum, copper, copper/aluminum alloy and steel. Additionally, or alternatively, the portion 4816A and the portion 4816B of the coolant container 4802 (which defines the center hole 4812) may comprise ferrous materials and/or metallic materials such as, but not limited to, aluminum, copper, copper/aluminum alloy and steel.

In some embodiments, the example refrigerant evaporator 4806 can freeze water in the coolant container 4802 into ice in less than 30 minutes. In some embodiments, when there is 1.5 kilograms to 5 kilograms of water stored in the example coolant container 4802, the example refrigerant evaporator 4806 may take up to 4 hours to freeze all the water into ice.

Similar to those described above, the breathing tube 4804 may comprise a breathing tube inlet opening that is connected to an air-purifying device outlet opening of the air-purifying device and receives purified air from the air-purifying device. In some embodiments, the breathing tube 4804 may comprise a breathing tube outlet opening that is connected to a respiratory headgear inlet opening of a respiratory headgear and provides the purified air to the respiratory headgear.

In some embodiments, at least a portion of the breathing tube 4804 runs through the coolant container 4802. For example, the breathing tube 4804 enters and exits the coolant container 4802 through one or more openings of the coolant container 4802. In some embodiments, the breathing tube 4804 comprises a cooling portion, which refers to the portion of the breathing tube 4804 that is within the coolant container 4802 and in contact with the coolant material 4810.

Similar to those described above, the breathing tube 4804 is in a shape similar to a substantially cylindrical shape. Additionally, or alternatively, the breathing tube 4804 may be in the form of other shape(s).

In some embodiments, the coolant container 4802 and the breathing tube 4804 (including, but not limited to, the cooling portion) may comprise different materials. For example, the breathing tube 4804 (including, but not limited to, the cooling portion) may comprise thermal conductive material that has a thermal conductivity at room temperature of between 0.2 W/mK and 10 W/mK. In some embodiments, the thermal conductive material has a thermal conductivity more preferably between 0.3 W/mK to 0.8 W/mK or between 0.3 W/mK to 0.5 W/mK, providing various technical benefits and improvements such as, but not limited to, allowing purified air to be cooled at a sufficient rate without causing too much condensation.

In some embodiments, preferred materials for the breathing tube 4804 (including, but not limited to, the cooling portion that is in contact with the coolant material 4810) may include, but are not limited to, HDPE, ABS, PPS, LDPE, PEEK, polybutylene terephthalate, EVA, Nylon 6, Nylon 66, and polyurethanes.

In some embodiments, the breathing tube 4804 can isolate purified air from the coolant material 4810 in the coolant container 4802. For example, the breathing tube 4804 (including, but not limited to, the cooling portion) has a gas and liquid barrier properties that is above a threshold (for example, as required by a safety standard) and/or a chemical resistance level that is above a threshold (for example, as required by a safety standard), thereby reducing/preventing the purified air from leaking into the coolant container 4802 and/or reducing/preventing the coolant material 4810 from leaking into the breathing tube 2008. In some embodiments, the thickness of the breathing tube 4804 (including, but not limited to, the cooling portion) is less than 10 mm, preferably less than 3 mm.

In some embodiments, the material for the breathing tube 4804 (including, but not limited to, the cooling portion) may include filler materials, which may provide the technical benefits and advantages such as, but not limited to, enhancing the thermal conductivities of the breathing tube 4804 (including, but not limited to, the cooling portion). In some embodiments, the material for the breathing tube 4804 (including, but not limited to, the cooling portion) may have a low density (for example, less than 1.4 $g/cm^3$, and preferably less than 1 $g/cm^3$).

In some embodiments, a length of the cooling portion of the breathing tube 4804 (e.g. the portion of the breathing tube 4804 that is in contact with the coolant material 4810) is between 1 cm to 100 cm. In some embodiments, the length is between 15 cm to 60 cm. In some embodiments, the length is between 20 cm to 30 cm. Example lengths of the cooling portion of the breathing tube 4804 described herein may provide technical benefits and advantages such as, but not limited to, maximizing the reduction of temperature of the purified air while minimizing the condensation of water.

In some embodiments, when the example refrigerant evaporator 4806 operates and reduces the temperature of the coolant materials stored in the example coolant container 4802, ice may be formed in the direct contact between the example refrigerant evaporator 4806 and the example coolant container 4802, which can in turn cause it technically challenging to remove the example refrigerant evaporator 4806 from being in direct contact with the example coolant container 4802. In some embodiments, to release the example refrigerant evaporator 4806 from being in contact with the example refrigerant evaporator 4806, water with a temperature higher than the freezing temperature can be poured to the top of the example refrigerant evaporator 4806, so that the ice accumulated in the direct contact can be removed, and the example refrigerant evaporator 4806 can be released from the example coolant container 4802.

Referring now to FIG. 49, an example function diagram 4900 illustrates example components that are connected to an example refrigerant evaporator 4901 for providing refringent material to and discharge refringent from the example refrigerant evaporator 4901.

In the example shown in FIG. 49, the refrigerant condenser 4905 is connected to the capillary tube 4903, which in turn is connected to the example refrigerant evaporator 4901, which in turn is connected to the refrigerant compressor 4907, which in turn is connected back to the refrigerant condenser 4905.

In some embodiments, the refrigerant compressor 4907 circulates refrigerant material and adds pressure to the refrigerant material, which causes the temperature of the refrigerant material to increase.

In some embodiments, the refrigerant material circulates from the refrigerant compressor 4907 to the refrigerant condenser 4905. In some embodiments, the refrigerant condenser 4905 condenses the refrigerant material, which transfers the refrigerant material from a gaseous form into a liquid form.

In some embodiments, the refrigerant material (in the liquid form) circulates from the refrigerant condenser 4905 to the capillary tube 4903. In some embodiments, the capillary tube 4903 provides an expansion of the length of circulating the refrigerant material. For example, the capillary tube 4903 may be in the form of a thin tubing and sprays the refrigerant material (in the liquid form) onto the example refrigerant evaporator 4901.

In some embodiments, the example refrigerant evaporator 4901 causes evaporation of the refrigerant material (i.e. transfers the refrigerant material from a liquid form into a gaseous form). For example, the example refrigerant evaporator 4901 reduces the pressure on the refrigerant material and causes the refrigerant material to transfer into gas form. The evaporation of the refrigerant material absorbs heat from the surrounding environment. As such, the example refrigerant evaporator 4901 can be used to reduce the temperature of the coolant material in the coolant container in accordance with some embodiments of the present disclosure.

Referring now to FIG. 50, example portions of an example air-purifying respirator 5000 that include an example coolant container 5002 and an example refrigerant evaporator 5004 in accordance with some embodiments of the present disclosure are illustrated.

For example, similar to those described above in connection with at least FIG. 22 to FIG. 24, the example air-purifying respirator 5000 comprises an example air-purifying device 5010. Similar to those described above, the breathing tube 5006 may comprise a breathing tube inlet opening 5008 that is connected to an air-purifying device outlet opening of the air-purifying device 5010 and receives purified air from the air-purifying device 5010. In some embodiments, the breathing tube 5006 may comprise a breathing tube outlet opening that is connected to a respiratory headgear inlet opening of the respiratory headgear and provides the purified air to the respiratory headgear.

In some embodiments, the example coolant container 5002 is positioned above the example air-purifying device 5010. In some embodiments, the example coolant container 5002 comprises coolant material, such as, but not limited to, water and/or ice.

Similar to those described above in connection with FIG. 48, the example coolant container 5002 defines a central hole. In some embodiments, at least a portion of the refrigerant evaporator 5004 is positioned within the central hole of the example coolant container 5002 and in contact with the coolant container 5002. As described above, the refrigerant evaporator 5004 may comprise refrigerant materials that flow through the refrigerant evaporator 5004, which can reduce the temperature of the coolant material in the coolant container 5002.

In some embodiments, at least a portion of the breathing tube 5006 runs through the coolant container 5002. For example, the breathing tube 5006 enters the coolant container 5002 through a coolant container entrance opening 5012 and exits the coolant container 5002 through a coolant container exit opening 5014. In some embodiments, the breathing tube 5006 comprises a cooling portion, which refers to the portion of the breathing tube 5006 that is within the coolant container 5002 and in contact with the coolant material. In some embodiments, the cooling portion of the breathing tube 5006 may at least partially surround the central hole of the coolant container 5002, where the example refrigerant evaporator 5004 is positioned.

As described above, the example refrigerant evaporator 5004 can reduce the temperature of the coolant container material in the coolant container 5002. Because the cooling portion of the breathing tube 5006 is in contact with the coolant material, the example refrigerant evaporator 5004 can reduce the temperature of purified air in the cooling portion of the breathing tube 5006.

Referring now to FIG. 51A and FIG. 51B, example views of an example refrigerant evaporator 5100 in accordance with some embodiments of the present disclosure are illustrated. In particular, FIG. 51A illustrates an example isometric view of the example refrigerant evaporator 5100. FIG. 51B illustrates an example perspective view of the example refrigerant evaporator 5100.

In the example shown in FIG. 51A, the example refrigerant evaporator 5100 comprises an evaporator base 5101 and an evaporator head 5103. In some embodiments, the evaporator base 5101 refers to a bottom portion of the example refrigerant evaporator 5100. In some embodiments, the evaporator head 5103 extends from the evaporator base 5101 and provides an elongated portion.

Similar to those described above, the example refrigerant evaporator 5100 may be positioned in a central hole of the coolant container. For example, the evaporator head 5103 may be positioned within the central hole of the coolant container, and the top surface of the evaporator base 5101 may provide mechanical support for the coolant container.

In some embodiments, the evaporator base 5101 defines a refrigerant circulation opening 5105. In the example shown in FIG. 51A and FIG. 51B, the refrigerant circulation opening 5105 is positioned on a side surface of the evaporator base 5101 of the example refrigerant evaporator 5100. In some embodiments, the refrigerant circulation opening 5105 corresponds to an opening where refrigerant material may enter and/or exit the example refrigerant evaporator 5100. For example, the refrigerant circulation opening 5105 may comprise one or more threads so that at least one refrigerant flow tube can be secured to the refrigerant circulation opening 5105 through tread engagement, similar to those described above.

In some embodiments, the example refrigerant evaporator 5100 defines a refrigerant flow channel for refrigerant material to flow within the example refrigerant evaporator 5100. In some embodiments, the refrigerant circulation opening 5105 is connected to the refrigerant flow channel.

For example, the refrigerant material may enter the refrigerant flow channel through the refrigerant circulation opening 5105. The refrigerant material may first flow through a bottom left portion 5107A of the refrigerant flow channel that is within the evaporator base 5101. The refrigerant material may then flow upwards to through the top left portion 5107B of the refrigerant flow channel that is within the evaporator head 5103, and then through the top middle portion 5107C of the refrigerant flow channel that is within the evaporator head 5103, and then flow downwards through the top right portion 5107D of the refrigerant flow channel that is within the evaporator head 5103. The refrigerant material may further flow through a bottom right portion 5107E of the refrigerant flow channel that is within the evaporator base 5101, and then exit the refrigerant flow channel through the refrigerant circulation opening 5105.

Referring now to FIG. 52A and FIG. 52B, example views of an example refrigerant evaporator 5200 in accordance with some embodiments of the present disclosure are illustrated. In particular, FIG. 52A illustrates an example perspective view of the example refrigerant evaporator 5200. FIG. 52B illustrates an example cross-sectional view of the example refrigerant evaporator 5200.

In some embodiments, the example refrigerant evaporator 5200 comprises an evaporator base 5202 and an evaporator head 5204, similar to the evaporator base 5101 and the evaporator head 5103 described above in connection with FIG. 51A and FIG. 51B.

In some embodiments, the evaporator base 5202 defines an refrigerant circulation opening 5206. In the example shown in FIG. 52A and FIG. 52B, the refrigerant circulation opening 5206 is positioned on a bottom surface of the evaporator base 5202 of the example refrigerant evaporator 5200. In some embodiments, the refrigerant circulation opening 5206 corresponds to an opening where refrigerant material may enter and/or exit the example refrigerant evaporator 5200. For example, the refrigerant circulation opening 5206 may comprise one or more threads so that at least one refrigerant flow tube can be secured to the refrigerant circulation opening 5206 through tread engagement, similar to those described above.

In some embodiments, the example refrigerant evaporator 5200 defines a refrigerant flow channel for refrigerant material to flow within the example refrigerant evaporator 5200. In some embodiments, the refrigerant circulation opening 5206 is connected to the refrigerant flow channel.

For example, the refrigerant material may enter the refrigerant flow channel through the refrigerant circulation opening 5206. The refrigerant material may first flow up through a bottom left portion 5208A of the refrigerant flow channel that is within the evaporator base 5202. The refrigerant material may then flow upwards to through the top left portion 5208B of the refrigerant flow channel that is within the evaporator head 5204, and then through the top middle portion 5208C of the refrigerant flow channel that is within the evaporator head 5204, and then flow downwards through the top right portion 5208D of the refrigerant flow channel that is within the evaporator head 5204. The refrigerant material may further flow downwards through a bottom right portion 5208E of the refrigerant flow channel that is within the evaporator base 5202, and then flow downwards to exit the refrigerant flow channel through the refrigerant circulation opening 5206.

Referring now to FIG. 53A and FIG. 53B, example views of an example coolant container 5300 in accordance with some embodiments of the present disclosure are illustrated.

In some embodiments, the example coolant container 5300 stores coolant material. In some embodiments, the example coolant container 5300 comprises a coolant container entrance opening 5305 and a coolant container exit opening 5303, similar to various examples described herein. In some embodiments, the breathing tube enters the coolant container 5300 through the coolant container entrance opening 5305 and exits the coolant container 5300 through the coolant container exit opening 5303. In some embodiments, a cooling portion 5307 of the breathing tube is disposed in the example coolant container 5300.

In some embodiments, the example coolant container 5300 further comprises a condensation release valve 5309. In some embodiments, the condensation release valve 5309 is connected to the cooling portion 5307 of the breathing tube, so that condensation in the breathing tube can be released through the condensation release valve 5309.

In some embodiments, the example coolant container 5300 defines a longitudinal center hole 5301. In particular, the longitudinal center hole 5301 is positioned at the center of the example coolant container 5300 and extends in a longitudinal direction. As shown in FIG. 53B, the longitudinal direction is approximately orthogonal to a plane where the cooling portion 5307 of the breathing tube is positioned. In some embodiments, the cooling portion 5307 of the breathing tube surrounds the longitudinal center hole 5301.

Referring now to FIG. 54A, FIG. 54B, and FIG. 54C, example views of example portions of an example air-purifying respirator 5400 that includes an example refrigerant evaporator 5402 and an example coolant container 5404 in accordance with some embodiments of the present disclosure are illustrated.

In particular, FIG. 54A illustrates an example perspective view of the example air-purifying respirator 5400. FIG. 54B and FIG. 54C illustrate example cross-sectional views of the example air-purifying respirator 5400.

In some embodiments, the example coolant container 5404 stores coolant material. In some embodiments, the example coolant container 5404 comprises a coolant container entrance opening 5406 and a coolant container exit opening 5408, similar to various examples described herein. In some embodiments, the breathing tube enters the coolant container 5404 through the coolant container entrance opening 5406 and exits the coolant container 5404 through the coolant container exit opening 5408. In some embodiments, a cooling portion 5412 of the breathing tube is disposed in the example coolant container 5404.

In some embodiments, the example coolant container 5404 further comprises a condensation release valve 5410. In some embodiments, the condensation release valve 5410 is connected to the cooling portion 5412 of the breathing tube, so that condensation in the breathing tube can be released through the condensation release valve 5410.

In some embodiments, the example coolant container 5404 defines a longitudinal center hole 5414. In particular, the longitudinal center hole 5414 is positioned at the center of the example coolant container 5404 and extends in a longitudinal direction. As shown in FIG. 54B, the longitudinal direction is approximately orthogonal to a plane where the cooling portion 5412 of the breathing tube is positioned. In some embodiments, the cooling portion 5412 of the breathing tube surrounds the longitudinal center hole 5414.

In some embodiments, at least a portion of the example refrigerant evaporator 5402 is positioned in the longitudinal center hole 5414. For example, the example refrigerant evaporator 5402 comprises an evaporator base 5418 and an evaporator head 5416 that extends from the evaporator base 5418. In the example shown in FIG. 54B, the evaporator head 5416 of the example refrigerant evaporator 5402 is positioned within the longitudinal center hole 5414 and in contact with the coolant container 5404. In some embodiments, the example refrigerant evaporator 5402 defines a refrigerant flow channel where refrigerant material may circulate.

In the example shown in FIG. 54C, the cooling portion 5412 of the breathing tube is disposed within the coolant container 5404 and surrounds the evaporator head 5416 of the example refrigerant evaporator 5402. As refrigerant material circulates through the refrigerant flow channel, the temperature of the evaporator head 5416 of the example refrigerant evaporator 5402 is reduced. Because the evaporator head 5416 of the example refrigerant evaporator 5402 is in contact with the coolant container 5404, the evaporator head 5416 may reduce the temperature of the coolant container 5404, including the coolant material in the coolant container 5404. As the temperature of the coolant material is reduced, the temperature of the cooling portion 5412 of the breathing tube is also reduced. As such, the temperature of the purified air within the cooling portion 5412 of the breathing tube can be reduced.

Referring now to FIG. 55A, FIG. 55B, FIG. 55C, and FIG. 55D, example views of example portions of an example air-purifying respirator 5500 that includes an example refrigerant evaporator 5501 and an example coolant container 5503 in accordance with some embodiments of the present disclosure are illustrated.

Figure 55A:
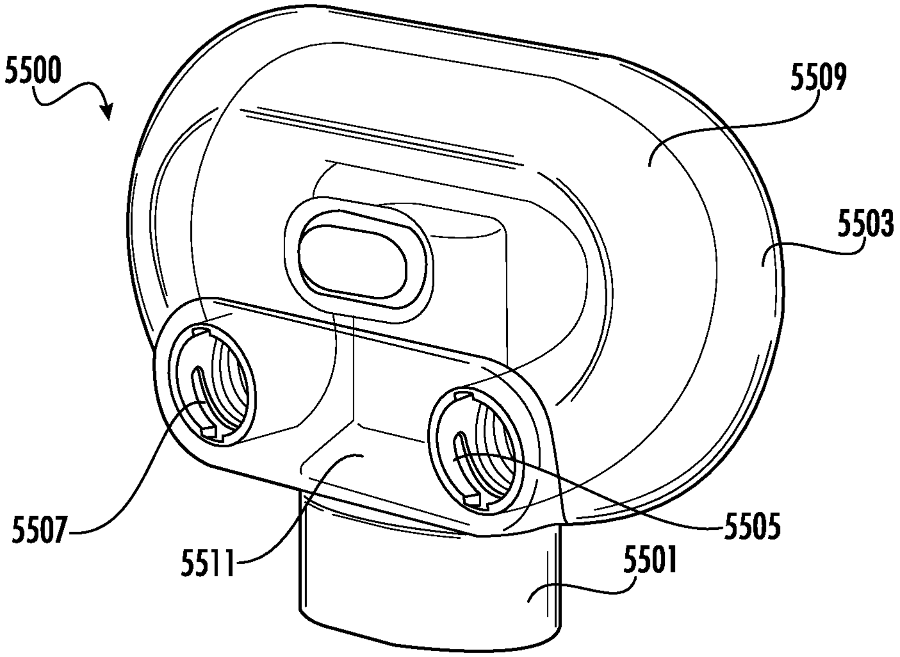
Figure 55B:
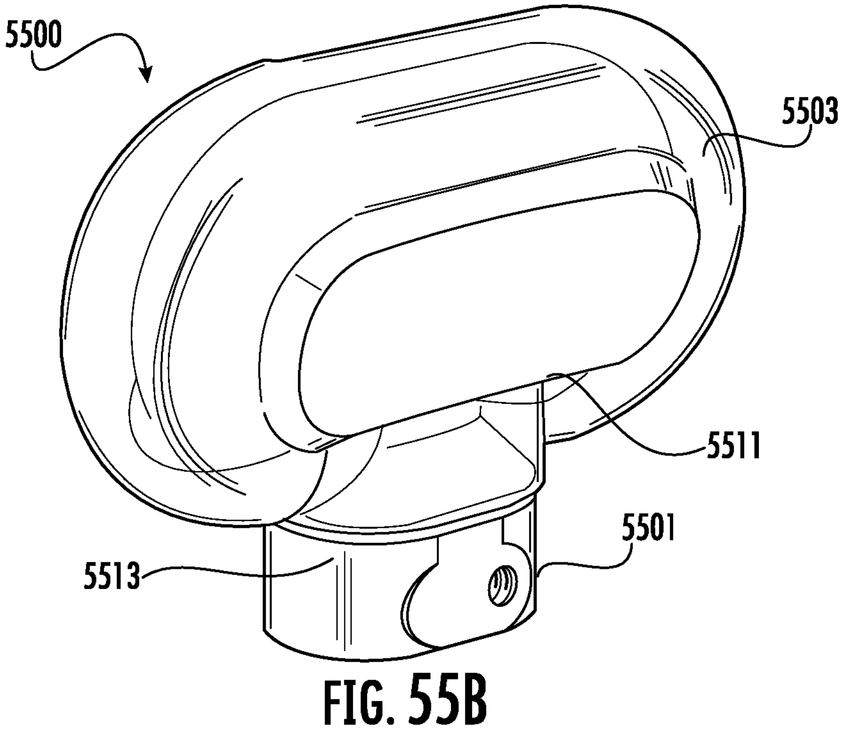
Figure 55D:
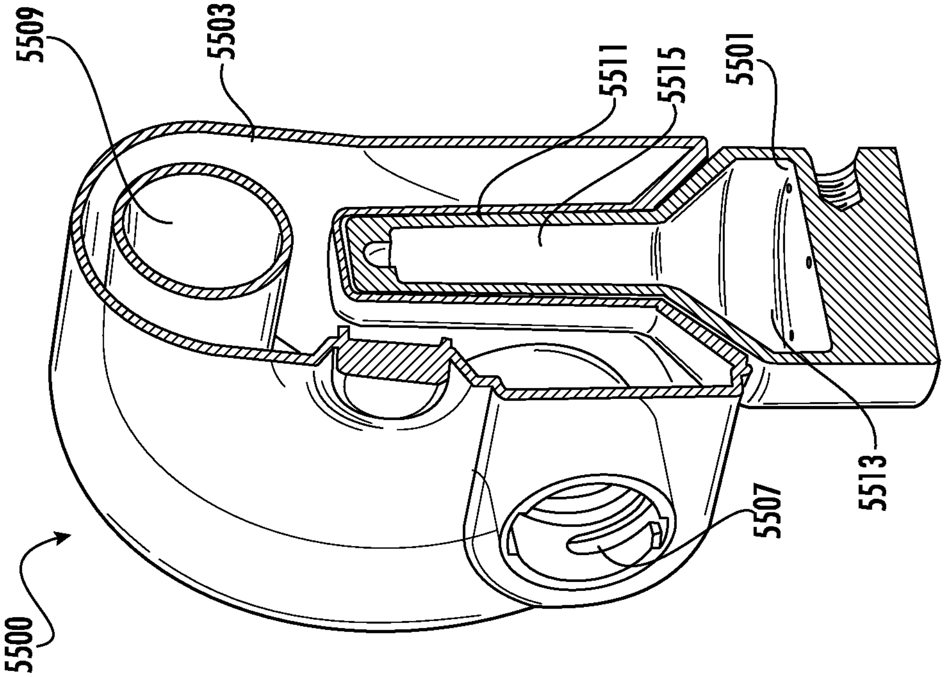
Figure 55C:
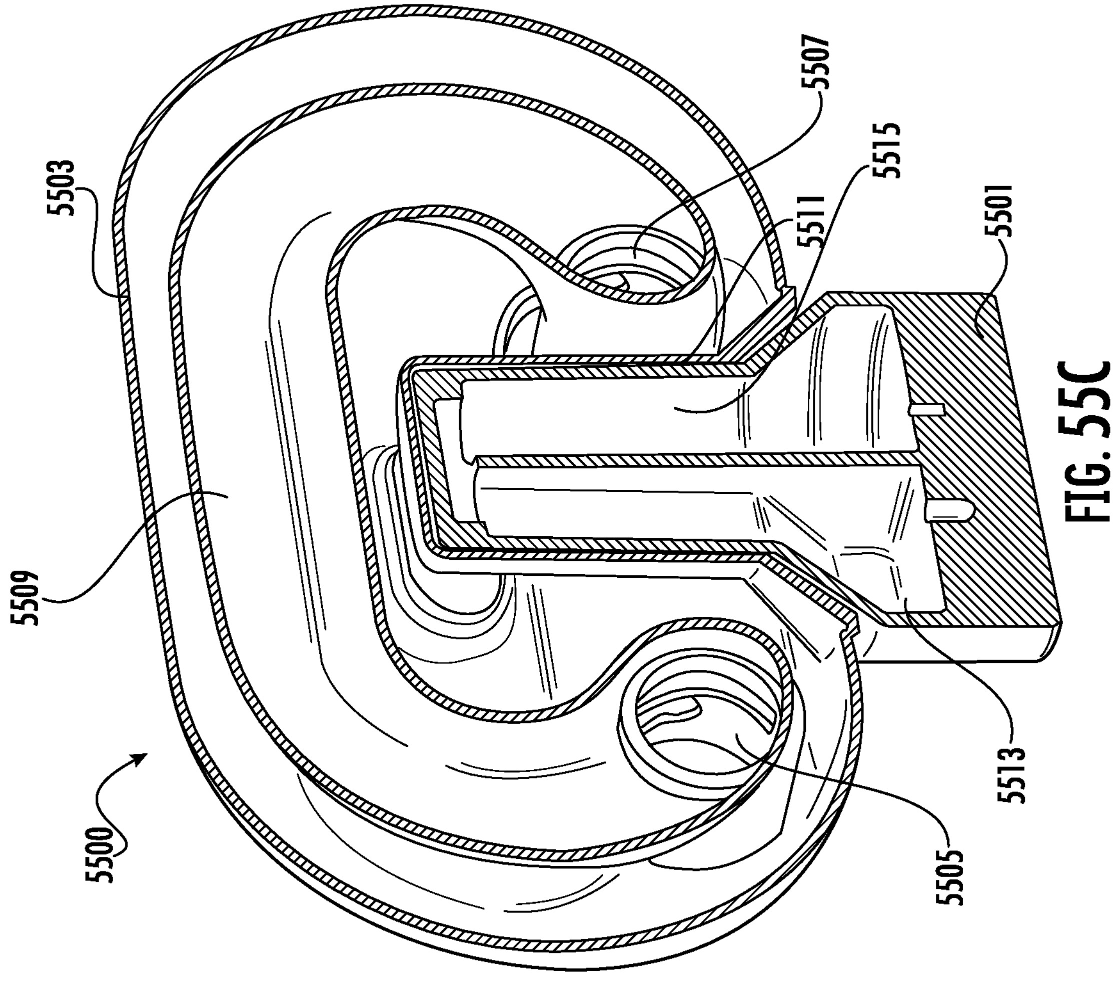

In particular, FIG. 55A illustrates an example front side view of the example air-purifying respirator 5500. FIG. 55B illustrates an example back side view of the example air-purifying respirator 5500. FIG. 55C and FIG. 55D illustrate example cross-sectional views of the example air-purifying respirator 5500.

In some embodiments, the example coolant container 5503 stores coolant material. In some embodiments, the example coolant container 5503 comprises a coolant container entrance opening 5505 and a coolant container exit opening 5507, similar to various examples described herein. In some embodiments, the breathing tube enters the coolant container 5503 through the coolant container entrance opening 5505 and exits the coolant container 5503 through the coolant container exit opening 5507. In some embodiments, a cooling portion 5509 of the breathing tube is disposed in the example coolant container 5503.

In some embodiments, the example coolant container 5503 defines a transverse center hole 5511. In particular, the transverse center hole 5511 is positioned at the center of the example coolant container 5503 and extends in a transverse direction. As shown in FIG. 55C and FIG. 55D, the transverse direction is approximately parallel to a plane where the cooling portion 5509 of the breathing tube is positioned. In some embodiments, the cooling portion 5509 of the breathing tube surrounds the transverse center hole 5511.

In some embodiments, at least a portion of the example refrigerant evaporator 5501 is positioned in the transverse center hole 5511. For example, the example refrigerant evaporator 5501 comprises an evaporator base 5513 and an evaporator head 5515 that extends from the evaporator base 5513. In the example shown in FIG. 55C and FIG. 55D, the evaporator head 5515 of the example refrigerant evaporator 5501 is positioned within the transverse center hole 5511 and in contact with the coolant container 5503. In some embodiments, the example refrigerant evaporator 5501 defines a refrigerant flow channel where refrigerant material may circulate.

In the example shown in FIG. 55C and FIG. 55D, the cooling portion 5509 of the breathing tube is disposed within the coolant container 5503 and surrounds the evaporator head 5515 of the example refrigerant evaporator 5501. As refrigerant material circulates through the refrigerant flow channel, the temperature of the evaporator head 5515 of the example refrigerant evaporator 5501 is reduced. Because the evaporator head 5515 of the example refrigerant evaporator 5501 is in contact with the coolant container 5503, the evaporator head 5515 may reduce the temperature of the coolant container 5503, including the coolant material in the coolant container 5503. As the temperature of the coolant material is reduced, the temperature of the cooling portion 5509 of the breathing tube is also reduced. As such, the temperature of the purified air within the cooling portion 5509 of the breathing tube can be reduced.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims.

Although specific terms are employed herein, they are used in a generic and descriptive sense only and not for purposes of limitation, unless described otherwise.

The invention claimed is:

1. An air-purifying respirator comprising:

a coolant container comprising a coolant material stored within a container shell, wherein the coolant container defines a central hole;

a refrigerant evaporator comprising a refrigerant material configured to reduce a temperature of the coolant material; and a breathing tube comprising:

a cooling portion located within the coolant container;

a breathing tube inlet opening connected to an air-purifying device outlet opening; and a breathing tube outlet opening connected to a respiratory headgear inlet opening to provide purified air thereto, wherein the breathing tube enters the coolant container through a coolant container entrance opening of the coolant container and exits the coolant container through a coolant container exit opening of the coolant container, wherein at least a portion of the refrigerant evaporator is positioned within the central hole of the coolant container such that the refrigerant evaporator is secured through a male-female interlock mechanism, and wherein the cooling portion of the breathing tube is in contact with the coolant material in the coolant container and at least partially surrounds the central hole such that both the coolant container and the refrigerant evaporator are configured to absorb heat from purified air in the breathing tube.

2. The air-purifying respirator of claim 1, wherein the refrigerant evaporator defines a refrigerant flow channel within an outer shell of the refrigerant evaporator and a refrigerant circulation opening, and wherein the refrigerant circulation opening is connected to the refrigerant flow channel.

3. The air-purifying respirator of claim 2, wherein the refrigerant material enters the refrigerant flow channel through the refrigerant circulation opening.

4. The air-purifying respirator of claim 1, wherein the breathing tube enters the coolant container through a front coolant container entrance opening of the coolant container and exits the coolant container through a front coolant container exit opening of the coolant container.

5. The air-purifying respirator of claim 1, wherein the breathing tube enters the coolant container through a bottom coolant container entrance opening of the coolant container and exits the coolant container through a top coolant container exit opening of the coolant container.

6. The air-purifying respirator of claim 1, wherein the breathing tube enters the coolant container through a left coolant container entrance opening of the coolant container and exits the coolant container through a top coolant container exit opening of the coolant container.

7. The air-purifying respirator of claim 1, wherein the breathing tube enters the coolant container through a top coolant container entrance opening of the coolant container and exits the coolant container through a top coolant container exit opening of the coolant container.

8. The air-purifying respirator of claim 1, wherein the breathing tube enters the coolant container through a right coolant container entrance opening of the coolant container and exits the coolant container through a left coolant container exit opening of the coolant container.

9. The air-purifying respirator of claim 1, further comprising:

a blower assembly housing defining a sunken surface, wherein a centrifugal blower is disposed in the blower assembly housing; and a filter cartridge positioned on the sunken surface of the blower assembly housing, wherein the filter cartridge comprises the additional coolant material.

10. The air-purifying respirator of claim 9, wherein a centrifugal blower inlet opening of the centrifugal blower is on the sunken surface.

11. The air-purifying respirator of claim 9, wherein the additional coolant material comprises ammonium nitrate.

12. The air-purifying respirator of claim 9, wherein the additional coolant material comprises water.

13. The air-purifying respirator of claim 1, further comprising:

a blower assembly housing defining a sunken surface, wherein a centrifugal blower is disposed in the blower assembly housing;

a cooling cartridge positioned on the sunken surface of the blower assembly housing, wherein the cooling cartridge comprises additional coolant material; and a filter cartridge positioned to a top surface of the cooling cartridge.

14. The air-purifying respirator of claim 13, wherein a centrifugal blower inlet opening of the centrifugal blower is on the sunken surface.

15. The air-purifying respirator of claim 13, wherein the additional coolant material comprises ammonium nitrate and water.

16. The air-purifying respirator of claim 13, wherein the additional coolant material comprises ice and water.

17. The air-purifying respirator of claim 1, further comprising:

a blower assembly housing, wherein a centrifugal blower is disposed in the blower assembly housing;

a blower assembly cover secured to the blower assembly housing; and a cooling pad disposed on an inner surface of a blower assembly cover, wherein the cooling pad comprises additional coolant material.

18. The air-purifying respirator of claim 17, wherein the additional coolant material comprises ammonium nitrate and water.

19. The air-purifying respirator of claim 1, wherein the container shell isolates the coolant material from an ambient environment.

20. The air-purifying respirator of claim 1, wherein the refrigerant evaporator comprises an outer shell made of thermally conductive material.

* * * * *